US012461109B2

(12) United States Patent
Emrich et al.

(10) Patent No.: US 12,461,109 B2
(45) Date of Patent: Nov. 4, 2025

(54) VITRO PREDICTION OF IN VIVO HALF-LIFE

(71) Applicant: Hoffmann-La Roche Inc., Little Falls, NJ (US)

(72) Inventors: Thomas Emrich, Iffeldorf (DE); Hubert Kettenberger, Munich (DE); Tilman Schlothauer, Penzberg (DE); Angela Schoch, Munich (DE)

(73) Assignee: Hoffmann-La Roche Inc.

( * ) Notice: Subject to any disclaimer, the term of this patent is extended or adjusted under 35 U.S.C. 154(b) by 315 days.

(21) Appl. No.: 17/158,431

(22) Filed: Jan. 26, 2021

(65) Prior Publication Data

US 2021/0190795 A1 Jun. 24, 2021

Related U.S. Application Data

(63) Continuation of application No. 15/271,091, filed on Sep. 20, 2016, now abandoned, which is a continuation of application No. PCT/EP2015/055482, filed on Mar. 17, 2015.

(30) Foreign Application Priority Data

Mar. 21, 2014 (EP) .................................... 14161103
Apr. 25, 2014 (EP) .................................... 14165987

(51) Int. Cl.
*G01N 33/68* (2006.01)
*B01D 15/16* (2006.01)
*B01D 15/38* (2006.01)
*C07K 16/00* (2006.01)

(52) U.S. Cl.
CPC ....... *G01N 33/6854* (2013.01); *B01D 15/168* (2013.01); *B01D 15/3809* (2013.01); *C07K 16/00* (2013.01); *C07K 2317/52* (2013.01); *C07K 2317/94* (2013.01)

(58) Field of Classification Search
None
See application file for complete search history.

(56) References Cited

U.S. PATENT DOCUMENTS 4,676,980 A 6/1987 Segal et al.
4,737,456 A 4/1988 Weng et al.
4,816,567 A 3/1989 Cabilly et al.
5,208,020 A 5/1993 Chari et al.
5,416,064 A 5/1995 Chari et al.
5,429,746 A 7/1995 Shadle et al.
5,500,362 A 3/1996 Robinson et al.
5,571,894 A 11/1996 Wels et al.
5,587,458 A 12/1996 King et al.
5,591,828 A 1/1997 Bosslet et al.
5,610,285 A 3/1997 Lebing et al.
5,624,821 A 4/1997 Winter et al.
5,635,483 A 6/1997 Pettit et al.
5,648,237 A 7/1997 Carter
5,648,260 A 7/1997 Winter et al.
5,658,570 A 8/1997 Newman et al.
5,712,374 A 1/1998 Kuntsmann et al.
5,714,586 A 2/1998 Kunstmann et al.
5,731,168 A 3/1998 Carter et al.
5,739,116 A 4/1998 Hamann et al.
5,750,373 A 5/1998 Garrard et al.
5,767,285 A 6/1998 Hamann et al.
5,770,429 A 6/1998 Lonberg et al.
5,770,701 A 6/1998 McGahren et al.
5,770,710 A 6/1998 McGahren et al.
5,773,001 A 6/1998 Hamann et al.
5,780,588 A 7/1998 Pettit et al.
5,789,199 A 8/1998 Joly et al.
5,821,337 A 10/1998 Carter et al.
5,840,523 A 11/1998 Simmons et al.
5,869,046 A 2/1999 Presta et al.
5,877,296 A 3/1999 Hamann et al.
5,959,177 A 9/1999 Hein et al.
6,040,498 A 3/2000 Stomp et al.
6,075,181 A 6/2000 Kucherlapati et al.
(Continued)

FOREIGN PATENT DOCUMENTS

EP 0 425 235 B1 9/1996
WO 9301161 A1 1/1993
(Continued)

OTHER PUBLICATIONS

Akilesh, S., et al., "Podocytes use FcRn to clear IgG from the glomerular basement membrane," Proc. Natl. Acad. Sci. USA 105 (2008) 967-972.
Almagro, J.C. and Fransson, J., "Humanization of antibodies," Front. Biosci. 13 (2008) 1619-1633.
Baca, M., et al., "Antibody Humanization Using Monovalent Phage Display*," J. Biol. Chem. 272 (1997) 10678-10684.
(Continued)

*Primary Examiner* — Stacy B Chen

(57) ABSTRACT

Herein is reported a method for determining the presence of antibody-Fab-FcRn interaction in an antibody-Fc-FcRn complex influencing the in vivo half-life comprising the steps of a) determining the retention time of the antibody on an FcRn affinity chromatography column with a positive linear pH gradient elution in the presence of a first sodium chloride concentration, and b) determining the retention time of the antibody on an FcRn affinity chromatography column with a positive linear pH gradient elution in the presence of a second sodium chloride concentration, whereby the presence of antibody-Fab-FcRn interaction in an antibody-Fc-FcRn complex influencing the in vivo half-life is determined if the retention time determined in step a) and the retention time determined in step b) are substantially different.

4 Claims, 23 Drawing Sheets

Specification includes a Sequence Listing.

(56) References Cited

U.S. PATENT DOCUMENTS

| | | | |
|---|---|---|---|
| 6,140,474 | A | 10/2000 | Kamada et al. |
| 6,150,584 | A | 11/2000 | Kucherlapati et al. |
| 6,171,586 | B1 | 1/2001 | Lam et al. |
| 6,194,551 | B1 | 2/2001 | Idusogie et al. |
| 6,248,516 | B1 | 6/2001 | Winter et al. |
| 6,267,958 | B1 | 7/2001 | Andya et al. |
| 6,339,142 | B1 | 1/2002 | Basey et al. |
| 6,417,429 | B1 | 7/2002 | Hein et al. |
| 6,420,548 | B1 | 7/2002 | Vezina et al. |
| 6,602,684 | B1 | 8/2003 | Umana et al. |
| 6,630,579 | B2 | 10/2003 | Chari et al. |
| 6,737,056 | B1 | 5/2004 | Presta |
| 6,875,432 | B2 | 4/2005 | Liu et al. |
| 6,946,292 | B2 | 9/2005 | Kanda et al. |
| 6,982,321 | B2 | 1/2006 | Winter |
| 7,041,870 | B2 | 5/2006 | Tomizuka et al. |
| 7,087,409 | B2 | 8/2006 | Barbas, III et al. |
| 7,125,978 | B1 | 10/2006 | Vezina et al. |
| 7,189,826 | B2 | 3/2007 | Rodman |
| 7,332,581 | B2 | 2/2008 | Presta |
| 7,498,298 | B2 | 3/2009 | Doronina et al. |
| 7,521,541 | B2 | 4/2009 | Eigenbrot et al. |
| 7,527,791 | B2 | 5/2009 | Adams et al. |
| 7,662,930 | B2 | 2/2010 | Zhou |
| 7,691,980 | B2 | 4/2010 | Gagnon |
| 7,834,152 | B2 | 11/2010 | Strom et al. |
| 8,198,409 | B2 | 6/2012 | Sato |
| 8,313,913 | B2 | 11/2012 | Nakamura et al. |
| 9,096,651 | B2 | 8/2015 | Igawa et al. |
| 2002/0004587 | A1 | 1/2002 | Miller et al. |
| 2002/0151688 | A1 | 10/2002 | Ristol Debart et al. |
| 2002/0164328 | A1 | 11/2002 | Shinkawa et al. |
| 2003/0115614 | A1 | 6/2003 | Kanda et al. |
| 2003/0157108 | A1 | 8/2003 | Presta |
| 2004/0072290 | A1 | 4/2004 | Umana et al. |
| 2004/0093621 | A1 | 5/2004 | Shitara et al. |
| 2004/0109865 | A1 | 6/2004 | Niwa et al. |
| 2004/0110282 | A1 | 6/2004 | Kanda et al. |
| 2004/0110704 | A1 | 6/2004 | Yamane et al. |
| 2004/0132140 | A1 | 7/2004 | Satoh et al. |
| 2005/0014934 | A1 | 1/2005 | Hinton et al. |
| 2005/0031613 | A1 | 2/2005 | Nakamura et al. |
| 2005/0079574 | A1 | 4/2005 | Bond |
| 2005/0119455 | A1 | 6/2005 | Fuh et al. |
| 2005/0123546 | A1 | 6/2005 | Umana et al. |
| 2005/0175606 | A1 | 8/2005 | Huang et al. |
| 2005/0260186 | A1 | 11/2005 | Bookbinder et al. |
| 2005/0266000 | A1 | 12/2005 | Bond et al. |
| 2006/0025576 | A1 | 2/2006 | Miller et al. |
| 2006/0104968 | A1 | 5/2006 | Bookbinder et al. |
| 2007/0061900 | A1 | 3/2007 | Murphy et al. |
| 2007/0117126 | A1 | 5/2007 | Sidhu et al. |
| 2007/0134759 | A1 | 6/2007 | Nishiya et al. |
| 2007/0160598 | A1 | 7/2007 | Dennis et al. |
| 2007/0237764 | A1 | 10/2007 | Birtalan et al. |
| 2007/0292936 | A1 | 12/2007 | Barthelemy et al. |
| 2008/0069820 | A1 | 3/2008 | Fuh et al. |
| 2008/0167450 | A1 | 7/2008 | Pan |
| 2008/0241884 | A1 | 10/2008 | Shitara et al. |
| 2009/0002360 | A1 | 1/2009 | Chen et al. |
| 2010/0069617 | A1 | 3/2010 | Gagnon |
| 2010/0311952 | A1 | 12/2010 | Falkenstein et al. |
| 2013/0005948 | A1 | 1/2013 | Binder et al. |
| 2013/0131319 | A1 | 5/2013 | Igawa et al. |
| 2014/0142283 | A1 | 5/2014 | Baehner et al. |
| 2014/0243508 | A1 | 8/2014 | Falkenstein et al. |
| 2017/0227547 | A1 | 8/2017 | Emrich et al. |

FOREIGN PATENT DOCUMENTS

| | | | |
|---|---|---|---|
| WO | 93/08829 | A1 | 5/1993 |
| WO | 93/16185 | A1 | 8/1993 |
| WO | 94/11026 | A2 | 5/1994 |
| WO | 94/29351 | A1 | 12/1994 |
| WO | 96027011 | A1 | 9/1996 |
| WO | 1997/30087 | A1 | 8/1997 |
| WO | 1998/58964 | A1 | 12/1998 |
| WO | 1999/22764 | A1 | 5/1999 |
| WO | 99/51642 | A1 | 10/1999 |
| WO | 2000/61739 | A1 | 10/2000 |
| WO | 2001/29246 | A1 | 4/2001 |
| WO | 2003/011878 | A2 | 2/2003 |
| WO | 2004/056312 | A2 | 7/2004 |
| WO | 2005/053742 | A2 | 6/2005 |
| WO | 2005082926 | A1 | 9/2005 |
| WO | 2006/029879 | A2 | 3/2006 |
| WO | 2006/044908 | A2 | 4/2006 |
| WO | 2008/077546 | A1 | 7/2008 |
| WO | 2009/080252 | A1 | 7/2009 |
| WO | 2009/080253 | A1 | 7/2009 |
| WO | 2009/080254 | A1 | 7/2009 |
| WO | 2010045193 | A1 | 4/2010 |
| WO | 2010/112193 | A1 | 10/2010 |
| WO | 2010/115589 | A1 | 10/2010 |
| WO | 2010/136172 | A1 | 12/2010 |
| WO | 2010/145792 | A1 | 12/2010 |
| WO | 2010/145793 | A1 | 12/2010 |
| WO | 2014009465 | A1 | 1/2014 |
| WO | 2015140126 | A1 | 9/2015 |
| WO | 2015175874 | A2 | 11/2015 |
| WO | 2016071376 | A2 | 5/2016 |

OTHER PUBLICATIONS

Boerner, P., et al., "Production of Antigen-Specific Human Monoclonal Antibodies From In Vitro-Primed Human Splenocytes," J. Immunol. 147 (1991) 86-95.
Brennan, M., et al., "Preparation of Bispecific Antibodies by Chemical Recombination of Monoclonal Immunoglobulin G1 Fragments," Science 229 (1985) 81-83.
Brodeur, B.R., et al., "Monoclonal Antibody Production Techniques and Applications," Marcel Dekker, Inc., New York (1987), pp. 51-63.
Bruggemann, M., et al., "Comparison of the Effector Functions of Human Immunoglobulins Using a Matched Set of Chimericantibodies," J. Exp. Med. 166 (1987) 1351-1361.
Carter, P., et al., "Humanizationofananti-p185HER2antibodyforhuman cancertherapy," Proc. Natl. Acad. Sci. USA 89 (1992) 4285-4289.
Chari, R.V., et al., "Immunoconjugates Containing Novel Maytansinoids: Promising Anticancer Drugs," Cancer Res. 52 (1992) 127-131.
Charlton, K.A., "Methods in Molecular Biology," vol. 248, Lo, B.K.C. (ed.), Humana Press, Totowa, NJ (2003), pp. 245-254.
Chothia, C. and Lesk, A.M., "Canonical Structures for the Hypervariable Regions of Immunoglobulins," J. Mol. Biol. 196 (1987) 901-917.
Chowdhury, P.S., "Engineering Hot Spots for Affinity Enhancement of Antibodies," Methods Mol. Biol. 207 (2008) 179-196.
Cragg, M.S. and M.J. Glennie, "Antibody specificity controls in vivo effector mechanisms of anti-CD20 reagents," Blood 103 (2004) 2738-2743.
Cragg, M.S., et al., "Complement-mediated lysis by anti-CD20 mAb correlates with segregation into lipid rafts," Blood 101 (2003) 1045-1052.
Cunningham, B.C. and Wells, J.A., "High-Resolution Epitope Mapping of hGH-Receptor Interactions by Alanine-Scanning Mutagenesis," Science 244 (1989) 1081-1085.
Dall'Acqua, W.F., et al., "Antibody humanization by framework shuffling," Methods 36 (2005) 43-60.
Dickinson, B.L., et al., "Bidirectional FcRn-dependent IgG transport in a polarized human intestinal epithelial cell line," J. Clin. Invest. 104 (1999) 903-911.
Dubowchik, G.M., et al., "Doxorubicin Immunoconjugates Containing Bivalent, Lysosomally-Cleavable Dipeptide Linkages," Bioorg. & Med. Chem. Letters 12 (2002) 1529-1532.
Duncan, A.R. and Winter, G., "The binding site for C1q on IgG," Nature 322 (1988) 738-740.
Ellman, et al., Biosynthetic Method for Introducing Unnatural Amino Acids Site-Specifically into Proteins Meth. Enzym. 202 (1991) 301-336.

(56) References Cited

OTHER PUBLICATIONS

Fellouse, F.A., "Synthetic antibedks from iiour-amino-zicid code: A dominant role for tyrosine in antigen recognition," Proc. Natl. Acad. Sci. USA 101 (2004) 12467-12472.
Gazzano-Santoro, H., et al., "A non-radioactive complement-dependent cytotoxicity assay for anti-CD20 monoclonal antibody," J. Immunol. Methods 202 (1996) 163-171.
Gerngross, T.U., "Advances in the production of human therapeutic proteins in yeasts and filamentous fungi," Nat. Biotech. 22 (2004) 1409-1414.
Ghetie, V., et al., "Increasing the serum persistence of an IgG fragment by random mutagenesis," Nat. Biotechnol. 15 (1997) 637-640.
Graham, F.L., et al., "Characteristics of a Human Cell Line Transformed by DNA from Human Adenovirus Type 5," J. Gen Virol. 36 (1977) 59-74.
Griffiths, A.D., et al., "Human anti-self antibodies with high specificity from phage display libraries," EMBO J. 12 (1993) 725-734.
Gruber, M., et al., "Efficient tumor cell lysis mediated by a bispecific single chain antibody expressed in *Escherichia coli*," J. Immunol. 152 (1994) 5368-5374.
Guyer, R.L., et al., "Immunoglobulin Binding by Mouse Intestinal Epithelial Cell Receptors," J. Immunol. 117 (1976) 587-593.
Hellstrom, I., et al., "Strong antitumoractivities of IgG3 antibodies to a human melanoma-associated ganglioside," Proc. Natl. Acad. Sci. USA 82 (1985) 1499-1502.
Hellstrom, I., et al., "Antitumor effects of L6, and IgG2a antibody that reacts with most human carcinomas," Proc. Natl. Acad. Sci. USA 83 (1986) 7059-7063.
Hermanson, G.T., et al., "Antibody Modification and Conjugation," Bioconjugate Techniques, Academic Press (1996). (Two pages).
Hinman, L.M., et al., "Preparation and Characterization of Monoclonal Antibody Conjugates of the Calicheamicins: A Novel and Potent Family of Antitumor Antibiotics," Cancer Res. 53 (1993) 3336-3342.
Hinton, P.R., et al., "Engineered Human IgG Antibodies with Longer Serum Half-lives in Primates," J. Biol. Chem. 279 (2004) 6213-6216.
Hinton, P.R., et al., "An Engineered Human IgG1 Antibody with Longer Serum Half-Life," J. Immunol. 176 (2006) 346-356.
Holliger, P., et al., ""Diabodies": Smallbivalentandbispecificantibodyfragments," Proc. Natl. Acad. Sci. USA 90 (1993) 6444-6448.
Hoogenboom, H.R. and Winter, G., "By-passing Immunisation Human Antibodies from Synthetic Repertoires of Germline VH Gene Segments Rearranged in Vitro," J. Mol. Biol. 227 (1992) 381-388.
Hoogenboom, H.R., et al., "Overview of Antibody Phage-Display Technology and Its Applications," Methods in Molecular Biology 178 (2002) 1-37.
Hudson, P.J. et al., "Engineered antibodies," Nat. Med. 9 (2003) 129-134.
Idusogie, E.E., et al., "Mapping of the C1q Binding Site on Rituxan, a Chimeric Antibody with a Human IgG1 Fc," J. Immunol. 164 (2000) 4178-4184.
Israel, E.J., "Increased clearance of IgG in mice that lack beta 2-microglobulin: possible protective role of FcRn" Immunology 89 (1996) 573-578.
Jeffrey, S.C., et al., "Dipeptide-based highly potent doxorubicin antibody conjugates," Bioorg. Med. Chem. Lett. 16 (2006) 358-362.
Junghans, R.P. and Anderson, C.L., "The protection receptor for IgG catabolismis the B32-microglobulin-containing neonatal intestinal transport receptor," Proc. Natl. Acad. Sci. USA 93 (1996) 5512-5516.
Kabat, E.A., et al., "Sequences of Proteins of Immunological Interest," 5th ed. Public Health Service, National Institutes of Health, Bethesda, MD (1991), NIH Publication 91-3242.
Kam, N.W., et al., "Carbon nanotubes as multifunctional biological transporters and near-infrared agents for selective cancer cell destruction," Proc. Natl. Acad. Sci. USA 102 (2005) 11600-11605.
Kanda, Y., et al., "Comparison of Cell Lines for Stable Production of Fucose-Negative Antibodies With Enhanced ADCC," Biotechnol. Bioeng. 94 (2006) 680-688.
Kashmiri, S.V., et al., "SDR grafting a new approach to antibody humanization," Methods 36 (2005) 25-34.
Kim, H., et al., "Mapping of the Neonatal Fc Receptor in the Rodent Eye," Invest. Ophthalmol. Vis. Sci. 49 (2008) 2025-2029.
Kim et al., "Localization of the site of the murine IgG1 molecule that is involved in binding to the murine intestinal Fc receptor" Eur J Immunol 24(10):2429-2434 ( 1994).
Kindt et al. Kuby Immunology "Antigens and Antibodies Chapter 4" 6th ed edition, N.Y.:W.H. Freeman and Co,:p. 91 ( 2007).
The English translation of the Decision to Grant a Patent, mailed on Feb. 8, 2022, in the related Japanese Appl. No. 2020-129979.
Atwell et al., "Stable Heterodimers from Remodeling the Domain Interface of a Homodimer using a Phage Dispaly Library" J. Mol. Biol. 270:26-35 (1997).
Carter, P., et al., "'Knobs-into-holes' provides a rational design strategy for engineering antibody CH3 domains for heavy chain heterodimerization" Immunotechnology 2(1):73 (Jan. 1996).
Clackson et al., "Making antibody fragments using phage display libraries" Nature 352:624-628 (Aug. 15, 1991).
Datta-Mannan et al., "Monoclonal antibody clearance: impact of modulating the interaction of IgG with the neonatal Fc receptor," J. Biol. Chem. 282 (3): 1709-1717, 2007.
Datta-Mannan et al., "Aberrant bispecific antibody pharmacokinetics linked to liver sinusoidal endothelium clearance mechanism in cynomolgus monkeys," MAbs 8(5):969-982, ( 2016).
Datta-Mannan, Amita et al., "Balancing charge in the complementarity-determining regions of humanized mAbs without affecting pl reduces non-specific binding and improves the pharmacokinetics" MAbs 7(3):483-493, (2015).
Datta-Mannan et al., "The interplay of non-specific binding, target-mediated clearance and FcRn interactions on the pharmacokinetics of humanized antibodies" MABS 7(6):1084-1093, (2015).
Hotzel et al., "A strategy for risk mitigation of antibodies with fast clearance" MABS 4(6):753-760 (2012).
Kraft., "Heparin chromatography as an in vitro predictor for antibody clearance rate through pinocytosis," MABS 12 (i): e1683432, 9 pages, 2020.
Martin et al., "Peer Reviewed: Nanomaterials in Analytical Chemistry" Analytical Chemistry News & Features 70:322A-327A (May 1, 1998).
Merchant et al., "An efficient route to human bispecific IgG" Nat. Biotechnol. 16(7):677-681 (1998).
Neuber et al., "Characterization and screening of IgG binding to the neonatal Fc receptor" MABS 6(4):928-942 (2014).
Portolano, S., et al., Lack of promiscuity in autoantigen-specific H and L chain combinations as revealed by human H and L chain 'roulette' J. Immunol. 150(3):880-887 (Feb 1. 1993).
Ridgway et al., "'Knobs-into-holes' Engineering of Antibody CH3 Domains for Heavy Chain Heterodimerization" Protein Eng. 9(7):617-621 (1996).
Schoch et al., "Charge-mediated influence of the antibody variable domain on FcRn-dependent pharmacokinetics" PNAS 112(19):5997-6002 (2015).
Stracke et al., "A novel approach to investigate the effect of methionine oxidation on pharmacokinetic properties of therapeutic antibodies" MABS 6:1229-1242 (2014).
Yao et al. "Intein-mediated biotinylation of proteins and its application in a protein microarray" J. Am Chem. Soc. 2002, 124, 8768-8769 (Year: 2002).
The International Search Report and Written Opinion for PCT/EP2018/060536 mailed on Jul. 12, 2018.
The US office action, mailed on Jun. 27, 2022, in U.S. Appl. No. 16/657,753.
The US office actions, mailed on Feb. 14, 2022 and Aug. 17, 2022, in the related U.S. Appl. No. 16/258,294.
King et al., "Monoclonal Antibody Conjugates of Doxorubicin Prepared with Branched Peptide Linkers: Inhibition of Aggregation by Methoxytriethyleneglycol Chains" J Med Chem 45(19 SUPPL 4336-43( 2002).

(56) References Cited

OTHER PUBLICATIONS

Klimka, A., et al., "Human anti-CD30 recombinant antibodies by guided phage antibody selection using cell panning," Br. J. Cancer 83 (2000) 252-260.
Kohler and Milstein, "Continuous cultures of fused cells secreting antibody of predefined specificity" Nature 256:495-497 (Aug. 7, 1975).
Kostelny et al., "Formation of a bispecific antibody by the use of leucine zippers" J Immunol. 148(5):1547-1553 ( 1992).
Kozbor et al., "A human hybrid myeloma for production of human monoclonal antibodies" J Immunol 133 (6):3001-3005 (Dec. 1984).
Kratz, F., et al., "Prodrugs of anthracyclines in cancer chemotherapy" Curr Med Chem 13(5):477-523 (Mar. 1, 2006).
Lee et al., "Bivalent antibody phage display mimics natural immunoglobulin" J Immunol Methods 284(1-2):119-132 ( 2004).
Lee et al., "High-affinity human antibodies from phage-displayed synthetic Fab libraries with a single framework scaffold" J Mol Biol 340(5):1073-1093 ( 2004).
Li, H., et al., "Optimization of humanized IgGs in glycoengineered Pichia pastoris" Nat Biotechnol 24(2):210-215 (Feb. 1, 2006).
Li et al., "Human antibodies for immunotherapy development generation via a human B cell hybridoma technology" Proc Natl Acad Sci U S A 103(10):3557-62 ( 2006).
Lode et al., "Targeted Therapy with a Novel Enediyene Antibiotic Calicheamicin theta(I)1 Effectively Suppresses Growth and Dissemination of Liver Metastases in a Syngeneic Model of Murine Neuroblastoma" Cancer Res 58 (14):2925-28 ( 1998).
Lonberg, N., et al., "Fully human antibodies from transgenic mouse and phage display platforms" Curr Opin Immunol 20(4):450-459 (Aug. 1, 2008).
Lonberg et al., "Human antibodies from transgenic animals" Nat Biotechnol 23(9):1117-25 ( 2005).
Marks and Bradbury Methods Mol Biol, Antibody Engineering "Selection of human antibodies from phage display libraries" Benny K. C. Lo, Humana Press, vol. 248:161-176 ( 2004).
Marks et al., "By-passing Immunization Human Antibodies from V-gene Libraries Displayed on Phage" J Mol Biol 222 (3):581-97 (1991).
Mather, J., "Establishment and characterization of two distinct mouse testicular epithelial cell lines" Biol Reprod 23(1):243-252 (Aug. 1, 1980).
Mather et al., "Culture of Testicular Cells in Hormone-Supplemented Serum-Free Medium" Ann N Y Acad Sci 383:44-68 (1982).
McCafferty et al., "Phage antibodies: filamentous phage displaying antibody variable domains" Nature 348 (6301):552-4 (1990).
Milstein and Cuello et al., "Hybrid hybridomas and their use in immunohistochemistry" Nature 305:537-540 (Oct. 6, 1983).
Morrison et al., "Chimeric Human Antibody Molecules: Mouse Antigen-Binding Domains with Human Constant Region Domains" P.N.A.S. USA 81:6851-6855 (1984).
Nagy et al., "Stability of cytotoxic luteinizing hormone-releasing hormone conjugate (AN-152) containing doxorubicin 14-O-hemiglutarate in mouse and human serum in vitro: Implications for the design of preclinical studies" Proc Natl Acad Sci U S A 97(2):829-34 (2000).
Ni, "Research progress and future perspectives in antibodomics and antibodomic drugs," HCAPLUS Accession No. 2006:1101736. Xiandai Mianyixue. 26(4):265-268 (2006) (Abstract Only) (3 pages)., pp. 3 (2006).
Noren et al., "A general method for site-specific incorporation of unnatural amino acids into proteins" Science 244 (4901):182-188 (Apr. 14, 1989).
Ochi, A., et al., "Functional immunoglobulin M production after transfection of cloned immunoglobulin heavy and light chain genes into lymphoid cells" PNAS USA 80(20):6351-6355 (Oct. 1, 1983).
Okazaki et al., "Fucose depletion from human IgG1 oligosaccharide enhances binding enthalpy and association rate between IgG1 and FcgammaRIIIa" J Mol Biol 336(5):1239-1249 (Mar. 5, 2004).
Osbourn et al., "From rodent reagents to human therapeutics using antibody guided selection" Methods 36(1):61-8 (2005).
Padlan, E. et al., "A possible procedure for reducing the immunogenicity of antibody variable domains while preserving their ligand-binding properties" Mol Immunol 28(4-5):489-498 (Apr. 30, 1991).
Pluckthun et al. The Pharmacology of Monoclonal Antibodies Rosenburg and Moore (eds.), New York:Springer-Verlag, vol. 113:269-315 (1994).
Presta et al., "Humanization of an antibody directed against IgE" J Immunol 151(5):2623-2632 (Sep. 1, 1993).
Queen et al., "A humanized Antibody that Binds to the Interleukin 2 Receptor" P.N.A.S. USA 86:10029-10033 (1989).
Ravetch, J. et al., "Fc receptors" Annu Rev Immunol 9:457-492 (1991).
Remington, J., et al. Remington's Pharmaceutical Sciences (Table of Contents, total in 4 pages), OSOL , eds., 16th edition, Easton, PA:Mack Publishing Company, (1980).
Riechmann et al., "Reshaping human antibodies for therapy" Nature 322(6162):323-7 (1988).
Ripka, J., et al., "Two Chinese Hamster Ovary Glycosylation Mutants Affected in the Conversion of GDP-Mannose to GDP-Fucose" Arch Biochem Biophys 249(2):533-545 (Sep. 1, 1986).
Rosok et al., "A Combinatorial Library Strategy for the Rapid Humanization of Anticarcinoma BR96 Fab" J Biol Chem 271(37):22611-8 (1996).
Roux, K., et al., "Comparisons of the ability of human IgG3 hinge mutants, IgM, IgE, and IgA2, to form small immune complexes: a role for flexibility and geometry" J Immunol 161(8):4083-4090 (Oct. 15, 1998).
Sidhu et al., "Phage-displayed Antibody Libraries of Synthetic Heavy Chain Complementarity Determining Regions" J Mol Biol 338(2):299-310 (2004).
Sims et al., "A Humanized CD18 Antibody Can Block Function without Cell Destruction" J Immunol 151(4):2296-308 (1993).
Spiekermann, G.M., et al., "Receptor-mediated immunoglobulin G transport across mucosal barriers in adult life: functional expression of FcRn in the mammalian lung," J. Exp. Med. 196 (2002) 303-310.
Torgov et al., "Generation of an Intensely Potent Anthracycline by a Monoclonal Anitbody-Beta-Galactosidase Conjugate" Bioconjug Chem 16(3):717-21 (2005).
Traunecker et al., "Bispecific single chain molecules (Janusins) target cytotoxic lymphocytes on HIV infected cells" EMBO J 10(12):3655-3659 (1991).
Tutt et al., "Trispecific F(ab')3 derivatives that use cooperative signaling via the TCR/CD3 complex and CD2 to activate and redirect resting cytotoxic T cells" J Immunol 147(1):60-69 (1991).
Urlaub et al., "Isolation of Chinese hamster cell mutants deficient in dihydrofolate reductase activity" Proc Natl Acad Sci U S A 77(7):4216-20 (1980).
Van Dijk, M., et al., "Human antibodies as next generation therapeutics" Curr Opin Chem Biol 5(4):368-374 (Aug. 1, 2001).
Vitetta et al., "Redesigning Nature's Poisons to Create Anti-Tumor Reagents" Science 238(4830):1098-104 ( 1987).
Vollmers et al., "The 'early birds': natural IgM antibodies and immune surveillance" Histol Histopathol 20(3):927-37 (2005).
Vollmers et al., "Death by Stress: Natural IgM-Induced Apoptosis" Methods Find Exp Clin Pharmacol 27(3):185-91 (2005).
Ward et al., "The Effector Functions of Immunoglobulins: Implications for Therapy." Therapeutic Immunology 2 (2):77-94 (1995).
Winter et al., "Making Antibodies by Phage Display Technology" Annu Rev Immunol 12:433-55 (1994).
Wright, A., et al., "Effect of Glycosylation on Antibody Function: Implications for Genetic Engineering" Trends Biotechnol 15(1):26-32 (Jan. 1, 1997).
Coffey, "pH Gradient Elution for Improved Separation of Monoclonal Antibody Charge Variants," https://www.agilent.aom/cs/library/applications/5990-9629EN.pdf, Aug. 1, 2013.
Everitt et al., "The pharmacokinetics, antigenicity, and fusion-inhibition activity of RSHZ19, a humanized monoclonal antibody to respiratory syncytial virus, in healthy volunteers," J. Infect. Dis. 174(3):463-469 (1996).

(56) References Cited

OTHER PUBLICATIONS

Firan et al., "The MHC class I-related receptor, FcRn, plays an essential role in the maternofetal transfer of .gamma.-globulin in humans" InternationalImmunology 13(8):993-1002 (2001).
Josie et al., "Analytical and Preparative Methods for Putifieation of Antibodies," Food technol. biotechnol., 39 (3), pp. 215-226, 2001.
Kortt et al., "Single-chain Fv fragments of anti-neuraminidase antibody NC10 containing five-and ten-residue linkers form dimers and with zero-residue linker a trimer" Protein Eng 10(4):423-433 (Apr. 1997).
Kozlov I. G. Monoclonal antibodies are a new era in pharmacology and therapy. // Lechebnoe delo.—2006.—n. 1, pp. 26-31. (English abstract included.).
Kuo, T.T. et al., "Neonatal Fc receptor and IgG-based therapeutic" mAbs 3(5):422-430 ( 2011).
Leach et al., "Isolation from human placenta of the IgG transporter, FcRn, and localization to the syncytiotrophoblast: Implications for maternal-fetal antibody transport," J Immunol Oct. 15, 1996, 157 (8) 3317-3322.
Medesan et al., "Localization of the site of the IgG molecule that regulates maternofetal transmission in mice" Eur J Immunol 26(10):2533-2536 (Oct. 1996).
Shields, R., et al., "High resolution mapping of the binding site on human IgG1 for Fc gamma RI, Fc gamma RII, Fc gamma RIII, and FcRn and design of IgGI variants with improved binding to the Fc gamma R" J Biol Chem 276 (9):6591-6604 (Mar. 2, 2001).
Wozniak-Knopp et al., "Stabilisation of the Fc fragment of human IgG1 by engineered intradomain disulfide bonds," PLoS ONE, vol. 7 Issue 1, pp. e30083, Jan. 17, 2012.
Brazilian office action, mailed on Dec. 9, 2019, in the related Brazilian Appl. No. BR112014018005-9.
Brazilian office action, mailed on Aug. 13, 2020, in the related Brazilian Appl. No. BR112017006178-3.
Canadian office action, mailed on Nov. 21, 2019, in the related Canadian Appl. No. 2,860,600.
Canadian office action, mailed on Feb. 9, 2021, in the related Canadian Appl. No. 2,860,600.
Chinese Office Action, mailed on Feb. 25, 2019, in the related Chinese Patent Appl. No. 201580015172.9.
Chinese Office Action, mailed on Jun. 23, 2020, in the related Chinese Patent Appl. No.201580060466.3.
European Communication, mailed on Mar. 15, 2019, in the related European Patent Appl. No. 15710178.3.
International Search Report and Written Opinion for PCT/EP2015/075656, dated Dec. 21, 2015 in 10 pages.
Japanese office action, mailed on Aug. 3, 2021, in the related Japanese Appl. No. 2020-129979.
Japanese Office Action, mailed on Jan. 8, 2019, in the related Japanese Appl. No. 2017-500408.
Korean office action, mailed on Jun. 28, 2019, in the related Korean Appl. No. 10-2014-7022694.
Russian Office Action, mailed on Oct. 29, 2018, in the related Russian Appl. No. 2016137932/10(059948).
Russian Office Action, mailed on Apr. 23, 2019, in the related Russian Appl. No. 2017117856(030876).
JS office actions, mailed on Dec. 4, 2018 and Apr. 15, 2019, in the related U.S. Appl. No. 15/586,679.
US office actions, mailed on May 25, 2016, Oct. 5, 2016, Mar. 24, 2017, Jun. 12, 2018 and Oct. 10, 2018, in the related U.S. Appl. No. 14/378,808.
US office action, mailed on Aug. 23, 2021, in the related U.S. Appl. No. 16/258,294.
Yamane-Ohnuki, N., et al., "Establishment of FUT8 knockout Chinese hamster ovary cells: an ideal host cell line for producing completely defucosylated antibodies with enhanced antibody-dependent cellular cytotoxicity" Biotechnol Bioeng 87(5):614-622 (Sep. 5, 2004).
Yazaki et al., "Expression of Recombinant Antibodies in Mammalian Cell Lines" Methods in Molecular Biology 248:255-68 (2004).
Zhu, X., et al., "MHC Class I-Related Neonatal Fc Receptor for IgG Is Functionally Expressed in Monocytes, Intestinal Macrophages, and Dendritic Cells," J. Immunol. 166 (2001) 3266-3276.
Canadian Office Action, mailed on Mar. 21, 2024, in the related Canadian Appl. No. 3,159,061.
Ghose et al., "Antibody variable region interactions with Protein A: implications for the development of generic purification processes," Biotechnol Bioeng, Dec. 20, 2005;92(6):665-73.
Vaughn et al., "Structural basis of pH-dependent antibody binding by the neonatal Fc receptor," Structure, Jan. 15, 1998;6(1):63-73.

Figure 14

```
                                          ******* ****                 * ******
Bevacizumab           DIQMTQSPSS LSASVGDRVT ITCSASQDIS NYLNWYQQKP GKAPKVLIYF TSSLHSGVPS
Bevacizumab-variant   DIQMTQSPSS LSASVGDRVT ITCSASQKIS NYLNWYQQKP GKAPKVLIYF TSSKHSGVPS

                                                 ** *******
Bevacizumab           RFSGSGSGTD FTLTISSLQP EDFATYYCQQ YSTVPWTFGQ GTKVEIKRTV
Bevacizumab-variant   RFSGSGSGTD FTLTISSLQP EDFATYYCQQ YSKVPWTFGQ GTKVEIKRTV
```

VITRO PREDICTION OF IN VIVO HALF-LIFE

CROSS REFERENCE TO RELATED APPLICATIONS

This application claims priority to and is a continuation of pending U.S. patent application Ser. No. 15/271,091, filed Sep. 20, 2016, which is a continuation of International Application No. PCT/EP2015/055482, filed Mar. 17, 2015, which in turn claims priority from European Application No. 14165987.0, filed on Apr. 25, 2014 and European Application No. 14161103.8, filed on Mar. 21, 2014. Each of these applications is hereby incorporated by reference herein in its entirety.

SEQUENCE LISTING

The instant application contains a Sequence Listing submitted via EFS-Web and hereby incorporated by reference in its entirety. Said ASCII copy, created on Mar. 1, 2021, is named SequenceListing.txt, and is 113 KB in size.

FIELD OF THE INVENTION

The current invention is in the field of recombinant antibody technology, especially in the field of tailor made antibodies. Herein is reported a method for the prediction of the in vivo half-life of an antibody based on the retention time determined on an FcRn affinity chromatography column.

BACKGROUND OF THE INVENTION

Human immunoglobulins of the class G (IgGs) contain two antigen binding (Fab) regions that convey specificity for the target antigen and a constant region (Fc-region) that is responsible for interactions with Fc receptors ([1,2]). Human IgGs of subclasses 1, 2 and 4 have an average serum half-life of 21 days, which is longer than that of any other known serum protein ([3]). This long half-life is predominantly mediated by the interaction between the Fc-region and the neonatal Fc receptor (FcRn) ([4,5]). This is one of the reasons, why IgGs or Fc-containing fusion proteins are used as a widespread class of therapeutics.

The neonatal Fc receptor FcRn is a membrane-associated receptor involved in both IgG and albumin homeostasis, in maternal IgG transport across the placenta and in antigen-IgG immune complex phagocytosis ([6,9]). Human FcRn is a heterodimer consisting of the glycosylated class I major histocompatibility complex-like protein (α-FcRn) and a $\beta_2$ microglobulin ($\beta_2$m) subunit ([10]). FcRn binds to a site in the $C_H2$-$C_H3$ region of the Fc-region ([11-14]) and two FcRn molecules can bind to the Fc-region simultaneously ([15,16]). The affinity between the FcRn and the Fc-region is pH dependent, showing nanomolar affinity at endosomal pH of 5-6 and negligible binding at a physiological pH of 7.4 ([13,17,18]). The underlying mechanism conveying long half-life to IgGs can be explained by three fundamental steps. First, IgGs are subject to unspecific pinocytosis by various cell types ([19,20]). Second, IgGs encounter and bind FcRn in the acidic endosome at a pH of 5-6, thereby protecting IgGs from lysosomal degradation ([11,21]). Finally, IgGs are released in the extracellular space at physiological pH of 7.4 [4]. This strict pH-dependent bind-and-release mechanism is critical for IgG recycling and any deviation of the binding characteristics at different pH values may strongly influence circulation half-life of IgGs ([22]).

The Fab regions have also been suggested to contribute to FcRn binding ([23-25]), in addition to the specific interaction of the Fc-region with FcRn. For example, Fab-mediated residual binding at neutral pH was correlated with the pharmacokinetic properties of a set of therapeutic antibodies, indicating that IgGs with excessive binding to FcRn at pH 7.3 suffer from reduced terminal half-life ([24]). Recently, Schlothauer et al. ([25]) have described a novel pH-gradient FcRn affinity chromatography method that closely mimics physiological conditions for the dissociation between FcRn and IgGs. Furthermore, they showed that IgGs with identical Fc-regions differ in their dissociation from FcRn, thereby indicating the influence of the Fab region on FcRn binding.

However, the underlying mechanism how the Fab region influences FcRn binding is still not elucidated.

Analytical FcRn affinity chromatography for functional characterization of monoclonal antibodies is reported by Schlothauer, T., et al. ([25]). Wang, W., et al. ([24]) report monoclonal antibodies with identical Fc sequences can bind to FcRn differentially with pharmacokinetic consequences. Importance of neonatal FcR in regulating the serum half-life of therapeutic proteins containing the Fc domain of human IgG1 is reported by Suzuki, T., et al. ([23]). Igawa, T., et al. ([37]) report reduced elimination of IgG antibodies by engineering the variable region. Engineering the Fc-region of immunoglobulins G to modulate in vivo antibody levels is reported by Vaccaro, C., et al. ([22]). Prabhat, P., et al. ([40]) report elucidation of intracellular recycling pathways leading to exocytosis of the Fc receptor, FcRn, by using multifocal plane microscopy. Pharmacokinetic, pharmacodynamic and immunogenicity comparability assessment strategies for monoclonal antibodies is reported by Putnam, W. S., et al. ([36]). Boswell, C. A., et al. ([38]) report effects of charge on antibody tissue distribution and pharmacokinetics. Pharmacokinetic characteristics and biodistribution of radioiodinated chimeric TNT-1, -2, and -3 monoclonal antibodies after chemical modification with biotin is reported by Khawli, L. A., et al. ([35]).

In WO 2013/120929 Fc-receptor based affinity chromatography is reported. In US 2011/0111406 a method for binding antigen-binding molecules to the antigens multiple times is reported. In US 2014/0013456 histidine engineered light chain antibodies and genetically modified non-human animals for generating the same are reported.

The influence of the Fab region on FcRn interactions has recently been discussed ([23,24,25]).

However, antibodies having the same Fc-regions do not simply have to have a similar PK profile. An additional contribution of the Fab region to FcRn binding has been reported, but the underlying mechanism remained unknown ([47], [24], [25]).

In addition to the specific interaction of the Fc region with FcRn, the Fab regions have also been suggested to contribute to the FcRn-IgG interaction ([37,24,25]).

Post published Li, B., et al. ([48]) report that framework selection can influence pharmacokinetics of a humanized therapeutic antibody through differences in molecule charge.

Sampei, Z., et al. ([49]) report identification and multidimensional optimization of an asymmetric bispecific IgG antibody mimicking the function of factor VIII cofactor activity.

Wang et al. ([24]) reported that IgGs with different target specificities and Fab regions but identical Fc sequences can have different FcRn affinities. Fab-mediated residual binding at near physiological pH was correlated with the pharmacokinetic properties of a set of therapeutic antibodies indicating that IgGs with excessive binding to FcRn at pH 7.3 suffer from reduced terminal half-lives.

Recently, Schlothauer et al. ([25]) have described a novel pH-gradient FcRn affinity chromatography method that closely mimics physiological conditions for the dissociation between FcRn and IgG. Furthermore, they showed that IgGs with identical Fc regions differ in their dissociation from FcRn in vitro, thereby indicating the influence of the Fab region on FcRn-IgG interaction.

Benson, J. M., et al. ([50]) report the discovery and mechanism of Ustekinumab: A human monoclonal antibody targeting interleukin-12 and interleukin-23 for treatment of immunmediated disorders.

The amino acid sequences of the antibody Briakinumab are reported in WO 2013/087911 (SEQ ID NO: 39 and SEQ ID NO: 40), of the antibody Ustekinumab in WO 2013/087911 (SEQ ID NO: 37 and SEQ ID NO: 38) and of the antibody Bevacizumab in Drug Bank entry DB00112.

SUMMARY OF THE INVENTION

It has been found that the charge distribution in the Fv domain influences antibody-FcRn binding and results in additional interactions between the antibody and the FcRn. This changes the FcRn binding characteristics, especially with respect to the dissociation of the antibody-FcRn complex at pH 7.4, thereby reducing FcRn-dependent terminal half-life of the antibody.

One aspect as reported herein is a method for determining the presence of antibody-Fab-FcRn interaction influencing the in vivo half-life of the antibody comprising the following steps:

a) determining the retention time of the antibody on an FcRn affinity chromatography column with a positive linear pH gradient elution in the presence of a first salt concentration,
b) determining the retention time of the antibody on an FcRn affinity chromatography column with a positive linear pH gradient elution in the presence of a second salt concentration, whereby the presence of antibody-Fab-FcRn interaction influencing the in vivo half-life of the antibody is determined if the retention time determined in step a) and the retention time determined in step b) are substantially different.

The antibody-Fab-FcRn interaction is an interaction between the Fab-region of an antibody with the FcRn. This interaction occurs, if present at all, after the antibody has been bound by the FcRn. Thus, the establishment of this interaction is a two-step process. In the first step an antibody-FcRn complex, to be more precise an antibody-Fc-FcRn complex, is formed. The second step after the antibody-Fc-FcRn complex has been formed is the establishment of the antibody-Fab-FcRn interaction. As can be seen from this, only with a full-length antibody these two interactions, i.e. the antibody-Fc-FcRn interaction and the antibody-Fab-FcRn interaction, can be established.

One aspect as reported herein is a method for determining the presence of Fab-FcRn interaction in an antibody-FcRn complex influencing the in vivo half-life comprising the following steps:

a) determining the retention time of the antibody on an FcRn affinity chromatography column with a positive linear pH gradient elution in the presence of a first salt concentration,
b) determining the retention time of the antibody on an FcRn affinity chromatography column with a positive linear pH gradient elution in the presence of a second salt concentration, whereby the presence of Fab-FcRn interaction in an antibody-FcRn complex influencing the in vivo half-life is determined if the retention time determined in step a) and the retention time determined in step b) are substantially different.

Another aspect as reported herein is a method for determining the relative in vivo half-life of an antibody comprising the following steps:

a) determining the retention time of the antibody on an FcRn affinity chromatography column with a positive linear pH gradient elution in the presence of a first salt concentration,
b) determining the retention time of the antibody on an FcRn affinity chromatography column with a positive linear pH gradient elution in the presence of a second salt concentration, whereby the antibody has a relative in vivo half-life that is reduced compared to a standard/natural antibody of the IgG class if the retention time determined in step a) and the retention time determined in step b) are substantially different.

In one embodiment the antibody of the IgG class is an antibody of the IgG1, IgG2, IgG3 or IgG4 subclass. In one embodiment the antibody of the IgG class is an antibody of the IgG1, IgG3 or IgG4 subclass. In one embodiment the antibody of the IgG class is an antibody of the IgG1 or IgG4 subclass. In one embodiment the antibody of the IgG class is an antibody of the IgG1 subclass. In one embodiment the antibody of the IgG class is an antibody of the IgG4 subclass.

A further aspect as reported herein is a method for determining an increase or a decrease in the vivo half-life of a variant antibody relative to its parent antibody comprising the following steps:

a) determining the retention time of the variant antibody and its parent antibody on an FcRn affinity chromatography column with a positive linear pH gradient elution in the presence of a first salt concentration,
b) determining the retention time of the variant antibody and its parent antibody on an FcRn affinity chromatography column with a positive linear pH gradient elution in the presence of a second salt concentration, whereby the in vivo half-life of the variant antibody relative to its parent antibody is increased if i) the retention time of the variant antibody determined in step a) is longer than the retention time of its parent antibody determined in step a), and ii) the retention time of the variant antibody determined in step a) and the retention time of the variant antibody determined in step b) are substantially the same, whereby the in vivo half-life of the variant antibody relative to its parent antibody is decreased if i) the retention time of the variant antibody determined in step a) is shorter than the retention time of its parent antibody determined in step a), and ii) the retention time of the variant antibody determined in step a)

and the retention time of the variant antibody determined in step b) are substantially the same.

Another aspect as reported herein is a method for selecting an antibody with increased or decreased in the vivo half-life relative to a reference antibody comprising the following steps:

a) determining the retention time of the antibody and the reference antibody on an FcRn affinity chromatography column with a positive linear pH gradient elution in the presence of a first salt concentration,
b) determining the retention time of the antibody and the reference antibody on an FcRn affinity chromatography column with a positive linear pH gradient elution in the presence of a second salt concentration, whereby in case of selecting an antibody with increased in vivo half-life relative to the reference antibody an antibody is selected that has i) a retention time determined in step a) that is longer than the retention time of the reference antibody determined in step a), and ii) a retention time determined in step a) that is substantially the same as the retention time determined in step b),
whereby in case of selecting an antibody with decreased in vivo half-life relative to the reference antibody an antibody is selected that has i) a retention time determined in step a) that is shorter than the retention time of the reference antibody determined in step a), and ii) a retention time determined in step a) that is substantially the same as the retention time determined in step b).

Another aspect as reported herein is a method for selecting an antibody without antibody-Fab-FcRn interaction influencing the vivo half-life of the antibody:

a) determining the retention time of the antibody on an FcRn affinity chromatography column with a positive linear pH gradient elution in the presence of a first salt concentration,
b) determining the retention time of the antibody on an FcRn affinity chromatography column with a positive linear pH gradient elution in the presence of a second salt concentration, whereby an antibody is selected that has a retention time determined in step a) that is not substantially different from the retention time determined in step b) and thereby selecting an antibody without antibody-Fab-FcRn interaction influencing the vivo half-life of the antibody.

One aspect as reported herein is a method for producing an antibody comprising the following steps:

a) providing a cell comprising one or more nucleic acids encoding an antibody with increased or decreased in vivo half-life relative to a reference antibody selected with a method as reported herein, and
b) cultivating the cell in a cultivation medium and recovering the antibody from the cell or the cultivation medium and thereby producing the antibody.

One aspect as reported herein is a method for increasing the in vivo half-life of an antibody comprising the step of:
changing a charged amino acid residue at the positions 27, 55 and 94 in the light chain of an antibody to a hydrophobic or neutral hydrophilic amino acid residue (numbering according to Kabat) and thereby increasing the in vivo half-life of the antibody.

One aspect as reported herein is a method for determining the presence of antibody-Fab-FcRn interaction influencing the in vivo half-life of the antibody comprising the following steps:

a) determining the retention time of the antibody and of a reference antibody on an FcRn affinity chromatography column at a first pH value with a salt gradient elution,
b) determining the retention time of the antibody and a reference antibody on an FcRn affinity chromatography column at a second pH value with a salt gradient elution, whereby the presence of antibody-Fab-FcRn interaction influencing the in vivo half-life of the antibody is determined if the ratio of the retention times of the antibody and the reference antibody determined in step a) is substantially different from the ratio of the retention times of the antibody and the reference antibody determined in step b).

One aspect as reported herein is a method for determining the presence of antibody-Fab-FcRn interaction influencing the in vivo half-life of the antibody comprising the following steps:

a) determining for a variant antibody and its parent antibody the $K_D$ values at pH 6 using surface plasmon resonance,
b) determining the retention time of the variant antibody and its parent antibody on an FcRn affinity chromatography column with a positive linear pH gradient elution in the presence of a high salt concentration, whereby the presence of antibody-Fab-FcRn interaction influencing the in vivo half-life of the antibody is determined if the $K_D$ values differ by at most a factor of 10 and the retention time determined in step b) between the variant antibody and its parent antibody are substantially different.

One aspect as reported herein is a method for determining the relative in vivo half-life of an antibody comprising the following steps:

a) determining for a variant antibody and its parent antibody the $K_D$ values at pH 6 using surface plasmon resonance,
b) determining the retention time of the variant antibody and its parent antibody on an FcRn affinity chromatography column with a positive linear pH gradient elution in the presence of a high salt concentration, whereby the antibody has a relative in vivo half-life that is reduced compared to its parent antibody if the $K_D$ values differ by at most a factor of 10 and the retention time determined in step b) of the variant antibody is shorter/smaller than the retention time of its parent antibody, and
whereby the antibody has a relative in vivo half-life that is increased compared to its parent antibody if the $K_D$ values differ by at most a factor of 10 and the retention time determined in step b) of the variant antibody is longer/bigger than the retention time of its parent antibody.

One aspect as reported herein is a method for determining an increase or a decrease of the vivo half-life of an antibody comprising the following steps:

a) determining for a variant antibody and its parent antibody the $K_D$ values at pH 6 using surface plasmon resonance,
b) determining the retention time of the variant antibody and its parent antibody on an FcRn affinity chromatography column with a positive linear pH gradient elution in the presence of a high salt concentration, whereby the antibody has a decrease of the in vivo half-life compared to its parent antibody if the $K_D$ values differ by at most a factor of 10 and the retention time determined in step b) of the variant antibody is shorter/smaller than the retention time of its parent antibody, and
whereby the antibody has an increase of the in vivo half-life compared to its parent antibody if the $K_D$ values differ by at most a factor of 10 and the retention time determined in step b) of the variant antibody is longer/bigger than the retention time of its parent antibody.

In one embodiment the antibody is a full length antibody.

In one embodiment of all aspects the positive linear pH gradient is from about pH 5.5 to about pH 8.8.

In one embodiment of all aspects the salt is selected from sodium chloride, sodium sulphate, potassium chloride, potassium sulfate, sodium citrate, or potassium citrate.

In one embodiment of all aspects the salt is sodium chloride.

In one embodiment of all aspects the first salt concentration is between 50 mM and 200 mM.

In one embodiment of all aspects the first salt concentration is about 140 mM.

In one embodiment of all aspects the second salt concentration is between 300 mM and 600 mM.

In one embodiment of all aspects the second salt concentration is about 400 mM.

In one embodiment of all aspects the retention times that are substantially different in step a) and step b) differ by at least 5%.

In one embodiment of all aspects the retention times that are substantially different in step a) and step b) differ by at least 10%.

In one embodiment of all aspects the retention times that are substantially different in step a) and step b) differ by at least 15%.

In one embodiment of all aspects if the retention times are substantially different in step a) and step b) the retention time in step a) is bigger/longer than in step b).

In one embodiment of all aspects if the retention times are substantially different in step a) and step b) the retention time in step b) is smaller/shorter than in step a).

In one embodiment of all aspects if the retention times are substantially different in step a) and step b) the retention times are proportional to one above the square root of the salt concentration (~1/SQRT (c(salt))).

In one embodiment of all aspects the parent or reference antibody is the anti-IL-1R antibody with SEQ ID NO: 01 (heavy chain) and SEQ ID NO: 02 (light chain) for the subclass IgG1 and the anti-IL-1R antibody with SEQ ID NO: 03 (heavy chain) and SEQ ID NO: 04 (light chain) for the subclass IgG4.

In one embodiment of all aspects the parent or reference antibody is the anti-HER2 antibody with SEQ ID NO: 36 (heavy chain) and SEQ ID NO: 37 (light chain) for the subclass IgG1 and the anti-HER2 antibody with SEQ ID NO: 38 (heavy chain) and SEQ ID NO: 39 (light chain) for the subclass IgG4.

In one embodiment of all aspects the parent or reference antibody is Ustekinumab with light and heavy chain amino acid sequence as depicted in FIG. 5.

In one embodiment of all aspects the FcRn affinity chromatography column comprises a non-covalent complex of a neonatal Fc receptor (FcRn) and beta-2-microglobulin (b2m).

In one embodiment of all aspects the FcRn affinity chromatography column comprises a covalent complex of a neonatal Fc receptor (FcRn) and beta-2-microglobulin (b2m).

In one embodiment of all aspects the complex of the neonatal Fc receptor (FcRn) and beta-2-microglobulin (b2m) is bound to a solid phase.

In one embodiment of all aspects the solid phase is a chromatography material.

In one embodiment of all aspects the complex of a neonatal Fc receptor (FcRn) and beta-2-microglobulin (b2m) is biotinylated and the solid phase is derivatized with streptavidin.

In one embodiment of all aspects the beta-2-microglobulin is from the same species as the neonatal Fc receptor (FcRn).

In one embodiment of all aspects the beta-2-microglobulin is from a different species as the FcRn.

In one embodiment of all aspects the FcRn is selected from human FcRn, cynomolgus FcRn, mouse FcRn, rat FcRn, sheep FcRn, dog FcRn, pig FcRn, minipig FcRn, and rabbit FcRn.

In one embodiment of all aspects the antibody is a monospecific antibody or antibody fragment of fusion polypeptide, or a bispecific antibody or antibody fragment of fusion polypeptide, or a trispecific antibody or antibody fragment of fusion polypeptide, or a tetraspecific antibody or antibody fragment of fusion polypeptide.

In one embodiment the antibody is an antibody of the class IgG. In one embodiment the antibody is an antibody of the subclass IgG1, IgG2, IgG3 or IgG4. In one embodiment the antibody is an antibody of the subclass IgG1 or IgG4.

DESCRIPTION OF THE FIGURES

(FIG. 1A) Briakinumab. The light chain is shown in light gray, the heavy chain is shown in darker grey. Views of the middle and right images are related to the view in the left panel by a rotation about a vertical and a horizontal axis, respectively. (FIG. 1B) Ustekinumab. Light and heavy chains are colored in light and dark gray, respectively. The views are identical to (FIG. 1A). (FIG. 1C) Isopotential surface contoured at 2 $k_B T/e$ of a human FcRn homology model in complex with human $\beta_2$ microglobulin ($\beta_2$m). The Fc domain is shown for clarity. (FIG. 1D) Sequence-based calculated net charge vs. pH of Briakinumab and Ustekinumab. Protein structures were prepared with Discovery Studio Pro.

(FIG. 3A) Blood level curves of Briakinumab (diamonds, orange), Ustekinumab (squares, green), mAb 8 (triangles, purple) and mAb 9 (circles, blue). (FIG. 3B) Correlation between the terminal half-life with the FcRn column elution pH.

(FIG. 4A) Conformation at the start of the simulation. The dashed line indicates the distance between two example amino acids in the Fv region and in the FcRn, which approach during the MD simulation as shown in panel (FIG. 4C). The colors are identical to FIGS. 1A-D. (FIG. 4B) Conformation at the end of the simulation (t=100 ns). The box indicates the part of the molecule shown in (FIG. 4C). (FIG. 4C) Detailed view of the interaction between FcRn and the Fv domains. Note that the interacting framework, CDR and FcRn residues are different in Briakinumab and Ustekinumab. (FIG. 4D) Distance between residues 245 (FcRn) and 100 (Ustekinumab LC) and 29 (Briakinumab LC), respectively during the course of the simulation. (FIG. 4E) Interaction energies at the end of the simulation (average and standard deviations of conformations at 96, 97, 98, 99 and 100 ns). "VDW" and "Electrostatic" denote the van-der-Waals and electrostatic contributions, respectively, to the FcRn-Fab interaction. Protein structures were prepared with PyMol™ (Schrodinger LLC).

FIG. 5 discloses the Light Chain sequences as SEQ ID NOS 46 and 48 and discloses the Heavy Chain sequences as SEQ ID NOS 47 and 49, all respectively, in order of appearance.

FIG. 10A: wild-type-like Fc-region, no antibody-Fab-FcRn interaction;

FIG. 10B: wild-type-like Fc-region, antibody-Fab-FcRn interaction;

FIG. 10C: engineered Fc-region with improved FcRn-binding, no antibody-Fab-FcRn interaction;

FIG. 10D: engineered Fc-region with improved FcRn-binding, antibody-Fab-FcRn interaction.

FIG. 14 Sequence alignment of Bevacizumab (SEQ ID NO: 50) and the Bevacizumab variant (SEQ ID NO: 51) light chain variable domains. Identical and similar amino acids are shown in grey; CDRs are marked with an asterisk (*).

DETAILED DESCRIPTION OF THE INVENTION

Figure 1C:
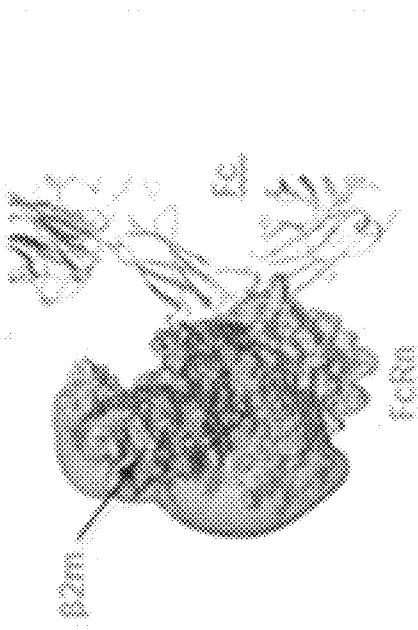
FIGS. 1A-1D Charge distribution and pH-dependent net charge. Isopotential surfaces of the proteins protonated at pH 7.4 and contoured at 2 $k_B T/e$; black: positive/negative.

Combining the results of the structural analysis of the FcRn-mAb (mAb=monoclonal antibody) interaction leads to the conclusion that the Fv domain and especially the light chain variable domain (VL) provides the main influence on the FcRn-mAb dissociation. This finding was unexpected because the Fv domain is distant from the cognate FcRn-binding site.

Antibodies did not show differences in pH 6.0 affinity, therefore the Fab region seems to have no influence on pH 6.0 binding. In contrast, the dissociation between FcRn and the antibodies was influenced by the Fab region.

FcRn-IgG dissociation pHs in vitro correlated linearly with in vivo terminal half-lives. In conclusion, these findings support the assumption that antibodies showing slower dissociation at higher pH values are transported back into the cell and are subsequently degraded instead of being released back to blood circulation.

It has been found that the charge distribution in the Fv domain influences antibody-FcRn binding and results in additional interactions between the antibody and the FcRn. This changes the FcRn binding characteristics, especially with respect to the dissociation of the antibody-FcRn complex at pH 7.4, thereby reducing FcRn-dependent terminal half-life of the antibody.

I. Definitions

The terms "a" and "an" denote one or two or three or four or five or six and up to 109.

The term "about" denotes a range of +/−20% of the thereafter following numerical value. In one embodiment the term about denotes a range of +/−10% of the thereafter following numerical value. In one embodiment the term about denotes a range of +/−5% of the thereafter following numerical value.

The term "comprising" also includes the term "consisting of".

The term "alteration" denotes the mutation (substitution), insertion (addition), modification (derivatization), or deletion of one or more amino acid residues in a parent antibody or fusion polypeptide, e.g. a fusion polypeptide comprising at least an FcRn binding portion of an Fc-region, to obtain a modified antibody or fusion polypeptide. The term "mutation" denotes that the specified amino acid residue is substituted for a different amino acid residue. For example the mutation L234A denotes that the amino acid residue lysine at position 234 in an antibody Fc-region (polypeptide) is substituted by the amino acid residue alanine (substitution of lysine with alanine) (numbering according to the EU index).

The term "amino acid mutation" denotes the substitution of at least one existing amino acid residue with another different amino acid residue (=replacing amino acid residue). The replacing amino acid residue may be a "naturally occurring amino acid residues" and selected from the group consisting of alanine (three letter code: ala, one letter code: A), arginine (arg, R), asparagine (asn, N), aspartic acid (asp, D), cysteine (cys, C), glutamine (gln, Q), glutamic acid (glu, E), glycine (gly, G), histidine (his, H), isoleucine (ile, I), leucine (leu, L), lysine (lys, K), methionine (met, M), phenylalanine (phe, F), proline (pro, P), serine (ser, S), threonine (thr, T), tryptophan (trp, W), tyrosine (tyr, Y), and valine (val, V). The replacing amino acid residue may be a "non-naturally occurring amino acid residue". See e.g. U.S. Pat. No. 6,586,207, WO 98/48032, WO 03/073238, US 2004/0214988, WO 2005/35727, WO 2005/74524, Chin, J. W., et al., J. Am. Chem. Soc. 124 (2002) 9026-9027; Chin, J. W. and Schultz, P. G., ChemBioChem 11 (2002) 1135-1137; Chin, J. W., et al., PICAS United States of America 99 (2002) 11020-11024; and, Wang, L. and Schultz, P. G., Chem. (2002) 1-10 (all entirely incorporated by reference herein).

The term "amino acid insertion" denotes the (additional) incorporation of at least one amino acid residue at a predetermined position in an amino acid sequence. In one embodiment the insertion will be the insertion of one or two amino acid residues. The inserted amino acid residue(s) can be any naturally occurring or non-naturally occurring amino acid residue.

The term "amino acid deletion" denotes the removal of at least one amino acid residue at a predetermined position in an amino acid sequence.

The term "antibody" herein is used in a broad sense and encompasses various antibody structures, including but not limited to monoclonal antibodies and multispecific antibodies (e.g. bispecific antibodies, trispecific antibodies) so long as they are full length antibodies and exhibit the desired antigen- and/or FcRn-binding activity.

The term "binding (to an antigen)" denotes the binding of an antibody in an in vitro assay. In one embodiment binding is determined in a binding assay in which the antibody is bound to a surface and binding of the antigen to the antibody is measured by Surface Plasmon Resonance (SPR). Binding means e.g. a binding affinity ($K_D$) of $10^{-8}$ M or less, in some embodiments of $10^{-13}$ to $10^{-8}$ M, in some embodiments of $10^{-13}$ to $10^{-9}$ M.

Binding can be investigated by a BIAcore assay (GE Healthcare Biosensor AB, Uppsala, Sweden). The affinity of the binding is defined by the terms $k_a$ (rate constant for the association of the antibody from the antibody/antigen complex), $k_d$ (dissociation constant), and $K_D$ ($k_d/k_a$).

The term "buffer substance" denotes a substance that when in solution can level changes of the pH value of the solution e.g. due to the addition or release of acidic or basic substances.

The term "CH2-domain" denotes the part of an antibody heavy chain polypeptide that extends approximately from EU position 231 to EU position 340 (EU numbering system according to Kabat). In one embodiment a CH2 domain has the amino acid sequence of SEQ ID NO: 05: APELLGG PSVFLFPPKP KDTLMISRTP EVTCVWDVS HEDPE-VKFNW YVDGVEVHNA KTKPREEQ E STYRWSVLT VLHQDWLNGK EYKCKVSNKA LPAPIEKTIS KAK.

The term "CH3-domain" denotes the part of an antibody heavy chain polypeptide that extends approximately from EU position 341 to EU position 446. In one embodiment the CH3 domain has the amino acid sequence of SEQ ID NO: 06: GQPREPQ VYTLPPSRDE LTKNQVSLTC LVKGFYPSDI AVEWESNGQP ENNYKTTPPV LDSDGSFFLY SKLTVDKSRW QQGNVFSCSV MHEALHNHYT QKSLSLSPG.

The "class" of an antibody refers to the type of constant domain or constant region possessed by its heavy chain. There are five major classes of antibodies: IgA, IgD, IgE, IgG, and IgM, and several of these may be further divided into subclasses (isotypes), e.g., $IgG_1$, $IgG_2$, $IgG_3$, $IgG_4$, $IgA_1$, and $IgA_2$. The heavy chain constant domains that correspond to the different classes of immunoglobulins are called a, 8, E, Y, and u, respectively.

An "effective amount" of an agent, e.g., a pharmaceutical formulation, refers to an amount effective, at dosages and for periods of time necessary, to achieve the desired therapeutic or prophylactic result.

The term "Fc-fusion polypeptide" denotes a fusion of a binding domain (e.g. an antigen binding domain such as a single chain antibody, or a polypeptide such as a ligand of a receptor) with an antibody Fc-region that exhibits the desired target- and/or protein A and/or FcRn-binding activity.

The term "Fc-region of human origin" denotes the C-terminal region of an immunoglobulin heavy chain of human origin that contains at least a part of the hinge region, the CH2 domain and the CH3 domain. In one embodiment, a human IgG heavy chain Fc-region extends from Cys226, or from Pro230, to the carboxyl-terminus of the heavy chain. In one embodiment the Fc-region has the amino acid sequence of SEQ ID NO: 07. However, the C-terminal lysine (Lys447) of the Fc-region may or may not be present. Unless otherwise specified herein, numbering of amino acid residues in the Fc-region or constant region is according to the EU numbering system, also called the EU index, as described in Kabat, E. A., et al., Sequences of Proteins of Immunological Interest, 5th ed., Public Health Service, National Institutes of Health, Bethesda, MD (1991), NIH Publication 91 3242. The Fc-region is composed of two heavy chain Fc-region polypeptides, which can be covalently linked to each other via the hinge region cysteine residues forming inter-polypeptide disulfide bonds.

The term "FcRn" denotes the human neonatal Fc-receptor. FcRn functions to salvage IgG from the lysosomal degradation pathway, resulting in reduced clearance and increased half-life. The FcRn is a heterodimeric protein consisting of two polypeptides: a 50 kDa class I major histocompatibility complex-like protein (α-FcRn) and a 15 kDa β2-microglobulin (β2m). FcRn binds with high affinity to the CH2-CH3 portion of the Fc-region of IgG. The interaction between IgG and FcRn is strictly pH dependent and occurs in a 1:2 stoichiometry, with one IgG binding to two FcRn molecules via its two heavy chains (Huber, A. H., et al., J. Mol. Biol. 230 (1993) 1077-1083). FcRn binding occurs in the endosome at acidic pH (pH<6.5) and IgG is released at the neutral cell surface (pH of about 7.4). The pH-sensitive nature of the interaction facilitates the FcRn-mediated protection of IgGs pinocytosed into cells from intracellular degradation by binding to the receptor within the acidic environment of endosomes. FcRn then facilitates the recycling of IgG to the cell surface and subsequent release into the blood stream upon exposure of the FcRn-IgG complex to the neutral pH environment outside the cell.

The term "FcRn binding portion of an Fc-region" denotes the part of an antibody heavy chain polypeptide that extends approximately from EU position 243 to EU position 261 and approximately from EU position 275 to EU position 293 and approximately from EU position 302 to EU position 319 and approximately from EU position 336 to EU position 348 and approximately from EU position 367 to EU position 393 and EU position 408 and approximately from EU position 424 to EU position 440. In one embodiment one or more of the following amino acid residues according to the EU numbering of Kabat are altered F243, P244, P245 P, K246, P247, K248, D249, T250, L251, M252, I253, S254, R255, T256, P257, E258, V259, T260, C261, F275, N276, W277, Y278, V279, D280, V282, E283, V284, H285, N286, A287, K288, T289, K290, P291, R292, E293, V302, V303, S304, V305, L306, T307, V308, L309, H310, Q311, D312, W313, L314, N315, G316, K317, E318, Y319, I336, S337, K338, A339, K340, G341, Q342, P343, R344, E345, P346, Q347, V348, C367, V369, F372, Y373, P374, S375, D376, 1377, A378, V379, E380, W381, E382, S383, N384, G385, Q386, P387, E388, N389, Y391, T393, S408, S424, C425, S426, V427, M428, H429, E430, A431, L432, H433, N434, H435, Y436, T437, Q438, K439, and S440 (EU numbering).

The term "full length antibody" denotes an antibody having a structure substantially similar to a native antibody structure. A full length antibody comprises two full length antibody light chains comprising a light chain variable domain and a light chain constant domain and two full length antibody heavy chains comprising a heavy chain variable domain, a first constant domain, a hinge region, a second constant domain and a third constant domain. A full length antibody may comprise further domains, such as e.g. additional scFv or a scFab conjugated to one or more of the chains of the full length antibody. These conjugates are also encompassed by the term full length antibody.

The term "hinge region" denotes the part of an antibody heavy chain polypeptide that joins the CH1 domain and the CH2 domain, e. g. from about position 216 to position about 230 according to the EU numbering system of Kabat. In one embodiment the hinge region is a shortened hinge region comprising residues 221 to 230 according to the EU numbering system of Kabat. The hinge region is normally a dimeric molecule consisting of two polypeptides with identical amino acid sequence. The hinge region generally comprises about 25 amino acid residues and is flexible allowing the antigen binding regions to move independently. The hinge region can be subdivided into three domains: the upper, the middle, and the lower hinge domain (Roux, et al., J. Immunol. 161 (1998) 4083).

The terms "host cell", "host cell line", and "host cell culture" are used interchangeably and refer to cells into which exogenous nucleic acid has been introduced, including the progeny of such cells. Host cells include "transformants" and "transformed cells," which include the primary transformed cell and progeny derived therefrom without regard to the number of passages. Progeny may not be completely identical in nucleic acid content to a parent cell, but may contain mutations. Mutant progeny that have the same function or biological activity as screened or selected for in the originally transformed cell are included herein.

The term "derived from" denotes that an amino acid sequence is derived from a parent amino acid sequence by introducing alterations at at least one position. Thus a derived amino acid sequence differs from the corresponding parent amino acid sequence at at least one corresponding position (numbering according to Kabat EU index for antibody Fc-regions). In one embodiment an amino acid sequence derived from a parent amino acid sequence differs by one to fifteen amino acid residues at corresponding positions. In one embodiment an amino acid sequence derived from a parent amino acid sequence differs by one to ten amino acid residues at corresponding positions. In one embodiment an amino acid sequence derived from a parent amino acid sequence differs by one to six amino acid residues at corresponding positions. Likewise a derived amino acid sequence has a high amino acid sequence identity to its parent amino acid sequence. In one embodiment an amino acid sequence derived from a parent amino acid sequence has 80% or more amino acid sequence identity. In one embodiment an amino acid sequence derived from a parent amino acid sequence has 90% or more amino acid sequence identity. In one embodiment an amino acid sequence derived from a parent amino acid sequence has 95% or more amino acid sequence identity.

The term "human Fc-region polypeptide" denotes an amino acid sequence which is identical to a "native" or "wild-type" human Fc-region polypeptide. The term "variant (human) Fc-region polypeptide" denotes an amino acid sequence which derived from a "native" or "wild-type" human Fc-region polypeptide by virtue of at least one "amino acid alteration". A "human Fc-region" is consisting of two human Fc-region polypeptides. A "variant (human) Fc-region" is consisting of two Fc-region polypeptides, whereby both can be variant (human) Fc-region polypeptides or one is a human Fc-region polypeptide and the other is a variant (human) Fc-region polypeptide.

In one embodiment the human Fc-region polypeptide has the amino acid sequence of a human IgG1 Fc-region polypeptide of SEQ ID NO: 07, or of a human IgG2 Fc-region polypeptide of SEQ ID NO: 08, or of a human IgG3 Fc-region polypeptide of SEQ ID NO: 09, or of a human IgG4 Fc-region polypeptide of SEQ ID NO: 10. In one embodiment the Fc-region polypeptide is derived from an Fc-region polypeptide of SEQ ID NO: 07, or 08, or 09, or 10 and has at least one amino acid mutation compared to the Fc-region polypeptide of SEQ ID NO: 07, or 08, or 09, or 10. In one embodiment the Fc-region polypeptide comprises/has from about one to about ten amino acid mutations, and in one embodiment from about one to about five amino acid mutations. In one embodiment the Fc-region polypeptide has at least about 80% homology with a human Fc-region polypeptide of SEQ ID NO: 07, or 08, or 09, or 10. In one embodiment the Fc-region polypeptide has least about 90% homology with a human Fc-region polypeptide of SEQ ID NO: 07, or 08, or 09, or 10. In one embodiment the Fc-region polypeptide has at least about 95% homology with a human Fc-region polypeptide of SEQ ID NO: 07, or 08, or 09, or 10.

The Fc-region polypeptide derived from a human Fc-region polypeptide of SEQ ID NO: 07, or 08 or 09, or 10 is defined by the amino acid alterations that are contained. Thus, for example, the term P329G denotes an Fc-region polypeptide derived human Fc-region polypeptide with the mutation of proline to glycine at amino acid position 329 relative to the human Fc-region polypeptide of SEQ ID NO: 07, or 08, or 09, or 10.

For all heavy chain positions discussed in the present invention, numbering is according to the EU index. The EU index or EU index as in Kabat or Kabat EU index or EU numbering scheme refers to the numbering of the EU antibody (Edelman, et al., Proc. Natl. Acad. Sci. USA 63 (1969) 78-85, hereby entirely incorporated by reference). The numbering of the light chain residues is according to the Kabat nomenclature (Kabat, E. A., et al., Sequences of Proteins of Immunological Interest, 5th ed., Public Health Service, National Institutes of Health, Bethesda, MD (1991), NIH Publication 91 3242).

A human IgG1 Fc-region polypeptide has the following amino acid sequence:

(SEQ ID NO: 07)
DKTHTCPPCPAPELLGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALPAPIEKTISKAKGQPREPQVYTLPPSRDELTKNQVSLTCLVK

GFYPSDIAVEWESNGQPENNYKTTPPVLDSDGSFFLYSKLTVDKSRWQQG

NVFSCSVMHEALHNHYTQKSLSLSPGK.

A human IgG1 Fc-region derived Fc-region polypeptide with the mutations L234A, L235A has the following amino acid sequence:

(SEQ ID NO: 11)
DKTHTCPPCPAPEAAGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALPAPIEKTISKAKGQPREPQVYTLPPSRDELTKNQVSLTCLVK

GFYPSDIAVEWESNGQPENNYKTTPPVLDSDGSFFLYSKLTVDKSRWQQG

NVFSCSVMHEALHNHYTQKSLSLSPGK.

A human IgG1 Fc-region derived Fc-region polypeptide with Y349C, T366S, L368A and Y407V mutations has the following amino acid sequence:

(SEQ ID NO: 12)
DKTHTCPPCPAPELLGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALPAPIEKTISKAKGQPREPQVCTLPPSRDELTKNQVSLSCAVK

GFYPSDIAVEWESNGQPENNYKTTPPVLDSDGSFFLVSKLTVDKSRWQQG

NVFSCSVMHEALHNHYTQKSLSLSPGK.

A human IgG1 Fc-region derived Fc-region polypeptide with S354C, T366W mutations has the following amino acid sequence:

(SEQ ID NO: 13)
DKTHTCPPCPAPELLGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALPAPIEKTISKAKGQPREPQVYTLPPCRDELTKNQVSLWCLVK

GFYPSDIAVEWESNGQPENNYKTTPPVLDSDGSFFLYSKLTVDKSRWQQG

NVFSCSVMHEALHNHYTQKSLSLSPGK.

A human IgG1 Fc-region derived Fc-region polypeptide with L234A, L235A mutations and Y349C, T366S, L368A, Y407V mutations has the following amino acid sequence:

(SEQ ID NO: 14)
DKTHTCPPCPAPEAAGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALPAPIEKTISKAKGQPREPQVCTLPPSRDELTKNQVSLSCAVK

-continued

GFYPSDIAVEWESNGQPENNYKTTPPVLDSDGSFFLVSKLTVDKSRWQQG

NVFSCSVMHEALHNHYTQKSLSLSPGK.

A human IgG1 Fc-region derived Fc-region polypeptide with a L234A, L235A and S354C, T366W mutations has the following amino acid sequence:

(SEQ ID NO: 15)
DKTHTCPPCPAPEAAGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALPAPIEKTISKAKGQPREPQVYTLPPCRDELTKNQVSLWCLVK

GFYPSDIAVEWESNGQPENNYKTTPPVLDSDGSFFLYSKLTVDKSRWQQG

NVFSCSVMHEALHNHYTQKSLSLSPGK.

A human IgG1 Fc-region derived Fc-region polypeptide with a P329G mutation has the following amino acid sequence:

(SEQ ID NO: 16)
DKTHTCPPCPAPELLGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALGAPIEKTISKAKGQPREPQVYTLPPSRDELTKNQVSLTCLVK

GFYPSDIAVEWESNGQPENNYKTTPPVLDSDGSFFLYSKLTVDKSRWQQG

NVFSCSVMHEALHNHYTQKSLSLSPGK.

A human IgG1 Fc-region derived Fc-region polypeptide with L234A, L235A mutations and P329G mutation has the following amino acid sequence:

(SEQ ID NO: 17)
DKTHTCPPCPAPEAAGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALGAPIEKTISKAKGQPREPQVYTLPPSRDELTKNQVSLTCLVK

GFYPSDIAVEWESNGQPENNYKTTPPVLDSDGSFFLYSKLTVDKSRWQQG

NVFSCSVMHEALHNHYTQKSLSLSPGK.

A human IgG1 Fc-region derived Fc-region polypeptide with a P329G mutation and Y349C, T366S, L368A, Y407V mutations has the following amino acid sequence:

(SEQ ID NO: 18)
DKTHTCPPCPAPELLGGPSVFLEPPKPKDTLMISRTPEVTCVVVDVSHED

PEVKFNWYVDGVEVHNAKTKPREEQYNSTYRVVSVLTVLHQDWLNGKEYK

CKVSNKALGAPIEKTISKAKGQPREPQVCTLPPSRDELTKNQVSLSCAVK

GFYPSDIAVEWESNGQPENNYKTTPPVLDSDGSFFLVSKLTVDKSRWQQG

NVFSCSVMHEALHNHYTQKSLSLSPGK.

A human IgG1 Fc-region derived Fc-region polypeptide with a P329G mutation and S354C, T366W mutation has the following amino acid sequence:

(SEQ ID NO: 19)
DKTHTCPPCPAPELLGGPSVFLFPPKPKDTLMISRTPEVTCVVVDVSHED
PEVKFNWYVDGVEVHNAKTKPREEQYNSTYRVVSVLTVLHQDWLNGKEYK
CKVSNKALGAPIEKTISKAKGQPREPQVYTLPPCRDELTKNQVSLWCLVK
GFYPSDIAVEWESNGQPENNYKTTPPVLDSDGSFFLYSKLTVDKSRWQQG
NVFSCSVMHEALHNHYTQKSLSLSPGK.

A human IgG1 Fc-region derived Fc-region polypeptide with L234A, L235A, P329G and Y349C, T366S, L368A, Y407V mutations has the following amino acid sequence:

(SEQ ID NO: 20)
DKTHTCPPCPAPEAAGGPSVFLFPPKPKDTLMISRTPEVTCVVVDVSHED
PEVKFNWYVDGVEVHNAKTKPREEQYNSTYRVVSVLTVLHQDWLNGKEYK
CKVSNKALGAPIEKTISKAKGQPREPQVCTLPPSRDELTKNQVSLSCAVK
GFYPSDIAVEWESNGQPENNYKTTPPVLDSDGSFFLVSKLTVDKSRWQQG
NVFSCSVMHEALHNHYTQKSLSLSPGK.

A human IgG1 Fc-region derived Fc-region polypeptide with L234A, L235A, P329G mutations and S354C, T366W mutations has the following amino acid sequence:

(SEQ ID NO: 21)
DKTHTCPPCPAPEAAGGPSVFLFPPKPKDTLMISRTPEVTCVVVDVSHE
DPEVKFNWYVDGVEVHNAKTKPREEQYNSTYRVVSVLTVLHQDWLNGKE
YKCKVSNKALGAPIEKTISKAKGQPREPQVYTLPPCRDELTKNQVSLWC
LVKGFYPSDIAVEWESNGQPENNYKTTPPVLDSDGSFFLYSKLTVDKSR
WQQGNVFSCSVMHEALHNHYTQKSLSLSPGK.

A human IgG4 Fc-region polypeptide has the following amino acid sequence:

(SEQ ID NO: 10)
ESKYGPPCPSCPAPEFLGGPSVFLFPPKPKDTLMISRTPEVTCVVVDVS
QEDPEVQFNWYVDGVEVHNAKTKPREEQFNSTYRVVSVLTVLHQDWLNG
KEYKCKVSNKGLPSSIEKTISKAKGQPREPQVYTLPPSQEEMTKNQVSL
TCLVKGFYPSDIAVEWESNGQPENNYKTTPPVLDSDGSFFLYSRLTVDK
SRWQEGNVFSCSVMHEALHNHYTQKSLSLSLGK.

A human IgG4 Fc-region derived Fc-region polypeptide with S228P and L235E mutations has the following amino acid sequence:

(SEQ ID NO: 22)
ESKYGPPCPPCPAPEFEGGPSVFLFPPKPKDTLMISRTPEVTCVVVDVS
QEDPEVQFNWYVDGVEVHNAKTKPREEQFNSTYRVVSVLTVLHQDWLNG
KEYKCKVSNKGLPSSIEKTISKAKGQPREPQVYTLPPSQEEMTKNQVSL

-continued

TCLVKGFYPSDIAVEWESNGQPENNYKTTPPVLDSDGSFFLYSRLTVDK
SRWQEGNVFSCSVMHEALHNHYTQKSLSLSLGK.

A human IgG4 Fc-region derived Fc-region polypeptide with S228P, L235E mutations and P329G mutation has the following amino acid sequence:

(SEQ ID NO: 23)
ESKYGPPCPPCPAPEFEGGPSVFLFPPKPKDTLMISRTPEVTCVVVDVS
QEDPEVQFNWYVDGVEVHNAKTKPREEQFNSTYRVVSVLTVLHQDWLNG
KEYKCKVSNKGLGSSIEKTISKAKGQPREPQVYTLPPSQEEMTKNQVSL
TCLVKGFYPSDIAVEWESNGQPENNYKTTPPVLDSDGSFFLYSRLTVDK
SRWQEGNVFSCSVMHEALHNHYTQKSLSLSLGK.

A human IgG4 Fc-region derived Fc-region polypeptide with S354C, T366W mutations has the following amino acid sequence:

(SEQ ID NO: 24)
ESKYGPPCPSCPAPEFLGGPSVFLFPPKPKDTLMISRTPEVTCVVVDVS
QEDPEVQFNWYVDGVEVHNAKTKPREEQFNSTYRVVSVLTVLHQDWLNG
KEYKCKVSNKGLPSSIEKTISKAKGQPREPQVYTLPPCQEEMTKNQVSL
WCLVKGFYPSDIAVEWESNGQPENNYKTTPPVLDSDGSFFLYSRLTVDK
SRWQEGNVFSCSVMHEALHNHYTQKSLSLSLGK.

A human IgG4 Fc-region derived Fc-region polypeptide with Y349C, T366S, L368A, Y407V mutations has the following amino acid sequence:

(SEQ ID NO: 25)
ESKYGPPCPSCPAPEFLGGPSVFLFPPKPKDTLMISRTPEVTCVVVDVS
QEDPEVQFNWYVDGVEVHNAKTKPREEQFNSTYRVVSVLTVLHQDWLNG
KEYKCKVSNKGLPSSIEKTISKAKGQPREPQVCTLPPSQEEMTKNQVSL
SCAVKGFYPSDIAVEWESNGQPENNYKTTPPVLDSDGSFFLVSRLTVDK
SRWQEGNVFSCSVMHEALHNHYTQKSLSLSLGK.

A human IgG4 Fc-region derived Fc-region polypeptide with a S228P, L235E and S354C, T366W mutations has the following amino acid sequence:

(SEQ ID NO: 26)
ESKYGPPCPPCPAPEFEGGPSVFLFPPKPKDTLMISRTPEVTCVVVDVS
QEDPEVQFNWYVDGVEVHNAKTKPREEQFNSTYRVVSVLTVLHQDWLNG
KEYKCKVSNKGLPSSIEKTISKAKGQPREPQVYTLPPCQEEMTKNQVSL
WCLVKGFYPSDIAVEWESNGQPENNYKTTPPVLDSDGSFFLYSRLTVDK
SRWQEGNVFSCSVMHEALHNHYTQKSLSLSLGK.

A human IgG4 Fc-region derived Fc-region polypeptide with a S228P, L235E and Y349C, T366S, L368A, Y407V mutations has the following amino acid sequence:

(SEQ ID NO: 27)
ESKYGPPCPPCPAPEFEGGPSVFLFPPKPKDTLMISRTPEVTCVVVDVS

QEDPEVQFNWYVDGVEVHNAKTKPREEQFNSTYRVVSVLTVLHQDWLNG

KEYKCKVSNKGLPSSIEKTISKAKGQPREPQVCTLPPSQEEMTKNQVSL

SCAVKGFYPSDIAVEWESNGQPENNYKTTPPVLDSDGSFFLVSRLTVDK

SRWQEGNVFSCSVMHEALHNHYTQKSLSLSLGK.

A human IgG4 Fc-region derived Fc-region polypeptide with a P329G mutation has the following amino acid sequence:

(SEQ ID NO: 28)
ESKYGPPCPSCPAPEFLGGPSVFLFPPKPKDTLMISRTPEVTCVVVDVS

QEDPEVQFNWYVDGVEVHNAKTKPREEQFNSTYRVVSVLTVLHQDWLNG

KEYKCKVSNKGLGSSIEKTISKAKGQPREPQVYTLPPSQEEMTKNQVSL

TCLVKGFYPSDIAVEWESNGQPENNYKTTPPVLDSDGSFFLYSRLTVDK

SRWQEGNVFSCSVMHEALHNHYTQKSLSLSLGK.

A human IgG4 Fc-region derived Fc-region polypeptide with a P329G and Y349C, T366S, L368A, Y407V mutations has the following amino acid sequence:

(SEQ ID NO: 29)
ESKYGPPCPSCPAPEFLGGPSVFLFPPKPKDTLMISRTPEVTCVVVDVS

QEDPEVQFNWYVDGVEVHNAKTKPREEQFNSTYRVVSVLTVLHQDWLNG

KEYKCKVSNKGLGSSIEKTISKAKGQPREPQVCTLPPSQEEMTKNQVSL

SCAVKGFYPSDIAVEWESNGQPENNYKTTPPVLDSDGSFFLVSRLTVDK

SRWQEGNVFSCSVMHEALHNHYTQKSLSLSLGK.

A human IgG4 Fc-region derived Fc-region polypeptide with a P329G and S354C, T366W mutations has the following amino acid sequence:

(SEQ ID NO: 30)
ESKYGPPCPSCPAPEFLGGPSVFLFPPKPKDTLMISRTPEVTCVVVDVS

QEDPEVQFNWYVDGVEVHNAKTKPREEQFNSTYRVVSVLTVLHQDWLNG

KEYKCKVSNKGLGSSIEKTISKAKGQPREPQVYTLPPCQEEMTKNQVSL

WCLVKGFYPSDIAVEWESNGQPENNYKTTPPVLDSDGSFFLYSRLTVDK

SRWQEGNVFSCSVMHEALHNHYTQKSLSLSLGK.

A human IgG4 Fc-region derived Fc-region polypeptide with a S228P, L235E, P329G and Y349C, T366S, L368A, Y407V mutations has the following amino acid sequence:

(SEQ ID NO: 31)
ESKYGPPCPPCPAPEFEGGPSVFLFPPKPKDTLMISRTPEVTCVVVDVS

QEDPEVQFNWYVDGVEVHNAKTKPREEQFNSTYRVVSVLTVLHQDWLNG

KEYKCKVSNKGLGSSIEKTISKAKGQPREPQVCTLPPSQEEMTKNQVSL

SCAVKGFYPSDIAVEWESNGQPENNYKTTPPVLDSDGSFFLVSRLTVDK

SRWQEGNVFSCSVMHEALHNHYTQKSLSLSLGK.

A human IgG4 Fc-region derived Fc-region polypeptide with a S228P, L235E, P329G and S354C, T366W mutations has the following amino acid sequence:

(SEQ ID NO: 32)
ESKYGPPCPPCPAPEFEGGPSVFLFPPKPKDTLMISRTPEVTCVVVDVS

QEDPEVQFNWYVDGVEVHNAKTKPREEQFNSTYRVVSVLTVLHQDWLNG

KEYKCKVSNKGLGSSIEKTISKAKGQPREPQVYTLPPCQEEMTKNQVSL

WCLVKGFYPSDIAVEWESNGQPENNYKTTPPVLDSDGSFFLYSRLTVDK

SRWQEGNVFSCSVMHEALHNHYTQKSLSLSLGK.

An alignment of the different human Fc-regions is shown below (EU numbering):

```
               230                     250
IGG1 DKTHTCPPCP APELLGGPSV FLFPPKPKDT LMISRTPEVT CVVVDVSHED
IGG2 ...VECPPCP APP.VAGPSV FLFPPKPKDT LMISRTPEVT CVVVDVSHED
IGG3 DTPPPCPRCP APELLGGPSV FLFPPKPKDT LMISRTPEVT CVVVDVSHED
IGG4 ...PPCPSCP APEFLGGPSV FLFPPKPKDT LMISRTPEVT CVVVDVSQED
     -- HINGE -|-- CH2 ----------------------------------

                                  300
IGG1 PEVKFNWYVD GVEVHNAKTK PREEQYNSTY RVVSVLTVLH QDWLNGKEYK
IGG2 PEVQFNWYVD GVEVHNAKTK PREEQFNSTF RVVSVLTVVH QDWLNGKEYK
IGG3 PEVQFKWYVD GVEVHNAKTK PREEQYNSTF RVVSVLTVLH QDWLNGKEYK
IGG4 PEVQFNWYVD GVEVHNAKTK PREEQFNSTY RVVSVLTVLH QDWLNGKEYK
     -- CH2 ---------------------------------------------

                                  350
IGG1 CKVSNKALPA PIEKTISKAK GQPREPQVYT LPPSRDELTK NQVSLTCLVK
IGG2 CKVSNKGLPA PIEKTISKTK GQPREPQVYT LPPSREEMTK NQVSLTCLVK
IGG3 CKVSNKALPA PIEKTISKTK GQPREPQVYT LPPSREEMTK NQVSLTCLVK
IGG4 CKVSNKGLPS SIEKTISKAK GQPREPQVYT LPPSQEEMTK NQVSLTCLVK
     -- CH2 ------- CH2 --|-- CH3 ------------------------

                                  400
IGG1 GFYPSDIAVE WESNGQPENN YKTTPPVLDS DGSFFLYSKL TVDKSRWQQG
IGG2 GFYPSDISVE WESNGQPENN YKTTPPMLDS DGSFFLYSKL TVDKSRWQQG
```

-continued

```
IGG3 GFYPSDIAVE WESSGQPENN YNTTPPMLDS DGSFFLYSKL TVDKSRWQQG
IGG4 GFYPSDIAVE WESNGQPENN YKTTPPVLDS DGSFFLYSRL TVDKSRWQEG
     -- CH3 ---------------------------------------------

                            447
IGG1 NVFSCSVMHE ALHNHYTQKS LSLSPGK (SEQ ID NO: 7)
IGG2 NVFSCSVMHE ALHNHYTQKS LSLSPGK (SEQ ID NO: 52)
IGG3 NIFSCSVMHE ALHNRFTQKS LSLSPGK (SEQ ID NO: 53)
IGG4 NVFSCSVMHE ALHNHYTQKS LSLSLGK (SEQ ID NO: 54)
     --CH3 ----------------------|
```

A "humanized" antibody refers to a chimeric antibody comprising amino acid residues from non-human HVRs and amino acid residues from human FRs. In certain embodiments, a humanized antibody will comprise substantially all of at least one, and typically two, variable domains, in which all or substantially all of the HVRs (e.g., the CDRs) correspond to those of a non-human antibody, and all or substantially all of the FRs correspond to those of a human antibody. A humanized antibody optionally may comprise at least a portion of an antibody constant region derived from a human antibody. A "humanized form" of an antibody, e.g., a non-human antibody, refers to an antibody that has undergone humanization.

An "individual" or "subject" is a mammal. Mammals include, but are not limited to, domesticated animals (e.g. cows, sheep, cats, dogs, and horses), primates (e.g., humans and non-human primates such as monkeys), rabbits, and rodents (e.g., mice and rats). In certain embodiments, the individual or subject is a human.

An "isolated" antibody is one which has been separated from a component of its natural environment. In some embodiments, an antibody is purified to greater than 95% or 99% purity as determined by, for example, electrophoretic (e.g., SDS-PAGE, isoelectric focusing (IEF), capillary electrophoresis) or chromatographic (e.g., size exclusion chromatography or ion exchange or reverse phase HPLC). For review of methods for assessment of antibody purity, see, e.g., Flatman, S. et al., J. Chrom. B 848 (2007) 79-87.

An "isolated" nucleic acid refers to a nucleic acid molecule that has been separated from a component of its natural environment. An isolated nucleic acid includes a nucleic acid molecule contained in cells that ordinarily contain the nucleic acid molecule, but the nucleic acid molecule is present extrachromosomally or at a chromosomal location that is different from its natural chromosomal location.

The term "monoclonal antibody" as used herein refers to an antibody obtained from a population of substantially homogeneous antibodies, i.e., the individual antibodies comprising the population are identical and/or bind the same epitope, except for possible variant antibodies, e.g., containing naturally occurring mutations or arising during production of a monoclonal antibody preparation, such variants generally being present in minor amounts. In contrast to polyclonal antibody preparations, which typically include different antibodies directed against different determinants (epitopes), each monoclonal antibody of a monoclonal antibody preparation is directed against a single determinant on an antigen. Thus, the modifier "monoclonal" indicates the character of the antibody as being obtained from a substantially homogeneous population of antibodies, and is not to be construed as requiring production of the antibody by any particular method. For example, the monoclonal antibodies to be used in accordance with the present invention may be made by a variety of techniques, including but not limited to the hybridoma method, recombinant DNA methods, phage-display methods, and methods utilizing transgenic animals containing all or part of the human immunoglobulin loci, such methods and other exemplary methods for making monoclonal antibodies being described herein.

"Native antibodies" refer to naturally occurring immunoglobulin molecules with varying structures. For example, native IgG antibodies are heterotetrameric glycoproteins of about 150,000 daltons, composed of two identical light chains and two identical heavy chains that are disulfide-bonded. From N- to C-terminus, each heavy chain has a variable region (VH), also called a variable heavy domain or a heavy chain variable domain, followed by three constant domains (CH1, CH2, and CH3). Similarly, from N- to C-terminus, each light chain has a variable region (VL), also called a variable light domain or a light chain variable domain, followed by a constant light (CL) domain. The light chain of an antibody may be assigned to one of two types, called kappa (κ) and lambda (λ), based on the amino acid sequence of its constant domain.

The term "negative linear pH gradient" denotes a pH gradient starting at a high (i.e. neutral or alkaline) pH value and ending at a lower (i.e. neutral or acidic) pH value. In one embodiment the negative linear pH gradient starts at a pH value of about 8.8 and ends at a pH value of about 5.5.

The term "non-naturally occurring amino acid residue" denotes an amino acid residue, other than the naturally occurring amino acid residues as listed above, which can be covalently bound to the adjacent amino acid residues in a polypeptide chain. Examples of non-naturally occurring amino acid residues are norleucine, ornithine, norvaline, homoserine. Further examples are listed in Ellman, et al., Meth. Enzym. 202 (1991) 301-336. Exemplary method for the synthesis of non-naturally occurring amino acid residues are reported in, e. g., Noren, et al., Science 244 (1989) 182 and Ellman et al., supra.

The term "pharmaceutical formulation" refers to a preparation which is in such form as to permit the biological activity of an active ingredient contained therein to be effective, and which contains no additional components which are unacceptably toxic to a subject to which the formulation would be administered.

A "pharmaceutically acceptable carrier" refers to an ingredient in a pharmaceutical formulation, other than an active ingredient, which is nontoxic to a subject., A pharmaceutically acceptable carrier includes, but is not limited to, a buffer, excipient, stabilizer, or preservative.

The term "plasmid", as used herein, refers to a nucleic acid molecule capable of propagating another nucleic acid to which it is linked. The term includes the plasmid as a self-replicating nucleic acid structure as well as the plasmid incorporated into the genome of a host cell into which it has been introduced. Certain plasmids are capable of directing the expression of nucleic acids to which they are operatively linked. Such plasmids are referred to herein as "expression plasmid".

The term "positive linear pH gradient" denotes a pH gradient starting at a low (i.e. more acidic) pH value and ending at a higher (i.e. less acidic, neutral or alkaline) pH value. In one embodiment the positive linear pH gradient starts at a pH value of about 5.5 and ends at a pH value of about 8.8.

The term "recombinant antibody", as used herein, denotes all antibodies (chimeric, humanized and human) that are prepared, expressed, created or isolated by recombinant means. This includes antibodies isolated from a host cell such as a NS0 or CHO cell or from an animal (e.g. a mouse) that is transgenic for human immunoglobulin genes or antibodies expressed using a recombinant expression plasmid transfected into a host cell. Such recombinant antibodies have variable and constant regions in a rearranged form. The recombinant antibodies as reported herein can be subjected to in vivo somatic hypermutation. Thus, the amino acid sequences of the VH and VL regions of the recombinant antibodies are sequences that, while derived from and related to human germ line VH and VL sequences, may not naturally exist within the human antibody germ line repertoire in vivo.

A "solid phase" denotes a non-fluid substance, and includes particles (including microparticles and beads) made from materials such as polymer, metal (paramagnetic, ferromagnetic particles), glass, and ceramic; gel substances such as silica, alumina, and polymer gels; capillaries, which may be made of polymer, metal, glass, and/or ceramic; zeolites and other porous substances; electrodes; microtiter plates; solid strips; and cuvettes, tubes or other spectrometer sample containers. A solid phase component of an assay is distinguished from inert solid surfaces in that a "solid support" contains at least one moiety on its surface, which is intended to interact chemically with a molecule. A solid phase may be a stationary component, such as a chip, tube, strip, cuvette, or microtiter plate, or may be non-stationary components, such as beads and microparticles. Microparticles can also be used as a solid support for homogeneous assay formats. A variety of microparticles that allow both non-covalent or covalent attachment of proteins and other substances may be used. Such particles include polymer particles such as polystyrene and poly (methylmethacrylate); gold particles such as gold nanoparticles and gold colloids; and ceramic particles such as silica, glass, and metal oxide particles. See for example Martin, C. R., et al., Analytical Chemistry-News & Features, May 1 (1998) 322A-327A, which is incorporated herein by reference. In one embodiment the solid support is sepharose.

The term "substantially the same" denotes that two values, e.g. the retention times on an FcRn affinity chromatography column of two different antibodies, are within 5% of each other, i.e. they differ by less than 5%. For example, a first retention time of 80 minutes and a second retention time of 84 minutes are substantially the same, whereas a retention time of 80 minutes and a retention time of 85 minutes are not substantially the same, these retention times are different. In one embodiment substantially the same denotes that two values are within 3.5% of each other, i.e. they differ by 3.5% or less. In one embodiment substantially the same denotes that two values are within 2.5% of each other, i.e. they differ by 2.5% or less. The smaller of the two values is taken as basis for this calculation.

As used herein, "treatment" (and grammatical variations thereof such as "treat" or "treating") refers to clinical intervention in an attempt to alter the natural course of the individual being treated, and can be performed either for prophylaxis or during the course of clinical pathology. Desirable effects of treatment include, but are not limited to, preventing occurrence or recurrence of disease, alleviation of symptoms, diminishment of any direct or indirect pathological consequences of the disease, preventing metastasis, decreasing the rate of disease progression, amelioration or palliation of the disease state, and remission or improved prognosis. In some embodiments, antibodies or Fc-region fusion polypeptides as reported herein are used to delay development of a disease or to slow the progression of a disease.

The term "valent" as used within the current application denotes the presence of a specified number of binding sites in a (antibody) molecule. As such, the terms "bivalent", "tetravalent", and "hexavalent" denote the presence of two binding site, four binding sites, and six binding sites, respectively, in a (antibody) molecule. The bispecific antibodies as reported herein as reported herein are in one preferred embodiment "bivalent".

The term "variable region" or "variable domain" refer to the domain of an antibody heavy or light chain that is involved in binding of the antibody to its antigen. The variable domains of the heavy chain and light chain (VH and VL, respectively) of an antibody generally have similar structures, with each domain comprising four framework regions (FRs) and three hypervariable regions (HVRs) (see, e.g., Kindt, T. J. et al. Kuby Immunology, 6th ed., W.H. Freeman and Co., N. Y. (2007), page 91). A single VH or VL domain may be sufficient to confer antigen-binding specificity. Furthermore, antibodies that bind a particular antigen may be isolated using a VH or VL domain from an antibody that binds the antigen to screen a library of complementary VL or VH domains, respectively. See, e.g., Portolano, S. et al., J. Immunol. 150 (1993) 880-887; Clackson, T. et al., Nature 352 (1991) 624-628).

The terms "variant", "modified antibody", and "modified fusion polypeptide" denotes molecules which have an amino acid sequence that differs from the amino acid sequence of a parent molecule. Typically such molecules have one or more alterations, insertions, or deletions. In one embodiment the modified antibody or the modified fusion polypeptide comprises an amino acid sequence comprising at least a portion of an Fc-region which is not naturally occurring. Such molecules have less than 100% sequence identity with the parent antibody or parent fusion polypeptide. In one embodiment the variant antibody or the variant fusion polypeptide has an amino acid sequence that has from about 75% to less than 100% amino acid sequence identity with the amino acid sequence of the parent antibody or parent fusion polypeptide, especially from about 80% to less than 100%, especially from about 85% to less than 100%, especially from about 90% to less than 100%, and especially from about 95% to less than 100%. In one embodiment the parent antibody or the parent fusion polypeptide and the variant antibody or the variant fusion polypeptide differ by one (a single), two or three amino acid residue(s).

II. Methods as Reported Herein

The invention is based, at least in part, on the finding that the charge distribution in the Fv domain influences antibody-FcRn binding and results in additional interactions between the antibody and the FcRn. This changes the FcRn binding characteristics, especially with respect to the dissociation of the antibody-FcRn complex at pH 7.4, thereby reducing FcRn-dependent terminal half-life of the antibody.

a) the Neonatal Fc-Receptor (FcRn)

The neonatal Fc-receptor (FcRn) is important for the metabolic fate of antibodies of the IgG class in vivo. The FcRn functions to salvage wild-type IgG from the lysosomal degradation pathway, resulting in reduced clearance and increased half-life. It is a heterodimeric protein consisting of two polypeptides: a 50 kDa class I major histocompatibility complex-like protein (α-FcRn) and a 15 kDa β2-microglobulin (β2m). FcRn binds with high affinity to the CH2-CH3 portion of the Fc-region of an antibody of the class IgG. The interaction between an antibody of the class IgG and the FcRn is pH dependent and occurs in a 1:2 stoichiometry, i.e. one IgG antibody molecule can interact with two FcRn molecules via its two heavy chain Fc-region polypeptides (see e.g. [16]).

Thus, an IgGs in vitro FcRn binding properties/characteristics are indicative of its in vivo pharmacokinetic properties in the blood circulation.

In the interaction between the FcRn and the Fc-region of an antibody of the IgG class different amino acid residues of the heavy chain CH2- and CH3-domain are participating. The amino acid residues interacting with the FcRn are located approximately between EU position 243 and EU position 261, approximately between EU position 275 and EU position 293, approximately between EU position 302 and EU position 319, approximately between EU position 336 and EU position 348, approximately between EU position 367 and EU position 393, at EU position 408, and approximately between EU position 424 and EU position 440. More specifically the following amino acid residues according to the EU numbering of Kabat are involved in the interaction between the Fc-region and the FcRn: F243, P244, P245 P, K246, P247, K248, D249, T250, L251, M252, I253, S254, R255, T256, P257, E258, V259, T260, C261, F275, N276, W277, Y278, V279, D280, V282, E283, V284, H285, N286, A287, K288, T289, K290, P291, R292, E293, V302, V303, S304, V305, L306, T307, V308, L309, H310, Q311, D312, W313, L314, N315, G316, K317, E318, Y319, I336, S337, K338, A339, K340, G341, Q342, P343, R344, E345, P346, Q347, V348, C367, V369, F372, Y373, P374, S375, D376, 1377, A378, V379, E380, W381, E382, S383, N384, G385, Q386, P387, E388, N389, Y391, T393, S408, S424, C425, S426, V427, M428, H429, E430, A431, L432, H433, N434, H435, Y436, T437, Q438, K439, and S440.

Site-directed mutagenesis studies have proven that the critical binding sites in the Fc-region of IgGs for FcRn are Histidine 310, Histidine 435, and Isoleucine 253 and to a lesser extent Histidine 433 and Tyrosine 436 (see e.g. Kim, J. K., et al., Eur. J. Immunol. 29 (1999) 2819-2825; Raghavan, M., et al., Biochem. 34 (1995) 14649-146579; Medesan, C., et al., J Immunol. 158 (1997) 2211-2217).

Methods to increase IgG binding to FcRn have been performed by mutating IgG at various amino acid residues: Threonine 250, Methionine 252, Serine 254, Threonine 256, Threonine 307, Glutamic acid 380, Methionine 428, Histidine 433, and Asparagine 434 (see Kuo, T. T., et al., J. Clin. Immunol. 30 (2010) 777-789).

In some cases antibodies with reduced half-life in the blood circulation are desired. For example, drugs for intravitreal application should have a long half-life in the eye and a short half-life in the circulation of the patient. Such antibodies also have the advantage of increased exposure to a disease site, e.g. in the eye.

Different mutations that influence the FcRn binding and therewith the half-life in the blood circulation are known. Fc-region residues critical to the mouse Fc-mouse FcRn interaction have been identified by site-directed mutagenesis (see e.g. Dall'Acqua, W. F., et al. J. Immunol 169 (2002) 5171-5180). Residues I253, H310, H433, N434, and H435 (EU numbering according to Kabat) are involved in the interaction (Medesan, C., et al., Eur. J. Immunol. 26 (1996) 2533-2536; Firan, M., et al., Int. Immunol. 13 (2001) 993-1002; Kim, J. K., et al., Eur. J. Immunol. 24 (1994) 542-548). Residues I253, H310, and H435 were found to be critical for the interaction of human Fc with murine FcRn (Kim, J. K., et al., Eur. J. Immunol. 29 (1999) 2819-2825). Residues M252Y, S254T, T256E have been described by Dall'Acqua et al. to improve FcRn binding by protein-protein interaction studies (Dall'Acqua, W. F., et al. J. Biol. Chem. 281 (2006) 23514-23524). Studies of the human Fc-human FcRn complex have shown that residues 1253, S254, H435, and Y436 are crucial for the interaction (Firan, M., et al., Int. Immunol. 13 (2001) 993-1002; Shields, R. L., et al., J. Biol. Chem. 276 (2001) 6591-6604). In Yeung, Y. A., et al. (J. Immunol. 182 (2009) 7667-7671) various mutants of residues 248 to 259 and 301 to 317 and 376 to 382 and 424 to 437 have been reported and examined. Exemplary mutations and their effect on FcRn binding are listed in the following Table 1.

TABLE 1

Collocation of different Fc-region mutations and their influence on FcRn-binding and in vivo half-life.

| mutation | effect on FcRn binding | half-life in the circulation | reference |
|---|---|---|---|
| H285<br>H310Q/H433N<br>(murine IgG1) | reduced<br>(murine) | reduced<br>(in mouse) | Kim, J. K., Scand. J. Immunol. 40 (1994) 457-465 |
| I253A<br>H310A<br>H435A<br>H436A<br>(murine IgG1) | reduced<br>(murine) | reduced<br>(in mouse) | Ghetie, V. and Ward, E. S., Immunol. Today 18 (1997) 592-598 |
| T252L/T254S/T256F<br>T252A/T254S/T256A<br>(murine IgG1) | increased<br>(murine) | increased<br>(in mouse) | Ghetie, V. and Ward, E. S., Immunol. Today 18 (1997) 592-598 |
| I253A<br>H310A<br>H435A<br>H436A<br>H433A/N434Q<br>(murine IgG1) | reduced<br>(murine) | reduced<br>(in mouse) | Medesan, C., et al., J. Immunol. 158 (1997) 2211-2217 |

TABLE 1-continued

Collocation of different Fc-region mutations and their influence on FcRn-binding and in vivo half-life.

| mutation | effect on FcRn binding | half-life in the circulation | reference |
|---|---|---|---|
| I253A<br>H310A<br>H435A<br>H435R<br>(human IgG1) | reduced<br>H310A: <0.1 rel. binding to muFcRn<br>(murine) | reduced<br>(in mouse) | Kim, J. K., Eur. J. Immunol. 29 (1999) 2819-2825 |
| H433A<br>(human IgG1) | 1.1 rel. binding to muFcRn,<br>0.4 rel. binding huFcRn<br>(murine) | | Kim, J. K., Eur. J. Immunol. 29 (1999) 2819-2825 |
| I253A<br>S254A<br>H435A<br>Y436A<br>(human IgG1) | reduced<br><0.1 relative binding to huFcRn | reduced | Shields, R. L., et al., J. Biol. Chem. 276 (2001) 6591-6604 |
| R255A<br>K288A<br>L309A<br>S415A<br>H433A<br>(human IgG1) | reduced<br>(human) | reduced | Shields, R. L., et al., J. Biol. Chem. 276 (2001) 6591-6604 |
| P238A<br>T256A<br>E272A<br>V305A<br>T307A<br>Q311A<br>D312A<br>K317A<br>D376A<br>A378Q<br>E380A<br>E382A<br>S424A<br>N434A<br>K288A/N434A<br>E380A/N434A<br>T307A/E380A/N434A<br>(human IgG1) | increased<br>(human) | increased | Shields, R. L., et al., J. Biol. Chem. 276 (2001) 6591-6604 |
| H435A<br>(humanized IgG1) | reduced<br><0.1 rel. binding to huFcRn | reduced | Firan, M., et al., Int. Immunol. 13 (2001) 993-1002 |
| I253A (no binding)<br>M252W<br>M252Y<br>M252Y/T256Q<br>M252F/T256D<br>N434F/Y436H<br>M252Y/S254T/T256E<br>G385A/Q386P/N389S<br>H433K/N434F/Y436H<br>H433R/N434Y/Y436H<br>G385R/Q386T/P387R/N389P<br>M252Y/S254T/T256E/<br>H433K/N434F/Y436H<br>M252Y/S254T/T256E/<br>G385R/Q386T/P387R/N389P<br>(human IgG1) | increased<br>(murine and human) | reduced<br>(in mouse) | Dall' Acqua, J. Immunol. 169 (2002) 5171-5180 |
| M428L<br>T250Q/M428L<br>(human IgG2) | increased<br>(human) | increased<br>(in monkey) | Hinton, P. R., et al., J. Biol. Chem. 279 (2004) 6213-6216 |
| M252Y/S254T/T256E +<br>H433K/N434F<br>(human IgG) | increased<br>(human) | increased<br>(in mouse) | Vaccaro, C., et al., Nat. Biotechnol. 23 (2005) 1283-1288 |
| T307A/E380A/N434A<br>(chimeric IgG1) | increased | increased in transgenic mouse | Pop, L. M., et al., Int. Immunopharm acol. 5 (2005) 1279-1290 |

TABLE 1-continued

Collocation of different Fc-region mutations and their influence on FcRn-binding and in vivo half-life.

| mutation | effect on FcRn binding | half-life in the circulation | reference |
|---|---|---|---|
| T250Q<br>E380A<br>M428L<br>N434A<br>K288A/N434A<br>E380A/N434A<br>T307A/E380A/N434A<br>(human IgG1) | increased (human) | increased in transgenic mouse | Petkova, S. B., et al., Int. Immunol 18 (2006) 1759-1769 |
| I253A<br>(human IgG1) | reduced (human) | reduced in transgenic mouse | Petkova, S. B., et al., Int. Immunol 18 (2006) 1759-1769 |
| S239D/A330L/I332E<br>M252Y/S254T/T256E<br>(humanized) | increased (human and Cynomolgus) | increased in Cynomolgus | Dall' Acqua, W. F., et al., J. Biol. Chem. 281 (2006) 23514-23524 |
| T250Q<br>M428L<br>T250Q/M428L<br>(human IgG1) | increased (human) | increased in Rhesus apes | Hinton, P. R., et al., J. Immunol. 176 (2006) 346-356 |
| T250Q/M428L<br>P257I/Q311I<br>(humanized IgG1) | increased (mouse and Cynomolgus) | no change in Cynomolgus increased in mouse | Datta-Mannan, A., et al., J. Biol. Chem. 282 (2007) 1709-1717 |
| P257I/Q311I<br>P257I/N434H<br>D376V/N434H<br>(humanized IgG1) | increased at pH 6 (human, Cynomolgus, mouse) | reduced in mice P257I/N434H reduced in Cynomolgus | Datta-Mannan, A., et al., Drug Metab. Dispos. 35 (2007) 86-94 |
| abrogate FcRn binding:<br>I253<br>H310<br>H433<br>H435<br>reduce FcRn binding:<br>Y436<br>increased FcRn binding:<br>T250<br>N252<br>S254<br>T256<br>T307<br>M428<br>N434 | increased and reduced | reducing the binding ability of IgG for FcRn reduces its serum persistence; a higher-affinity FcRn-IgG interaction prolongs the half-lives of IgG and Fc-coupled drugs in the serum | Ropeenian, D. C. and Akilesh, S., Nat. Rev. Immunol. 7 (2007) 715-725 |
| N434A<br>T307Q/N434A<br>T307Q/N434S<br>V308P/N434A<br>T307Q/E380A/N434A<br>(human IgG1) | increased (Cynomolgus monkey) | increased in Cynomolgus monkey | Yeung, Y. A., et al., Cancer Res. 70 (2010) 3269-3277 |
| 256P<br>280K<br>339T<br>385H<br>428L<br>434W/Y/F/A/H<br>(human IgG) | increased at neutral pH | | WO 2011/122011 |

It has been found that the charge distribution in the Fv domain influences antibody-FcRn binding and can result in additional interactions between the antibody and the FcRn. This changes the FcRn binding characteristics, especially with respect to the dissociation of the antibody-FcRn complex at pH 7.4, thereby influencing (reducing) FcRn-dependent terminal half-life of the antibody.

The human neonatal Fc receptor (FcRn) plays an important role in IgG catabolisman IgGs in vitro FcRn binding properties/characteristics are indicative of its in vivo pharmacokinetic properties. Such in vitro methods would be of great value during antibody development as repeated in vivo studies can be avoided (reduced animal experiments, time and costs).

IgG-FcRn interactions can be analyzed using plasmon surface resonance (SPR) assays (Wang, W., et al., Drug Metab. Disp. 39 (2011) 1469-1477; Datta-Mannan, A., et al., Drug Metab. Disp. 40 (2012) 1545-1555; Vaughn, D. E. and Bjorkman, P. J., Biochemistry 36 (1997) 9374-9380; Raghavan, M., et al., Proc. Natl. Acad. Sci. USA 92 (1995) 11200-11204; Martin, W. L. and Bjorkman, P. J., Biochemistry 38 (1999) 12639-12647).

Calorimetric and asymmetrical flow field flow fractionation methods have also been described for assessing IgG binding affinity to FcRn (Huber, A. H., et al., J. Mol. Biol. 230 (1993) 1077-1083; Pollastrini, J., et al., Anal. Biochem. 414 (2011) 88-98).

In addition of being complex assays, several studies investigating the correlation between in vitro FcRn binding parameters determined by SPR and the serum half-life of antibodies in vivo failed so far to demonstrate such correlation despite improved binding reaction conditions and appropriate modeling (Gurbaxani, B., et al., Mol. Immunol. 43 (2006) 1462-1473; Gurbaxani, B. M. and Morrison, S. L., Mol. Immunol. 43 (2006) 1379-1389; Gurbaxani, B., Clin. Immunol. 122 (2007) 121-124).

Engineering of the Fc-region of IgG1 to improve affinity of IgG1 to FcRn at pH 6 and at neutral pH as measured by SPR technology did not result in improved pharmacokinetics in cynomolgus monkeys (Yeung, Y. A., et al., J. Immunol. 182 (2009) 7663-7671). However, only modest increases in pH 6 FcRn affinity in the N434A IgG1 variant without concomitant significant binding to FcRn at pH 7.4 resulted in improved pharmacokinetics in primates demonstrating the importance of the FcRn release at pH 7.4 (see Yeung, Y. A., above).

For example, SPR analysis of the IgG-FcRn interaction provides a qualitative result indicating expected or aberrant binding properties of a sample but does neither give a hint for the cause of aberrant binding nor a quantitative estimation of the amount of antibody with aberrant binding.

An FcRn affinity chromatography method using a positive linear gradient elution has been reported in WO 2013/120929.

b) FcRn-Fab Charge-Mediated Interactions

Specific manipulation of the Fc-region is known to affect PK parameters by altering interaction between the Fc-region and FcRn and has been used to design therapeutic antibodies with specific PK properties [33,34].

Although the influence of the Fab region on FcRn interactions has recently been discussed when antibodies of the same wild-type human Fc-region sequences but different Fab regions showed differences in FcRn affinity and altered PK. The mechanism of this interaction remained unclear [23,24].

Figure 5:
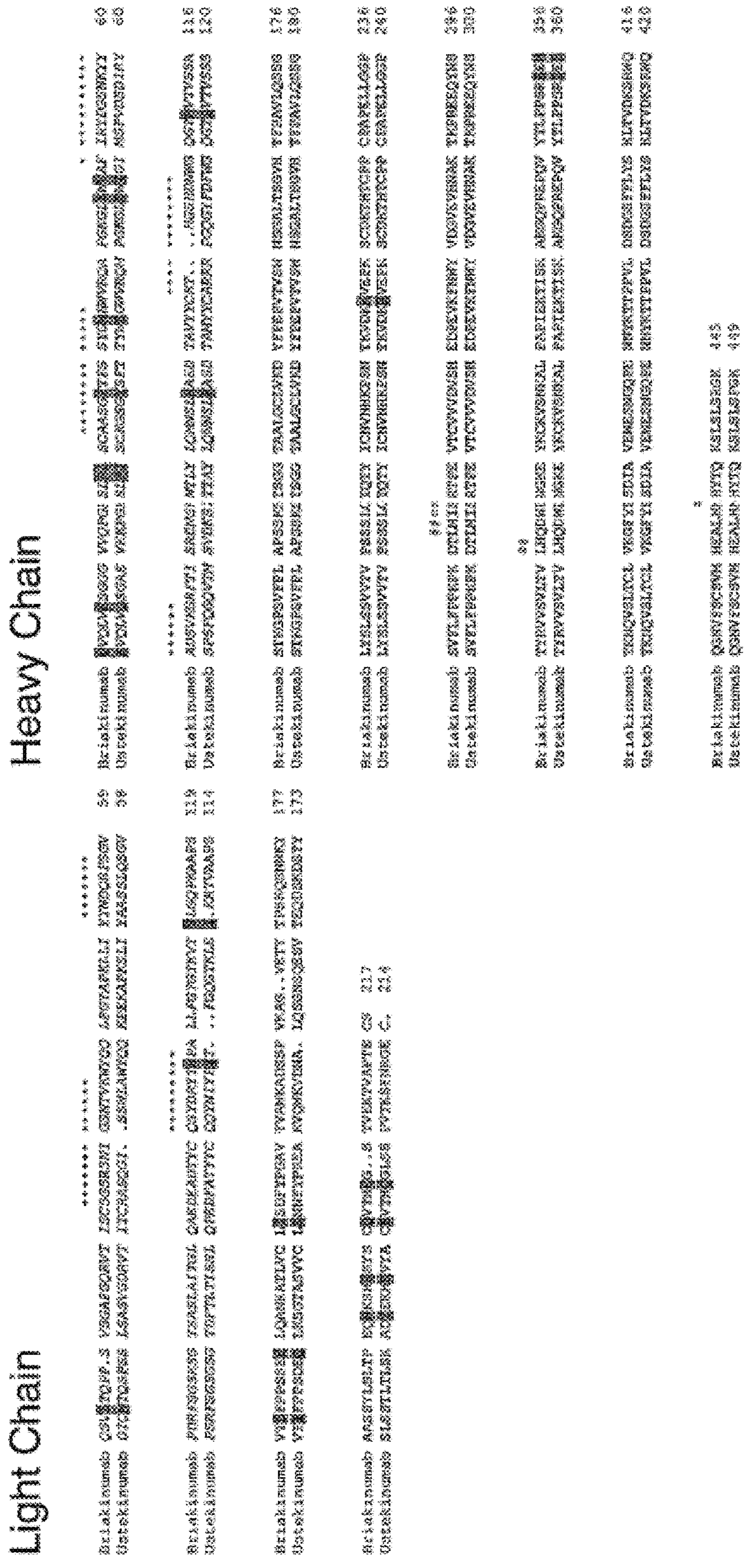
FIG. 5 Sequence alignment of Briakinumab and Ustekinumab light and heavy chains. VH and VL regions are shown in italics; CDRs are marked with an asterisk (*); a hash (#) denotes amino acids in close proximity (<4 Å) to the FcRn in the starting structure. A "¤" symbol marks the residue mutated to Cys to establish a disulfide bridge to the FcRn for MD purposes.

To show the influencing factors of the Fab region to FcRn-mediated IgG homeostasis the antibody pair Briakinumab (Ozespa™) and Ustekinumab (Stelara™) were used as a model system. Both Briakinumab and Ustekinumab are fully human monoclonal IgG1 antibodies. They bind to the same human p40-subunit of interleukin 12 (IL-12) and interleukin 23 (IL-23) and they are not cross-reactive to the corresponding mouse IL-12 and IL-23 [27, 28]. Briakinumab and Ustekinumab are an IgG1κ antibody with variable heavy and light chain domains of the $V_H5$ and $V_\kappa 1D$ germline families and an IgG12 antibody with variable heavy and light chain domains of the $V_H3$ and $V_\lambda 1$ germline families, respectively. In addition to different variable domains, Briakinumab and Ustekinumab show differences in several allotype-specific amino acids in the constant domains (see FIG. 5). However, these amino acid residues are outside of the (cognate) FcRn binding regions and can therefore be considered to play no role in FcRn-dependent PK [11]. Interestingly, Ustekinumab has a (reported) median terminal half-life of 22 days [29], whereas Briakinumab has a terminal half-life of only 8-9 days [26,30,31].

c) Charge Distribution and pH Dependent Net Charge

Figure 1D:
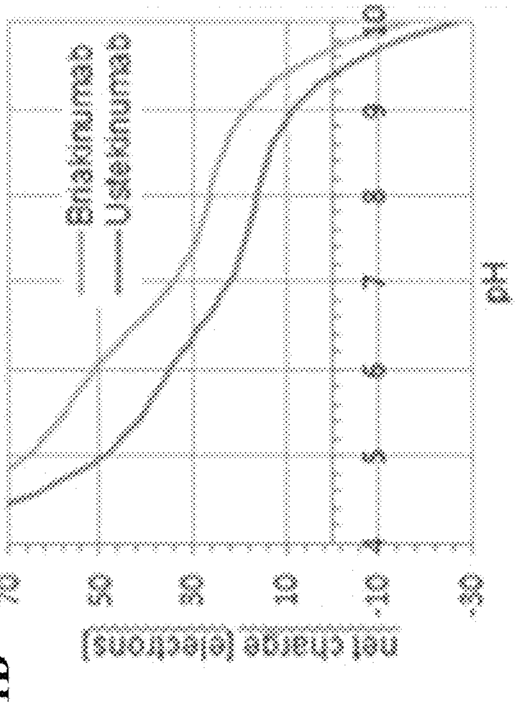
Figure 1A:
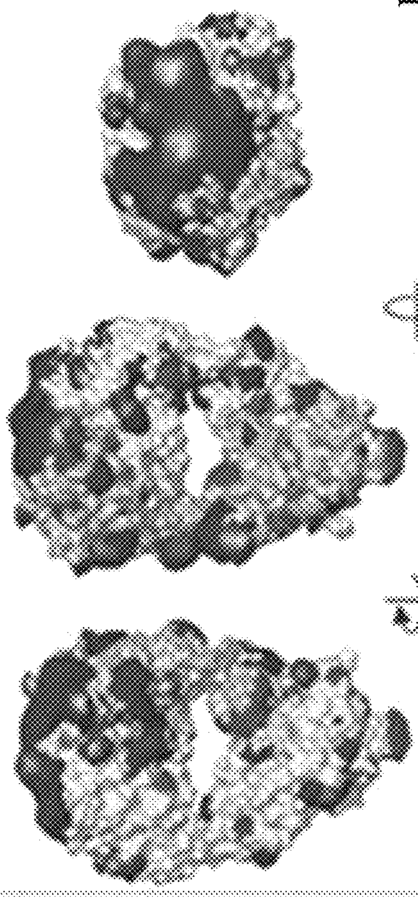
Figure 1B:
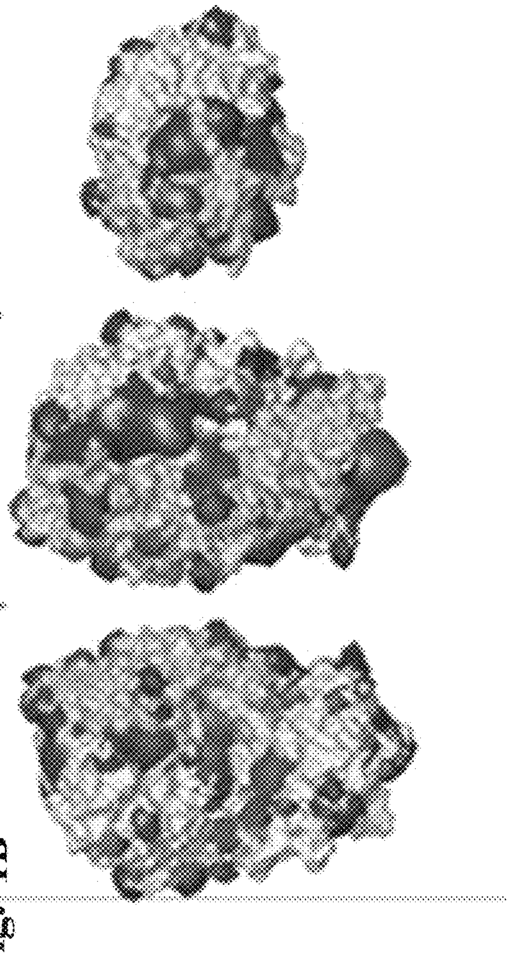

Briakinumab exhibits a non-uniform charge distribution at physiological pH of 7.4 (see e.g. the published crystal structure of Ustekinumab and a homology model of Briakinumab). Briakinumab shows a large positively charged region on the Fv domain (see FIG. 1A) which is absent in Ustekinumab (see FIG. 1B). Furthermore FcRn possesses a strong and extended negatively charged region (see FIG. 1C) which is however not involved in cognate Fc-region binding. Briakinumab and Ustekinumab have calculated isoelectric points of 9.7 and 9.4, respectively. Moreover, the net charge of Briakinumab is slightly more positive over the entire pH range (see FIG. 1D).

FcRn binding affinity of Briakinumab and Ustekinumab at pH 6.0 is comparable, i.e. both values differ at most by one order or magnitude, in one embodiment at most 5-fold, whereas the dissociation from the FcRn is very different. Using variants of Briakinumab and Ustekinumab, it could be shown that the interaction is predominantly electrostatic and correlates with the extent of a positively charged region (see below).

d) pH-Dependent FcRn-IgG Interaction

Ten variants of Briakinumab and Ustekinumab have been synthesized and characterized with respect to their FcRn binding properties by FcRn affinity chromatography (see Table 2). In the variants the variable regions have been modified and tested for FcRn pH 6 binding affinity and FcRn dissociation using surface plasmon resonance (SPR) and FcRn affinity chromatography (see Table 3), respectively.

TABLE 2

Systematically engineered variants of Briakinumab and Ustekinumab. Structural parts like Fv, LC and CDRs were exchanged between Briakinumab (light) and Ustekinumab (dark): mAb 1-6. Three and five basic amino acids in the HC of Briakinumab were exchanged into alanine residues (by site-directed mutagenesis) for mAb 7 and mAb 8, respectively. MAb 9 is Briakinumab with three basic amino acids in the light chain CDRs exchanged into alanine residues and mAb 10 presents mAb 9 with additional exchange of five basic amino acids in the HC. Exchange of single basic amino acids is shown by circles, three amino acids exchanged is pictured as 1 circle and 5 amino acids exchanged as 2 circles.

| | | | | FcRn column retention time [min] | | | |
|---|---|---|---|---|---|---|---|
| No | Name | Description | | pH gradient | pH gradient + high salt | salt gradient | T1/2 [h] |
| 1 | Briakinumab | Briakinumab wild type | 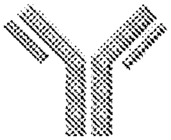 | 93.7 | 83.1 | 59.6 | 48 |
| 2 | Ustekinumab | Ustekinumab wild type | 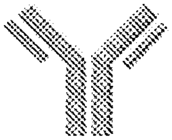 | 84.3 | 80.4 | 31.3 | 137 |
| 3 | mAb 1 | Ustekinumab Fv + Briakinumab constant domains | 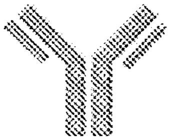 | 84.3 | 80.4 | 33.0 | |
| 4 | mAb 2 | Briakinumab Fv + Ustekinumab constant domains | 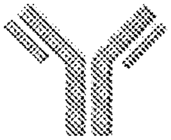 | 93.0 | 83.0 | 58.5 | |
| 5 | mAb 3 | Ustekinumab HC + Briakinumab LC | 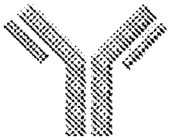 | 92.4 | 83.0 | 53.9 | |
| 6 | mAb 4 | Briakinumab HC + Ustekinumab LC | 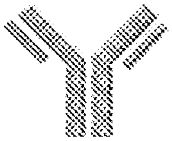 | 84.5 | 80.9 | 34.0 | |
| 7 | mAb 5 | Ustekinumab CDRs on Briakinumab | 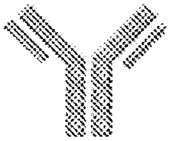 | 85.1 | 80.9 | 37.4 | |
| 8 | mAb 6 | Briakinumab CDRs on Ustekinumab | 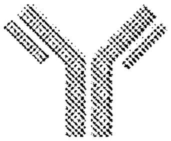 | 86.2 | 81.4 | 40.7 | |

TABLE 2-continued

Systematically engineered variants of Briakinumab and Ustekinumab. Structural parts like Fv, LC and CDRs were exchanged between Briakinumab (light) and Ustekinumab (dark): mAb 1-6. Three and five basic amino acids in the HC of Briakinumab were exchanged into alanine residues (by site-directed mutagenesis) for mAb 7 and mAb 8, respectively. MAb 9 is Briakinumab with three basic amino acids in the light chain CDRs exchanged into alanine residues and mAb 10 presents mAb 9 with additional exchange of five basic amino acids in the HC. Exchange of single basic amino acids is shown by circles, three amino acids exchanged is pictured as 1 circle and 5 amino acids exchanged as 2 circles.

| | | | | FcRn column retention time [min] | | | |
|---|---|---|---|---|---|---|---|
| No | Name | Description | | pH gradient | pH gradient + high salt | salt gradient | T1/2 [h] |
| 9 | mAb 7 | Briakinumab R19HCA, K64HCA, R83HCA* | 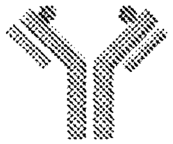 | 90.4 | 82.7 | 52.1 | |
| 10 | mAb 8 | Briakinumab R16HCA, R19HCA, K57HCA, K64HCA R83HCA* | 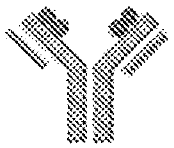 | 90.1 | 82.6 | 49.5 | 78 |
| 11 | mAb 9 | Briakinumab R27LCA, R55LCA, R94LCA* | 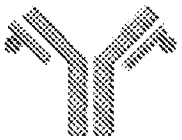 | 86.2 | 81.6 | 38.1 | 109 |
| 12 | mAb 10 | Briakinumab R16HCA, R19HCA, K57HCA, K64HCA R83HCA, R27LCA, R55LCA, R94LCA* | 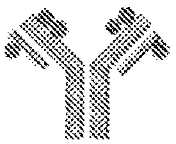 | 85.0 | 81.3 | 22.4 | |

TABLE 3

FcRn binding affinities and charge distributions of all tested antibodies. Antibodies are sorted according to the FcRn column retention times. The equilibrium dissociation constant $K_D$ was calculated as steady state affinity and normalized to the $K_D$ of Ustekinumab. Comparison of relative $K_D$ values (Ustekinumab = 1) are presented as the mean (n = 3) ± standard deviation (SD). Isoelectric points and the net charges of the Fv domains at pH 6.0 and pH 7.4 were calculated (SaWI-Tools). FcRn column retention times do not correlate with the isoelectric point or the net charge of the Fv domain at pH 6.0 or pH 7.4.

| name | Ustekinumab | mAb 1 | mAb 4 | mAb 5 | mAb 6 | mAb 9 | mAb 8 | mAb 7 | mAb 3 | mAb 2 | Briakinumab |
|---|---|---|---|---|---|---|---|---|---|---|---|
| ret. time [min] | 84.3 | 84.3 | 84.5 | 85.1 | 86.2 | 86.2 | 90.1 | 90.4 | 92.4 | 93.0 | 93.7 |
| rel. $K_D$ | 1.00 | 1.0 ± 0.22 | 0.5 ± 0.08 | 0.9 ± 0.16 | 0.4 ± 0.17 | 0.4 ± 0.04 | 0.4 ± 0.07 | 0.2 ± 0.03 | 0.2 ± 0.06 | 0.3 ± 0.19 | 0.2 ± 0.07 |
| calc. pI (IgG) | 9.4 | 9.5 | 9.5 | 9.6 | 9.4 | 9.4 | 9.3 | 9.4 | 9.5 | 9.4 | 9.7 |
| q(VL) pH 6.0 | 2.1 | 2.1 | 2.1 | 2.1 | 3.9 | 0.8 | 3.8 | 3.8 | 3.8 | 3.8 | 3.8 |
| q(VL) pH 7.4 | 1.9 | 1.9 | 1.9 | 1.9 | 3.0 | 0.0 | 3.0 | 3.0 | 3.0 | 3.0 | 3.0 |
| q(VH) pH 6.0 | 3.1 | 3.1 | 6.4 | 4.1 | 5.4 | 6.4 | 1.4 | 3.4 | 3.1 | 6.4 | 6.4 |
| q(VH) pH 7.4 | 2.9 | 2.9 | 4.3 | 3.9 | 3.3 | 4.3 | −0.7 | 1.3 | 2.9 | 4.3 | 4.3 |
| q(Fv) pH 6.0 | 5.2 | 5.2 | 8.4 | 6.1 | 9.2 | 7.2 | 5.2 | 7.2 | 6.9 | 10.2 | 10.2 |
| q(Fv) pH 7.4 | 4.9 | 4.9 | 6.2 | 5.9 | 6.3 | 4.3 | 2.3 | 4.3 | 6.0 | 7.3 | 7.3 |

The FcRn binding affinities at pH 6 fell in a narrow range for all eleven antibodies (see Table 3). The equilibrium dissociation constant ($K_D$) was calculated relative to Ustekinumab (Ustekinumab=1.0). Briakinumab had a relative $K_D$ of 0.2 and the nine variants ranged between Briakinumab and Ustekinumab. Thus, it can be concluded that different terminal in vivo half-life are not caused by different FcRn binding at pH 6.0.

One aspect as reported herein is a method for determining the presence of antibody-Fab-FcRn interaction in an antibody-Fc-FcRn complex influencing the in vivo half-life of the antibody comprising the following steps:

a) determining for a variant antibody and its parent antibody the $K_D$ values at pH 6 using surface plasmon resonance,
b) determining the retention time of the variant antibody and its parent antibody on an FcRn affinity chromatography column with a positive linear pH gradient elution in the presence of a high salt concentration, whereby the presence of antibody-Fab-FcRn interaction in an antibody-Fc-FcRn complex influencing the in vivo half-life is determined if the $K_D$ values differ by at most a factor of 10 and the retention time determined in step b) between the variant antibody and its parent antibody are substantially different.

One aspect as reported herein is a method for determining the relative in vivo half-life of an antibody comprising the following steps:

a) determining for a variant antibody and its parent antibody the $K_D$ values at pH 6 using surface plasmon resonance,
b) determining the retention time of the variant antibody and its parent antibody on an FcRn affinity chromatography column with a positive linear pH gradient elution in the presence of a high salt concentration, whereby the antibody has a relative in vivo half-life that is reduced compared to its parent antibody if the $K_D$ values differ by at most a factor of 10 and the retention time determined in step b) of the variant antibody is shorter/smaller than the retention time of its parent antibody, and whereby the antibody has a relative in vivo half-life that is increased compared to its parent antibody if the $K_D$ values differ by at most a factor of 10 and the retention time determined in step b) of the variant antibody is longer/bigger than the retention time of its parent antibody.

One aspect as reported herein is a method for determining an increase or a decrease of the vivo half-life of an antibody comprising the following steps:

a) determining for a variant antibody and its parent antibody the $K_D$ values at pH 6 using surface plasmon resonance,
b) determining the retention time of the variant antibody and its parent antibody on an FcRn affinity chromatography column with a positive linear pH gradient elution in the presence of a high salt concentration, whereby the antibody has a decrease of the vivo half-life compared to its parent antibody if the $K_D$ values differ by at most a factor of 10 and the retention time determined in step b) of the variant antibody is shorter/smaller than the retention time of its parent antibody, and whereby the antibody has an increase of the in vivo half-life compared to its parent antibody if the $K_D$ values differ by at most a factor of 10 and the retention time determined in step b) of the variant antibody is longer/bigger than the retention time of its parent antibody.

Figure 2:
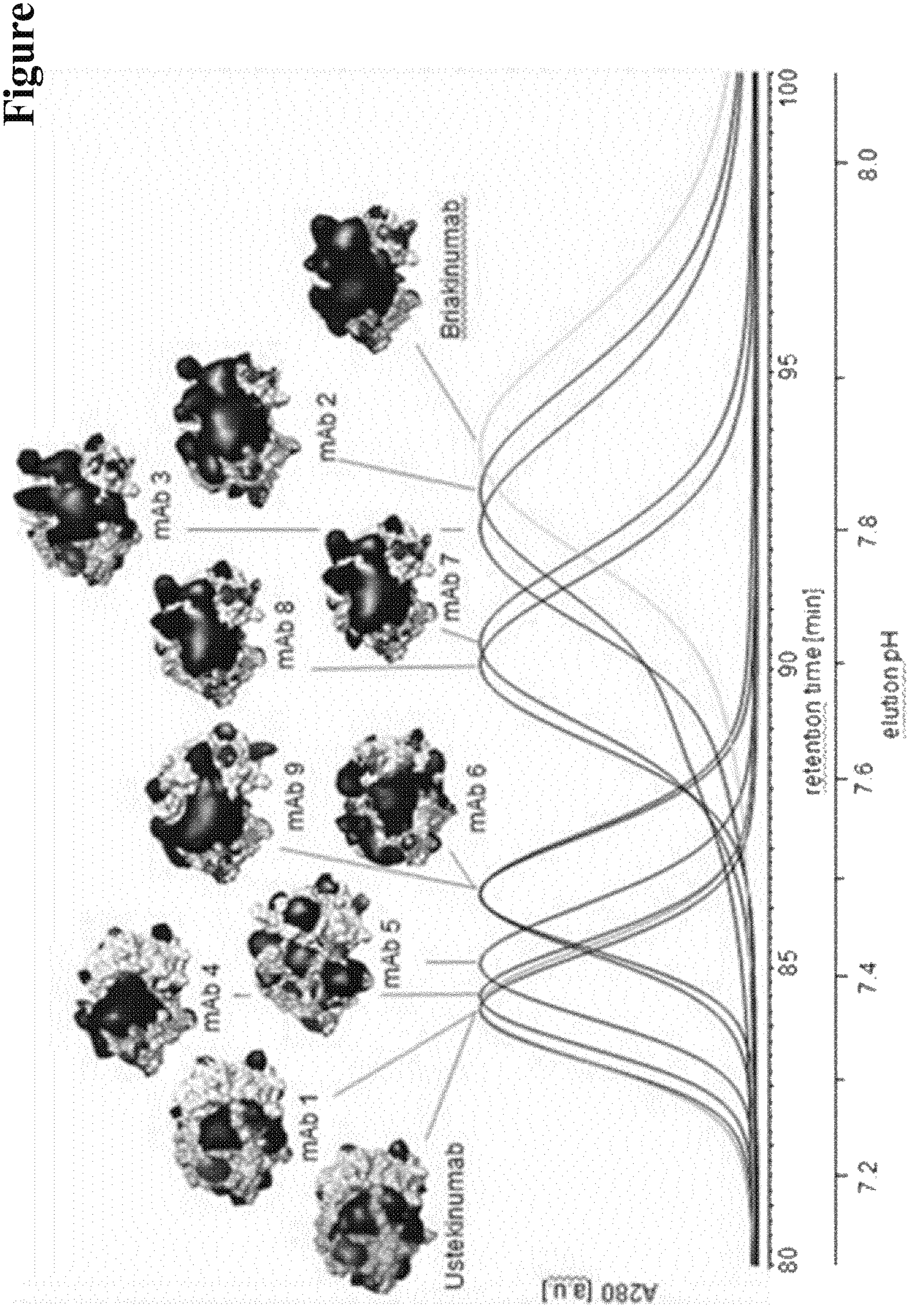
FIG. 2 pH-dependent FcRn-IgG interaction. FcRn affinity chromatograms of the eleven IgG variants were intensity-normalized for clarity. A molecular surface representation of the structural models, protonated at pH 7.4, were superimposed with isopotential surfaces contoured at 2 $k_B T/e$. The view is identical to the right panel in FIG. 1*a* and focuses on the CDR regions. A second horizontal axis indicates the elution pH, interpolated from offline pH measurements.

The elution profiles of the twelve antibodies were analyzed using an FcRn affinity column with positive linear pH gradient elution (see FIG. 2). Ustekinumab and mAb 1, which bears the Fv domain of Ustekinumab on the constant parts of Briakinumab, showed indistinguishable retention times of around 84 minutes, showing that the Fv domain influences the interaction with the FcRn. Briakinumab, on the other hand, eluted at a retention time of 94 minutes and therefore had a clearly different retention time compared to Ustekinumab. The indistinguishable retention times of the IdeS-cleaved Fc-regions of Briakinumab (85.7 min) and Ustekinumab (85.2 min) indicated the negligible role of the Fc-region. MAb 4 containing Ustekinumab LCs (LC=light chain, HC-heavy chain) and Briakinumab HCs had a retention time close to Ustekinumab, showing the impact of the LC on FcRn binding.

Variant antibodies mAb 5 and mAb 6 bear Ustekinumab CDRs (heavy and light chain parts) on the Briakinumab framework and vice versa. Grafting Ustekinumab CDRs on Briakinumab (mAb 5) shifted the retention time of mAb 5 close to that of Ustekinumab. Grafting Briakinumab CDRs on Ustekinumab (mAb 6) described/presented an elution profile which was still close to Ustekinumab.

A strong retention time shift from Briakinumab in the direction of Ustekinumab was observed for mAb 9 that is a Briakinumab variant in which three positively charged residues in the light chain CDRs were mutated to alanine residues.

Three and five positively charged residues in the heavy chain of Briakinumab were mutated in mAb 7 and mAb 8, respectively. In these variants the retention time shifted relative to Briakinumab.

MAb 3, comprising the HCs of Ustekinumab and the LCs of Briakinumab, as well as mAb 2 containing the Fv domain of Briakinumab on the Ustekinumab constant domains both eluted close to Briakinumab.

Taken together, the data shows that the Fv domain influences FcRn dissociation and not FcRn binding (at pH 6.0).

The FcRn column retention times were aligned with isoelectric points and net charges of the antibodies. No correlation between the FcRn column retention times and the isoelectric points or the net charges of the Fv domains at lysosomal pH 6.0 or physiological pH 7.4 can be seen (see Table 3). However, the measured FcRn column retention times increased with the extent of positively charged regions, especially around the light chain variable domains (see FIG. 2).

One aspect as reported herein is a method for increasing the in vivo half-life of an antibody comprising the step of:

changing a charged amino acid residue at the positions 27, 55 and 94 in the light chain of an antibody to a hydrophobic or neutral hydrophilic amino acid residue (numbering according to Kabat) and thereby increasing the in vivo half-life of the antibody.

Amino acids may be grouped according to common side-chain properties:

(1) hydrophobic: Norleucine, Met, Ala, Val, Leu, Ile;
(2) neutral hydrophilic: Cys, Ser, Thr, Asn, Gln;
(3) acidic: Asp, Glu;
(4) basic: His, Lys, Arg;
(5) residues that influence chain orientation: Gly, Pro;
(6) aromatic: Trp, Tyr, Phe.

Acidic and basic amino acid residues together for the group of charged amino acid residues.

Figure 6:
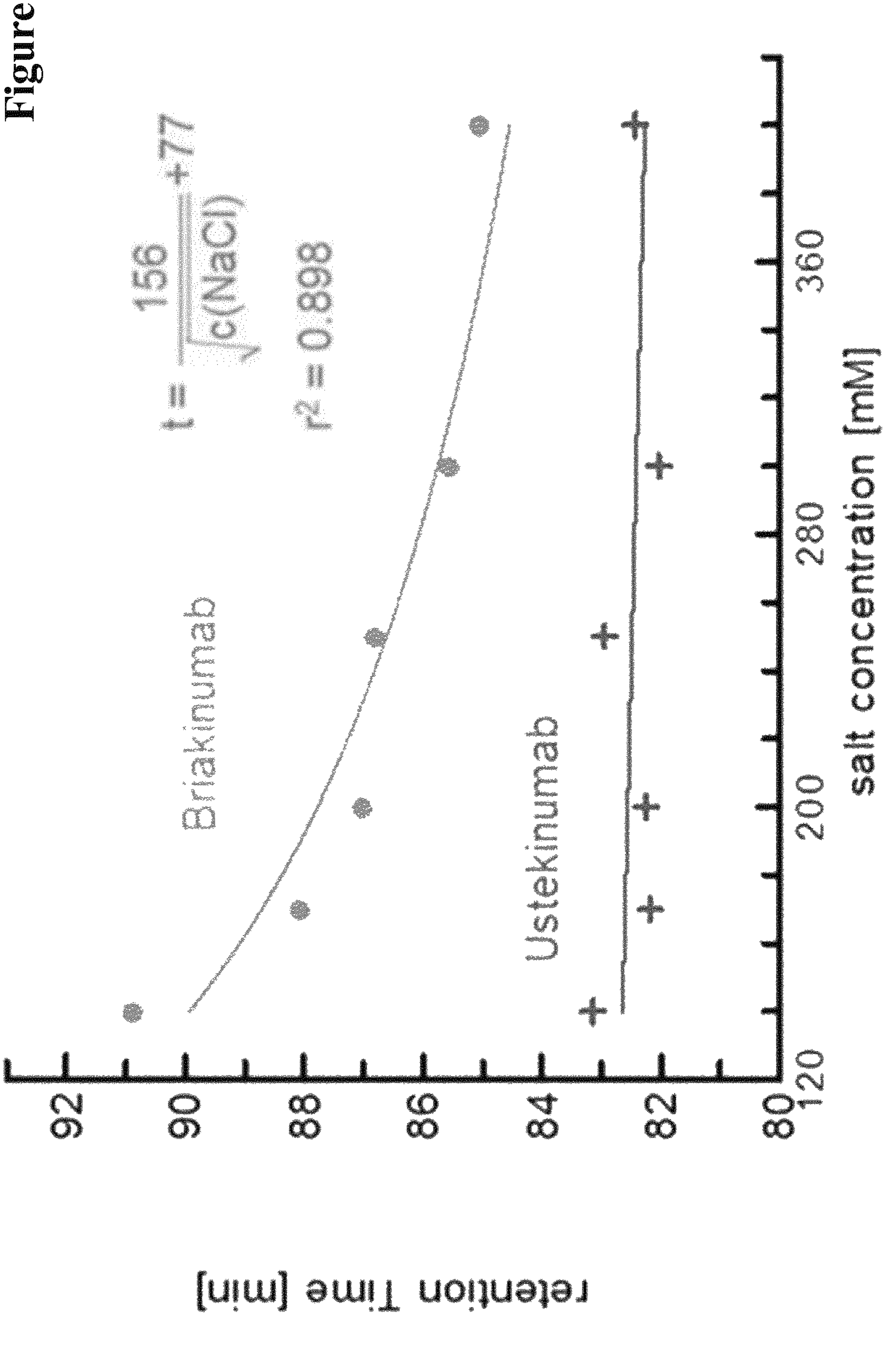
FIG. 6 Salt-dependence of the FcRn affinity column retention times of Briakinumab and Ustekinumab. Briakinumab and Ustekinumab were subjected to FcRn column chromatography with pH gradient elution in the presence of increasing amounts of NaCl. Data are fitted to an inverse square root function to account for the charge shielding effect by dissolved salt. Briakinumab retention times decrease with $1/\sqrt{c(NaCl)}$ ($r^2$=0.898), whereas the retention times of Ustekinumab remain essentially unaffected.

FcRn column retention times were also determined in a different set up with increased ionic strength in the mobile phase, i.e. in the presence of increased salt concentrations. Charge-mediated interactions are known to be weakened under high ionic strength conditions, whereas hydrophobic interactions are typically strengthened by salt. It has been found that the FcRn column retention time of Briakinumab was shortened in the presence of salt and was proportional to the inverse square root of the ionic strength as suggested by the Debye-Hückel law of charge screening [32]. The retention time of Ustekinumab remained essentially unaffected (see FIG. 6). Thus, a significant part of the excessive FcRn-Briakinumab interaction is charge-mediated.

Summarizing the above, FcRn affinity chromatography of the engineered variants showed that antibodies with the same Fv domain (mAb 1 & mAb 2) and the same LC (mAb 3 & mAb 4) elute at nearly identical FcRn column retention times. Furthermore, grafting Ustekinumab CDRs on Briakinumab (mAb 5) shifts the elution pH close to that of Ustekinumab. Thus, the light chain CDRs provide the main influence on Briakinumab's FcRn binding.

Grafting Briakinumab CDRs on Ustekinumab (mAb 6) presented an elution profile which was still close to Ustekinumab. Thus, without being bound by this theory it could be that the antibody-FcRn interaction is more affected by disrupting the large positively charged region of Briakinumab than by creating a smaller positively charged region. As suggested by the MD simulation (see below), a direct, stabilizing interaction between a positively charged Fv region and a negatively charged region on FcRn is readily feasible. Thus, FcRn-Fv interaction may lead to a slower-than-normal dissociation of the FcRn-IgG complex under physiological conditions.

e) Correlation of the FcRn Elution pH on Pharmacokinetics in Human FcRn Transgenic Mice Previous studies have discussed net charge to be a driving force for altered pharmacokinetic properties by affecting the electrostatic interaction between the antibody and negatively charged groups on the surface of endothelial cells [35,36]. For example, Igawa et al. observed that IgG4 antibodies with lower isoelectric points (pI) due to engineering in the variable region have a lower rate of fluid-phase pinocytosis and in turn a reduced elimination rate. Furthermore, Boswell et al. proposed the pI differences needed to be at least of one unit to influence PK.

The pIs of Briakinumab, Ustekinumab, mAb 8 and mAb 9 vary between 9.3 and 9.7. Therefore, it can be assumed that the influence on fluid-phase pinocytosis is minimal due to pI differences. However, Briakinumab's shorter FcRn column retention times under high ionic strength conditions (see above) as well as the higher electrostatic contribution to the FcRn-Fv interaction compared to Ustekinumab in the MD simulation (see below) show that specifically located charge may be the main influencing factor on the FcRn-IgG interaction. The influence of charge in the Fv domain was analyzed using mutants which have three (mAb 7) and five (mAb 8) positively charged residues in the HC of Briakinumab mutated as well as Briakinumab with three positively charged residues mutated in the light chain CDRs (mAb 9). MAb 7 and mAb 8 show small retention time shifts in the direction of Ustekinumab confirming a charge-mediated interaction, whereas mAb 9 shows a high retention time shift in the direction of Ustekinumab. Thus, specifically located charge(s) in the light chain CDRs strongly influence FcRn dissociation.

To assess whether the effect of mutated charged residues in the variable domains of Briakinumab on FcRn binding translates into modulated in vivo PK properties PK studies in human FcRn-transgenic mice were conducted. Briakinumab and Ustekinumab, together with two variants of Briakinumab (mAb 8 and mAb 9), which had FcRn column retention times between Briakinumab and Ustekinumab, were tested. The distribution and elimination processes of the four antibodies are in agreement with other IgG PK studies (see FIG. 3A). Briakinumab showed a faster decrease in the α-phase than the other antibodies. Interestingly, Briakinumab and Ustekinumab showed terminal half-life of 48 hours and 137 hours, respectively (see FIG. 3B). The variants mAb 8 and mAb 9, which have smaller positively charged regions in the Fv domain, had terminal half-life of 78 hours and 109 hours, respectively. A statistically significance could be detected between the terminal half-life of Briakinumab and Ustekinumab, Briakinumab and mAb 9 as well as Ustekinumab and mAb 8. Ustekinumab, mAb 9, mAb 8, and Briakinumab eluted at 84.3, 86.2, 90.1 and 93.7 minutes corresponding to an elution pH of 7.4, 7.5, 7.7 and 7.9, respectively. Thus, it has been found that the terminal half-life of the four IgGs is linearly correlated with the in vitro FcRn column elution pH values (see FIG. 3B).

In the PK experiments the terminal half-life was examined, which is exclusively calculated in the elimination phase where FcRn recycling dominates [39]. The terminal half-life of the four antibodies correlate linearly with the in vitro FcRn column elution pH: The higher the FcRn column elution pH the shorter the terminal half-life, thereby demonstrating that the FcRn column is a predictive/sensitive tool for in vitro FcRn dissociation. The correlation between terminal half-life and the FcRn column elution pH confirms the importance of the fast FcRn-IgG dissociation at physiological pH.

Without being bound by this theory the FcRn-IgG complex is built in the endosomes at pH 6.0, therefore, less binding results in less IgG-recycling and faster clearance. By exocytosis the FcRn-IgG complex is released to the plasma membrane, where the dissociation of the IgG and the FcRn has to take place at a physiological pH of 7.4 within a short period of time [40]. Consequently, dissociation at physiological pH is also important for a prolonged half-life [22,40].

Thus, it has been found that the dissociation at higher pH-values indicates a slower dissociation from the FcRn. This could without being bound by this theory lead to degradation of the antibodies in the lysosome instead of releasing the antibodies back to blood circulation.

Thus, it has been found that charge in the Fv domain of an IgG affects the terminal half-life by altering the interaction between the IgG and FcRn. The structural parts of the Fab which interact with FcRn have been located and it has been demonstrated that the interaction is charge-mediated. The PK study revealed a linear correlation between the in vitro FcRn-IgG dissociation and the terminal half-life in vivo.

f) Molecular Dynamics (MD) Simulation of FcRn-IgG Models

Figure 4D:
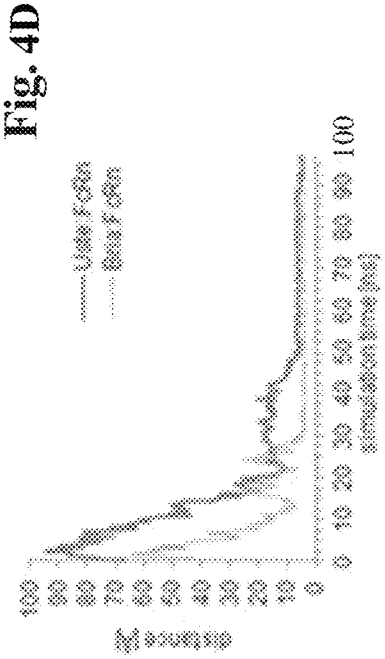
FIGS. 4A-4E Molecular dynamics simulation of FcRn-IgG models.
Figure 4E:
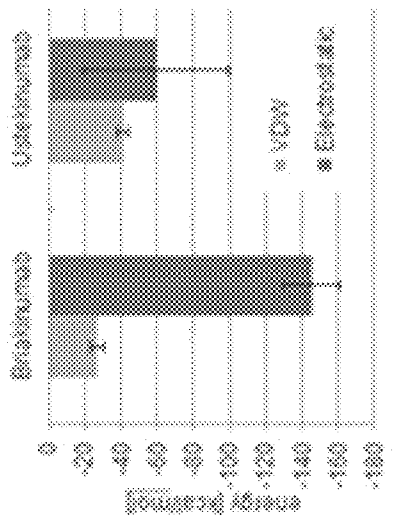
Figure 4A:
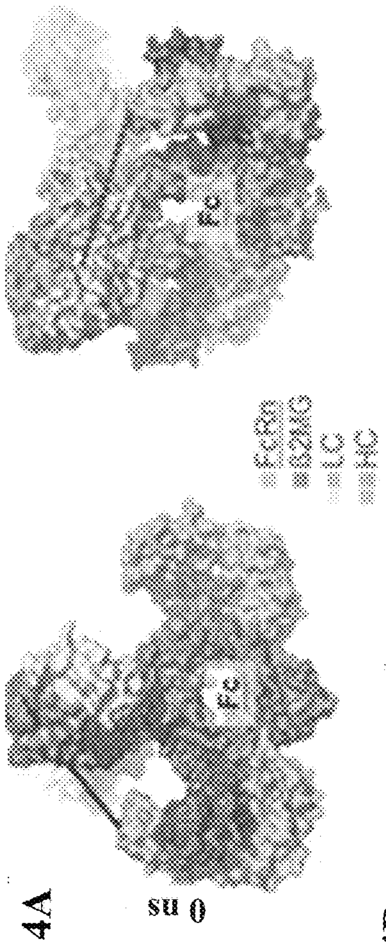
Figure 4B:
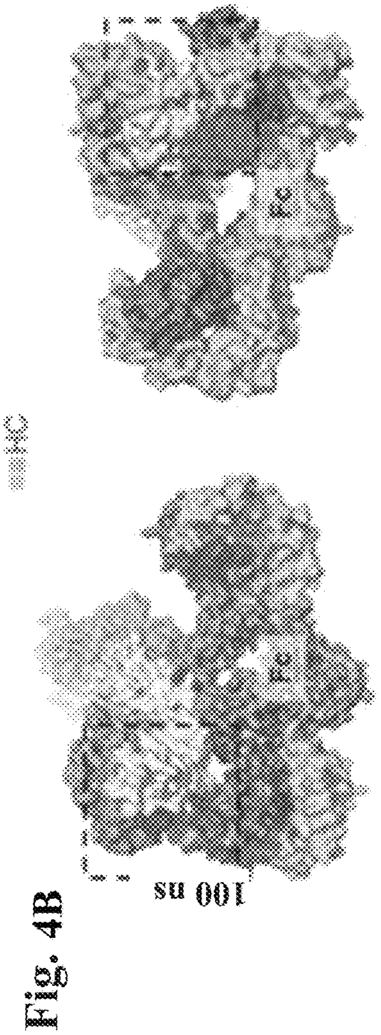
Figure 4C:
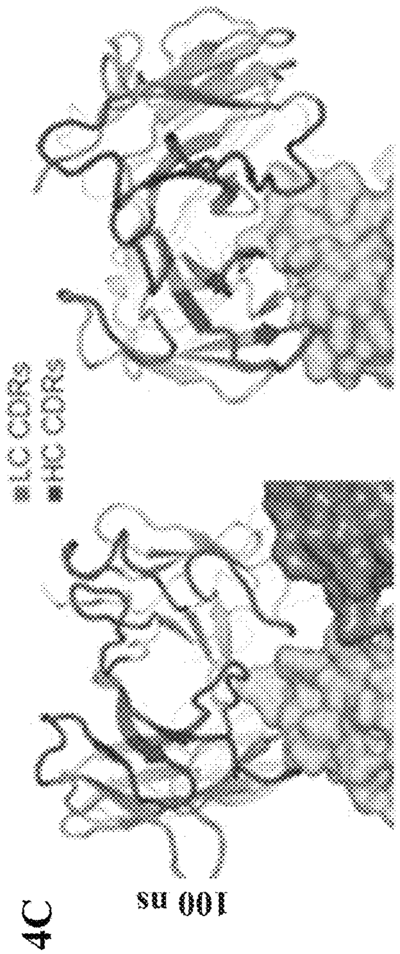

A homology model of a human FcRn-Fc complex was generated using the published rat FcRn structure as a template. The position of the Fv domains of Briakinumab and Ustekinumab was modeled based on the crystal structure of a complete IgG1 (PDB code 1HZH). These homology models contain two copies of FcRn (α-FcRn with $\beta_2$m) on one complete IgG molecule (see FIG. 4A). The distance between FcRn and the Fv domains is >40 Å in the starting structure and exceeds the Debye length of approx. 8 Å under physiological conditions [32]. The dynamics of the FcRn-IgG complexes were simulated by molecular dynamics simulation over a period of 100 ns in explicit water and physiological ionic strength. During the course of the simulation, one of the two Fab regions approached the tip of FcRn and persisted in this conformation for the rest of the simulation time (see FIGS. 4B-4D). The region on FcRn found to interact with the Fv domain had hitherto not been described as being involved in IgG binding. Surprisingly, in the MD simulations not only Briakinumab but also Ustekinumab assumed a conformation with Fv and FcRn interacting with one another (see FIGS. 4B-4C). It has been found that in both complexes, two different pairs of Fv and FcRn domains in the asymmetric starting structure approached each other. The electrostatic contribution to the FcRn-Fv interaction was found to be about twice as high in Briakinumab as in Ustekinumab (see FIG. 4E).

In summary, it has been found that the intrinsic flexibility of Fab arms of FcRn-IgG complexes structurally allows a direct, stabilizing interaction of the Fv domain with the tip of FcRn.

g) the Methods According to the Current Invention g.i) Elution with Linear Positive pH Gradient at Different Salt Concentrations Herein is reported a method comprising the following two steps:

a) determining the retention time of the antibody on an FcRn affinity chromatography column with a positive linear pH gradient elution in the presence of a first salt concentration,
b) determining the retention time of the antibody on an FcRn affinity chromatography column with a positive linear pH gradient elution in the presence of a second salt concentration.

The second salt concentration is generally higher/bigger than the first salt concentration, so that these concentrations are not about identical, i.e. they differ by at least 10%, in one embodiment by at least 20%.

Figure 13:
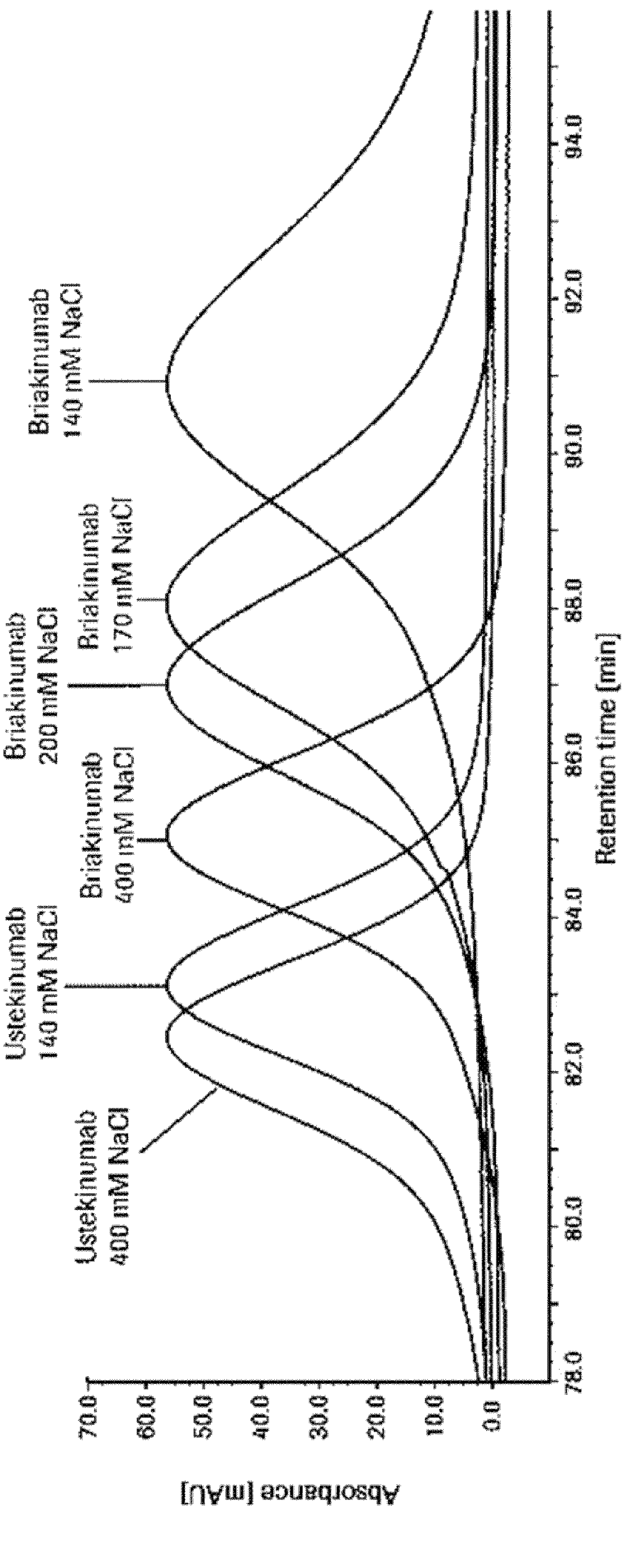
FIG. 13 Dependence of FcRn affinity chromatography retention time on salt concentration and antibody-Fab-FcRn interaction.

With this method it is possible to determine the presence of antibody-Fab-FcRn interaction in an antibody-Fc-FcRn complex in a simple chromatography method by comparing the retention times obtained in the presence of different salt concentrations (see FIG. 13) or by comparing the retention time of the full antibody and its Fc-region. This is important as antibody-Fab-FcRn interactions influence the in vivo half-life of the antibody.

For antibody/reference antibody pairs different relations with respect to their retention times on an FcRn affinity chromatography column and therewith with respect to their FcRn interaction exist:

1) the antibody and the reference antibody have substantially the same retention time in step a) and step b): in this case the in vivo half-life of both antibodies should be substantially the same, i.e. the in vivo half-life is not influenced by antibody-Fab-FcRn interactions, or
2) the antibody and the reference antibody have substantially the same retention time in step a) but a different retention time in step b): in this case the in vivo half-life of the antibody is shorter than the in vivo half-life of the reference antibody, i.e. the in vivo half-life is influenced by antibody-Fab-FcRn interactions.

The antibody can be a variant antibody of a parent antibody in which case the reference antibody is the parent antibody.

In one case the reference antibody is an antibody that has substantially the same retention time as its Fc-region after IdeS cleavage or papain cleavage.

In order to provide therapeutic regimens to treat the diversity of diseases known today and also those that will be revealed in the future a need for tailor made antibodies as well as Fc-region containing polypeptides exists.

To tailor make the FcRn binding characteristics of an antibody the residues involved in FcRn interaction are modified and the resulting modified antibodies have to be tested. If the required characteristics are not met the same process is performed again.

Thus, it would be advantageous to provide a method that predicts the changes in the characteristic properties of a modified antibody based on a simple chromatographical method and which does not require in vivo studies to analyze the changes of the characteristics in the modified antibody.

In some cases antibodies with extended half-life are desired. For example, drugs with an extended half-life in the circulation of a patient in need of a treatment require decreased dosing or increased dosing intervals. Such antibodies also have the advantage of increased exposure to a disease site, e. g. a tumor.

The in vivo half-life correlates with the retention time on an FcRn affinity chromatography column. This is especially true if the interaction between the antibody and the FcRn is almost solely mediated by the residues in the antibody Fc-region. But if residues outside the antibody Fc-region, e.g. in the antibody-Fab, also interact with the FcRn this correlation has to be further confirmed. This can be done with the method as reported herein exploiting the change in retention time in an FcRn affinity chromatography method with a positive linear pH gradient elution in the presence of low and high salt concentrations or of the intact antibody and the Fv-region cleaved antibody (=Fc-region). If the retention time is substantially not affected by the change from low to high salt concentration or by the cleavage of the Fc-region then no antibody-Fab-FcRn interaction is present and a higher retention time on the FcRn affinity chromatography column correlates with an increased half-life in vivo. But if the retention time is affected, especially if it is reduced, by a change from low to high salt concentrations or by cleavage of the Fc-region then the in vivo half-life correlates differently to the retention time on the FcRn affinity chromatography column, i.e. a longer retention time on the FcRn affinity chromatography column correlates to a shorter in vivo half-life due to reduced antibody-FcRn dissociation at physiological pH and, without being bound by this theory, an increased lysosomal degradation of the antibody.

The herein used FcRn affinity chromatography column comprises a matrix and matrix bound chromatographical functional groups, wherein the matrix bound chromatographical functional group comprises a non-covalent complex of neonatal Fc receptor (FcRn) and beta-2-microglobulin.

Generally, starting point for the method as reported herein is a parent or reference antibody that is characterized by its binding to the FcRn.

One aspect as reported herein is the use of a method as reported herein for determining the presence of antibody-Fab-FcRn interaction in an antibody-Fc-FcRn complex influencing the in vivo half-life comprising the following steps:

a) determining the retention time of the antibody on an FcRn affinity chromatography column with a positive linear pH gradient elution in the presence of a first salt concentration,
b) determining the retention time of the antibody on an FcRn affinity chromatography column with a positive linear pH gradient elution in the presence of a second salt concentration, whereby the presence of antibody-Fab-FcRn interaction in an antibody-Fc-FcRn complex influencing the in vivo half-life is determined if the retention time determined in step a) and the retention time determined in step b) are substantially different.

One aspect as reported herein is a method for determining the presence of antibody-Fab-FcRn interaction in an antibody-Fc-FcRn complex influencing the in vivo half-life comprising the following steps:

a) determining the retention time of the antibody on an FcRn affinity chromatography column with a positive linear pH gradient elution in the presence of a first salt concentration,
b) determining the retention time of the antibody on an FcRn affinity chromatography column with a positive linear pH gradient elution in the presence of a second salt concentration, whereby the presence of antibody-Fab-FcRn interaction in an antibody-Fc-FcRn complex influencing the in vivo half-life is determined if the retention time determined in step a) and the retention time determined in step b) are substantially different.

Variant antibodies show either increased or decreased binding to FcRn when compared to a parent antibody polypeptide or compared to a reference antibody, and, thus, have a modified half-life compared to the parent/reference antibody in serum.

Generally, Fc-region variants with increased affinity for the FcRn (i.e. increased retention time on an FcRn column compared to a parent antibody or reference antibody) are predicted at first to have longer serum half-life compared to those with decreased affinity for the FcRn (i.e. with reduced retention time on an FcRn column compared to a parent antibody or reference antibody).

This predicted in vivo half-life has to be confirmed thereafter. For this confirmation the method as reported herein can be used.

Antibody variants with increased in vivo half-life have applications in methods of treating mammals, especially humans, where long half-life of the administered antibody is desired, such as in the treatment of a chronic disease or disorder.

Antibody variants with decreased affinity for the FcRn have applications in methods of treating mammals, especially humans, where a short half-life of the administered antibody or fusion polypeptide is desired, such as in vivo diagnostic imaging.

It is very likely that antibody variants with decreased FcRn binding affinity will be able to cross the placenta and, thus, can be used in the treatment of diseases or disorders in pregnant women especially of unborn children. In addition, reduced FcRn binding affinity may be desired for those drugs intended for application/transport to the brain, kidney, and/or liver.

One aspect as reported herein is the use of a method as reported herein for identifying antibodies that exhibit reduced transport across the epithelium of kidney glomeruli from the vasculature.

One aspect as reported herein is the use of a method as reported herein for identifying antibodies that exhibit reduced transport across the blood brain barrier from the brain into the vascular space.

In one embodiment of all aspects as reported herein the FcRn is selected from human FcRn, cynomolgus FcRn, mouse FcRn, rat FcRn, sheep FcRn, dog FcRn, pig FcRn, minipig FcRn, and rabbit FcRn.

In one embodiment of all aspects as reported herein the beta-2-microglobulin is from the same species as the FcRn.

In one embodiment of all aspects as reported herein the beta-2-microglobulin is from a different species as the FcRn.

In one embodiment the parent antibody comprises at least one binding domain and at least one Fc-region. In one embodiment the parent antibody comprises two binding domains and two Fc-regions.

In one embodiment the parent antibody comprises at least one binding domain that specifically binds to a target which mediates a biological effect (in one embodiment a ligand capable of binding to a cell surface receptor or a cell surface receptor capable of binding a ligand) and mediates transmission of a negative or positive signal to a cell. In one embodiment the parent antibody comprises at least one binding domain specific for an antigen targeted for reduction or elimination (in one embodiment a cell surface antigen or a soluble antigen) and at least one Fc-region.

Antibodies specifically binding to a target can be raised in mammals by multiple subcutaneous or intraperitoneal injections of the relevant antigen (e.g. purified antigen, cells or cellular extracts comprising such antigens, or DNA encoding for such antigen) and optionally an adjuvant.

In one embodiment the antibody is a full length antibody.

In one embodiment the antibody is a monoclonal antibody.

In one embodiment the parent antibody is a bispecific antibody.

In one embodiment the parent antibody is a chimeric antibody.

In one embodiment of all previous aspects the pH is a gradient from about pH 5.5 to about pH 8.8.

In general the soluble extracellular domain of FcRn (SEQ ID NO: 33 for human FcRn) with C-terminal His-Avi Tag (SEQ ID NO: 34) was co-expressed with $\beta_2$-microglobulin (SEQ ID NO: 35 for human beta-2-microglobulin) in mammalian cells. The non-covalent FcRn-microglobulin complex was biotinylated and loaded onto streptavidin derivatized sepharose.

In one embodiment of all aspects as reported herein the non-covalent complex of neonatal Fc receptor (FcRn) and beta-2-microglobulin is bound to a solid phase.

In one embodiment the conjugation of the non-covalent complex to the solid phase is performed by chemically binding via N-terminal and/or ε-amino groups (lysine), ε-amino groups of different lysins, carboxy-, sulfhydryl-, hydroxyl-, and/or phenolic functional groups of the amino acid backbone of the antibody, and/or sugar alcohol groups of the carbohydrate structure of the antibody.

In one embodiment the non-covalent complex is conjugated to the solid phase via a specific binding pair. In one embodiment the non-covalent complex is conjugated to biotin and immobilization to a solid support is performed via solid support immobilized avidin or streptavidin.

A specific binding pair (first component/second component) is in one embodiment selected from streptavidin or avidin/biotin, antibody/antigen (see, for example, Hermanson, G. T., et al., Bioconjugate Techniques, Academic Press (1996)), lectin/polysaccharide, steroid/steroid binding protein, hormone/hormone receptor, enzyme/substrate, IgG/Protein A and/or G, etc.

In principle any buffer substance can be used in the methods as reported herein.

Fc residues critical to the mouse Fc-mouse FcRn interaction have been identified by site-directed mutagenesis (see e.g. Dall'Acqua, W. F., et al. J. Immunol 169 (2002) 5171-5180). Residues I253, H310, H433, N434, and H435 (EU numbering according to Kabat) are involved in the interaction (Medesan, C., et al., Eur. J. Immunol. 26 (1996) 2533;

Firan, M., et al., Int. Immunol. 13 (2001) 993; Kim, J. K., et al., Eur. J. Immunol. 24 (1994) 542). Residues I253, H310, and H435 were found to be critical for the interaction of human Fc with murine FcRn (Kim, J. K., et al., Eur. J. Immunol. 29 (1999) 2819). Residues M252Y, S254T, T256E have been described by Dall'Acqua et al. to improve FcRn binding by protein-protein interaction studies (Dall'Acqua, W. F., et al. J. Biol. Chem. 281 (2006) 23514-23524). Studies of the human Fc-human FcRn complex have shown that residues I253, S254, H435, and Y436 are crucial for the interaction (Firan, M., et al., Int. Immunol. 13 (2001) 993; Shields, R. L., et al., J. Biol. Chem. 276 (2001) 6591-6604). In Yeung, Y. A., et al. (J. Immunol. 182 (2009) 7667-7671) various mutants of residues 248 to 259 and 301 to 317 and 376 to 382 and 424 to 437 have been reported and examined.

mM. In one embodiment the buffer substance has a concentration of from 10 mM to 250 mM. In one embodiment the buffer substance has a concentration of from 10 mM to 100 mM. In one embodiment the buffer substance has a concentration of from 15 mM to 50 mM. In one embodiment the buffer substance has a concentration of about 20 mM.

An exemplary starting solution for the positive linear pH gradient comprises in one embodiment 20 mM MES and 140 mM NaCl, adjusted to pH 5.5.

An exemplary final solution for the positive linear pH gradient comprises in one embodiment 20 mM TRIS and 140 mM NaCl, adjusted to pH 8.8.

During the gradient a mixture of the starting solution and the final solution is applied to the FcRn affinity chromatography column, whereby the positive linear gradient starts

TABLE 4

Retention time of different antibodies obtained with different elution buffers and gradients.

| elution buffer | method based on | retention time [min] Briakinumab | Ustekinumab | anti-Ox40L antibody | anti-Abeta antibody | anti-HER2 antibody (I253H-mutant) |
|---|---|---|---|---|---|---|
| 20 mM Tris/HCl, with 50 mM NaCl, adjusted to pH 8.8 | example 5 | not determined | not determined | 43 | 44 | not determined |
| 20 mM Tris/HCl, with 140 mM NaCl, adjusted to pH 8.8 | example 2 | 93.7 | 84.3 | not determined | not determined | not determined |
| 20 mM Tris/HCl, with 150 mM NaCl, adjusted to pH 8.8 | example 5 | not determined | not determined | 45 | 45.5 | no binding |
| 20 mM HEPES, with 150 mM NaCl, adjusted to pH 8.6 | example 5 | not determined | not determined | 48 | 48.5 | not determined |
| 20 mM Tris/HCl, with 300 mM NaCl, adjusted to pH 8.8 | example 5 | not determined | not determined | 42.5 | 43 | not determined |
| 20 mM Tris/HCl, with 400 mM NaCl, adjusted to pH 8.8 | example 3 | 83.1 | 80.4 | not determined | not determined | not determined |

The term YTE-mutant denotes the triple mutant M252Y/S254T/T256E.

In one embodiment a pharmaceutically acceptable buffer substance is used, such as e.g. phosphoric acid or salts thereof, acetic acid or salts thereof, citric acid or salts thereof, morpholine or salts thereof, 2-(N-morpholino) ethanesulfonic acid (MES) or salts thereof, histidine or salts thereof, glycine or salts thereof, tris (hydroxymethyl) aminomethane (TRIS) or salts thereof, (4-(2-hydroxyethyl)-1-piperazineethanesulfonic acid (HEPES) or salts thereof.

In one embodiment the buffer substance is selected from phosphoric acid or salts thereof, or acetic acid or salts thereof, or citric acid or salts thereof, or histidine or salts thereof.

In one embodiment the buffer substance has a concentration of from 10 mM to 500 mM. In one embodiment the buffer substance has a concentration of from 10 mM to 300 with 100% of the starting solution (i.e. pure starting solution), thereafter the fraction of the starting solution is reduced from 100% to 0% and the fraction from the final solution is increased from 0% to 100% so that after the positive linear pH gradient 100% of the final solution is applied to the column.

In one embodiment the starting and the final solution comprises an additional salt. In one embodiment the additional salt is selected from sodium chloride, sodium sulphate, potassium chloride, potassium sulfate, sodium citrate, or potassium citrate. In one embodiment the solutions comprise of from 50 mM to 1000 mM of the additional salt. In one embodiment the solutions comprise of from 50 mM to 750 mM of the additional salt.

In one embodiment the solutions comprise of from 50 mM to 500 mM of the additional salt. In one embodiment the solution comprise of from 50 mM to 750 mM of the additional salt. In one embodiment the solution comprise about 140 mM to about 400 mM of the additional salt.

In one embodiment the starting and the final solution comprises sodium chloride. In one embodiment the starting and the final solution comprises of about 140 mM to about 400 mM sodium chloride.

It has been found that the kind of salt and buffer substance influences the retention time and the resolution. An optimal salt concentration for binding of antibodies to FcRn can be determined (140 mM NaCl). If the salt concentration is higher (400 mM) binding to FcRn is reduced due to interference with the charge interactions by the increase of the ionic strength of the solution and a shorter retention time is obtained.

Thus, in the method as reported herein the solutions used in step a) and step b) as well as the gradient applied in step a) and step b) as well as the loading of the column in step a) and step b) as well as the dimension of the column and the amount of FcRn affinity chromatography material in step a) and step b) as well as the FcRn affinity ligand density in the FcRn affinity chromatography material in step a) and step b) as well as the conjugation of the FcRn to the solid phase in step a) and step b) as well as the nature of the b2m and FcRn in step a) and step b) are the same or even identical. Thus, in the method as reported herein the FcRn affinity chromatography in step a) and step b) are performed under identical conditions except for the concentration of the salt, which is different between step a) and step b). In one embodiment the second salt concentration is bigger than the first salt concentration. In one embodiment the second salt concentration is at least twice the first salt concentration.

Figure 7:
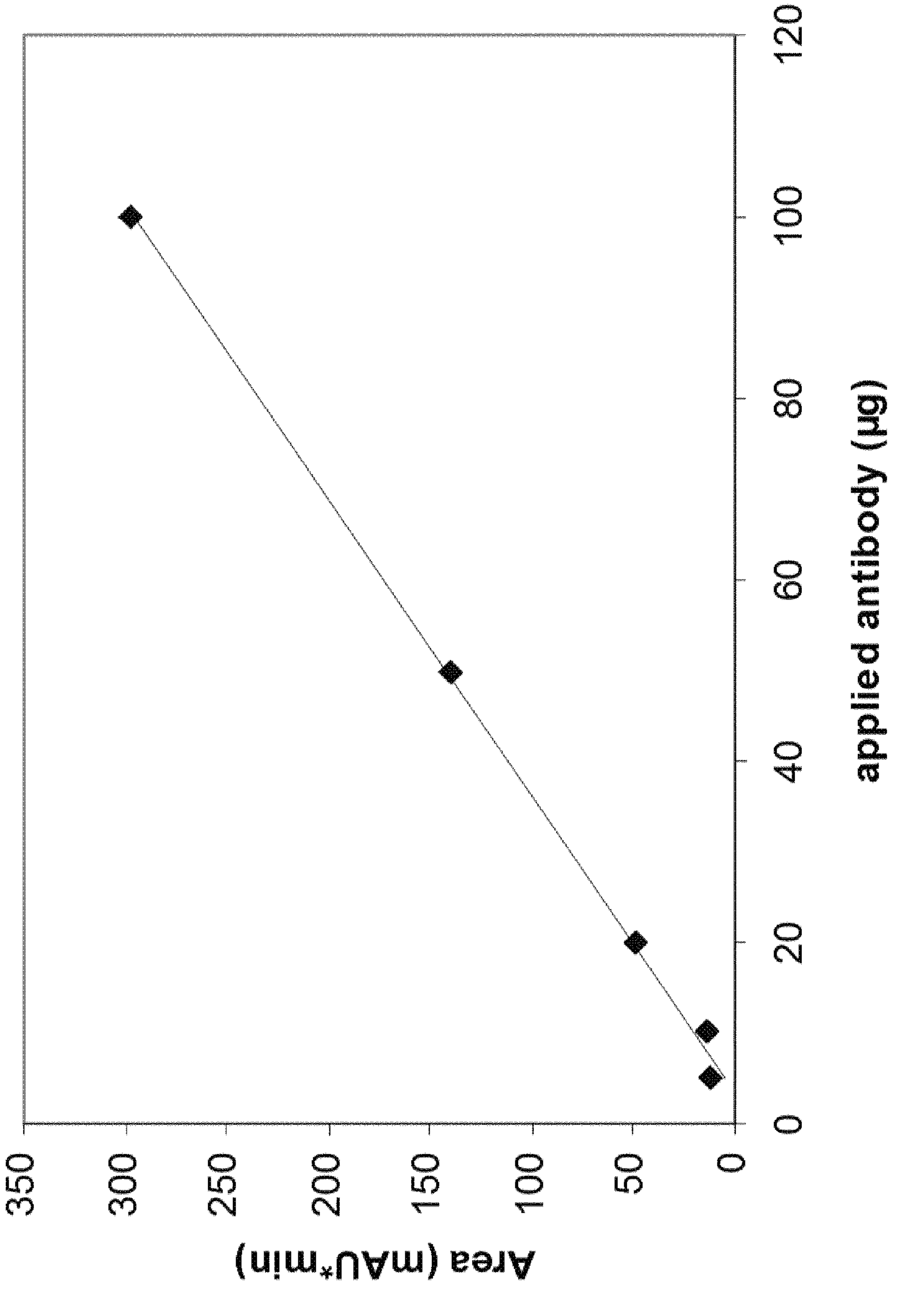
FIG. 7 Linearity of applied antibody and area under the curve of a chromatography using an FcRn column as reported herein.

As can be seen from FIG. 7 the amount of applied antibody shows a linear correlation to the area under the curve of the eluted peak.

Eight antibodies were analyzed as complete antibody and after cleavage with the enzyme IdeS. The cleavage was controlled by SDS page and analytical SEC. Fc-region and antibody-Fab were separated by preparative SEC.

TABLE 5

Comparison of retention times of complete antibody, antibody-Fab and Fc-region.

| determined according to Example | antibody | retention time [min] complete antibody | Fc-region | antibody-Fab |
|---|---|---|---|---|
| 5 | anti-IGF-1R antibody | 44.5 | 45 | no binding |
| 5 | anti-IL13Rα antibody | 44.5 | 45 | no binding |
| 5 | anti-HER2 antibody | 45 | 45 | no binding |
| 5 | anti-IL 6R antibody | 45 | 45 | no binding |
| 5 | anti-Ox40L antibody | 45 | 45 | no binding |
| 2 | Briakinumab | 93.7 | 85.7 | not determined |
| 2 | Ustekinumab | 84.3 | 85.2 | not determined |

In general the retention time of antibodies having a wild-type Fc-region (IgG1 or IgG2 or IgG4) varies between 45 and 49 min. (tested with 35 therapeutic antibodies against 36 antigens, data not shown) under the conditions of Example 5. If the conditions of Example 2 are used the retention time is increased to about 85 min as the gradient is longer.

TABLE 6

Retention time with respect to amount of immobilized FcRn receptor per gram of column material (chromatography conditions of Example 5).

| elution buffer: 20 mM Tris/HCl, with 150 mM NaCl, adjusted to pH 8.8 | retention time [min] anti-Ox40L antibody | anti-Abeta antibody |
|---|---|---|
| 1.2 mg FcRn/g solid phase | 42.5 | 42.5 |
| 3 mg FcRn/g solid phase | 45 | 45.5 |
| 6 mg FcRn/g solid phase | 48.5 | 49 |
| 12 mg FcRn/g solid phase | 48.5 | 49 |

In general the retention time in the methods and uses as reported herein is depending on steepness of the pH gradient and the employed salt concentration. If the wild-type antibody is used as reference and a weaker binding is indicated by a shorter retention time (=earlier elution) whereas a stronger binding is indicated by a longer retention time (=later elution).

Different mutants in the Fc-region of the IgG behave different on the FcRn column, displaying modified retention times.

Figure 8:
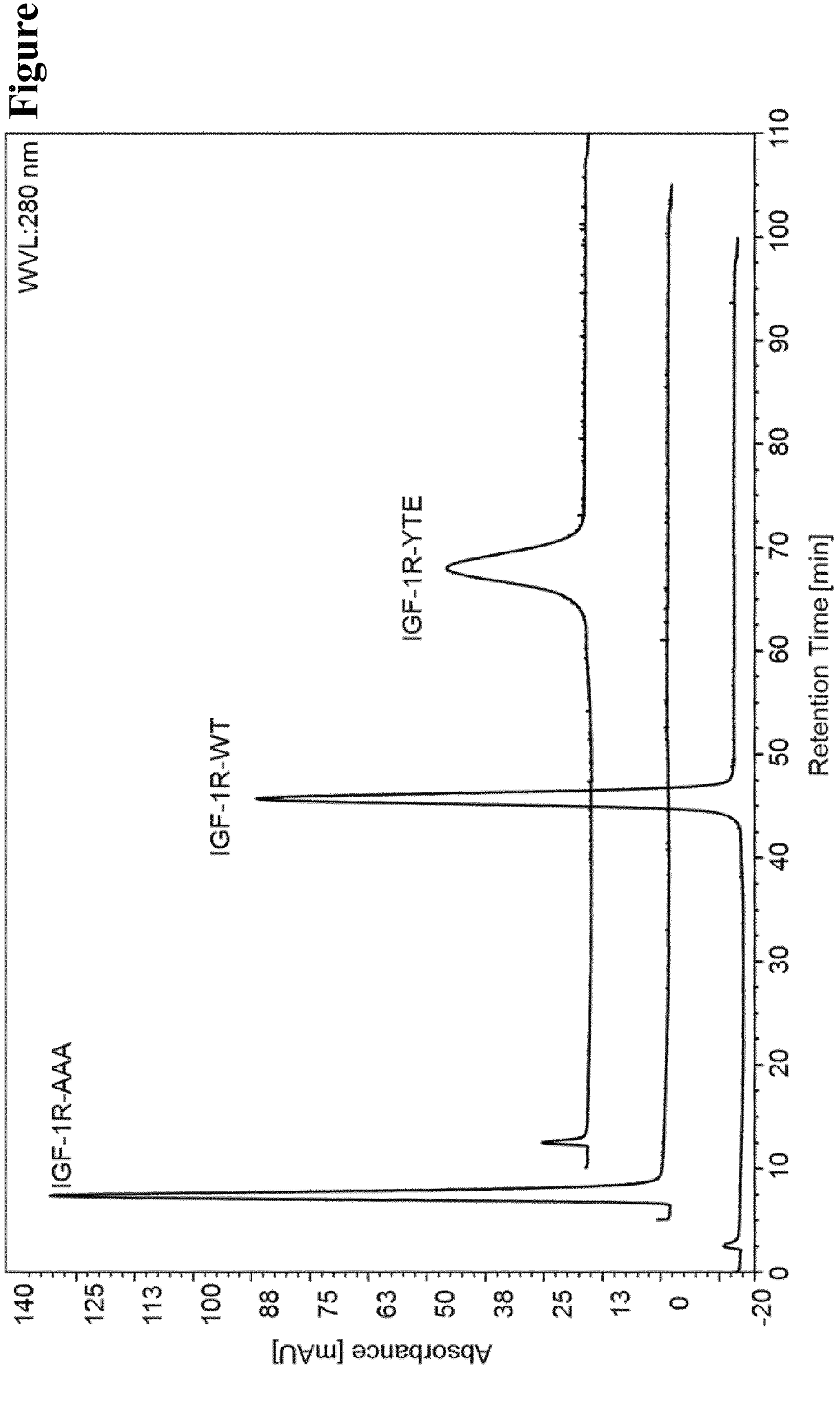
FIG. 8 Chromatogram of anti-IGF-1R antibody wild-type and YTE-mutant on FcRn column as reported herein.

For example the anti-IGF-1R antibody mutant YTE shows an increased retention time (see FIG. 8).

TABLE 7

Change of retention time with respect to Fc-region mutations.

| antibody | retention time [min] |
|---|---|
| anti-IGF-1R antibody (wild-type) | 44.5 |
| anti-IGF-1R antibody (YTE-mutant) | 57.5 |

The term YTE-mutant denotes the triple mutant M252Y/S254T/T256E.

One aspect as reported herein is a method for determining the relative in vivo half-life of an antibody comprising the following steps:

a) determining the retention time of the antibody on an FcRn affinity chromatography column with a positive linear pH gradient elution in the presence of a first salt concentration,
b) determining the retention time of the antibody on an FcRn affinity chromatography column with a positive linear pH gradient elution in the presence of a second salt concentration, whereby the antibody has a relative in vivo half-life that is reduced compared to a standard/natural antibody of the IgG1, IgG3 or IgG4 subclass if the retention time determined in step a) and the retention time determined in step b) are substantially different.

One aspect as reported herein is the use of the method as reported herein for determining the relative in vivo half-life of an antibody wherein the method comprises the following steps:

a) determining the retention time of the antibody on an FcRn affinity chromatography column with a positive linear pH gradient elution in the presence of a first salt concentration, b) determining the retention time of the antibody on an FcRn affinity chromatography column with a positive linear pH gradient elution in the presence of a second salt concentration, whereby the antibody has a relative in vivo half-life that is reduced compared to a standard/natural antibody of the IgG1, IgG3 or IgG4 subclass if the retention time determined in step a) and the retention time determined in step b) are substantially different.

One aspect as reported herein is a method for determining an increase or a decrease in the vivo half-life of a variant antibody relative to its parent antibody comprising the following steps:

a) determining the retention time of the variant antibody and its parent antibody on an FcRn affinity chromatography column with a positive linear pH gradient elution in the presence of a first salt concentration,
b) determining the retention time of the variant antibody and its parent antibody on an FcRn affinity chromatography column with a positive linear pH gradient elution in the presence of a second salt concentration, whereby the in vivo half-life of the variant antibody relative to its parent antibody is increased if i) the retention time of the variant antibody determined in step a) is bigger/longer than the retention time of its parent antibody determined in step a), and ii) the retention time of the variant antibody determined in step a) and the retention time of the variant antibody determined in step b) are substantially the same, whereby the in vivo half-life of the variant antibody relative to its parent antibody is decreased if i) the retention time of the variant antibody determined in step a) is smaller/shorter than the retention time of its parent antibody determined in step a), and ii) the retention time of the variant antibody determined in step a) and the retention time of the variant antibody determined in step b) are substantially the same.

One aspect as reported herein is the use of a method as reported herein for determining an increase or a decrease in the vivo half-life of a variant antibody relative to its parent antibody wherein the method comprises the following steps:

a) determining the retention time of the variant antibody and its parent antibody on an FcRn affinity chromatography column with a positive linear pH gradient elution in the presence of a first salt concentration,
b) determining the retention time of the variant antibody and its parent antibody on an FcRn affinity chromatography column with a positive linear pH gradient elution in the presence of a second salt concentration, whereby the in vivo half-life of the variant antibody relative to its parent antibody is increased if i) the retention time of the variant antibody determined in step a) is bigger/longer than the retention time of its parent antibody determined in step a), and ii) the retention time of the variant antibody determined in step a) and the retention time of the variant antibody determined in step b) are substantially the same, whereby the in vivo half-life of the variant antibody relative to its parent antibody is decreased if i) the retention time of the variant antibody determined in step a) is smaller/shorter than the retention time of its parent antibody determined in step a), and ii) the retention time of the variant antibody determined in step a) and the retention time of the variant antibody determined in step b) are substantially the same.

It has been found that antibodies that showed a late elution from the FcRn column, i.e. that had a longer retention time on the FcRn column and that showed no antibody-Fab-FcRn interaction had a longer half-life in vivo (see Example 6).

TABLE 8

In vivo data.

| antibody | retention time [min] | in vivo half-life [h] |
|---|---|---|
| anti-Abeta antibody (wild-type) | 45.5 (Example 5) | 103 +/− 51 |
| anti-IGF-1R antibody (wild-type) | 45.5 (Example 5) | 97 +/− 9 |
| anti-IGF-1R antibody (YTE-mutant) | 58 (Example 5) | 211 +/− 41 |
| Briakinumab | 93.7 (Example 2) | 48 |
| Briakinumab with HC mutations R16A, R19A, K57A, K64A, R83A | 90.1 (Example 2) | 78 |
| Briakinumab with LC mutations R27A, R55A, R94A | 86.2 (Example 2) | 109 |
| Ustekinumab | 84.3 (Example 2) | 137 |

The term Y1E-mutant denotes the triple mutant M252Y/S254T/T256E.

One aspect as reported herein is the use of a method as reported herein for determining the in vivo half-life of an antibody.

The set of in vitro and in vivo experiments conducted with wild-type IgG and IgG variants with YTE-mutations in the Fc-region allowed to show a semi-quantitative correlation of the findings in the FcRn affinity chromatography with those of the in vivo pharmacokinetic studies with mice transgenic for human FcRn (Spiekerman, G. M., et al. J. Exp. Med. 196 (2002) 303-310; Dall'Acqua, W. F., et al., J. Biol. Chem. 281 (2006) 23514-23524). The YTE-mutation leads to a significantly prolonged half-life and slower plasma clearance. The longer in vivo half-life corresponded to a longer retention time in the FcRn chromatography. An extended half-life of an Fc-engineered trastuzumab variant recently was shown to have enhanced in vitro binding to FcRn as measured by flow cytometry (Petkova, S. B., et al., Int. Immunol. 18 (2006) 1759-1769). A variant of the anti-VEGF IgG1 antibody Bevacizumab with 11-fold improved FcRn affinity was shown to have a five-fold extended half-life in human FcRn transgenic mice and a three-fold longer half-life in cynomolgus monkeys (Zalevsky, J., et al., Nat. Biotechnol. 28 (2010) 157-159).

It has been shown that the antibody format had no impact on the binding to FcRn column. This was shown for the knob-into-hole format and for several bispecific antibody formats. Thus, the method as reported herein can be used for the evaluation of new antibody formats.

In one embodiment the complex is mono-biotinylated.

In one embodiment the chromatography material comprising a non-covalent complex of neonatal Fc receptor (FcRn) and beta-2-microglobulin as ligand has a stability of at least 100 cycles in the methods and uses as reported herein. A cycle is a pH gradient from the first pH value to the second pH value of the respective method or use whereby for regeneration of the material no further change of conditions is required than the final conditions of the method or use. Thus, in one embodiment a cycle is a pH gradient from about pH value pH 5.5 to about pH value pH 8.8.

g.ii) Elution with Linear Positive pH Gradient at the Same Salt Concentration of the Antibody and its Fc-Region Herein is reported a method comprising the following two steps:

a) determining the retention time of the antibody on an FcRn affinity chromatography column with a positive linear pH gradient elution in the presence of a first salt concentration, b) determining the retention time of the Fc-region of the antibody on an FcRn affinity chromatography column with a positive linear pH gradient elution in the presence of the first salt concentration.

With this method it is possible to determine the presence of antibody-Fab-FcRn interaction in an antibody-Fc-FcRn complex in a simple chromatography method by comparing the retention times of the antibody and its Fc-region. The Fc-region e.g. can be obtained by enzymatic cleavage with the enzyme IdeS or papain, or can be produced recombinantly. This is important as antibody-Fab-FcRn interactions influence the in vivo half-life of the antibody.

For antibody/antibody-Fc-region pairs different relations with respect to their retention times on an FcRn affinity chromatography column and likewise with respect to their FcRn interaction exist:

1) the antibody and its Fc-region have substantially the same retention time: in this case the in vivo half-life of the antibody is not influenced by an antibody-Fab-FcRn interaction,
2) the antibody and its Fc-region have different retention times and the retention time of the Fc-region is shorter than the retention time of the antibody: in this case the in vivo half-life of the antibody is influenced by an antibody-Fab-FcRn interaction.

In case the antibody in question is a variant antibody further aspects have to be considered: in the variant antibody the antibody-Fc-FcRn interaction as well as the antibody-Fab-FcRn interaction can be changed due to the introduced modifications with respect to the parent antibody.

Figure 10:
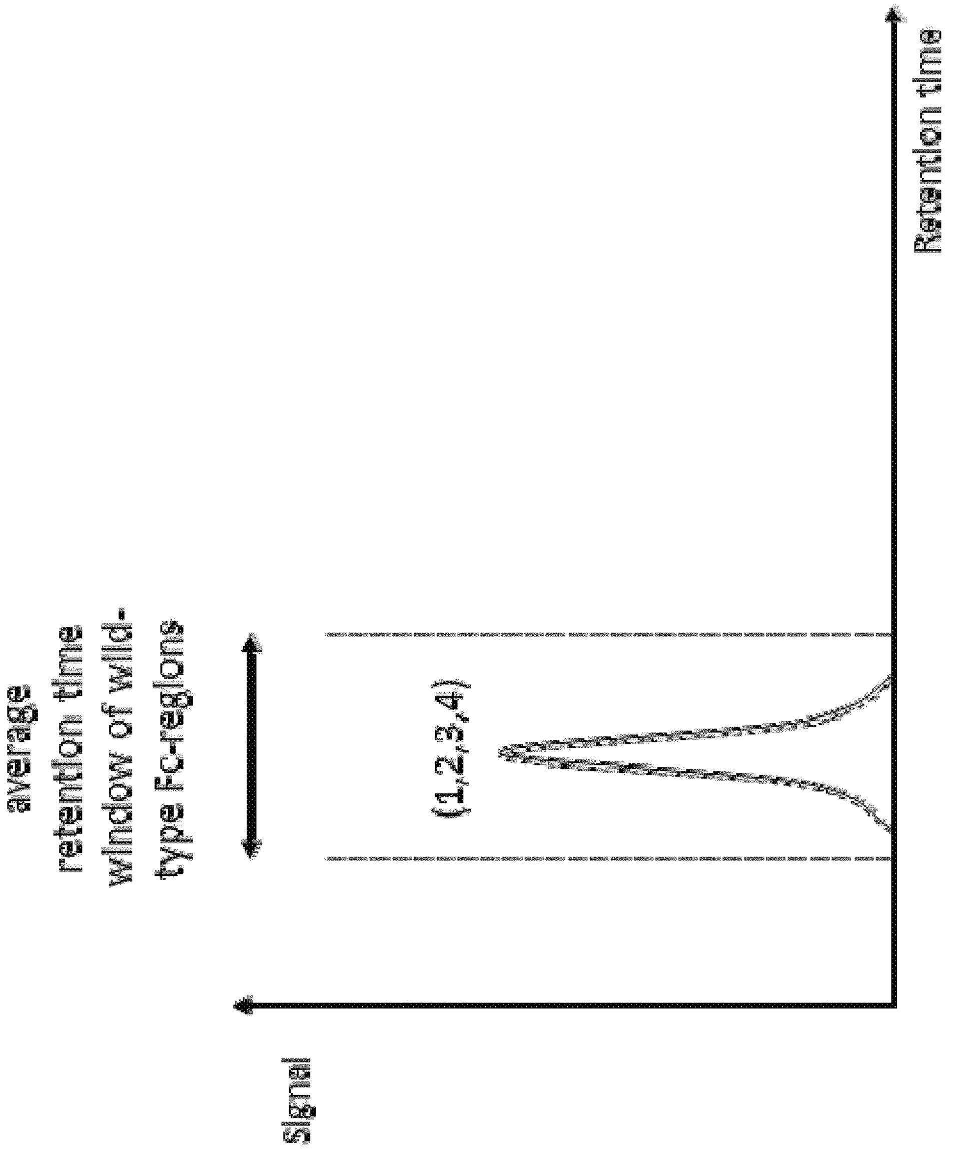
FIGS. 10A-10D Scheme of the change of the retention time on an FcRn affinity chromatography column depending on the antibody-FcRn interactions of the Fc-region and the antibody-Fab; 1: parent antibody, 2: parent antibody Fc-region, 3: variant antibody, 4: variant antibody Fc-region; solid-line: complete antibody (antibody-Fab+Fc-region), dotted line: Fc-region only.
Figure 10:
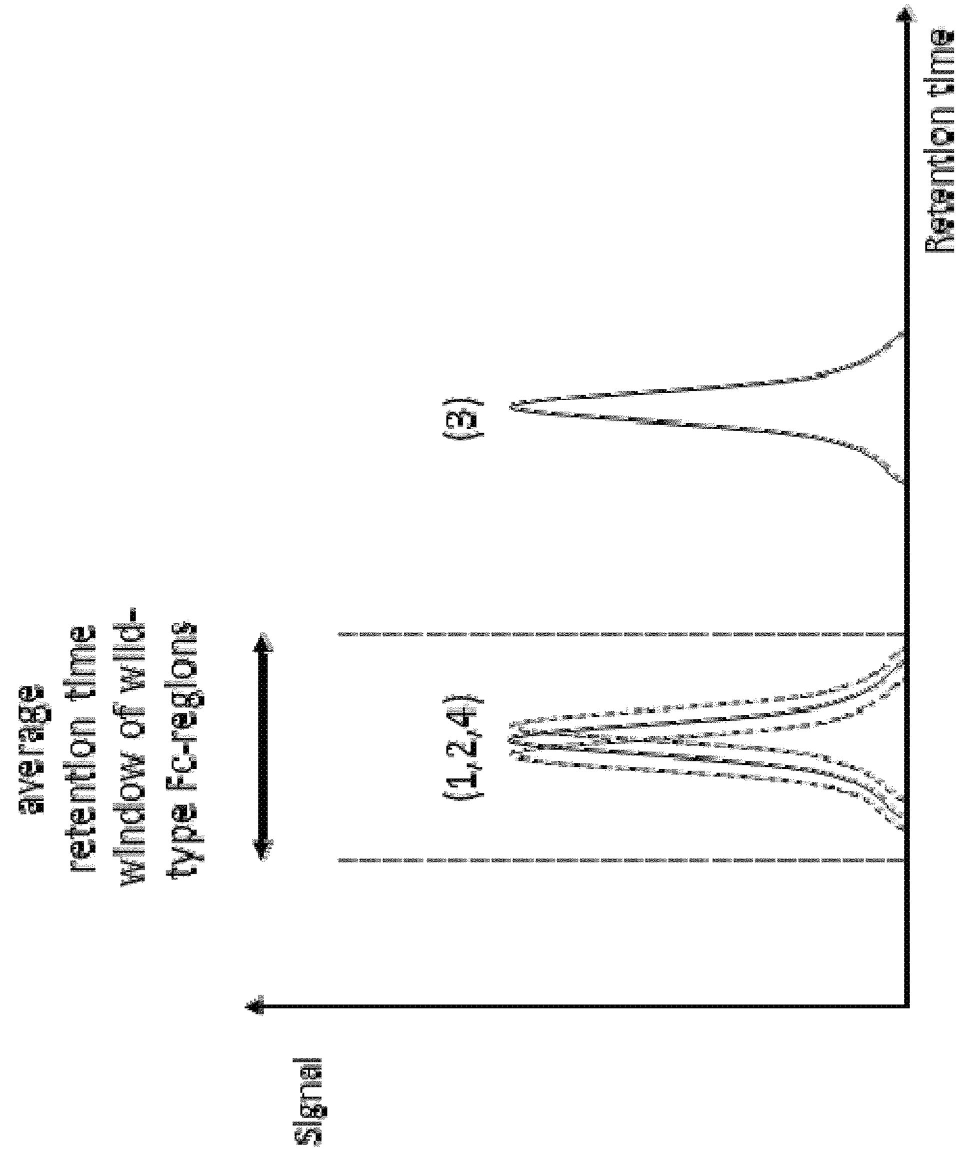
Figure 10:
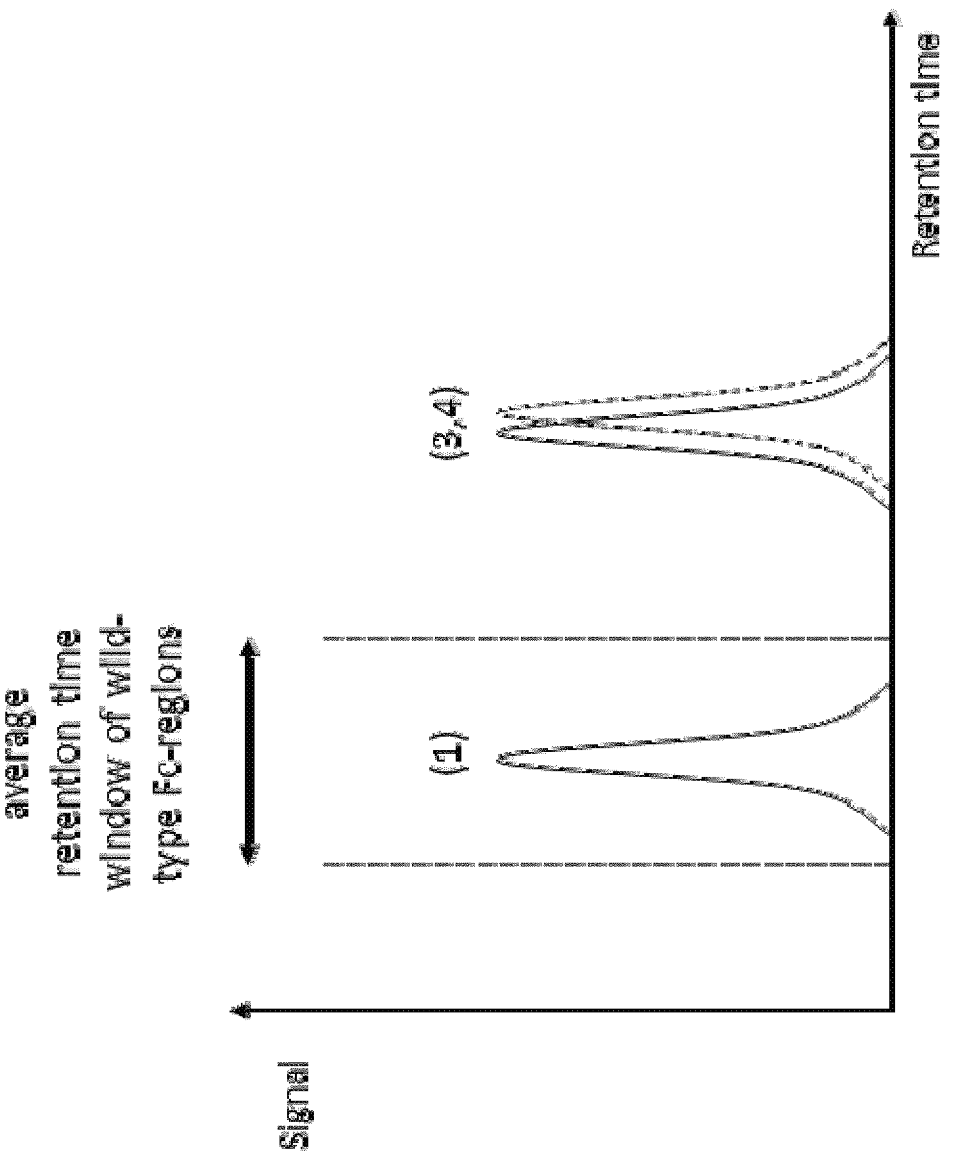
Figure 10:
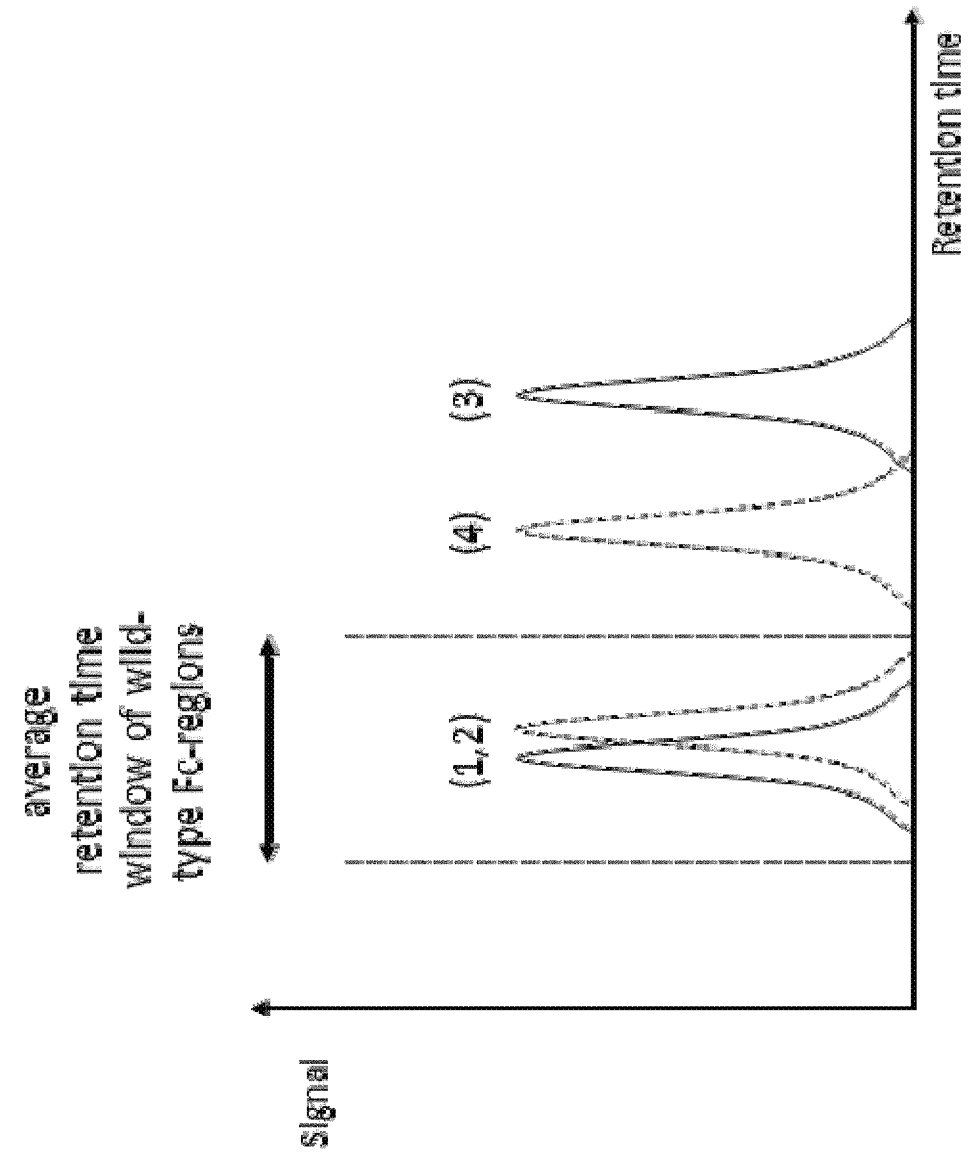

Thus, the following possible relations between a parent antibody, a variant antibody and their respective Fc-regions exist (see FIGS. 10A-10D):

1) the parent antibody (1), the variant antibody (3) and the respective Fc-regions (2,4) have substantially the same retention time: in this case the in vivo half-life of the variant antibody i) is not influenced by an antibody-Fab-FcRn interaction and ii) corresponds to the in-vivo half-life of the parent antibody (see FIG. 10A),
2) the variant antibody (3) and its Fc-region (4) have different retention times, the retention time of the variant antibody's Fc-region is shorter than the retention time of the variant antibody, and the parent antibody (1), the parent antibody's Fc-region (2) and the variant antibody's Fc-region (4) have substantially the same retention time: in this case the in vivo half-life of the variant antibody is i) influenced by an antibody-Fab-FcRn interaction and ii) is shorter than the in-vivo half-life of the parent antibody (see FIG. 10 B),
3) the parent antibody (1) and the variant antibody (3) have different retention times, the retention time of the variant antibody's Fc-region (4) is substantially the same as the retention time of the variant antibody (3), and the retention time of the variant antibody is longer than the retention time of the parent antibody (1): in this case the in vivo half-life of the variant antibody is i) not influenced by an antibody-Fab-FcRn interaction and ii) is longer than the in-vivo half-life of the parent antibody (see FIG. 10 C),
4) the parent antibody (1) and the variant antibody (3) have different retention times, the retention time of the variant antibody's Fc-region (4) is substantially the same as the retention time of the variant antibody (3), and the retention time of the variant antibody (3) is shorter than the retention time of the parent antibody (1): in this case the in vivo half-life of the variant antibody is i) not influenced by an antibody-Fab-FcRn interaction and ii) is shorter than the in-vivo half-life of the parent antibody,
5) the parent antibody (1) and the variant antibody (3) have different retention times, the retention time of the variant antibody's Fc-region (4) is different from the retention time of the variant antibody (3) and also different from the retention time of the parent antibody (1) and its Fc-region (2), and the retention time of the variant antibody's Fc-region (4) is between the retention time of the variant antibody (3) and the parent antibody (4): in this case the in vivo half-life of the variant antibody is i) influenced by an antibody-Fab-FcRn interaction and ii) is different from the in-vivo half-life of the parent antibody (see FIG. 10 D).

In one case the reference antibody is an antibody that has substantially the same retention time as its Fc-region after IdeS cleavage or papain cleavage.

As outlined above the antibody-Fab-FcRn interaction can have an influence on the in vivo half-life of the antibody. Also as outlined above the antibody-Fc-FcRn interaction can have an influence on the in vivo half-life of the antibody. Thus, both interactions have to be accounted for.

For example, Ropeenian and Akilesh (Nat. Rev. Immunol. 7 (2007) 715-725) report that, for example, the humanized IgG1 antibody hu4D5 (Herceptin; Genentech; an ERBB2-specific monoclonal antibody) variant Asn434Ala (N434A) and the triply substituted variant Thr307Ala/Asn434Ala/Glu380Ala (T307A/N434A/Q380A) bind human FcRn with 3-fold and 12-fold higher affinity, respectively, than the wild-type hu4D5 antibody at pH 6.0. Unexpectedly, in FcRn transgenic humanized mice, the half-lives of these two variant antibodies were essentially equivalent. This discrepancy may be explained according to Ropeenian and Akilesh by the increased affinity of the triply substituted variant for FcRn at pH 7.4. Fc-region mutations that improve the binding affinity at pH 7.4, as well as at pH 6.0, may actually accelerate the clearance of the antibody in vivo rather than prolong its half-life.

Figure 11:
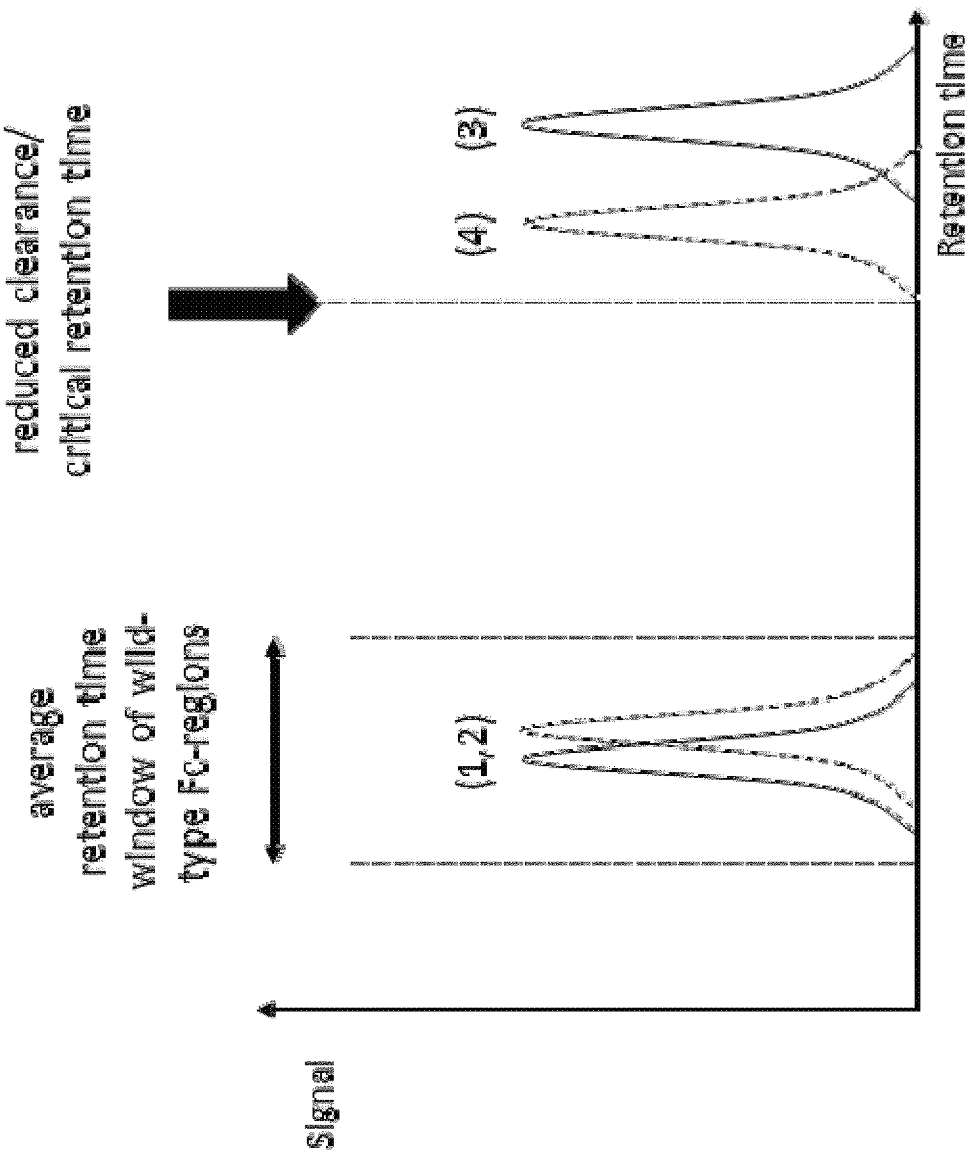
FIG. 11 Scheme showing an engineered antibody with improved FcRn binding, antibody-Fab-FcRn interaction but reduced in vivo half-life as the antibody-FcRn interaction results in an improved clearance (retention time above critical retention time).

Thus, it has further to be considered if the retention time of the Fc-region of the variant antibody is longer than a critical retention time. Without being bound by this theory this results in the effect that the interaction at pH 7.4 is increased so much that the dissociation of the antibody-FcRn complex at pH 7.4 is reduced leading to increased degradation of the antibody (see FIG. 11).

Figure 12:
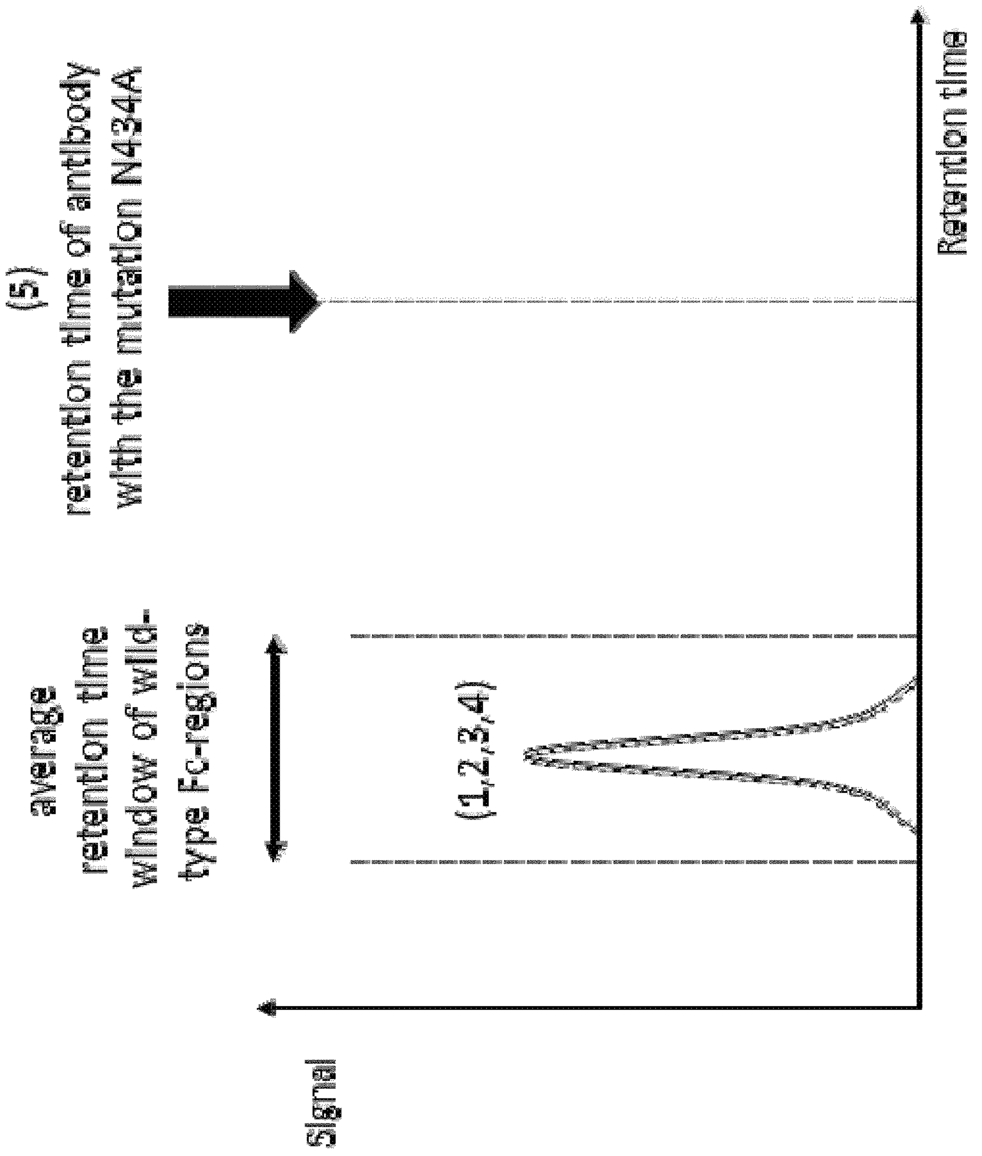
FIGS. 12A-12E Scheme of the change of the retention time on an FcRn affinity chromatography column depending on the antibody-FcRn interactions of the Fc-region and the antibody-Fab; 1: reference antibody, 2: reference antibody Fc-region, 3: antibody, 4: antibody Fc-region; solid-line: complete antibody (antibody-Fab+Fc-region), dotted line: Fc-region only.
Figure 12:
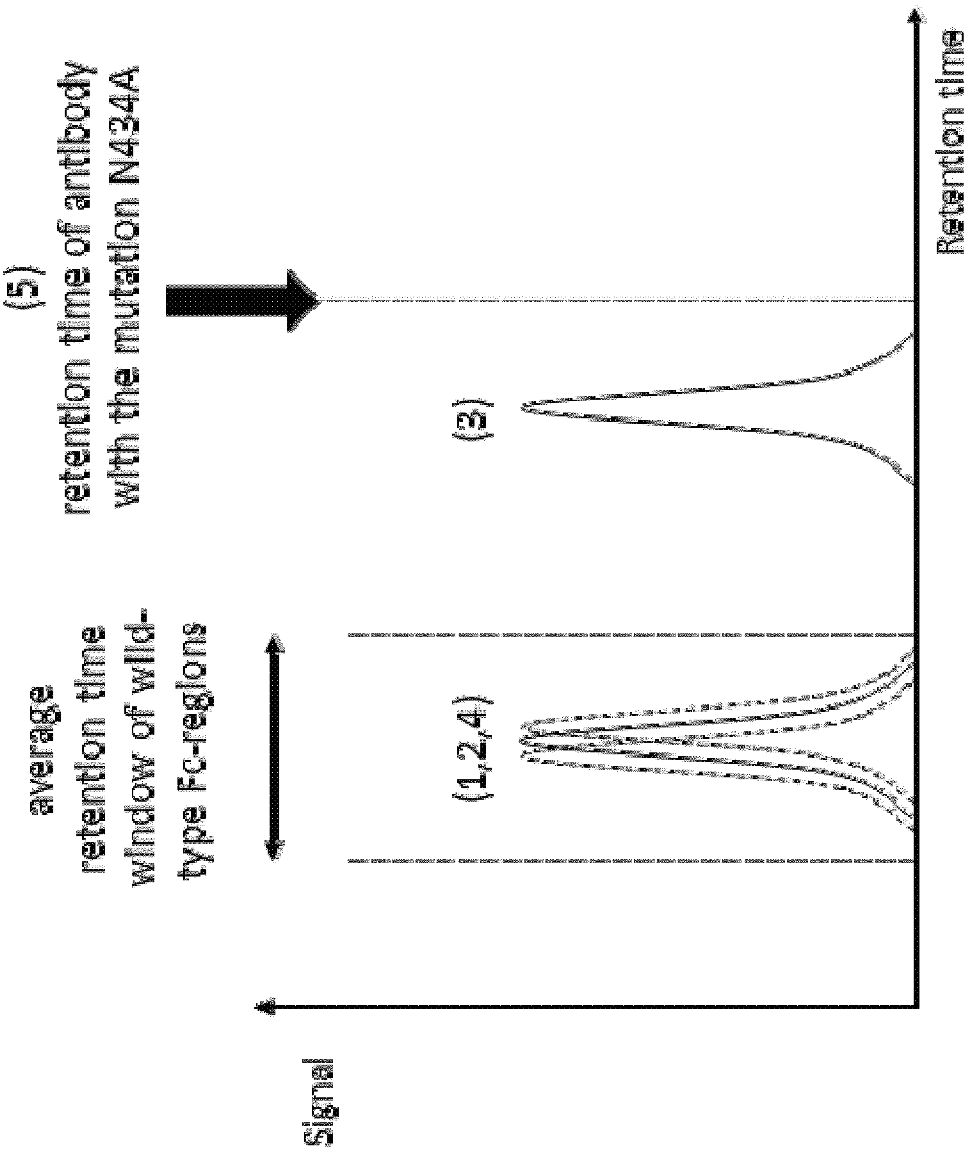
Figure 12:
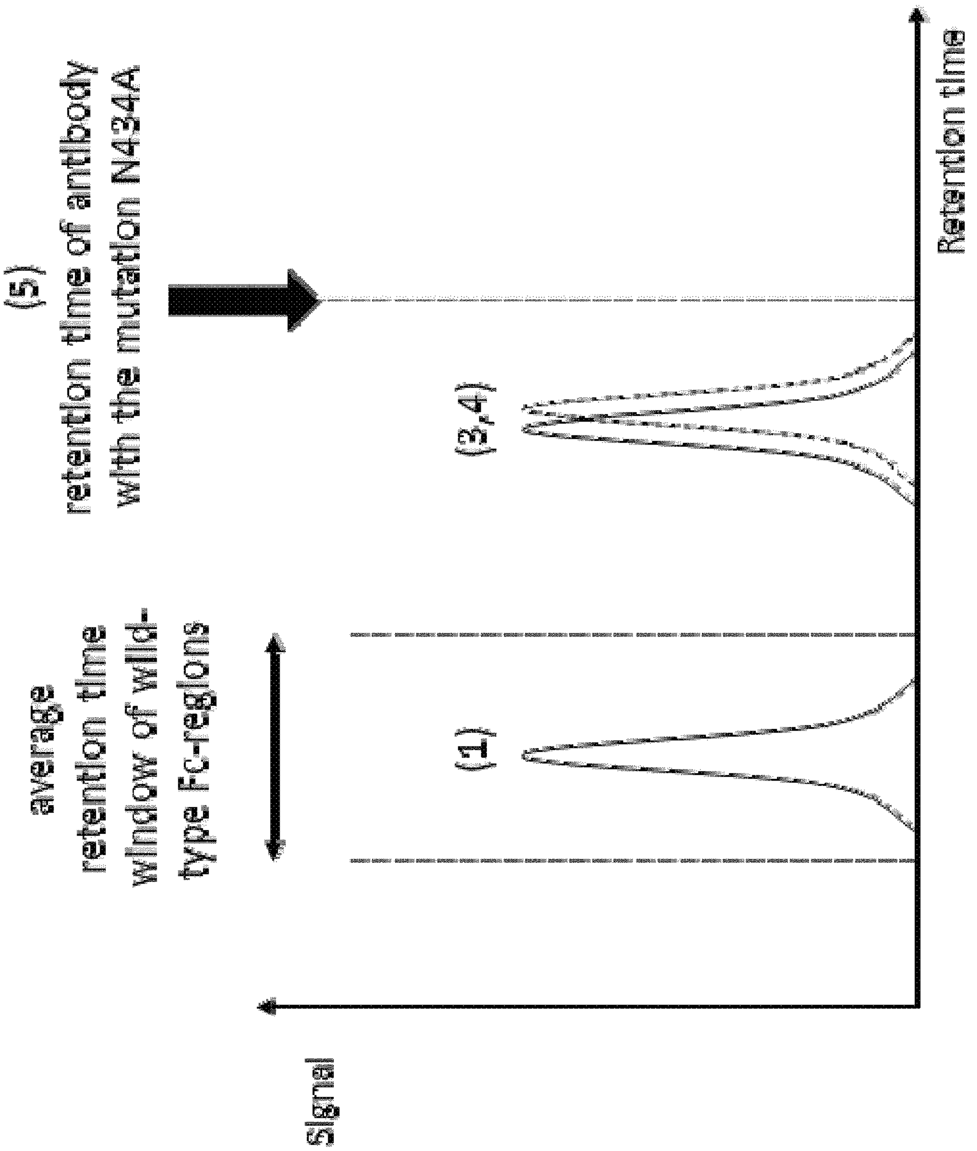
Figure 12:
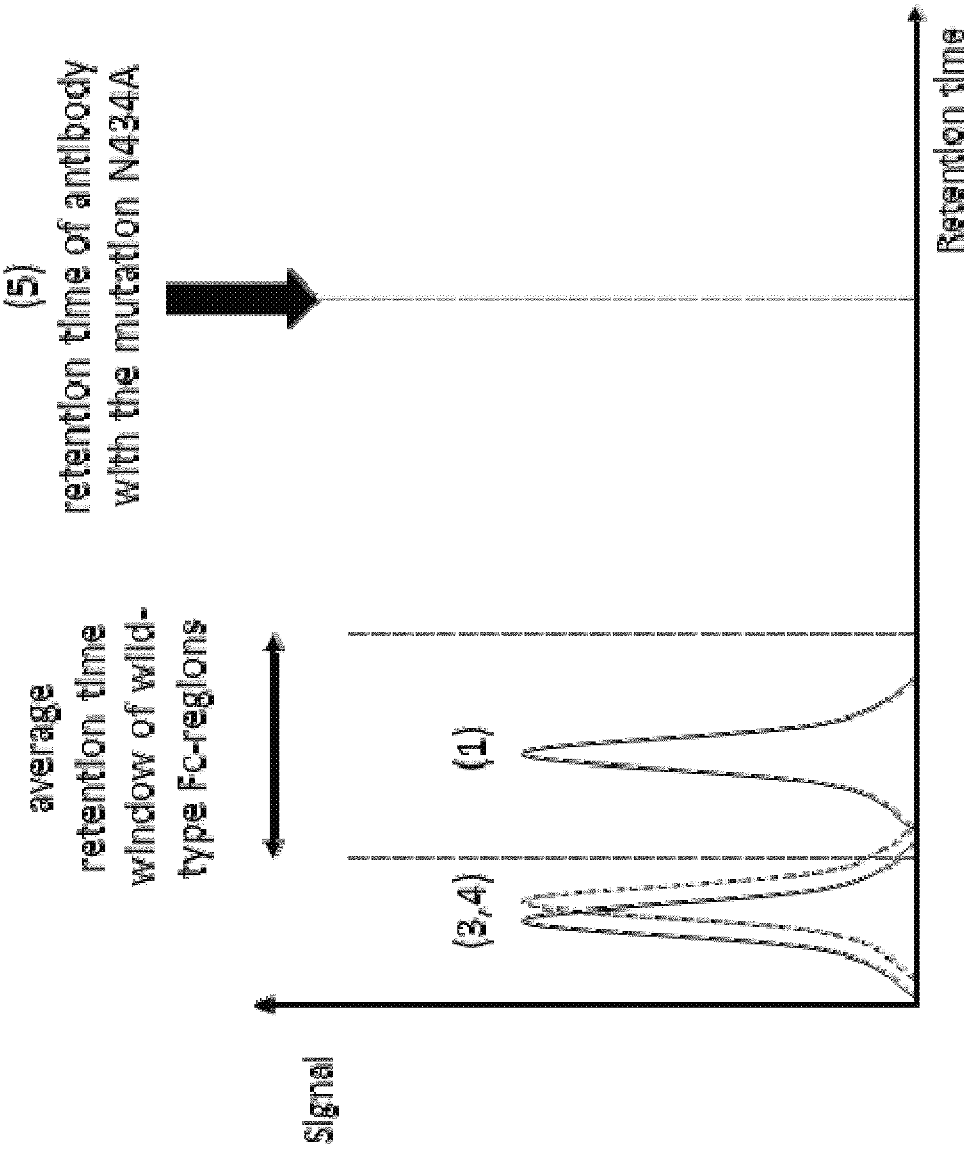
Figure 12:
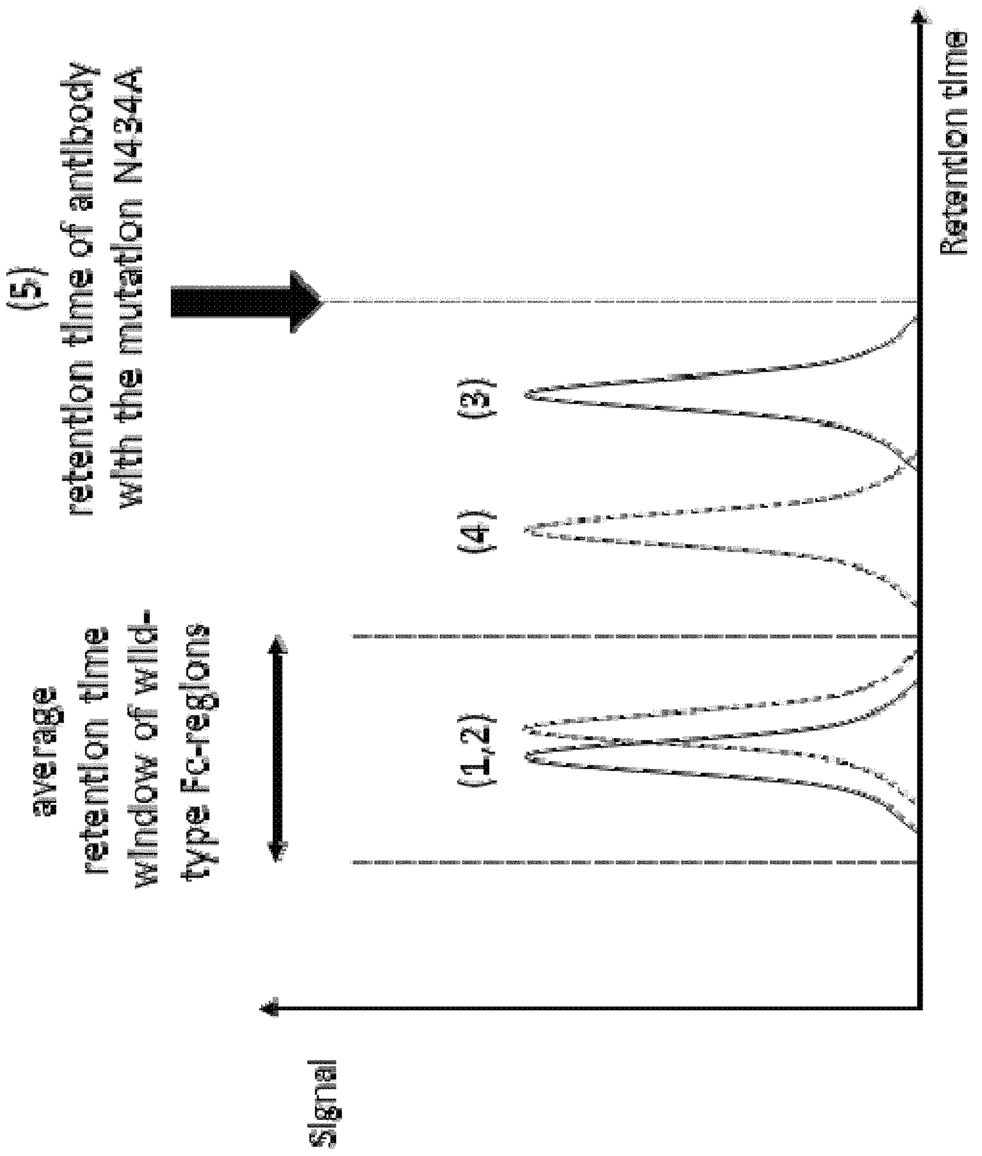

One aspect of the current invention is a method for selecting an antibody comprising the following steps (see FIGS. 12A-12E):

a) determining the retention time of i) the antibody (3), ii) the antibody's Fc-region (4), iii) a reference antibody (1), iv) the reference antibody's Fc-region (2), and v) the reference antibody with the mutation N434A in the Fc-region (5) on an FcRn affinity chromatography column using the same elution conditions,
b) selecting an antibody for which
   b-i) the reference antibody (1), the variant antibody (3) and the respective Fc-regions (2,4) have substantially the same retention time, and the retention time of the antibody is shorter than the retention time of the reference antibody with the mutation N434A in the Fc-region (5) and thereby selecting an antibody whose in vivo half-life i) is not influenced by an antibody-Fab-FcRn interaction and ii) corresponds to the in-vivo half-life of the parent antibody (see FIG. 12A), b-ii) the antibody (3) and its Fc-region (4) have different retention times, the retention time of the antibody's Fc-region (4) is shorter than the retention time of the antibody (3) and the same or longer than the retention time of the reference antibody (1) or its Fc-region (2), the retention time of the reference antibody (1), the reference antibody's Fc-region (2), and the antibody (3) is shorter than the retention time of the reference antibody with the mutation N434A in the Fc-region (5) and thereby selecting an antibody whose in vivo half-life is i) influenced by an antibody-Fab-FcRn interaction and ii) shorter than the in-vivo half-life of the reference antibody (see FIG. 12 B), b-iii) the reference antibody (1) and the antibody (3) have different retention times, the retention time of the antibody's Fc-region (4) is substantially the same as the retention time of the antibody (3), the retention time of the antibody (3) is longer than the retention time of the reference antibody (1), and the retention time of the antibody (3) is shorter than the retention time of the reference antibody with the mutation N434A in the Fc-region (5) and thereby selecting an antibody whose in vivo half-life is i) not influenced by an antibody-Fab-FcRn interaction and ii) longer than the in-vivo half-life of the reference antibody (see FIG. 12 C), b-iv) the reference antibody (1) and the antibody (3) have different retention times, the retention time of the antibody's Fc-region (4) is substantially the same as the retention time of the antibody (3), the retention time of the antibody (3) is shorter than the retention time of the reference antibody (1), and the retention time of the antibody (3) is shorter than the retention time of the reference antibody with the mutation N434A in the Fc-region (5) and thereby selecting an antibody whose in vivo half-life is i) not influenced by an antibody-Fab-FcRn interaction and ii) shorter than the in-vivo half-life of the reference antibody (see FIG. 12 D), b-v) the reference antibody (1) and the antibody (3) have different retention times, the retention time of the antibody's Fc-region (4) is different from the retention time of the antibody (3) and also different from the retention time of the reference antibody (1) and its Fc-region (2), the retention time of the antibody's Fc-region (3) is between the retention time of the antibody (3) and the reference antibody (1), and the retention time of the antibody (3) is shorter than the retention time of the reference antibody with the mutation N434A in the Fc-region (5) and thereby selecting an antibody whose in vivo half-life is i) influenced by an antibody-Fab-FcRn interaction and ii) different from the in-vivo half-life of the reference antibody (see FIG. 12 E).

In one embodiment the elution is by a positive linear pH gradient at a constant salt concentration or by using a linear salt gradient at a constant pH value.

In one embodiment the antibody is a variant antibody of a parent antibody and the reference antibody is the parent antibody. In one embodiment the variant antibody has amino acid alterations in the antibody-Fab or/and in the antibody-Fc-region.

g.iii) Elution with a Salt Gradient

Herein is reported a method comprising the following steps:

a) determining the retention time of an antibody and of a reference antibody on an FcRn affinity chromatography column at a first pH value with a salt gradient elution, b) determining the retention time of an antibody and a reference antibody on an FcRn affinity chromatography column at a second pH value with a salt gradient elution.

It has been found that beside an elution with a pH gradient at a constant salt concentration also the elution with a salt gradient at a constant pH value can be used to determine whether antibody-Fab-FcRn interactions in an antibody-Fc-FcRn complex are present or not.

As already outlined above the antibody-Fab-FcRn interaction is a secondary interaction that is established, if present at all, after an antibody-Fc-FcRn complex has been formed.

Both interactions, i.e. the antibody-Fc-FcRn and the antibody-Fab-FcRn interaction, are charge mediated non-covalent interactions.

One aspect as reported herein is a method for determining the presence of antibody-Fab-FcRn interaction influencing the in vivo half-life of the antibody comprising the following steps:

a) determining the retention time of the antibody and of a reference antibody on an FcRn affinity chromatography column at a first pH value with a salt gradient elution, b) determining the retention time of the antibody and a reference antibody on an FcRn affinity chromatography column at a second pH value with a salt gradient elution, whereby the presence of antibody-Fab-FcRn interaction influencing the in vivo half-life of the antibody is determined if the ratio of the retention times of the antibody and the reference antibody determined in step a) is substantially different from the ratio of the retention times of the antibody and the reference antibody determined in step b).

In one embodiment the first pH value is 5.5. In one embodiment the second pH value is 8.8. In one embodiment the salt gradient in step a) and step b) are identical.

In one embodiment the salt gradient is a sodium chloride gradient.

In one embodiment the salt gradient is from 0 mM to 250 mM salt.

h) Bevacizumab and Bevacizumab-Mutant

Another molecule without charge patch in the CDRs is chosen to create a positive charge patch in the LC-CDRs to verify the findings reported above that positive charge at this position influences FcRn binding affinity of antibodies in general.

Bevacizumab was chosen because it had only little charge in the LC-CDRs. The three basic amino acid residues that were identified using Briakinumab are the arginine residues R27, R55 and R94. In the Bevacizumab amino acid sequence aspartic acid D27, leucine L54 and threonine T93 are exchanged into lysine residues to create a positive charge patch (see FIG. 14).

Figure 9:
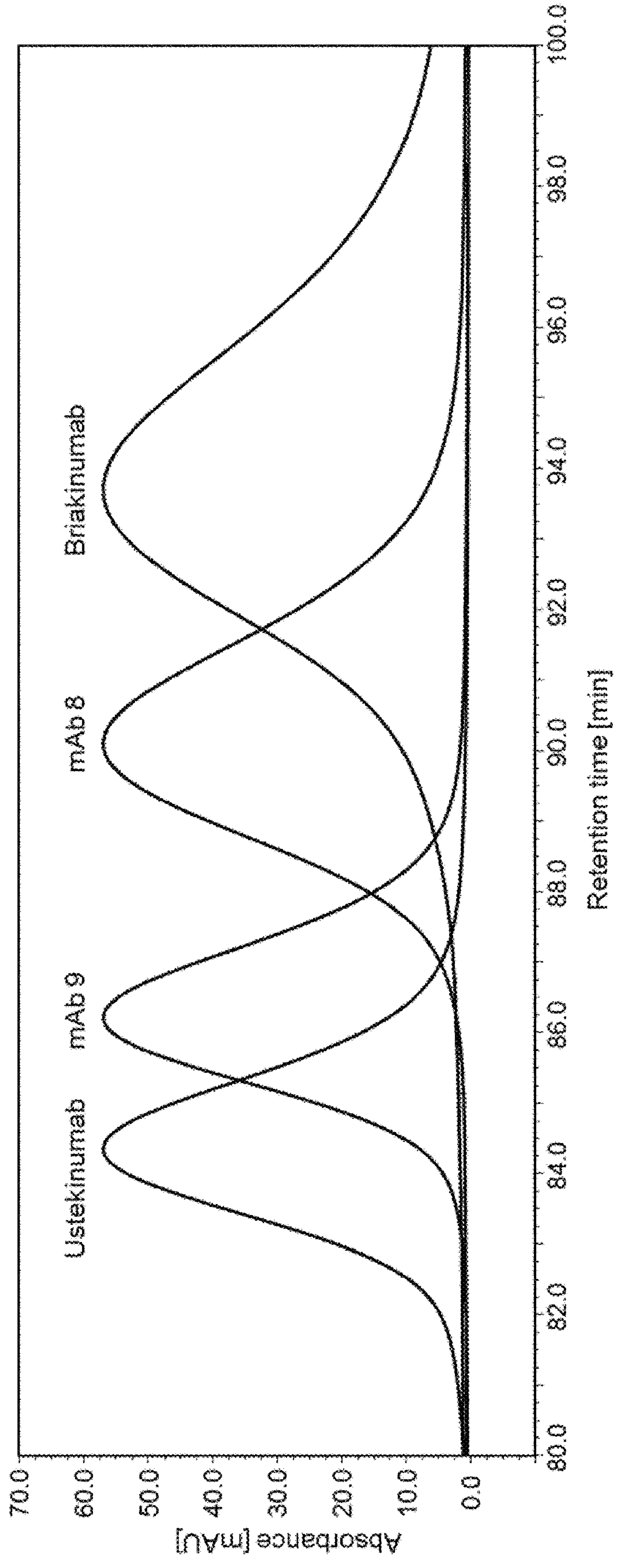
FIG. 9 FcRn affinity chromatogram of Avastin-wild-type and the Avastin-mutant.

The FcRn affinity chromatogram of Bevacizumab-wild-type and the Bevacizumab-mutant are shown in FIG. 9 and the respective retention times are listed in the following Table 9.

TABLE 9

| FcRn column retention times of Bevacizumab-wild-type and the Bevacizumab-mutant. | |
|---|---|
| sample | Retention time [min] |
| Ustekinumab | 83.6 |
| Briakinumab | 91.6 |
| Bevacizumab-wild-type | 84.7 |
| Bevacizumab-mutant | 86.9 |

Bevacizumab-wild-type has a retention time of 84.7 minutes, whereas Bevacizumab-mutant elutes after 86.9 minutes. Thus, the positive charge patch in the Fv of Bevacizumab causes a retention time shift of 2.2 minutes. The results indicate that charge in the Fv of an IgG1 influences FcRn binding affinity in general, especially the dissociation from the FcRn is influenced.

SPECIFIC EMBODIMENTS

1. A method for selecting an antibody comprising the following steps:
   i) determining a first retention time of the antibody and a reference antibody on an FcRn affinity chromatography column with a positive linear pH gradient elution in the presence of a first salt concentration, and determining a second retention time of the antibody and the reference antibody on an FcRn affinity chromatography column with the positive linear pH gradient elution in the presence of a second salt concentration, or
   ii) determining a first retention time of the antibody and a reference antibody on an FcRn affinity chromatography column with a linear salt gradient elution at a first pH value, and determining a second retention time of the antibody and the reference antibody on an FcRn affinity chromatography column with the linear salt gradient elution at a second pH value, or
   iii) determining for the antibody and a reference antibody the $K_D$ value at pH 6 using surface plasmon resonance, and determining the retention time of the antibody and the reference antibody on an FcRn affinity chromatography column with a positive linear pH gradient elution in the presence of a high salt concentration, or
   iv) determining for the antibody and a reference antibody the $K_D$ value at pH 6 using surface plasmon resonance, and determining the retention time of the antibody and the reference antibody on an FcRn affinity chromatography column with a linear salt gradient elution, or
   v) determining the retention time of the antibody and its Fc-region on an FcRn affinity chromatography column with a positive linear pH gradient elution, or
   vi) determining the retention time of the antibody and its Fc-region on an FcRn affinity chromatography column with a linear salt gradient elution at a high pH value, or
   vii) determining for the antibody and its Fc-region the $K_D$ value at pH 6 using surface plasmon resonance, and determining the retention time of the antibody and its Fc-region on an FcRn affinity chromatography column with a positive linear pH gradient elution in the presence of a high salt concentration, or
   viii) determining for the antibody and its Fc-region the $K_D$ value at pH 6 using surface plasmon resonance, and determining the retention time of the antibody and its Fc-region on an FcRn affinity chromatography column with a linear salt gradient elution at a high pH value, and by selecting
   a) an antibody that has a first retention time that is substantially the same as the second retention time, or
   b) an antibody that has a $K_D$ value that differs from the $K_D$ value of the reference antibody by at most a factor of 10 and that has a retention time that is substantially the same as the retention time of the reference antibody, or
   c) an antibody that has a retention time that is substantially the same as the retention time of its Fc-region, or
   d) an antibody that has a $K_D$ value that differs from the $K_D$ value of its Fc-region by at most a factor of 10 and that has a retention time that is substantially the same as the retention time of its Fc-region.
2. A method for selecting an antibody comprising the following steps:

determining a first retention time of the antibody and a reference antibody on an FcRn affinity chromatography column with a positive linear pH gradient elution in the presence of a first salt concentration, and determining a second retention time of the antibody and the reference antibody on an FcRn affinity chromatography column with the positive linear pH gradient elution in the presence of a second salt concentration, and selecting
   a) an antibody that has a first retention time that is substantially the same as the second retention time, or
   b) an antibody that has a $K_D$ value that differs from the $K_D$ value of the reference antibody by at most a factor of 10 and that has a retention time that is substantially the same as the retention time of the reference antibody, or
   c) an antibody that has a retention time that is substantially the same as the retention time of its Fc-region, or
   d) an antibody that has a $K_D$ value that differs from the $K_D$ value of its Fc-region by at most a factor of 10 and that has a retention time that is substantially the same as the retention time of its Fc-region.
3. A method for selecting an antibody comprising the following steps:

determining a first retention time of the antibody and a reference antibody on an FcRn affinity chromatography column with a linear salt gradient elution at a first pH value, and determining a second retention time of the antibody and the reference antibody on an FcRn affinity chromatography column with the linear salt gradient elution at a second pH value, and selecting
   a) an antibody that has a first retention time that is substantially the same as the second retention time, or
   b) an antibody that has a $K_D$ value that differs from the $K_D$ value of the reference antibody by at most a factor of 10 and that has a retention time that is substantially the same as the retention time of the reference antibody, or c) an antibody that has a retention time that is substantially the same as the retention time of its Fc-region, or d) an antibody that has a $K_D$ value that differs from the $K_D$ value of its Fc-region by at most a factor of 10 and that has a retention time that is substantially the same as the retention time of its Fc-region.

4. A method for selecting an antibody comprising the following steps:

determining for the antibody and a reference antibody the $K_D$ value at pH 6 using surface plasmon resonance, and determining the retention time of the antibody and the reference antibody on an FcRn affinity chromatography column with a positive linear pH gradient elution in the presence of a high salt concentration, and selecting a) an antibody that has a first retention time that is substantially the same as the second retention time, or b) an antibody that has a $K_D$ value that differs from the $K_D$ value of the reference antibody by at most a factor of 10 and that has a retention time that is substantially the same as the retention time of the reference antibody, or c) an antibody that has a retention time that is substantially the same as the retention time of its Fc-region, or d) an antibody that has a $K_D$ value that differs from the $K_D$ value of its Fc-region by at most a factor of 10 and that has a retention time that is substantially the same as the retention time of its Fc-region.

5. A method for selecting an antibody comprising the following steps:

determining for the antibody and a reference antibody the $K_D$ value at pH 6 using surface plasmon resonance, and determining the retention time of the antibody and the reference antibody on an FcRn affinity chromatography column with a linear salt gradient elution, and selecting a) an antibody that has a first retention time that is substantially the same as the second retention time, or b) an antibody that has a $K_D$ value that differs from the $K_D$ value of the reference antibody by at most a factor of 10 and that has a retention time that is substantially the same as the retention time of the reference antibody, or c) an antibody that has a retention time that is substantially the same as the retention time of its Fc-region, or d) an antibody that has a $K_D$ value that differs from the $K_D$ value of its Fc-region by at most a factor of 10 and that has a retention time that is substantially the same as the retention time of its Fc-region.

6. A method for selecting an antibody comprising the following steps:

determining the retention time of the antibody and its Fc-region on an FcRn affinity chromatography column with a positive linear pH gradient elution, and selecting a) an antibody that has a first retention time that is substantially the same as the second retention time, or b) an antibody that has a $K_D$ value that differs from the $K_D$ value of the reference antibody by at most a factor of 10 and that has a retention time that is substantially the same as the retention time of the reference antibody, or c) an antibody that has a retention time that is substantially the same as the retention time of its Fc-region, or d) an antibody that has a $K_D$ value that differs from the $K_D$ value of its Fc-region by at most a factor of 10 and that has a retention time that is substantially the same as the retention time of its Fc-region.

7. A method for selecting an antibody comprising the following steps:

determining the retention time of the antibody and its Fc-region on an FcRn affinity chromatography column with a linear salt gradient elution at a high pH value, and selecting a) an antibody that has a first retention time that is substantially the same as the second retention time, or b) an antibody that has a $K_D$ value that differs from the $K_D$ value of the reference antibody by at most a factor of 10 and that has a retention time that is substantially the same as the retention time of the reference antibody, or c) an antibody that has a retention time that is substantially the same as the retention time of its Fc-region, or d) an antibody that has a $K_D$ value that differs from the $K_D$ value of its Fc-region by at most a factor of 10 and that has a retention time that is substantially the same as the retention time of its Fc-region.

8. A method for selecting an antibody comprising the following steps:

determining for the antibody and its Fc-region the $K_D$ value at pH 6 using surface plasmon resonance, and determining the retention time of the antibody and its Fc-region on an FcRn affinity chromatography column with a positive linear pH gradient elution in the presence of a high salt concentration, and selecting a) an antibody that has a first retention time that is substantially the same as the second retention time, or b) an antibody that has a $K_D$ value that differs from the $K_D$ value of the reference antibody by at most a factor of 10 and that has a retention time that is substantially the same as the retention time of the reference antibody, or c) an antibody that has a retention time that is substantially the same as the retention time of its Fc-region, or d) an antibody that has a $K_D$ value that differs from the $K_D$ value of its Fc-region by at most a factor of 10 and that has a retention time that is substantially the same as the retention time of its Fc-region.

9. A method for selecting an antibody comprising the following steps:

determining for the antibody and its Fc-region the $K_D$ value at pH 6 using surface plasmon resonance, and determining the retention time of the antibody and its Fc-region on an FcRn affinity chromatography column with a linear salt gradient elution at a high pH value, and selecting a) an antibody that has a first retention time that is substantially the same as the second retention time, or b) an antibody that has a $K_D$ value that differs from the $K_D$ value of the reference antibody by at most a factor of 10 and that has a retention time that is substantially the same as the retention time of the reference antibody, or c) an antibody that has a retention time that is substantially the same as the retention time of its Fc-region, or d) an antibody that has a $K_D$ value that differs from the $K_D$ value of its Fc-region by at most a factor of 10 and that has a retention time that is substantially the same as the retention time of its Fc-region.

10. The method according to any one of embodiments 1 to 10, wherein the method is for selecting an antibody that is free of antibody-Fab-FcRn interaction influencing the in vivo half-life of the antibody.

11. The method according to any one of embodiments 1, 6, 7, 8 and 9 wherein the method is for selecting an antibody that has a relative in vivo half-life that is increased compared to an antibody of the IgG1, IgG3 or IgG4 subclass, and further the retention time of a reference antibody or reference Fc-region is determined, and by selecting a) an antibody that has a first retention time that is longer than the first retention time of the reference antibody, and a first retention time that is substantially the same as the second retention time, or b) an antibody that has a $K_D$ value that differs from the $K_D$ value of the reference antibody by at most a factor of 10 and that has a retention time that is longer than the retention time of the reference antibody, or c) an antibody that has a retention time that is substantially the same as the retention time of its Fc-region and that is longer than the retention time of the reference antibody, or d) an antibody that has a $K_D$ value that differs from the $K_D$ value of its Fc-region by at most a factor of 10 and that has a retention time that is substantially the same as the retention time of its Fc-region and that is longer than the retention time of the reference antibody.

12. The method according to any one of embodiments 1, 6, 7, 8 and 9 wherein the method is for determining the relative increase or decrease in the in vivo half-life of an antibody to a reference antibody, and further the retention time of a reference antibody or reference Fc-region is determined, and further the retention time of an IgG Fc-region with the mutation N434A is determined, and by selecting a) an antibody that has a first retention time that is longer than the first retention time of the reference, that has a first retention time and a second retention time that are substantially the same, and that has a first retention time that is shorter than the retention time of the Fc-region with the mutation N434A and thereby selecting an antibody with relative increased in vivo half-life, or b) an antibody that has a $K_D$ value that differs from the $K_D$ value of the reference antibody by at most a factor of 10, that has a retention time that is longer than the retention time of the reference antibody and that has a first retention time that is shorter than the retention time of the Fc-region with the mutation N434A and thereby selecting an antibody with relative increased in vivo half-life, or c) an antibody that has a first retention time that is shorter than the first retention time of the reference antibody, and that has a first the retention time and a second retention time that are substantially the same, and thereby selecting an antibody with relative decreased in vivo half-life, or d) an antibody that has a $K_D$ value that differs from the $K_D$ value of the reference antibody by at most a factor of 10, and that has a retention time that is shorter than the retention time of the reference antibody, and thereby selecting an antibody with relative increased in vivo half-life.

13. The method according to any one of embodiments 1, 2, 4, 6, 8, and 10 to 12, wherein the (positive) linear pH gradient is from about pH 5.5 to about pH 8.8.

14. The method according to any one of embodiments 1 to 13, wherein the salt is selected from sodium chloride, sodium sulphate, potassium chloride, potassium sulfate, sodium citrate, or potassium citrate.

15. The method according to any one of embodiments 1 to 14, wherein the salt is sodium chloride.

16. The method according to any one of embodiments 1, 2 and 10 to 15, wherein the first salt concentration is between 50 mM and 200 mM.

17. The method according to any one of embodiments 1, 2 and 10 to 16, wherein the first salt concentration is about 140 mM.

18. The method according to any one of embodiments 1, 2 and 10 to 17, wherein the second salt concentration is between 300 mM and 600 mM.

19. The method according to any one of embodiments 1, 2 and 10 to 18, wherein the second salt concentration is about 400 mM.

20. The method according to any one of embodiments 1, 3, 5, 7 and 9 to 19, wherein the linear salt gradient is from 0 mM salt to 500 mM salt.

21. The method according to any one of embodiments 1, 3, 5, 7 and 9 to 20, wherein the linear salt gradient is from 0 mM salt to 250 mM salt.

22. The method according to any one of embodiments 1, 3 and 10 to 21, wherein the first pH value is about 5.5.

23. The method according to any one of embodiments 1, 3 and 10 to 22, wherein the second pH value is about 7.4.

24. The method according to any one of embodiments 1, 4, 8 and 10 to 23, wherein the high salt concentration is between 250 mM and 600 mM.

25. The method according to any one of embodiments 1, 4, 8 and 10 to 24, wherein the high salt concentration is about 400 mM.

26. The method according to any one of embodiments 1, 7 and 9 to 25, wherein the high pH value is between pH 6.5 and pH 8.8.

27. The method according to any one of embodiments 1, 7 and 9 to 26, wherein the high pH value is about pH 7.4.

28. The method according to any one of embodiments 1 to 27, wherein substantially different retention times differ by at least 5%.

29. The method according to any one of embodiments 1 to 28, wherein substantially different retention times differ by at least 10%.
30. The method according to any one of embodiments 1 to 29, wherein substantially different retention time differ by at least 15%.
31. The method according to any one of embodiments 1 to 30, wherein substantially same retention times differ by less than 5%.
32. The method according to any one of embodiments 1 to 31, wherein substantially same retention times differ by 3.5% or less.
33. The method according to any one of embodiments 1 to 32, wherein substantially same retention times differ by 2.5% or less.
34. The method according to any one of embodiments 1 to 33, wherein if the retention times are substantially different the retention times are proportional to one above the square root of the salt concentration (~1/SQRT (c(salt))).
35. The method according to any one of embodiments 1 to 34, wherein the reference antibody is either the anti-IL-IR antibody with SEQ ID NO: 01 (heavy chain) and SEQ ID NO: 02 (light chain) for the subclass IgG1 and the anti-IL-1R antibody with SEQ ID NO: 03 (heavy chain) and SEQ ID NO: 04 (light chain) for the subclass IgG4, or the anti-HER2 antibody with SEQ ID NO: 36 (heavy chain) and SEQ ID NO: 37 (light chain) for the subclass IgG1 and the anti-HER2 antibody with SEQ ID NO: 38 (heavy chain) and SEQ ID NO: 39 (light chain) for the subclass IgG4.
36. The method according to any one of embodiments 1 to 35, wherein the FcRn affinity chromatography column comprises a non-covalent complex of a neonatal Fc receptor (FcRn) and beta-2-microglobulin (b2m).
37. The method according to any one of embodiments 1 to 36, wherein the FcRn affinity chromatography column comprises a covalent complex of a neonatal Fc receptor (FcRn) and beta-2-microglobulin (b2m).
38. The method according to any one of embodiments 36 to 37, wherein the complex of the neonatal Fc receptor (FcRn) and beta-2-microglobulin (b2m) is bound to a solid phase.
39. The method according to embodiment 38, wherein the solid phase is a chromatography material.
40. The method according to any one of embodiments 36 to 39, wherein the complex of a neonatal Fc receptor (FcRn) and beta-2-microglobulin (b2m) is biotinylated and the solid phase is derivatized with streptavidin.
41. The method according to any one of embodiments 36 to 40, wherein the beta-2-microglobulin is from the same species as the neonatal Fc receptor (FcRn).
42. The method according to any one of embodiments 36 to 40, wherein the beta-2-microglobulin is from a different species as the FcRn.
43. The method according to any one of embodiments 1 to 42, wherein the FcRn selected from human FcRn, cynomolgus FcRn, mouse FcRn, rat FcRn, sheep FcRn, dog FcRn, pig FcRn, minipig FcRn and rabbit FcRn.
44. The method according to any one of embodiments 1 to 43, wherein the antibody is a monospecific antibody or antibody fragment of fusion polypeptide, or a bispecific antibody or antibody fragment of fusion polypeptide, or a trispecific antibody or antibody fragment of fusion polypeptide, or a tetraspecific antibody or antibody fragment of fusion polypeptide.
45. The method according to any one of embodiments 1 to 44, wherein the antibody is a full length antibody.
46. The antibody according to any one of embodiments 1 to 45, wherein the antibody is a monoclonal antibody.
47. A method for producing an antibody comprising the following steps:
    a) providing a cell comprising one or more nucleic acids encoding an antibody selected with a method according to any one of embodiments 1 to 46,
    b) cultivating the cell in a cultivation medium, and
    c) recovering the antibody from the cell or the cultivation medium and thereby producing the antibody.

REFERENCE LIST

1. Edelman, G. M., Scand. J. Immunol. 34 (1991) 1-22.
2. Reff, M. E. and Heard, C., Crit. Rev. Oncol. Hematol. 40 (2001) 25-35.
3. Waldmann, T. A. and Strober, W., Prog. Allergy 13 (1969) 1-110.
4. Ghetie, V. and Ward, E. S., Annu. Rev. Immunol. 18 (2000) 739-766.
5. Chaudhury, C., et al., J. Exp. Med. 197 (2003) 315-322.
6. Brambell, F. W., et al., Nature 203 (1964) 1352-1354.
7. Brambell, F. W., Proc. Nutr. Soc. 28 (1969) 35-41.
8. Simister, N. E. and Mostov, K. E., Nature 337 (1989) 184-187.
9. Ropeenian, D. C., et al., J. Immunol. 170 (2003) 3528-3533.
10 Kuo, T. T., et al., J. Clin. Immunol. 30 (2010) 777-789.
11. Ropeenian, D. C. and Akilesh, S., Nat. Rev. Immunol. 7 (2007) 715-725.
12. Martin, W. L., et al., Mol. Cell 7 (2001) 867-877.
13. Goebl, N. A., et al., Mol. Biol. Cell 19 (2008) 5490-5505.
14. Kim, J. K., et al., Eur. J. Immunol. 24 (1994) 542-548.
15. Sanchez, L. M., et al., Biochemistry 38 (1999) 9471-9476.
16. Huber, A. H., et al., J. Mol. Biol. 230 (1993) 1077-1083.
17. Ober, R. J., et al., Proc. Natl. Acad. Sci. USA 101 (2004) 11076-11081.
18. Ober, R. J., et al., J. Immunol. 172 (2004) 2021-2029.
19. Akilesh, S., et al., J. Immunol. 179 (2007) 4580-4588.
20. Montoyo, H. P., et al., Proc. Natl. Acad. Sci. USA 106 (2009) 2788-2793.
21. Rodewald, R., J. Cell Biol. 71 (1976) 666-669.
22. Vaccaro, C., et al., Nat. Biotechnol. 23 (2005) 1283-1288.
23 Suzuki, T., et al., J. Immunol. 184 (2010) 1968-1976.
24. Wang, W., et al., Drug Metab Dispos. 39 (2011) 1469-1477.
25. Schlothauer, T., et al., MAbs. 5 (2013) 576-586.
26. Gandhi, M., et al., Semin. Cutan. Med. Surg. 29 (2010) 48-52.
27. Luo, J., et al., J. Mol. Biol. 402 (2010) 797-812.
28. Traczewski, P. and Rudnicka, L., BioDrugs. 26 (2012) 9-20.
29. Zhu, Y., et al., J. Clin. Pharmacol. 49 (2009) 162-175.
30. Lima, X. T., et al. Expert. Opin. Biol. Ther. 9 (2009) 1107-1113.
31 Weger, W., Br. J. Pharmacol. 160 (2010) 810-820.
32. Israelachvili, J. N., Intermolecular and Surface Forces, Academic Press Inc. (1985).
33. Petkova, S. B., et al., Int. Immunol. 18 (2006) 1759-1769.
34 Dall'Acqua, W. F., et al., J. Biol. Chem. 281 (2006) 23514-23524.

35. Khawli, L. A., et al., Cancer Biother. Radiopharm. 17 (2002) 359-370.
36. Putnam, W. S., et al., Trends Biotechnol. 28 (2010) 509-516.
37 Igawa, T., et al., Protein Eng. Des. Sel. 23 (2010) 385-392.
38. Boswell, C. A., et al., Bioconjug. Chem. 21 (2010) 2153-2163.
39 Ropeenian, D. C., et al., Methods Mol. Biol. 602 (2010) 93-104.
40. Prabhat, P., et al., Proc. Natl. Acad. Sci. USA 104 (2007) 5889-5894.
41. Faber, C., et al., Immunotechnology. 3 (1998) 253-270.
42. Li, L., et al., BMC. Biophys. 5 (2012) 9.
43. Shields, R. L., et al., J. Biol. Chem. 276 (2001) 6591-6604.
44. Hess, B., et al., J. Chem. Theory Comput. 4 (2008) 435-447.
45. Kortkhonjia, E., et al., MAbs. 5 (2013) 306-322.
46. Jorgensen, W. L., et al., J. Am. Chem. Soc. 118 (1996) 11225-11236.
47. Zalevsky, J., et al., Nat. Biotechnol. 28 (2010) 157-159.
48 Li, B., et al. (mAbs 6 (2014) 1255-1264).
49 Sampei, Z., et al. (PLOS One 8 (2013) e57479.
50 Benson, J. M., et al., mAbs 3 (2011) 535-545.
51. Ding, C., et al., Curr. Opin. Investig. Drugs 9 (2008) 515-522.
52. Weber, J., and Keam, S. J., BioDrugs. 23 (2009) 53-61.

The following examples, figures and sequences are provided to aid the understanding of the present invention, the true scope of which is set forth in the appended claims. It is understood that modifications can be made in the procedures set forth without departing from the spirit of the invention.

MATERIALS AND METHODS

Antibodies

The antibodies used in the experiments were Ustekinumab (CNTO 1275, Stelara™), CAS Registry Number 815610-63-0, variable domains in SEQ ID NO: 42 and 43), Briakinumab (ABT 874, J 695, Ozespa™, variable domains in SEQ ID NO: 40 and 41) as well as ten variants and mutants of Ustekinumab and Briakinumab, hereafter referred to as mAb 1 to mAb 10, respectively. In total 12 IgGs were investigated (see Table 2).

Synthetic genes were produced for Ustekinumab, Briakinumab, mAb 5 and mAb 6 at Geneart (Life technologies GmbH, Carlsbad, CA, USA). Site-directed mutagenesis was used to exchange specific amino acids to produce mAb 1, mAb 2, mAb 7, mAb 8 and mAb 9. MAb 3 was transfected with plasmids encoding Ustekinumab heavy chains and Briakinumab light chains and mAb 4 vice versa.

The monoclonal antibodies used herein were transiently expressed in HEK293 cells (see below) and purification was performed by protein A chromatography using standard procedures (see below).

The biochemical characterization included size exclusion chromatography (Waters BioSuite™ 250 7.8×300 mm, eluent: 200 mM $KH_2PO_4$, 250 mM KCl, pH 7.0) and analysis of the molecular weight distribution using the BioAnalyzer 2100 (Agilent technologies, Santa Clara, CA, USA).

Fc fragments were obtained by IdeS digestion of antibodies within 30 minutes at 37° C. using the FabRICATOR-Kit (GENOVIS, Lund, Sweden).

Expression Plasmids

For the expression of the above described antibodies, variants of expression plasmids for transient expression (e.g. in HEK293-F) cells based either on a cDNA organization with or without a CMV-Intron A promoter or on a genomic organization with a CMV promoter were applied.

Beside the antibody expression cassette the plasmids contained:

- an origin of replication which allows replication of this plasmid in *E. coli,*
- a ß-lactamase gene which confers ampicillin resistance in *E. coli*., and
- the dihydrofolate reductase gene from *Mus musculus* as a selectable marker in eukaryotic cells.

The transcription unit of the antibody gene was composed of the following elements:

- unique restriction site(s) at the 5' end
- the immediate early enhancer and promoter from the human cytomegalovirus,
- followed by the Intron A sequence in the case of the cDNA organization,
- a 5'-untranslated region of a human antibody gene,
- an immunoglobulin heavy chain signal sequence,
- the human antibody chain either as cDNA or as genomic organization with
- the immunoglobulin exon-intron organization
- a 3' non-translated region with a polyadenylation signal sequence, and
- unique restriction site(s) at the 3' end.

The fusion genes comprising the antibody chains were generated by PCR and/or gene synthesis and assembled by known recombinant methods and techniques by connection of the according nucleic acid segments e.g. using unique restriction sites in the respective plasmids. The subcloned nucleic acid sequences were verified by DNA sequencing. For transient transfections larger quantities of the plasmids were prepared by plasmid preparation from transformed *E. coli* cultures (Nucleobond AX, Macherey-Nagel).

Cell Culture Techniques

Standard cell culture techniques were used as described in Current Protocols in Cell Biology (2000), Bonifacino, J. S., Dasso, M., Harford, J. B., Lippincott-Schwartz, J. and Yamada, K. M. (eds.), John Wiley & Sons, Inc.

Transient Transfections in HEK293-F System

The antibodies were generated by transient transfection with the respective plasmids (e.g. encoding the heavy chain, as well as the corresponding light chain) using the HEK293-F system (Invitrogen) according to the manufacturer's instruction. Briefly, HEK293-F cells (Invitrogen) growing in suspension either in a shake flask or in a stirred fermenter in serum-free FreeStyle™ 293 expression medium (Invitrogen) were transfected with a mix of the respective expression plasmids and 293Fectin™ or fectin (Invitrogen). For 2 L shake flask (Corning) HEK293-F cells were seeded at a density of $1*10^6$ cells/mL in 600 mL and incubated at 120 rpm, 8% $CO_2$. The day after the cells were transfected at a cell density of ca. $1.5*10^6$ cells/mL with ca. 42 mL mix of A) 20 mL Opti-MEM (Invitrogen) with 600 μg total plasmid DNA (1 μg/mL) encoding the heavy chain, respectively and the corresponding light chain in an equimolar ratio and B) 20 ml Opti-MEM+1.2 mL 293 fectin or fectin (2 μL/mL). According to the glucose consumption glucose solution was added during the course of the fermentation. The supernatant containing the secreted antibody was harvested after 5-10 days and antibodies were either directly purified from the supernatant or the supernatant was frozen and stored.

Purification

The antibodies were purified from cell culture supernatants by affinity chromatography using MabSelectSure-Sepharose™ (GE Healthcare, Sweden), hydrophobic interaction chromatography using butyl-Sepharose (GE Healthcare, Sweden) and Superdex 200 size exclusion (GE Healthcare, Sweden) chromatography.

Briefly, sterile filtered cell culture supernatants were captured on a MabSelectSuRe resin equilibrated with PBS buffer (10 mM $Na_2HPO_4$, 1 mM $KH_2PO_4$, 137 mM NaCl and 2.7 mM KCl, pH 7.4), washed with equilibration buffer and eluted with 25 mM sodium citrate at pH 3.0. The eluted antibody fractions were pooled and neutralized with 2 M Tris, pH 9.0. The antibody pools were prepared for hydrophobic interaction chromatography by adding 1.6 M ammonium sulfate solution to a final concentration of 0.8 M ammonium sulfate and the pH adjusted to pH 5.0 using acetic acid. After equilibration of the butyl-Sepharose resin with 35 mM sodium acetate, 0.8 M ammonium sulfate, pH 5.0, the antibodies were applied to the resin, washed with equilibration buffer and eluted with a linear gradient to 35 mM sodium acetate pH 5.0. The antibody containing fractions were pooled and further purified by size exclusion chromatography using a Superdex 200 26/60 GL (GE Healthcare, Sweden) column equilibrated with 20 mM histidine, 140 mM NaCl, pH 6.0. The antibody containing fractions were pooled, concentrated to the required concentration using Vivaspin ultrafiltration devices (Sartorius Stedim Biotech S.A., France) and stored at −80° C.

TABLE 10

Yield of the antibodies.

| sample | final purified product amount [mg] | final purified product concentration [mg/mL] |
|---|---|---|
| Briakinumab | 23.50 | 2.36 |
| Ustekinumab | 12.55 | 2.67 |
| mAb 1 | 6.96 | 2.32 |
| mAb 2 | 1.89 | 1.66 |
| mAb 3 | 4.26 | 2.14 |
| mAb 4 | 3.50 | 2.1 |
| mAb 5 | 13.64 | 3.03 |
| mAb 6 | 2.04 | 0.4 |
| mAb 7 | 11.60 | 2.9 |
| mAb 8 | 23.25 | 3.1 |
| mAb 9 | 16.80 | 3.15 |
| mAb 10 | 33.00 | 4.08 |

Purity and antibody integrity were analyzed after each purification step by CE-SDS using microfluidic Labchip technology (Caliper Life Science, USA). Five μl of protein solution was prepared for CE-SDS analysis using the HT Protein Express Reagent Kit according manufacturer's instructions and analyzed on LabChip GXII system using a HT Protein Express Chip. Data were analyzed using LabChip GX Software.

TABLE 11

Overview biochemical characterization of all mAbs. The concentration is given as the average of 3 measurements. Monomer contents are determined by integration of the SEC chromatogram. Purity of antibody species is determined by CE-SDS of the intact mAbs and after DTT-reduction. The hydrophobicity is presented relative to low and high hydrophobic RS.

| | | SEC [%] | CE-SDS [%] | | | hydro- |
|---|---|---|---|---|---|---|
| sample | conc. [mg/mL] | Monomer content | Intact mAb | HC | LC | phobicity [%] |
| Briakinumab | 2.36 | 99.9 | 92 | 67 | 33 | 7 |
| Ustekinumab | 2.67 | 99.0 | 84 | 64 | 32 | −1 |
| mAb 1 | 2.32 | 99.4 | 74 | 66 | 31 | −6 |
| mAb 2 | 1.66 | 98.1 | 91 | 64 | 32 | 8 |
| mAb 3 | 2.14 | 99.3 | 80 | 66 | 28 | 8 |
| mAb 4 | 2.10 | 99.8 | 82 | 64 | 32 | −4 |
| mAb 5 | 3.03 | 99.5 | 90 | 70 | 30 | 13 |
| mAb 6 | 0.40 | 97.1 | 95 | 66 | 32 | 12 |
| mAb 7 | 2.90 | 97.2 | 85 | 65 | 33 | 13 |
| mAb 8 | 3.10 | 98.9 | 85 | 64 | 34 | 24 |
| mAb 9 | 3.15 | 99.1 | 80 | 70 | 29 | 16 |
| mAb 10 | 4.08 | 98.6 | 88 | 70 | 28 | 34 |

Functional Characterization

The functional characterization includes analysis of the interaction with the target (human IL-12) to test if Briakinumab and Ustekinumab were produced correctly and the target binding is still functional. The mAb variants were modified in the Fab region and it is tested if these modifications alter the target binding. Furthermore the interaction of the antibodies used in the mouse PK study with mouse IL-12/-23 are analyzed to exclude target-mediated clearance effects in the mouse study. In addition binding levels to mouse Fcγ receptor I (muFcγRI) are measured because stronger binding to mouse FcγRI could lead to a faster decrease in a PK study due to faster uptake into antigen presenting cells.

Interaction with Human IL-12

Briakinumab, Ustekinumab and the variants have structural differences in the Fab region that can influence IL-12 binding, therefore the results of all mAbs are presented in detail.

ELISA

Figure 15:
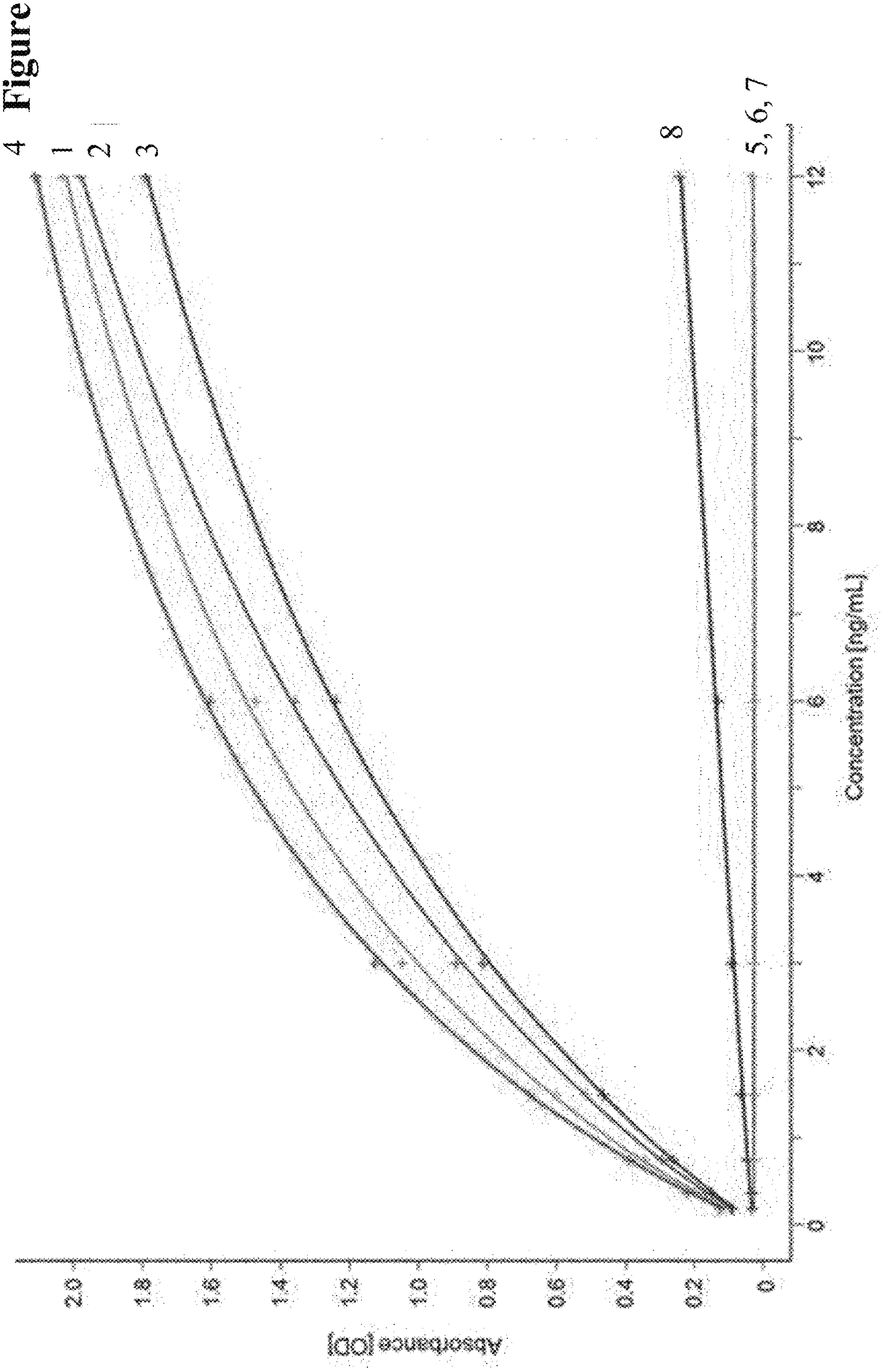
FIG. 15 IL-12 interaction of Briakinumab, Ustekinumab and mAb 1-6; 1: Briakinumab, 2: Ustekinumab, 3: mAb 1, 4: mAb 2, 5: mAb 3, 6: mAb 4, 7: mAb 5, 8: mAb 6.
Figure 16:
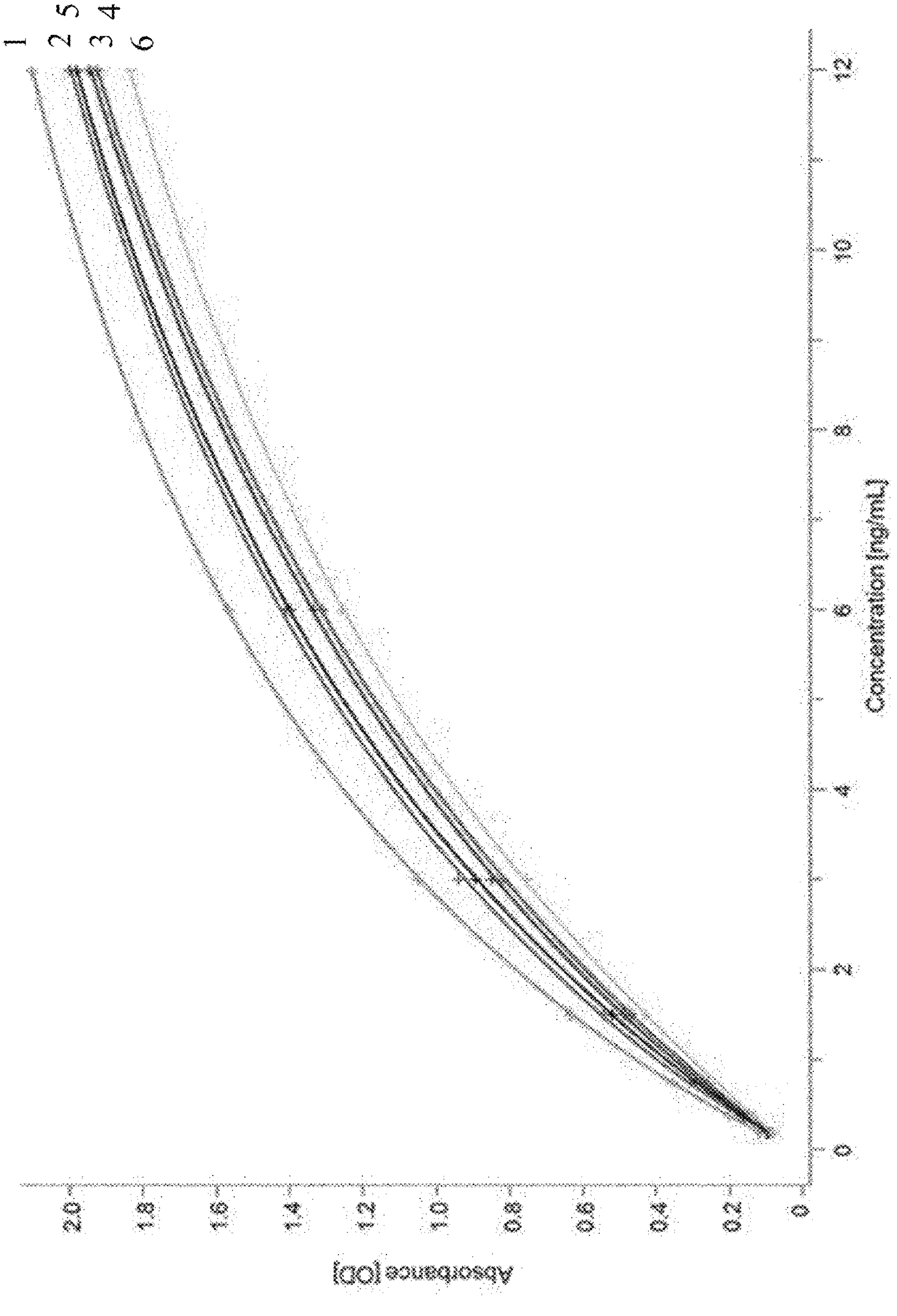
FIG. 16 IL-12 interaction of Briakinumab, Ustekinumab and mAb 7-10; 1: Briakinumab, 2: Ustekinumab, 3: mAb 7, 4: mAb 8, 5: mAb 9, 6: mAb 10.

The absorbance-concentration curves of the variants with cross-over exchanges (mAb 1-6) and with modified charge distribution (mAb 7-10) are shown in FIGS. 15 and 16, respectively. The concentration of each mAb was calculated using the fit of the Briakinumab calibration curve to obtain IL-12 binding relative to Briakinumab (Briakinumab=100%). Binding differences of ≤30% were assessed to show similar binding to IL-12 as Briakinumab, differences of ≥30% indicate reduced binding to IL-12. Briakinumab, Ustekinumab and mAbs with exchanged Fv domains (mAb 1 and mAb 2) show similar IL-12 binding profiles. The binding of Briakinumab, Ustekinumab and mAb 2 ranges in a 20% window, mAb 3 in a 30% window. MAbs with exchanged LCs (mAb 3 and mAb 4) and mAbs with exchanged CDRs (mAb 5 and mAb 6) do not bind to IL-12.

Briakinumab variants with modified charge distribution (mAb 7-9) bind IL-12 in a range of 30% relative to Briakinumab indicating similar IL-12 binding. Only mAb 10 shows reduced IL-12 binding with 63% binding compared to Briakinumab.

Surface Plasmon Resonance

SPR was used to confirm the results of the target specific ELISA. Ustekinumab and Briakinumab have nearly identical association rate constant ($k_a$) ($k_a$ (Briakinumab) $8*10^5$ 1/Ms vs. $k_a$ (Ustekinumab) $9*10^5$ 1/Ms). The dissociation of IL-12 and the mAbs is very slow, therefore calculation of the dissociation rate constant ($k_d$) and subsequently of the equilibrium dissociation constant ($K_D$) may differ from the actual values. Despite the limitation of the method in this setting, the calculated values can give a general evaluation and can be used to confirm the ELISA results. Briakinumab and Ustekinumab bind IL-12 with high affinity and the $K_D$ is in a low nM-range ($K_D$ (Briakinumab)=0.2 nM vs. $K_D$ (Ustekinumab)=0.07 nM). The measured affinity of Briakinumab with $k_a$, $k_d$ and $K_D$ values of $8*10^5$ 1/Ms, $6*10^{-5}$ 1/s and 70 pM, respectively, are in agreement with literature data ($k_a$ $5*10^5$ 1/s, $k_d$ $5.1*10^{-5}$ 1/s, $K_D$=100 pM) ([51]). The high affinity of Ustekinumab to IL-12 is also described in literature ([52]).

Table 12 summarizes the calculated kinetic parameters of the target interaction. Monoclonal antibodies with exchanged Fv domains (mAb 1 and mAb 2) and mAbs with modified charge distributions (mAb 7-10) have affinities to IL-12 similar to Briakinumab and Ustekinumab. MAb 3 and mAb 5 do not bind to IL-12 and mAb 4 and mAb 6 show very weak binding to IL-12. The data is in agreement with the ELISA results.

TABLE 12

SPR parameters of mAbs and IL-12. $K_D$, $k_a$ and $k_d$ were calculated using steady state affinity.

| sample | $k_a$ [1/Ms] | $k_d$ [1/s] | $K_D$ [nM] |
| --- | --- | --- | --- |
| Ustekinumab | $9*10^5$ | $1.8*10^{-4}$ | 0.20 |
| Briakinumab | $8*10^5$ | $6*10^{-5}$ | 0.07 |
| mAb 1 | $1.7*10^6$ | $4.1*10^{-4}$ | 0.24 |
| mAb 2 | $1.2*10^6$ | $3*10^{-4}$ | 0.25 |
| mAb 3 | no binding | no binding | no binding |
| mAb 4 | $1.2*10^7$ | 2.3 | 191 |
| mAb 5 | no binding | no binding | no binding |
| mAb 6 | $2*10^6$ | $1.9*10^{-2}$ | 9.62 |
| mAb 7 | $1*10^6$ | $7.9*10^{-5}$ | 0.08 |
| mAb 8 | $1.2*10^6$ | $9.1*10^{-5}$ | 0.07 |
| mAb 9 | $8.8*10^6$ | $1.3*10^{-4}$ | 0.01 |
| mAb 10 | $1.4*10^7$ | $1.3*10^{-4}$ | 0.01 |

FcRn-mAb Affinity at pH 6.0

The $K_D$ was calculated relative to Ustekinumab (Ustekinumab=1.0). For evaluation of the $K_D$ values, the affinity of the mAbs and FcRn was assessed to be similar to the Ustekinumab-FcRn affinity if differences were smaller than one decimal power to the Ustekinumab-FcRn $K_D$. $K_D$s were assessed to be different if $K_D$ differences were bigger than one decimal power to the Ustekinumab-FcRn $K_D$. The FcRn affinities at pH 6.0 fell in a narrow range for all mAbs. Briakinumab had a relative $K_D$ of 0.2 and the variants ranged between Briakinumab and Ustekinumab except for mAb 10 that had a relative $K_D$ of 1.1.

TABLE 13

Relative $K_D$s of all mAbs to FcRn.
Relative $K_D$ values (Ustekinumab = 1)
are presented as the mean
(n = 3) ± standard deviation.

| Sample | rel. $K_D$ |
| --- | --- |
| Ustekinumab | 1 |
| Briakinumab | 0.2 ± 0.07 |
| mAb 1 | 1.0 ± 0.22 |
| mAb 2 | 0.3 ± 0.19 |

TABLE 13-continued

Relative $K_D$s of all mAbs to FcRn.
Relative $K_D$ values (Ustekinumab = 1)
are presented as the mean
(n = 3) ± standard deviation.

| Sample | rel. $K_D$ |
| --- | --- |
| mAb 3 | 0.2 ± 0.06 |
| mAb 4 | 0.5 ± 0.08 |
| mAb 5 | 0.9 ± 0.16 |
| mAb 6 | 0.4 ± 0.17 |
| mAb 7 | 0.2 ± 0.03 |
| mAb 8 | 0.4 ± 0.07 |
| mAb 9 | 0.4 ± 0.04 |
| mAb 10 | 1.1 ± 0.09 |

FcRn-mAb Dissociation

The dissociation of FcRn and the mAbs was analyzed by SPR and FcRn affinity chromatography.

FcRn-mAb Dissociation Using SPR

For evaluation of the $K_D$ values, $K_D$ values below 1 μM were assessed to show moderate affinity, between 1-5 M to show weak affinity and above 5 M to show no binding to FcRn. Briakinumab and Ustekinumab showed similar affinities at pH 6.0. Ustekinumab showed very weak affinity at pH 6.6 and no affinity at pH 6.8. In contrast, Briakinumab showed a moderate affinity up to pH 6.8, weak affinity at pH 7.0 and no binding at pH 7.2.

TABLE 14

$K_D$ of Briakinumab and Ustekinumab
to FcRn. $K_D$s were calculated using
buffers with increasing pH
values. KD values higher than
5 μM were classified as no binding.

| | Briakinumab $K_D$ [μM] | Ustekinumab $K_D$ [μM] |
| --- | --- | --- |
| pH 6.0 | 0.09 | 0.39 |
| pH 6.4 | 0.10 | 1.00 |
| pH 6.6 | 0.36 | 3.10 |
| pH 6.8 | 0.60 | no binding |
| pH 7.0 | 4.20 | no binding |
| pH 7.2 | no binding | no binding |

The biochemical characterization of all antibodies showed no striking differences between Briakinumab, Ustekinumab and the variants.

Generation of Antibody Fragments

The F(ab')$_2$ fragment and the Fc-region fragment were prepared by incubation for 30 min. at 37° C. using the FabRICATOR-Kit (GENOVIS, Lund, Sweden). The resulting cleavage products F(ab')$_2$ and Fc-region were separated on a size exclusion chromatography (SEC) column (Superdex 200, GE Healthcare, Zurich, Switzerland) using an ÄKTA Explorer chromatography system (GE Healthcare, Uppsala, Sweden) and the peak fractions were pooled. Molecular weight standards on the same column served to identify the two cleavage products based on their retention times.

FcRn Surface Plasmon Resonance (SPR) Analysis

The binding properties of the antibodies to FcRn were analyzed by surface plasmon resonance (SPR) technology using a BIAcore T100 instrument (BIAcore AB, Uppsala, Sweden). This system is well established for the study of molecular interactions. It allows a continuous real-time monitoring of ligand/analyte bindings and thus the determination of kinetic parameters in various assay settings. SPR-technology is based on the measurement of the refractive index close to the surface of a gold coated biosensor chip. Changes in the refractive index indicate mass changes on the surface caused by the interaction of immobilized ligand with analyte injected in solution. If molecules bind to an immobilized ligand on the surface the mass increases, in case of dissociation the mass decreases. In the current assay, the FcRn receptor was immobilized onto a BIAcore CM5-biosensor chip (GE Healthcare Bioscience, Uppsala, Sweden) via amine coupling to a level of 400 Response units (RU). The assay was carried out at room temperature with PBS, 0.05% Tween20 pH 6.0 (GE Healthcare Bioscience) as running and dilution buffer. 200 nM of native or oxidized antibody samples were injected at a flow rate of 50 μL/min at room temperature. Association time was 180 s, dissociation phase took 360 s. Regeneration of the chip surface was reached by a short injection of HBS-P, pH 8.0. Evaluation of SPR-data was performed by comparison of the biological response signal height at 180 s after injection and at 300 s after injection. The corresponding parameters are the RU max level (180 s after injection) and late stability (300 s after end of injection).

The steady state binding levels and the equilibrium dissociation constants ($K_D$) for huFcRn and the IgGs were determined at pH 6.0 using a BIAcore T100 SPR instrument (GE Healthcare, Little Chalfont, United Kingdom). Human FcRn was immobilized on a BIAcore CM5-biosensor chip (GE Healthcare Bioscience) via amine-coupling to a level of 50 response units (RU). For mAb 5 and mAb 6, a CM4-biosensor chip was used. The assay was performed using PBS with 0.05% Tween20 (both from Roche Diagnostics, Mannheim, Germany) adjusted to pH 6.0 as running and dilution buffer at room temperature. A concentration series of the samples was prepared in a range of 1500 nM to 23 nM and each sample was injected at a flow rate of 5 L/min. Association and dissociation times of 600 and 360 seconds were used, respectively. The chip was regenerated by injection of PBS containing 0.05% Tween20 at pH 7.5. The equilibrium dissociation constant $K_D$ was calculated as steady state affinity and normalized to the $K_D$ of Ustekinumab.

Mice

B6.Cg-Fcgrt$^{tm1Dcr}$ Tg (FCGRT)276Dcr mice deficient in mouse FcRn α-chain gene, but hemizygous transgenic for a human FcRn α-chain gene (muFcRn−/−huFcRn tg+/−, line 276) were used for the pharmacokinetic studies [39]. Mouse husbandry was carried out under specific pathogen free conditions. Mice were obtained from the Jackson Laboratory (Bar Harbor, ME, USA) (female, age 4-10 weeks, weight 17-22 g at time of dosing). All animal experiments were approved by the Government of Upper Bavaria, Germany (permit number 55.2-1-54-2532.2-28-10) and performed in an AAALAC accredited animal facility according to the European Union Normative for Care and Use of Experimental Animals. The animals were housed in standard cages and had free access to food and water during the whole study period.

Pharmacokinetic Studies

A single dose of antibody was injected i.v. via the lateral tail vein at a dose level of 10 mg/kg. The mice were divided into 3 groups of 6 mice each to cover 9 serum collection time points in total (at 0.08, 2, 8, 24, 48, 168, 336, 504 and 672 hours post dose). Each mouse was subjected twice to retro-orbital bleeding, performed under light anesthesia with Isoflurane™ (CP-Pharma GmbH, Burgdorf, Germany); a third blood sample was collected at the time of euthanasia. Blood was collected into serum tubes (Microvette 500Z-Gel, Sarstedt, Nümbrecht, Germany). After 2 h incubation, samples were centrifuged for 3 min at 9.300 g to obtain serum. After centrifugation, serum samples were stored frozen at −20° C. until analysis.

Determination of Human Antibody Serum Concentrations

Concentrations of Ustekinumab, Briakinumab, mAb 8 and mAb 9 in murine serum were determined by specific enzyme-linked immunoassays. Biotinylated Interleukin 12 specific to the antibodies and digoxigenin-labeled anti-human-Fc mouse monoclonal antibody (Roche Diagnostics, Penzberg, Germany) were used for capturing and detection, respectively. Streptavidin-coated microtiter plates (Roche Diagnostics, Penzberg, Germany) were coated with biotinylated capture antibody diluted in assay buffer (Roche Diagnostics, Penzberg, Germany) for 1 h. After washing, serum samples were added at various dilutions followed by another incubation step for 1 h. After repeated washings, bound human antibodies were detected by subsequent incubation with detection antibody, followed by an anti-digoxigenin antibody conjugated to horseradish peroxidase (HRP; Roche Diagnostics, Penzberg, Germany). ABTS (2,2' Azino-di [3-ethylbenzthiazoline sulfonate]; Roche Diagnostics, Germany) was used as HRP substrate to form a colored reaction product. Absorbance of the resulting reaction product was read at 405 nm with a reference wavelength at 490 nm using a Tecan sunrise plate reader (Männedorf, Switzerland).

All serum samples, positive and negative control samples were analyzed in duplicates and calibrated against reference standard.

Pk Analysis

The pharmacokinetic parameters were calculated by non-compartmental analysis using WinNonlin™ 1.1.1 (Pharsight, CA, USA).

Briefly, area under the curve ($AUC_{0\text{-}inf}$) values were calculated by logarithmic trapezoidal method due to non-linear decrease of the antibodies and extrapolated to infinity using the apparent terminal rate constant λz, with extrapolation from the observed concentration at the last time point.

Plasma clearance was calculated as Dose rate (D) divided by $AUC_{0\text{-}inf}$. The apparent terminal half-life (T½) was derived from the equation T½=ln 2/λz.

Statistical Analysis

Outlying serum concentrations were detected using the Nalimov outlier test and were excluded from further analysis.

The Tukey's honest significant test (Tukey's HSD test) was used as statistical test for analysis of statistically significant differences in the terminal half-life.

Calculation of pH-Dependent Net Charge pH dependent net charge ("titration curves") were calculated with the open-source program EMBOSS iep assuming all cysteines involved in disulfide bridges.

Generation of the Briakinumab Homology Model and Calculation of Isopotential Surfaces A homology model for the Briakinumab Fab fragment was generated using modeller 9v7 using PDB structure 1AQK as a template. The isopotential surfaces for Briakinumab and Ustekinumab Fabs were calculated from this model (Briakinumab) or the crystal structure of Ustekinumab (PDB ID 3HMX), respectively. Structures were protonated using the "prepare protein" protocol with CHARMm force field in Discovery Studio Pro, Version 3.5 (Accelrys Inc., San Diego, USA) at pH 7.4 and an ionic strength of 0.145 M. The electrostatic potential was calculated with the "electrostatic potential" protocol in Discovery Studio Pro, which invokes the DelPhi program [42].

Molecular Dynamics Simulation of Briakinumab and Ustekinumab-FcRn Complexes

Homology models of Briakinumab and Ustekinumab as complete IgGs were built using DiscoveryStudio Pro, Version 3.5 with the crystal structure of a complete IgG1 (PDB ID 1HZH) without glycans as a template. This simplification was considered appropriate because in-vitro, glycosylation does not have a significant effect on FcRn binding [43]. The Fab domains in this template were replaced by the Fab structures described above after alignment of their $C_H1$ and $C_L$ domains. A homology model of human FcRn was built with Discovery Studio Pro using the rat FcRn-Fc complex (PDB ID 1I1A) as a template. Missing residues were built with the "prepare protein" script of DiscoveryStudio Pro. The homology model of the human FcRn was modeled to both heavy chains of the Briakinumab and Ustekinumab IgG models by superimposing the C-alpha atoms of the rat Fc domains within 5 Å around the FcRn with their homologous counterparts on the human Fc-region. For the MD simulation, a disulfide bond in the FcRn: Fc interface (between residue 108 in FcRn and residue 255 in Fc, Figure S1) was introduced to prevent dissociation of the complex during the time of simulation. The resulting structures represent a complete IgG bearing two copies of the FcRn/β2 mg heterodimer.

Molecular dynamics (MD) simulations of the IgG-FcRn complexes were performed with GROMACS 4.6.2 simulation software package (available at www.gromacs.org) [44], essentially as described by Kortkhonjia et al. [45]. The simulations were performed in parallel on 160 processors of a computer cluster running the Linux operating system. The OPLSAA force field was used and the structures were fully solvated with approx. 128'000 TIP3 water molecules. Chloride or sodium atoms were added to neutralize the overall charge of the system. A truncated octahedron with periodic boundary conditions was used with a 7.5 Angstrom border around the protein. Electrostatic interactions were calculated using PME summation with real-space electrostatic cut-off of 1.0 nm. The Lennard-Jones potential was cut off at 1.0 nm. LINCS was used to constrain all protein bond lengths, allowing a time-step of 2 fs. The temperature was kept constant at 300 K using the V-rescale algorithm. Following energy minimization (target: maximum force <1000 KJ/mol/nm), a 30 ps equilibration was performed before a trajectory was simulated over a length of 100 ns.

Calculation of the IgG-FcRn Interaction Energy

The electrostatic contribution to the non-bonded interactions between the FcRn and the Fab domain which approaches the FcRn in the MD trajectory was calculated with Discovery Studio Pro. For the energy calculation, the protein was protonated at pH 7.4, an ionic strength of 145 mM and a temperature of 37° C. with same settings as described above. Structures were minimized with a maximum of 1000 steps of the "smart minimizer" protocol before interaction energies were calculated using the "calculate interaction energy" protocol with the CHARMm force field in DiscoveryStudio Pro. Implicit waters and the GBMV electrostatics model were used. This calculation was performed at the beginning of the trajectory (0 ns) and at 96 to 100 ns in 1 ns intervals.

EXAMPLE 1

Preparation of FcRn Affinity Column

Expression of FcRn in HEK293 Cells

FcRn was transiently expressed by transfection of HEK293 cells with two plasmids containing the coding sequence of FcRn and of beta-2-microglobulin. The transfected cells were cultured in shaker flasks at 36.5° C., 120 rpm (shaker amplitude 5 cm), 80% humidity and 7% $CO_2$. The cells were diluted every 2-3 days to a density of 3 to $4*10^5$ cells/ml.

For transient expression, a 14 l stainless steel bioreactor was started with a culture volume of 8 l at 36.5° C., pH 7.0±0.2, $pO_2$ 35% (gassing with $N_2$ and air, total gas flow 200 ml $min^{-1}$) and a stirrer speed of 100-400 rpm. When the cell density reached $20*10^5$ cells/ml, 10 mg plasmid DNA (equimolar amounts of both plasmids) was diluted in 400 ml Opti-MEM (Invitrogen). 20 ml of 293fectin (Invitrogen) was added to this mixture, which was then incubated for 15 minutes at room temperature and subsequently transferred into the fermenter. From the next day on, the cells were supplied with nutrients in continuous mode: a feed solution was added at a rate of 500 ml per day and glucose as needed to keep the level above 2 g/l. The supernatant was harvested 7 days after transfection using a swing head centrifuge with 1 l buckets: 4000 rpm for 90 minutes. The supernatant (13 L) was cleared by a Sartobran P filter (0.45 μm+0.2 μm, Sartorius) and the FcRn beta-2-microglobulin complex was purified therefrom.

Biotinylation of Neonatal Fc Receptor 3 mg FcRn were solved/diluted in 5.3 mL 20 mM sodium dihydrogenphosphate buffer containing 150 mM sodium chloride and added to 250 μl PBS and 1 tablet complete protease inhibitor (complete ULTRA Tablets, Roche Diagnostics GmbH). FcRn was biotinylated using the biotinylation kit from Avidity according to the manufacturer instructions (Bulk BIRA, Avidity LLC). The biotinylation reaction was done at room temperature overnight.

The biotinylated FcRn was dialyzed against 20 mM sodium dihydrogen phosphate buffer comprising 150 mM NaCl, pH 7.5 at 4° C. overnight to remove excess of biotin.

Coupling to Streptavidin Sepharose

For coupling to streptavidin sepharose, one gram streptavidin sepharose (GE Healthcare, United Kingdom) was added to the biotinylated and dialyzed FcRn and incubated at 4° C. overnight. The FcRn derivatized sepharose was filled in a 1 ml XK column (GE Healthcare, United Kingdom) and the FcRn column then was equilibrated with 20 mM 2-(N-morpholine)-ethanesulfonic acid (MES) sodium salt buffer containing 140 mM sodium chloride, pH 5.5.

EXAMPLE 2

Chromatography Using the FcRn Affinity Column and pH Gradient

The receptor derivatized sepharose was filled in a 1 ml XK column (GE Healthcare) and the FcRn column then was equilibrated with 20 mM 2-(N-morpholine)-ethanesulfonic acid (MES) buffer containing 140 mM NaCl, pH 5.5.

Conditions:

- column dimensions: 50 mm×5 mm
- bed height: 5 cm
- loading: 30 μg sample
- equilibration buffer: 20 mM MES, with 140 mM NaCl, adjusted to pH 5.5
- elution buffer: 20 mM Tris/HCl, with 140 mM NaCl, adjusted to pH 8.8
- elution: 7.5 CV equilibration buffer, in 120 min. to 100% elution buffer, 10 CV elution buffer The samples were prepared in 20 mM 2-(N-morpholine)-ethanesulfonic acid (MES) sodium salt, 140 mM sodium chloride, pH 5.5. Each sample contained 30 μg mAb per injection. Antibodies were eluted by a linear pH gradient from pH 5.5 to 8.8 within 120 minutes using 20 mM 2-(N-morpholine)-ethanesulfonic acid (MES) sodium salt, 140 mM sodium chloride, pH 5.5 and 20 mM tris(hydroxymethyl) aminomethane TRIS, 140 mM sodium chloride, pH 8.8 as eluents and a flow rate of 0.5 ml/min. FcRn column chromatography shows binding at acidic pH (pH 5.5-6.0) and release at higher pH values. For complete elution of the antibodies, the pH is increased in the gradient up to pH 8.8.

The chromatograms were integrated manually by using the Chromeleon software (Dionex, Germany). The experiments were performed at room temperature. The elution profile was obtained by continuous measurement of the absorbance at 280 nm. To determine the elution pH at particular retention times, samples were collected every 5 minutes and the pH was measured offline.

EXAMPLE 3

Chromatography Using the FcRn Affinity Column, pH Gradient and High Salt Conditions The receptor derivatized sepharose was filled in a 1 ml XK column (GE Healthcare) and the FcRn column then was equilibrated with 20 mM 2-(N-morpholine)-ethanesulfonic acid (MES) buffer containing 400 mM NaCl, pH 5.5.

Conditions:

- column dimensions: 50 mm×5 mm
- bed height: 5 cm
- loading: 30 μg sample
- equilibration buffer: 20 mM MES, with 400 mM NaCl, adjusted to pH 5.5
- elution buffer: 20 mM Tris/HCl, with 400 mM NaCl, adjusted to pH 8.8
- elution: 7.5 CV equilibration buffer, in 120 min. to 100% elution buffer, 10 CV elution buffer The samples were prepared in 20 mM 2-(N-morpholine)-ethanesulfonic acid (MES) sodium salt, 400 mM sodium chloride, pH 5.5. Each sample contained 30 μg mAb per injection. Antibodies were eluted by a linear pH gradient from pH 5.5 to 8.8 within 120 minutes using 20 mM 2-(N-morpholine)-ethanesulfonic acid (MES) sodium salt, 400 mM sodium chloride, pH 5.5 and 20 mM tris(hydroxymethyl) aminomethane TRIS, 400 mM sodium chloride, pH 8.8 as eluents and a flow rate of 0.5 ml/min. FcRn column chromatography shows binding at acidic pH (pH 5.5-6.0) and release at higher pH values. For complete elution of the antibodies, the pH is increased in the gradient up to pH 8.8. The chromatograms were integrated manually by using the Chromeleon software (Dionex, Germany). The experiments were performed at room temperature. The elution profile was obtained by continuous measurement of the absorbance at 280 nm. To determine the elution pH at particular retention times, samples were collected every 5 minutes and the pH was measured offline.

EXAMPLE 4

Chromatography Using the FcRn Affinity Column and Salt Gradient

The receptor derivatized sepharose was filled in a 1 ml XK column (GE Healthcare) and the FcRn column then was equilibrated with 10 mM 2-(N-morpholine)-ethanesulfonic acid (MES) buffer, pH 7.8.

Conditions:

- column dimensions: 50 mm×5 mm
- bed height: 5 cm
- loading: 30 μg sample
- equilibration buffer: 10 mM MES, adjusted to pH 7.8
- elution buffer: 10 mM MES, with 250 mM NaCl, adjusted to pH 7.8
- elution: 7.5 CV equilibration buffer, in 60 min. to 100% elution buffer, 10 CV elution buffer The samples were prepared in 10 mM 2-(N-morpholine)-ethanesulfonic acid (MES) sodium salt, pH 7.8. Each sample contained 30 μg mAb per injection. Antibodies were eluted by a linear salt gradient from 0 nM to 250 nM sodium chloride within 60 minutes using 10 mM 2-(N-morpholine)-ethanesulfonic acid (MES) sodium salt, pH 7.8 and 10 mM 2-(N-morpholine)-ethanesulfonic acid (MES) sodium salt, 250 mM sodium chloride, pH 7.8 as eluents and a flow rate of 0.5 ml/min. The experiments were performed at room temperature. The elution profile was obtained by continuous measurement of the absorbance at 280 nm. The chromatograms were integrated manually by using the Chromeleon software (Dionex, Germany).

EXAMPLE 5

Chromatography Using the FcRn Affinity Column

The receptor derivatized sepharose was filled in a 1 ml XK column (GE Healthcare) and the FcRn column then was equilibrated with 20 mM 2-(N-morpholine)-ethanesulfonic acid (MES) buffer containing 150 mM NaCl, pH 5.5.

Conditions:

- column dimensions: 50 mm×5 mm
- bed height: 5 cm
- loading: 50 μg sample
- equilibration buffer: 20 mM MES, with 150 mM NaCl, adjusted to pH 5.5
- elution buffer: 20 mM Tris/HCl, with 150 mM NaCl, adjusted to pH 8.8
- elution: 7.5 CV equilibration buffer, in 30 CV to 100% elution buffer, 10 CV elution buffer Antibody or fusion protein samples containing 50 to 100 μg of protein were adjusted to pH 5.5 and applied to the FcRn column using ÄKTA explorer 10 XT or Dionex Summit (Dionex, Idstein, Germany). The column with 5 cm bed height was then washed with 5-10 column volumes of equilibration buffer 20 mM MES, 150 mM NaCl, pH 5.5. The affinity-bound Fc-containing proteins were eluted with a pH gradient to 20 mM Tris/HCl, 150 mM NaCl, pH 8.8, in 30 column volumes. For complete elution of modified antibodies, the pH was increased in the gradient up to pH 8.8. The experiments were carried out at room temperature. The elution profile was obtained by continuous measurement of the absorbance at 280 nm. The time taken for an analyte peak, X, to reach the detector after sample injection was called the retention time.

EXAMPLE 6

Correlation of Retention Time on FcRn Column to In Vivo Half Life

In vivo half-life was measured in human FcRn transgenic C57BL/6J mice after single i.v. administration of 10 mg/kg (n=8) and compared to the retention time on the FcRn column (see Table 15). It was found that antibodies that showed a late elution from the FcRn column had a longer half-life in FcRn transgenic mice.

TABLE 15

| antibody | retention time [min] | in vivo half-life [h] |
|---|---|---|
| anti-Abeta antibody (wild-type) | 45.5 | 103 +/− 51 |
| anti-IGF-1R antibody (wild-type) | 45.5 | 97 +/− 9 |
| anti-IGF-1R antibody (YTE-mutant) | 58 | 211 +/− 41 |

EXAMPLE 7

Purification of Human FcRn, Mouse FcRn and Cynomolgus FcRn

The clarified supernatants containing hexahis-tagged (SEQ ID NO:55) proteins were loaded on a Ni-NTA affinity chromatography resin (Qiagen, Hanbrechtikon, Switzerland) at 4° C. After wash steps with 20 mM sodium phosphate buffer comprising 500 mM NaCl at pH 7.4 and containing 20 mM respectively 100 mM imidazole, proteins were eluted at a flow rate of 2 ml/min using batch elution with the same buffer containing 300 mM imidazole on an ÄKTA Prime chromatography system (Amersham Pharmacia Biotech, Uppsala, Sweden). Fractions were pooled and further purified in sodium phosphate buffer containing 500 mM NaCl on size exclusion chromatography (Superdex™ 200, GE Healthcare, Zurich, Switzerland). Purified proteins were quantified using a Nanodrop spectrophotometer (Nanodrop Technologies, Wilmington, DE) and analyzed by SDS PAGE on NuPAGE 4-12% Bis-Tris gels in MES buffer under denaturing and reducing conditions.

EXAMPLE 8

Mouse and Cynomolgus FcRn Affinity Column Chromatographies

In the following Table 16 retention times of exemplary human antibodies on affinity columns comprising FcRn from Cynomolgus monkey are given. Data were obtained using the following conditions: Elution buffer: 20 mM TRIS/HCl, 150 mM NaCl, pH 8.5. Further description: see Example 2. The term YTE-mutant denotes the triple mutant M252Y/S254T/T256E.

TABLE 16

| antibody | retention time [min] |
|---|---|
| anti-IGF-1R antibody (wild-type) | 51.2 |
| anti-IGF-1R antibody (YTE-mutant) | 63.0 |

In the following Table 17 retention times of exemplary human antibodies on murine FcRn are given. Data were obtained using the following conditions: 1.2 mg receptor coupled on 1 ml Sepharose. Elution buffer: 20 mM TRIS/HCl, 150 mM NaCl, pH 8.5. Further description: see Example 2. The YTE-mutants are not included in this table as they could not have been eluted unless the pH of the elution buffer had been adjusted to 9.5.

TABLE 17

| antibody | retention time [min] |
|---|---|
| anti-IGF-1R antibody (wild-type) | 48.8 |

Cynomolgus FcRn affinity column behaves similar as human FcRn affinity column concerning binding of humanized antibodies. On the other hand binding of humanized antibodies to murine FcRn column is stronger than to human FcRn affinity column as can be seen by later retention.

EXAMPLE 9

Generation of Antibody Fragments

The F(ab')$_2$ fragment and the Fc-region fragment were prepared by cleavage of the full-length antibody 1:1 diluted with 100 mM Tris, pH 8.0, by adding 1 μg IdeS cysteine protease per 50 μg antibody and incubation for 2 h at 37° C. The resulting cleavage products F(ab')$_2$ and Fc were separated on a size exclusion chromatography (SEC) column (Superdex 200, GE Healthcare, Zurich, Switzerland) using an ÄKTA Explorer chromatography system (GE Healthcare, Uppsala, Sweden) and the peak fractions were pooled. Molecular weight standards on the same column served to identify the two cleavage products based on their retention times.

Retention times of full-length antibodies varied notably. In contrast, the retention times of the respective Fc portions of all tested antibodies virtually did not differ from each other (<1%).

When plasmin was used for cleavage of the full-length antibodies, the same findings were obtained (data not shown).

EXAMPLE 10

Pharmacokinetic Study in Human FcRn Mice

All procedures were carried out in accordance with the guidelines of the Association for Assessment and Accreditation of Laboratory Animal Care (www.aaalac.org). The study was authorized by the Regional Council of Oberbayern, Germany.

Male and female C57BL/6J mice (background); mouse FcRn deficient, but hemizygous transgenic for human FcRn (huFcRn (276)-/tg (30, 31) were used throughout the pharmacokinetic study.

At the time of administration, the animals weighed between 17 and 25 g. The respective antibody was given as a single intravenous bolus injection via the tail vein. Due to limited blood volume of mice, three groups of four male and four female animals each were required to cover nine sampling time points, i.e. three sampling time points per animal. Blood samples were taken in group 1 at 5 min, 24 hours and 336 hours, in group 2 at 2 hours, 168 hours and 504 hours and in group 3 at 8 hours, 48 hours and 672 hours after administration. Blood samples of about 100 μL were obtained by retrobulbar puncture and stored at room temperature for 60 min. to allow clotting. Serum samples of at least 40 μL were obtained by centrifugation at 9,300×g at 4° C. for 3 min and immediately frozen and stored at −20° C. until assayed.

Serum concentrations of the human therapeutic antibodies in murine serum were determined by an antigen-captured enzyme linked immunosorbent assay (ELISA) specific for the antigen binding region (Fab) of the administered antibody and its variants. All reagents or samples were incubated at room temperature on a shaker at 400 rpm. Each washing step included three cycles. Briefly, streptavidin-coated microtiter plates were coated with biotinylated antibody diluted in assay buffer. After washing with phosphate-buffered saline-polysorbate 20 (Tween20), serum samples in various dilutions were added and incubated for 1 h. After washing, bound human therapeutic antibodies were detected by subsequent incubation with human Fcγ-specific monoclonal antibody Fab fragments conjugated with digoxigenin that do not cross react with mouse IgG. After washing, an anti-digoxigenin antibody conjugated with horseradish peroxidase (HRP) was added and incubated for 1 h. After washing, ABTS (2,2' Azino-di [3-ethylbenzthiazoline sulfonate; Roche Diagnostics, Germany) was added as HRP substrate to form a colored reaction product. Absorbance of the resulting reaction product was read at 405 nm with a reference wavelength at 490 nm. All serum samples and positive or negative control samples were analyzed in replicates and calibrated against reference standard.

The pharmacokinetic parameters were calculated by non-compartmental analysis, using the pharmacokinetic evaluation program WinNonlin™ (Pharsight, St. Louis, MO, USA), version 5.2.1. Briefly, the area under the concentration/time curve AUC (0-672) was calculated by linear trapezoidal rule (with linear interpolation) from time 0 to infinity. The apparent terminal half-life ($T_{1/2}$) was derived from the equation: $T_{1/2}$=ln 2/λz. Total body clearance (CL) was calculated as dose/AUC. Statistically significant differences in the pharmacokinetic parameters between the wild-type antibody and its variants were determined by ANOVA analysis.

The pharmacokinetic study in C57BL/6J mice deficient for mouse FcRn, but hemizygous transgenic for human FcRn (huFcRn (276)-/tg) showed that the YTE mutation enhanced pharmacokinetics of the antibody. At a level of statistical significance, the YTE mutant had a 1.74-fold higher AUC (0-672), a 1.95-fold slower clearance and a 2.2-fold longer terminal half-life in comparison with wild-type antibody (Table 14).

TABLE 18

Pharmacokinetic parameters for wild-type antibody and its triple mutant YTE obtained by non-compartmental analysis of serum concentrations measured by ELISA after a single i.v. bolus injection of 10 mg/kg to human FcRn transgenic mice. Mean ± SD, n = 8 per group, ANOVA analysis of significance in comparison with wild-type antibody (+++, p <0.001). AUC (0-672), area under the serum concentration-time curve from time 0 to 672 h.

| antibody | AUC (0-672) [h*μg/ml] | clearance [ml/min/kg] | terminal half-life [h] |
|---|---|---|---|
| wild-type antibody | 15.693 ± 1.879 | 0.0107 ± 0.0013 | 96.8 ± 8.9 |
| YTE-mutant | 27.359 ± 2.731 | 0.0055 ± 0.0006 | 211.4 ± 40.6 |

EXAMPLE 11

Pharmacokinetic Study in Human FcRn Mice

All procedures were carried out in accordance with the guidelines of the Association for Assessment and Accreditation of Laboratory Animal Care (www.aaalac.org). The study was authorized by the Regional Council of Oberbayern, Germany.

Male and female C57BL/6J mice (background); mouse FcRn deficient, but hemizygous transgenic for human FcRn (huFcRn (276)-/tg (30, 31) were used throughout the pharmacokinetic study.

Four antibodies were used in the in vivo study: Briakinumab, Ustekinumab, mAb 8, and mAb 9.

The respective antibody was given as a single intravenous bolus injection (10 mg/kg). Due to limited blood volume of mice, three groups of six animals each were required to cover nine sampling time points. The last sampling point was four weeks after administration.

Figure 3A:
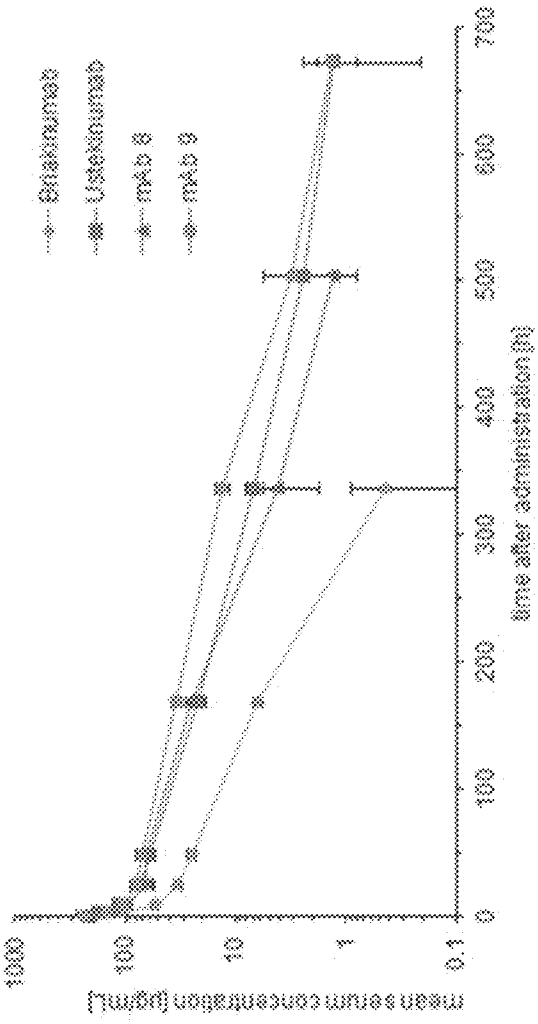
FIGS. 3A-3B Effect of the FcRn elution pH on pharmacokinetics in human FcRn transgenic mice. Antibodies were administered as a single i.v. bolus injection of 10 mg/kg to 6 animals per group. Data points represent the mean±standard deviation.
Figure 3B:
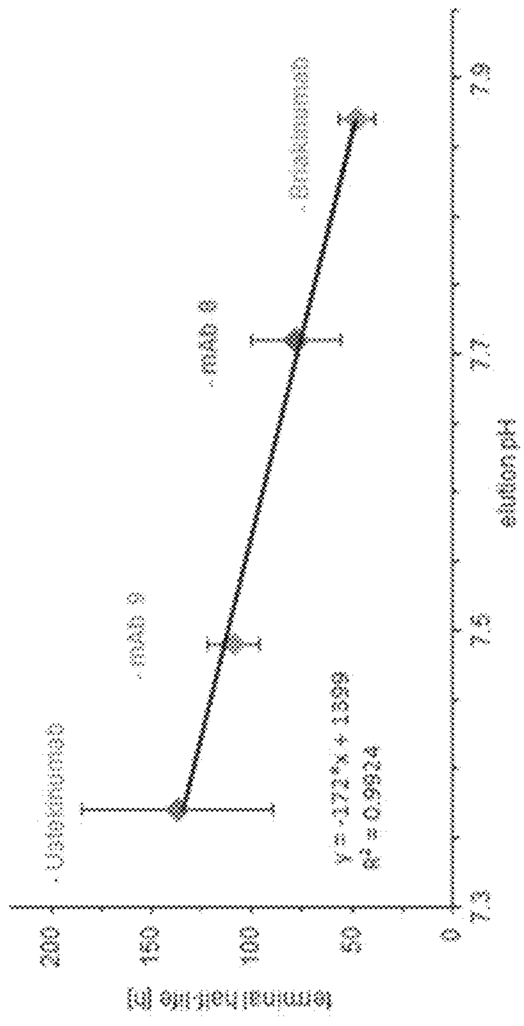

The results are shown in FIGS. 3A-3B.

TABLE 19

Pharmacokinetic parameters for Briakinumab, Ustekinumab and antibody variants mAb 8 and mAb 9.

| mAb | AUC0-inf [h*μg/ml] | Cl [mL/min/kg] | Vss [l/kg] | T 1/2 [h] |
|---|---|---|---|---|
| Briakinumab | 4228 ± 119 | 0.0394 ± 0.001 | 0.162 ± 0.015 | 48 ± 9 |
| Ustekinumab | 12238 ± 864 | 0.0137 ± 0.001 | 0.116 ± 0.006 | 137 ± 48 |
| mAb 8 | 11459 ± 843 | 0.0146 ± 0.001 | 0.101 ± 0.013 | 78 ± 22 |
| mAb 9 | 16039 ± 936 | 0.0104 ± 0.001 | 0.099 ± 0.011 | 109 ± 13 |

To confirm that differences in the terminal half-lives in human FcRn transgenic mice were caused by different FcRn-mAb interactions, a second in vivo study in FcRn knockout mice was conducted. In order to reduce the number of mice used in this study, only three antibodies were used: Briakinumab, Ustekinumab and mAb 9.

After i.v. administration of 10 mg/kg antibody the clearance of all antibodies is much faster in FcRn knockout mice than in human FcRn transgenic mice due to missing FcRn-mediated IgG-recycling. Division in alpha and beta phase is not clearly definable because antibodies are eliminated very fast. It can be demonstrated that Briakinumab has a different pharmacokinetic behavior with faster distribution in the first hours after administration compared to Ustekinumab and mAb 9. These findings were also observed in human FcRn transgenic mice indicating that the distribution process in the first hours after administration is not FcRn-mediated.

The following PK parameters were calculated and summarized: $AUC_{0\text{-}inf}$, Cl, $V_{SS}$ and $T_{1/2}$.

TABLE 20

PK parameters in FcRn knockout mice. PK parameters were calculated after administration of 10 mg/kg to 6 animals per group. PK data represent the mean ± standard deviation.

| sample | $AUC_{0\text{-}inf}$ [h*mg/mL] | Cl [mL/min/kg] | VSS [L/kg] | $T_{1/2}$ [h] |
|---|---|---|---|---|
| Briakinumab | 1.0 ± 0.1 | 0.163 ± 0.008 | 0.113 ± 0.004 | 10.6 ± 0.6 |
| Ustekinumab | 3.3 ± 0.1 | 0.051 ± 0.002 | 0.077 ± 0.004 | 22.8 ± 1.1 |
| mAb 9 | 2.9 ± 0.1 | 0.059 ± 0.003 | 0.093 ± 0.005 | 23.2 ± 1.2 |

Ustekinumab and mAb 9 are comparable regarding $AUC_{0\text{-}inf}$, Cl, $V_{SS}$ and $T_{1/2}$. Briakinumab has a smaller $AUC_{0\text{-}inf}$, faster Cl and smaller $T_{1/2}$ than Ustekinumab and mAb 9. The calculation of the $T_{1/2}$ might differ from the actual value, because time points after 3 and 4 days would have been needed to calculate the terminal half-lives more precisely.

The statistical analysis of the terminal half-lives was calculated using the Tukey HSD Test. A statistical significance could be detected between the terminal half-lives of Briakinumab and Ustekinumab and of Briakinumab and mAb 9.

The formation of ADAs was tested by detection of drug/ADA immune complexes. In FcRn knockout mice administration of 10 mg/kg Briakinumab resulted in formation of Briakinumab/ADA immune complexes after about 168-192 hours (7-8 days).

TABLE 21

ADA-positive samples after Briakinumab administration in FcRn knockout mice. Serum concentrations of each sampling time point after i.v. administration of 10 mg/kg Briakinumab in FcRn knockout mice. ADA-positive samples are illustrated as * and ** describing formation of moderate and severe drug/ADA immune complexes, respectively.

| time [h/d] | M 1 [μg/mL] | M 2 [μg/mL] | M 3 [μg/mL] | M 4 [μg/mL] | M 5 [μg/mL] | M 6 [μg/mL] |
|---|---|---|---|---|---|---|
| 0.08 | 192 | 181 | 200 | 187 | 186 | 178 |
| 2 | 86 | 79 | 74 | 91 | 89 | 91 |
| 8 | 31 | 32 | 36 | 31 | 29 | 33 |
| 24/1 | 6.7 | 12 | 7.9 | 11 | 6.9 | 8.0 |
| 48/2 | 1.8 | 2.3 | 2.7 | 2.6 | 2.4 | 2.2 |
| 168/7 | b.l.q. | b.l.q. | b.l.q. ** | b.l.q. | b.l.q. ** | b.l.q. |
| 192/8 | b.l.q. * | b.l.q. * | b.l.q. ** | b.l.q. * | b.l.q. ** | b.l.q. ** |
| 216/9 | b.l.q. * | b.l.q. | b.l.q. ** | b.l.q. ** | b.l.q. * | b.l.q. ** |
| 336/14 | b.l.q. | b.l.q. ** | b.l.q. * | b.l.q. ** | b.l.q. ** | b.l.q. * |

b.l.q. = below limit of quantification

After administration of mAb 9, drug/ADA immune complexes were also first detected after about 168 hours (7 days, Table 28). After administration of Ustekinumab, no Ustekinumab/ADA complexes were detected in FcRn knockout mice (Table 27Table 27).

The concentration-time curves of Briakinumab and mAb 9 show no rapid decrease due to ADA formation. Ustekinumab and mAb 9 have very similar concentration-time curves indicating that ADA formation after mAb 9 administration does not influence PK.

TABLE 22

Serum concentrations of Briakinumab in human FcRn transgenic mice. Serum concentrations are determined after administration of a 10 mg/kg single dose i.v. injection to 6 animals per group. ADA-positive samples are illustrated as * and ** for formation of moderate and severe drug/ADA immune complexes, respectively.

| time [h/d] | M 1 [μg/mL] | M 2 [μg/mL] | M 3 [μg/mL] | M 4 [μg/mL] | M 5 [μg/mL] | M 6 [μg/mL] | Mean [μg/mL] | SD [μg/mL] |
|---|---|---|---|---|---|---|---|---|
| 0.08 | 201 | 174 | 188 | 192 | 214 | 194 | 194 | 13 |
| 2 | 109 | 105 | 106 | 105 | 110 | 110 | 107 | 2.4 |
| 8 | 50 | 53 | 53 | 54 | 56 | 58 | 54 | 2.8 |
| 24/1 | 37 | 32 | 30 | 34 | 35 | 35 | 34 | 2.4 |
| 48/2 | 27 | 23 | 24 | 27 | 24 | 28 | 25 | 2.2 |
| 168/7 | 6.2 | 5.4 | 6.7 | 6.7 * | 6.4 | 6.8 | 6.4 | 0.5 |
| 336/14 | 0.4 | 1.0 * | 0.1 ** | 0.2 ** | 0.7 * | 0.1 ** | 0.4 | 0.4 |
| 504/21 | b.l.q. | b.l.q. ** | b.l.q. ** | b.l.q. ** | b.l.q. ** | b.l.q. ** | b.l.q. | — |
| 672/28 | b.l.q. | b.l.q. ** | b.l.q. | b.l.q. ** | b.l.q. ** | b.l.q. ** | b.l.q. | — |

TABLE 23

Serum concentrations of Ustekinumab in human FcRn transgenic mice. Serum concentrations are determined after administration of a 10 mg/kg single dose i.v. injection to 6 animals per group. ADA-positive samples are illustrated as * and ** for formation of moderate and severe drug/ADA immune complexes, respectively.

| time [h/d] | M 1 [μg/mL] | M 2 [μg/mL] | M 3 [μg/mL] | M 4 [μ/mL] | M 5 [μg/mL] | M 6 [μg/mL] | Mean [μg/mL] | SD [μg/mL] |
|---|---|---|---|---|---|---|---|---|
| 0.08 | 205 | 219 | 212 | 225 | 202 | 226 | 215 | 10 |
| 2 | 156 | 161 | 191 | 175 | 153 | 215 | 175 | 24 |
| 8 | 120 | 116 | 110 | 114 | 114 | 115 | 115 | 3.2 |
| 24/1 | 73 | 77 | 72 | 73 * | 69 | 76 | 73 | 2.9 |
| 48/2 | 58 | 57 | 64 | 57 | 56 | 59 | 59 | 2.7 |
| 168/7 | 18 | 19 | 27 | 22 | 20 | 25 | 22 | 3.5 |
| 336/14 | 7.2 | 6.8 | 8.0 | 6.2 | 8.3 | 4.8 | 6.9 | 1.3 |
| 504/21 | 2.2 | 2.2 | 2.5 | 2.3 | 2.5 | 3.0 * | 2.5 | 0.3 |
| 672/28 | 0.9 | 0.8 | 2.1 | 1.1 | 1.0 | 1.8 | 1.3 | 0.5 |

TABLE 24

Serum concentrations of mAb 8 in human FcRn transgenic mice. Serum concentrations are determined after administration of a 10 mg/kg single dose i.v. injection to 6 animals per group. ADA-positive samples are illustrated as * and ** for formation of moderate and severe drug/ADA immune complexes, respectively.

| time [h/d] | M 1 [μg/mL] | M 2 [μg/mL] | M 3 [μg/mL] | M 4 [μg/mL] | M 5 [μg/mL] | M 6 [μg/mL] | Mean [μg/mL] | SD [μg/mL] |
|---|---|---|---|---|---|---|---|---|
| 0.08 | 241 | 177 | 174 | 203 | 220 | 217 | 206 | 26 |
| 2 | 146 | 175 | 155 | 120 | 109 | 146 | 142 | 24 |
| 8 | 90 | 95 | 97 | 106 | 108 | 85 | 97 | 8.7 |
| 24/1 | 76 | 55 | 55 | 59 | 80 | 72 | 66 | 10.9 |
| 48/2 | 65 | 52 | 56 | 71 | 71 | 68 | 64 | 8.1 |
| 168/7 | 24 | 28 | 25 | 28 | 27 | 21 ** | 25 | 2.6 |
| 336/14 | 7.7 | 2.9 * | 4.4 | 1.3 * | 2.4 ** | 6.7 * | 4.2 | 2.5 |
| 504/21 | 3.1 | 0.1 ** | 2.3 | 2.1 | 0.1 ** | 0.1 | 1.3 | 1.4 |
| 672/28 | b.l.q. ** | b.l.q. ** | b.l.q. ** | b.l.q. ** | b.l.q. * | b.l.q. ** | b.l.q. | — |

TABLE 25

Serum concentrations of mAb 9 in human FcRn transgenic mice. Serum concentrations are determined after administration of a 10 mg/kg single dose i.v. injection to 6 animals per group. ADA-positive samples are illustrated as * and ** for formation of moderate and severe drug/ADA immune complexes, respectively.

| time [h/d] | M 1 [μg/mL] | M 2 [μg/mL] | M 3 [μg/mL] | M 4 [μg/mL] | M 5 [μg/mL] | M 6 [μg/mL] | Mean [μg/mL] | SD [μg/mL] |
|---|---|---|---|---|---|---|---|---|
| 0.08 | 194 | 254 | 198 | 270 | 295 | 233 | 241 | 40 |
| 2 | 151 | 183 | 124 | 143 | 165 | 137 | 150 | 21 |
| 8 | 126 | 104 | 109 | 89 | 111 | 114 | 109 | 12 |
| 24/1 | 73 | 80 | 64 | 89 | 94 | 77 | 80 | 11 |
| 48/2 | 65 | 81 | 66 | 69 | 83 | 60 | 71 | 9.2 |
| 168/7 | 34 | 37 | 31 | 30 * | 38 | 36 | 34 | 3.1 |
| 336/14 | 13 | 15 ** | 14 ** | 15 ** | 13 ** | 9.6 ** | 13 | 1.9 |
| 504/21 | 4.2 | 0.3 ** | 4.5 * | 49 ** | 0.1 ** | 4.8 ** | 3.1 | 2.3 |
| 672/28 | 0.1 ** | 2.4 * | 1.4 * | 1.5 * | 2.5 | 0.1 * | 1.3 | 1.1 |

TABLE 26

Serum concentrations of Briakinumab in FcRn knockout mice. Serum concentrations are determined after administration of a 10 mg/kg single dose i.v. injection to 6 animals per group. ADA-positive samples are illustrated as * and ** for formation of moderate and severe drug/ADA immune complexes, respectively.

| time [h/d] | M 1 [μg/mL] | M 2 [μg/mL] | M 3 [μg/mL] | M 4 [μg/mL] | M 5 [μg/mL] | M 6 [μg/mL] | Mean [μg/mL] | SD [μg/mL] |
|---|---|---|---|---|---|---|---|---|
| 0.08 | 192 | 181 | 200 | 187 | 186 | 178 | 187 | 8.0 |
| 2 | 86 | 79 | 74 | 91 | 89 | 91 | 85 | 7.1 |
| 8 | 31 | 32 | 36 | 31 | 29 | 33 | 32 | 2.3 |
| 24/1 | 6.7 | 12 | 7.9 | 11 | 6.9 | 8.0 | 8.7 | 2.1 |
| 48/2 | 1.8 | 2.3 | 2.7 | 2.6 | 2.4 | 2.2 | 2.3 | 0.3 |
| 168/7 | b.l.q. | b.l.q. | b.l.q. ** | b.l.q. | b.l.q. ** | b.l.q. | b.l.q. | — |
| 192/8 | b.l.q. * | b.l.q. * | b.l.q. ** | b.l.q. * | b.l.q. ** | b.l.q. ** | b.l.q. | — |
| 216/9 | b.l.q. * | b.l.q. | b.l.q. ** | b.l.q. ** | b.l.q. * | b.l.q. ** | b.l.q. | — |
| 336/14 | b.l.q. | b.l.q. ** | b.l.q. * | b.l.q. ** | b.l.q. ** | b.l.q. * | b.l.q. | — |

TABLE 27

Serum concentrations of Ustekinumab in FcRn knockout mice. Serum concentrations are determined after administration of a 10 mg/kg single dose i.v. injection to 6 animals per group.

| time [h/d] | M 1 [μg/mL] | M 2 [μg/mL] | M 3 [μg/mL] | M 4 [μg/mL] | M 5 [μg/mL] | M 6 [μg/mL] | Mean [μg/mL] | SD [μg/mL] |
|---|---|---|---|---|---|---|---|---|
| 0.08 | 209 | 221 | 229 | 228 | 220 | 219 | 221 | 7.4 |
| 2 | 153 | 164 | 158 | 155 | 157 | 149 | 156 | 4.8 |
| 8 | 80 | 95 | 88 | 96 | 104 | 95 | 93 | 8.0 |
| 24/1 | 50 | 47 | 37 | 44 | 38 | 37 | 42 | 5.5 |
| 48/2 | 16 | 16 | 17 | 13 | 11 | 14 | 15 | 2.2 |
| 168/7 | 0.4 | 0.6 | 0.4 | 0.3 | 0.6 | 0.4 | 0.5 | 0.1 |
| 192/8 | 0.5 | 0.2 | 0.1 | 0.1 | 0.2 | 0.4 | 0.2 | 0.2 |
| 216/9 | b.l.q. | b.l.q. | b.l.q. | b.l.q. | b.l.q. | b.l.q. | b.l.q. | — |
| 336/14 | b.l.q. | b.l.q. | b.l.q. | b.l.q. | b.l.q. | b.l.q. | b.l.q. | — |

TABLE 28

Serum concentrations of mAb 9 in FcRn knockout mice. Serum concentrations are determined after administration of a 10 mg/kg single dose i.v. injection to 6 animals per group. ADA-positive samples are illustrated as * and ** for formation of moderate and severe drug/ADA immune complexes, respectively.

| time [h/d] | M 1 [μg/mL] | M 2 [μg/mL] | M 3 [μg/mL] | M 4 [μg/mL] | M 5 [μg/mL] | M 6 [μg/mL] | Mean [μg/mL] | SD [μg/mL] |
|---|---|---|---|---|---|---|---|---|
| 0.08 | 249 | 292 | 232 | 214 | 242 | 226 | 242 | 27 |
| 2 | 119 | 130 | 139 | 136 | 123 | 129 | 129 | 7.3 |
| 8 | 62 | 65 | 74 | 80 | 83 | 87 | 75 | 10 |
| 24/1 | 31 | 37 | 37 | 32 | 35 | 36 | 35 | 2.6 |
| 48/2 | 16 | 15 | 17 | 12 | 13 | 16 | 15 | 1.9 |
| 168/7 | 0.2 * | 0.4 ** | 0.5 | 0.5 | 0.5 | 0.3 | 0.4 | 0.1 |
| 192/8 | 0.2 | 0.1 ** | 0.2 | 0.1 ** | 0.1 ** | 0.2 | 0.2 | 0.2 |
| 216/9 | b.l.q. | b.l.q. ** | b.l.q. ** | b.l.q. | b.l.q. * | b.l.q. ** | b.l.q. | — |
| 336/14 | b.l.q. * | b.l.q. ** | b.l.q. | b.l.q. | b.l.q. * | b.l.q. | b.l.q. | — |

What is claimed is:

1. A method for selecting a variant antibody of a parent antibody, comprising the steps of:

determining a first retention time of the variant antibody and the parent antibody on an FcRn affinity chromatography column with a positive linear pH gradient elution in the presence of a first salt concentration, and determining a second retention time of the variant antibody on an FcRn affinity chromatography column with the positive linear pH gradient elution in the presence of a second salt concentration, wherein:

the method is for selecting the variant antibody of the IgG1, IgG3 or IgG4 subclass that has a relative in vivo half-life that is increased compared to the parent antibody of the IgG1, IgG3 or IgG4 subclass, by selecting a variant antibody that has a first retention time that is longer than the first retention time of the parent antibody, and a first retention time that is substantially the same as the second retention time, wherein the positive linear pH gradient is from about pH 5.5 to about pH 8.8; the salt is sodium chloride; and wherein the first salt concentration is about 140 mM; and wherein the second salt concentration is about 400 mM.

2. The method according to claim 1, wherein the method is for selecting a variant antibody that is free of antibody-Fab-FcRn interaction influencing the in vivo half-life of the antibody.

3. The method according to claim 1, wherein substantially same retention times differ by 3.5% or less.

4. The method according to claim 1, wherein the variant antibody is a full length antibody.

* * * * *

SEQUENCE LISTING

```
<160> NUMBER OF SEQ ID NOS: 55

<210> SEQ ID NO 1
<211> LENGTH: 445
<212> TYPE: PRT
<213> ORGANISM: Artificial Sequence
<220> FEATURE:
<223> OTHER INFORMATION: Description of Artificial Sequence: Synthetic
      anti-IL-1R antibody IgG 1 HC

<400> SEQUENCE: 1

Gln Leu Gln Leu Gln Glu Ser Gly Pro Gly Leu Val Lys Pro Ser Gln
1               5                   10                  15

Thr Leu Ser Leu Thr Cys Thr Val Ser Gly Leu Ser Leu Thr Ser Asn
            20                  25                  30

Ser Ile Thr Trp Ile Arg Gln Pro Pro Gly Lys Gly Pro Glu Trp Met
        35                  40                  45

Gly Met Ile Trp Ser Asn Gly Asp Thr Asp Tyr Ser Thr Ser Leu Lys
    50                  55                  60

Ser Arg Leu Thr Ile Ser Lys Asp Thr Ser Lys Ser Gln Val Val Leu
65                  70                  75                  80

Thr Met Thr Asn Met Asp Pro Val Asp Thr Ala Thr Tyr Tyr Cys Ala
                85                  90                  95

Arg Tyr Asn Tyr Tyr Phe Asp Tyr Trp Gly Gln Gly Thr Leu Val Thr
            100                 105                 110
```

```
Val Ser Ser Ala Ser Thr Lys Gly Pro Ser Val Phe Pro Leu Ala Pro
        115                 120                 125

Ser Ser Lys Ser Thr Ser Gly Gly Thr Ala Ala Leu Gly Cys Leu Val
    130                 135                 140

Lys Asp Tyr Phe Pro Glu Pro Val Thr Val Ser Trp Asn Ser Gly Ala
145                 150                 155                 160

Leu Thr Ser Gly Val His Thr Phe Pro Ala Val Leu Gln Ser Ser Gly
                165                 170                 175

Leu Tyr Ser Leu Ser Ser Val Val Thr Val Pro Ser Ser Ser Leu Gly
            180                 185                 190

Thr Gln Thr Tyr Ile Cys Asn Val Asn His Lys Pro Ser Asn Thr Lys
        195                 200                 205

Val Asp Lys Lys Val Glu Pro Lys Ser Cys Asp Lys Thr His Thr Cys
    210                 215                 220

Pro Pro Cys Pro Ala Pro Glu Leu Leu Gly Gly Pro Ser Val Phe Leu
225                 230                 235                 240

Phe Pro Pro Lys Pro Lys Asp Thr Leu Met Ile Ser Arg Thr Pro Glu
                245                 250                 255

Val Thr Cys Val Val Val Asp Val Ser His Glu Asp Pro Glu Val Lys
            260                 265                 270

Phe Asn Trp Tyr Val Asp Gly Val Glu Val His Asn Ala Lys Thr Lys
        275                 280                 285

Pro Arg Glu Glu Gln Tyr Asn Ser Thr Tyr Arg Val Val Ser Val Leu
    290                 295                 300

Thr Val Leu His Gln Asp Trp Leu Asn Gly Lys Glu Tyr Lys Cys Lys
305                 310                 315                 320

Val Ser Asn Lys Ala Leu Pro Ala Pro Ile Glu Lys Thr Ile Ser Lys
                325                 330                 335

Ala Lys Gly Gln Pro Arg Glu Pro Gln Val Tyr Thr Leu Pro Pro Ser
            340                 345                 350

Arg Asp Glu Leu Thr Lys Asn Gln Val Ser Leu Thr Cys Leu Val Lys
        355                 360                 365

Gly Phe Tyr Pro Ser Asp Ile Ala Val Glu Trp Glu Ser Asn Gly Gln
    370                 375                 380

Pro Glu Asn Asn Tyr Lys Thr Thr Pro Pro Val Leu Asp Ser Asp Gly
385                 390                 395                 400

Ser Phe Phe Leu Tyr Ser Lys Leu Thr Val Asp Lys Ser Arg Trp Gln
                405                 410                 415

Gln Gly Asn Val Phe Ser Cys Ser Val Met His Glu Ala Leu His Asn
            420                 425                 430

His Tyr Thr Gln Lys Ser Leu Ser Leu Ser Pro Gly Lys
        435                 440                 445


<210> SEQ ID NO 2
<211> LENGTH: 218
<212> TYPE: PRT
<213> ORGANISM: Artificial Sequence
<220> FEATURE:
<223> OTHER INFORMATION: Description of Artificial Sequence: Synthetic
      anti-IL-1R antibody IgG 1 LC

<400> SEQUENCE: 2

Asp Ile Val Leu Thr Gln Ser Pro Ala Thr Leu Ser Leu Ser Pro Gly
1               5                   10                  15

Glu Arg Ala Thr Leu Ser Cys Lys Ala Ser Gln Asn Val Asp Asn Arg
```

```
            20                  25                  30

Gly Val Ser Tyr Val His Trp Tyr Gln Gln Lys Pro Gly Gln Ala Pro
        35                  40                  45

Lys Leu Leu Ile Tyr Lys Gly Ser Asn Leu Ala Phe Gly Val Pro Ser
    50                  55                  60

Arg Phe Ser Gly Ser Gly Ser Gly Thr Asp Phe Thr Leu Thr Ile Ser
65                  70                  75                  80

Ser Leu Gln Pro Glu Asp Phe Ala Thr Tyr Phe Cys Gln Gln Ser Lys
                85                  90                  95

Gly His Pro Asp Thr Phe Gly Ala Gly Thr Lys Leu Glu Leu Lys Arg
            100                 105                 110

Thr Val Ala Ala Pro Ser Val Phe Ile Phe Pro Pro Ser Asp Glu Gln
        115                 120                 125

Leu Lys Ser Gly Thr Ala Ser Val Val Cys Leu Leu Asn Asn Phe Tyr
    130                 135                 140

Pro Arg Glu Ala Lys Val Gln Trp Lys Val Asp Asn Ala Leu Gln Ser
145                 150                 155                 160

Gly Asn Ser Gln Glu Ser Val Thr Glu Gln Asp Ser Lys Asp Ser Thr
                165                 170                 175

Tyr Ser Leu Ser Ser Thr Leu Thr Leu Ser Lys Ala Asp Tyr Glu Lys
            180                 185                 190

His Lys Val Tyr Ala Cys Glu Val Thr His Gln Gly Leu Ser Ser Pro
        195                 200                 205

Val Thr Lys Ser Phe Asn Arg Gly Glu Cys
    210                 215


<210> SEQ ID NO 3
<211> LENGTH: 442
<212> TYPE: PRT
<213> ORGANISM: Artificial Sequence
<220> FEATURE:
<223> OTHER INFORMATION: Description of Artificial Sequence: Synthetic
      anti-IL-1R antibody IgG 4 HC

<400> SEQUENCE: 3

Gln Leu Gln Leu Gln Glu Ser Gly Pro Gly Leu Val Lys Pro Ser Gln
1               5                   10                  15

Thr Leu Ser Leu Thr Cys Thr Val Ser Gly Leu Ser Leu Thr Ser Asn
            20                  25                  30

Ser Ile Thr Trp Ile Arg Gln Pro Pro Gly Lys Gly Pro Glu Trp Met
        35                  40                  45

Gly Met Ile Trp Ser Asn Gly Asp Thr Asp Tyr Ser Thr Ser Leu Lys
    50                  55                  60

Ser Arg Leu Thr Ile Ser Lys Asp Thr Ser Lys Ser Gln Val Val Leu
65                  70                  75                  80

Thr Met Thr Asn Met Asp Pro Val Asp Thr Ala Thr Tyr Tyr Cys Ala
                85                  90                  95

Arg Tyr Asn Tyr Tyr Phe Asp Tyr Trp Gly Gln Gly Thr Leu Val Thr
            100                 105                 110

Val Ser Ser Ala Ser Thr Lys Gly Pro Ser Val Phe Pro Leu Ala Pro
        115                 120                 125

Cys Ser Arg Ser Thr Ser Glu Ser Thr Ala Ala Leu Gly Cys Leu Val
    130                 135                 140

Lys Asp Tyr Phe Pro Glu Pro Val Thr Val Ser Trp Asn Ser Gly Ala
145                 150                 155                 160
```

```
Leu Thr Ser Gly Val His Thr Phe Pro Ala Val Leu Gln Ser Ser Gly
                165                 170                 175

Leu Tyr Ser Leu Ser Ser Val Val Thr Val Pro Ser Ser Ser Leu Gly
            180                 185                 190

Thr Lys Thr Tyr Thr Cys Asn Val Asp His Lys Pro Ser Asn Thr Lys
        195                 200                 205

Val Asp Lys Arg Val Glu Ser Lys Tyr Gly Pro Pro Cys Pro Ser Cys
    210                 215                 220

Pro Ala Pro Glu Phe Leu Gly Gly Pro Ser Val Phe Leu Phe Pro Pro
225                 230                 235                 240

Lys Pro Lys Asp Thr Leu Met Ile Ser Arg Thr Pro Glu Val Thr Cys
                245                 250                 255

Val Val Val Asp Val Ser Gln Glu Asp Pro Glu Val Gln Phe Asn Trp
            260                 265                 270

Tyr Val Asp Gly Val Glu Val His Asn Ala Lys Thr Lys Pro Arg Glu
        275                 280                 285

Glu Gln Phe Asn Ser Thr Tyr Arg Val Val Ser Val Leu Thr Val Leu
    290                 295                 300

His Gln Asp Trp Leu Asn Gly Lys Glu Tyr Lys Cys Lys Val Ser Asn
305                 310                 315                 320

Lys Gly Leu Pro Ser Ser Ile Glu Lys Thr Ile Ser Lys Ala Lys Gly
                325                 330                 335

Gln Pro Arg Glu Pro Gln Val Tyr Thr Leu Pro Pro Ser Gln Glu Glu
            340                 345                 350

Met Thr Lys Asn Gln Val Ser Leu Thr Cys Leu Val Lys Gly Phe Tyr
        355                 360                 365

Pro Ser Asp Ile Ala Val Glu Trp Glu Ser Asn Gly Gln Pro Glu Asn
    370                 375                 380

Asn Tyr Lys Thr Thr Pro Pro Val Leu Asp Ser Asp Gly Ser Phe Phe
385                 390                 395                 400

Leu Tyr Ser Arg Leu Thr Val Asp Lys Ser Arg Trp Gln Glu Gly Asn
                405                 410                 415

Val Phe Ser Cys Ser Val Met His Glu Ala Leu His Asn His Tyr Thr
            420                 425                 430

Gln Lys Ser Leu Ser Leu Ser Leu Gly Lys
        435                 440


<210> SEQ ID NO 4
<211> LENGTH: 218
<212> TYPE: PRT
<213> ORGANISM: Artificial Sequence
<220> FEATURE:
<223> OTHER INFORMATION: Description of Artificial Sequence: Synthetic
      anti-IL-1R antibody IgG 4 LC

<400> SEQUENCE: 4

Asp Ile Val Leu Thr Gln Ser Pro Ala Thr Leu Ser Leu Ser Pro Gly
1               5                   10                  15

Glu Arg Ala Thr Leu Ser Cys Lys Ala Ser Gln Asn Val Asp Asn Arg
            20                  25                  30

Gly Val Ser Tyr Val His Trp Tyr Gln Gln Lys Pro Gly Gln Ala Pro
        35                  40                  45

Lys Leu Leu Ile Tyr Lys Gly Ser Asn Leu Ala Phe Gly Val Pro Ser
    50                  55                  60

Arg Phe Ser Gly Ser Gly Ser Gly Thr Asp Phe Thr Leu Thr Ile Ser
65                  70                  75                  80
```

Ser Leu Gln Pro Glu Asp Phe Ala Thr Tyr Phe Cys Gln Gln Ser Lys
85 90 95

Gly His Pro Asp Thr Phe Gly Ala Gly Thr Lys Leu Glu Leu Lys Arg
100 105 110

Thr Val Ala Ala Pro Ser Val Phe Ile Phe Pro Pro Ser Asp Glu Gln
115 120 125

Leu Lys Ser Gly Thr Ala Ser Val Val Cys Leu Leu Asn Asn Phe Tyr
130 135 140

Pro Arg Glu Ala Lys Val Gln Trp Lys Val Asp Asn Ala Leu Gln Ser
145 150 155 160

Gly Asn Ser Gln Glu Ser Val Thr Glu Gln Asp Ser Lys Asp Ser Thr
165 170 175

Tyr Ser Leu Ser Ser Thr Leu Thr Leu Ser Lys Ala Asp Tyr Glu Lys
180 185 190

His Lys Val Tyr Ala Cys Glu Val Thr His Gln Gly Leu Ser Ser Pro
195 200 205

Val Thr Lys Ser Phe Asn Arg Gly Glu Cys
210 215

<210> SEQ ID NO 5
<211> LENGTH: 107
<212> TYPE: PRT
<213> ORGANISM: Homo sapiens

<400> SEQUENCE: 5

Ala Pro Glu Leu Leu Gly Gly Pro Ser Val Phe Leu Phe Pro Pro Lys
1 5 10 15

Pro Lys Asp Thr Leu Met Ile Ser Arg Thr Pro Glu Val Thr Cys Val
20 25 30

Trp Asp Val Ser His Glu Asp Pro Glu Val Lys Phe Asn Trp Tyr Val
35 40 45

Asp Gly Val Glu Val His Asn Ala Lys Thr Lys Pro Arg Glu Glu Gln
50 55 60

Glu Ser Thr Tyr Arg Trp Ser Val Leu Thr Val Leu His Gln Asp Trp
65 70 75 80

Leu Asn Gly Lys Glu Tyr Lys Cys Lys Val Ser Asn Lys Ala Leu Pro
85 90 95

Ala Pro Ile Glu Lys Thr Ile Ser Lys Ala Lys
100 105

<210> SEQ ID NO 6
<211> LENGTH: 106
<212> TYPE: PRT
<213> ORGANISM: Homo sapiens

<400> SEQUENCE: 6

Gly Gln Pro Arg Glu Pro Gln Val Tyr Thr Leu Pro Pro Ser Arg Asp
1 5 10 15

Glu Leu Thr Lys Asn Gln Val Ser Leu Thr Cys Leu Val Lys Gly Phe
20 25 30

Tyr Pro Ser Asp Ile Ala Val Glu Trp Glu Ser Asn Gly Gln Pro Glu
35 40 45

Asn Asn Tyr Lys Thr Thr Pro Pro Val Leu Asp Ser Asp Gly Ser Phe
50 55 60

Phe Leu Tyr Ser Lys Leu Thr Val Asp Lys Ser Arg Trp Gln Gln Gly
65 70 75 80

```
Asn Val Phe Ser Cys Ser Val Met His Glu Ala Leu His Asn His Tyr
                85                  90                  95

Thr Gln Lys Ser Leu Ser Leu Ser Pro Gly
            100                 105


<210> SEQ ID NO 7
<211> LENGTH: 227
<212> TYPE: PRT
<213> ORGANISM: Homo sapiens

<400> SEQUENCE: 7

Asp Lys Thr His Thr Cys Pro Pro Cys Pro Ala Pro Glu Leu Leu Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Ser Arg Asp Glu Leu Thr Lys Asn Gln Val Ser
    130                 135                 140

Leu Thr Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225


<210> SEQ ID NO 8
<211> LENGTH: 326
<212> TYPE: PRT
<213> ORGANISM: Homo sapiens

<400> SEQUENCE: 8

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60
```

Leu Ser Ser Val Val Thr Val Pro Ser Ser Asn Phe Gly Thr Gln Thr
65 70 75 80

Tyr Thr Cys Asn Val Asp His Lys Pro Ser Asn Thr Lys Val Asp Lys
85 90 95

Thr Val Glu Arg Lys Cys Cys Val Glu Cys Pro Pro Cys Pro Ala Pro
100 105 110

Pro Val Ala Gly Pro Ser Val Phe Leu Phe Pro Pro Lys Pro Lys Asp
115 120 125

Thr Leu Met Ile Ser Arg Thr Pro Glu Val Thr Cys Val Val Val Asp
130 135 140

Val Ser His Glu Asp Pro Glu Val Gln Phe Asn Trp Tyr Val Asp Gly
145 150 155 160

Val Glu Val His Asn Ala Lys Thr Lys Pro Arg Glu Glu Gln Phe Asn
165 170 175

Ser Thr Phe Arg Val Val Ser Val Leu Thr Val Val His Gln Asp Trp
180 185 190

Leu Asn Gly Lys Glu Tyr Lys Cys Lys Val Ser Asn Lys Gly Leu Pro
195 200 205

Ala Pro Ile Glu Lys Thr Ile Ser Lys Thr Lys Gly Gln Pro Arg Glu
210 215 220

Pro Gln Val Tyr Thr Leu Pro Pro Ser Arg Glu Glu Met Thr Lys Asn
225 230 235 240

Gln Val Ser Leu Thr Cys Leu Val Lys Gly Phe Tyr Pro Ser Asp Ile
245 250 255

Ser Val Glu Trp Glu Ser Asn Gly Gln Pro Glu Asn Asn Tyr Lys Thr
260 265 270

Thr Pro Pro Met Leu Asp Ser Asp Gly Ser Phe Phe Leu Tyr Ser Lys
275 280 285

Leu Thr Val Asp Lys Ser Arg Trp Gln Gln Gly Asn Val Phe Ser Cys
290 295 300

Ser Val Met His Glu Ala Leu His Asn His Tyr Thr Gln Lys Ser Leu
305 310 315 320

Ser Leu Ser Pro Gly Lys
325

<210> SEQ ID NO 9
<211> LENGTH: 377
<212> TYPE: PRT
<213> ORGANISM: Homo sapiens

<400> SEQUENCE: 9

Ala Ser Thr Lys Gly Pro Ser Val Phe Pro Leu Ala Pro Cys Ser Arg
1 5 10 15

Ser Thr Ser Gly Gly Thr Ala Ala Leu Gly Cys Leu Val Lys Asp Tyr
20 25 30

Phe Pro Glu Pro Val Thr Val Ser Trp Asn Ser Gly Ala Leu Thr Ser
35 40 45

Gly Val His Thr Phe Pro Ala Val Leu Gln Ser Ser Gly Leu Tyr Ser
50 55 60

Leu Ser Ser Val Val Thr Val Pro Ser Ser Ser Leu Gly Thr Gln Thr
65 70 75 80

Tyr Thr Cys Asn Val Asn His Lys Pro Ser Asn Thr Lys Val Asp Lys
85 90 95

Arg Val Glu Leu Lys Thr Pro Leu Gly Asp Thr Thr His Thr Cys Pro

```
            100                 105                 110

Arg Cys Pro Glu Pro Lys Ser Cys Asp Thr Pro Pro Pro Cys Pro Arg
        115                 120                 125

Cys Pro Glu Pro Lys Ser Cys Asp Thr Pro Pro Pro Cys Pro Arg Cys
    130                 135                 140

Pro Glu Pro Lys Ser Cys Asp Thr Pro Pro Pro Cys Pro Arg Cys Pro
145                 150                 155                 160

Ala Pro Glu Leu Leu Gly Gly Pro Ser Val Phe Leu Phe Pro Pro Lys
                165                 170                 175

Pro Lys Asp Thr Leu Met Ile Ser Arg Thr Pro Glu Val Thr Cys Val
            180                 185                 190

Val Val Asp Val Ser His Glu Asp Pro Glu Val Gln Phe Lys Trp Tyr
        195                 200                 205

Val Asp Gly Val Glu Val His Asn Ala Lys Thr Lys Pro Arg Glu Glu
    210                 215                 220

Gln Tyr Asn Ser Thr Phe Arg Val Val Ser Val Leu Thr Val Leu His
225                 230                 235                 240

Gln Asp Trp Leu Asn Gly Lys Glu Tyr Lys Cys Lys Val Ser Asn Lys
                245                 250                 255

Ala Leu Pro Ala Pro Ile Glu Lys Thr Ile Ser Lys Thr Lys Gly Gln
            260                 265                 270

Pro Arg Glu Pro Gln Val Tyr Thr Leu Pro Pro Ser Arg Glu Glu Met
        275                 280                 285

Thr Lys Asn Gln Val Ser Leu Thr Cys Leu Val Lys Gly Phe Tyr Pro
    290                 295                 300

Ser Asp Ile Ala Val Glu Trp Glu Ser Ser Gly Gln Pro Glu Asn Asn
305                 310                 315                 320

Tyr Asn Thr Thr Pro Pro Met Leu Asp Ser Asp Gly Ser Phe Phe Leu
                325                 330                 335

Tyr Ser Lys Leu Thr Val Asp Lys Ser Arg Trp Gln Gln Gly Asn Ile
            340                 345                 350

Phe Ser Cys Ser Val Met His Glu Ala Leu His Asn Arg Phe Thr Gln
        355                 360                 365

Lys Ser Leu Ser Leu Ser Pro Gly Lys
    370                 375


<210> SEQ ID NO 10
<211> LENGTH: 229
<212> TYPE: PRT
<213> ORGANISM: Homo sapiens

<400> SEQUENCE: 10

Glu Ser Lys Tyr Gly Pro Pro Cys Pro Ser Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95
```

```
Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225


<210> SEQ ID NO 11
<211> LENGTH: 227
<212> TYPE: PRT
<213> ORGANISM: Artificial Sequence
<220> FEATURE:
<223> OTHER INFORMATION: Description of Artificial Sequence: Synthetic
      human IgG1 Fc-region derived Fc-region polypeptide with
      the mutations L234A, L235A

<400> SEQUENCE: 11

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Ser Arg Asp Glu Leu Thr Lys Asn Gln Val Ser
    130                 135                 140

Leu Thr Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
```

```
    210                 215                 220

Pro Gly Lys
225


<210> SEQ ID NO 12
<211> LENGTH: 227
<212> TYPE: PRT
<213> ORGANISM: Artificial Sequence
<220> FEATURE:
<223> OTHER INFORMATION: Description of Artificial Sequence: Synthetic
      human IgG1 Fc-region derived Fc-region polypeptide with
      Y349C, T366S, L368A and Y407V mutations

<400> SEQUENCE: 12

Asp Lys Thr His Thr Cys Pro Pro Cys Pro Ala Pro Glu Leu Leu Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
    130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225


<210> SEQ ID NO 13
<211> LENGTH: 227
<212> TYPE: PRT
<213> ORGANISM: Artificial Sequence
<220> FEATURE:
<223> OTHER INFORMATION: Description of Artificial Sequence: Synthetic
      human IgG1 Fc-region derived Fc-region polypeptide with
      S354C, T366W mutations

<400> SEQUENCE: 13

Asp Lys Thr His Thr Cys Pro Pro Cys Pro Ala Pro Glu Leu Leu Gly
1               5                   10                  15

Gly Pro Ser Val Phe Leu Phe Pro Pro Lys Pro Lys Asp Thr Leu Met
            20                  25                  30
```

```
Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Cys Arg Asp Glu Leu Thr Lys Asn Gln Val Ser
    130                 135                 140

Leu Trp Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225


<210> SEQ ID NO 14
<211> LENGTH: 227
<212> TYPE: PRT
<213> ORGANISM: Artificial Sequence
<220> FEATURE:
<223> OTHER INFORMATION: Description of Artificial Sequence: Synthetic
      human IgG1 Fc-region derived Fc-region polypeptide with
      L234A, L235A mutations and Y349C, T366S, L368A, Y407V
      mutations

<400> SEQUENCE: 14

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
    130                 135                 140
```

```
Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225


<210> SEQ ID NO 15
<211> LENGTH: 227
<212> TYPE: PRT
<213> ORGANISM: Artificial Sequence
<220> FEATURE:
<223> OTHER INFORMATION: Description of Artificial Sequence: Synthetic
      human IgG1 Fc-region derived Fc-region polypeptide with a
      L234A, L235A and S354C, T366W mutations

<400> SEQUENCE: 15

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Cys Arg Asp Glu Leu Thr Lys Asn Gln Val Ser
    130                 135                 140

Leu Trp Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225


<210> SEQ ID NO 16
<211> LENGTH: 227
```

<212> TYPE: PRT
<213> ORGANISM: Artificial Sequence
<220> FEATURE:
<223> OTHER INFORMATION: Description of Artificial Sequence: Synthetic human IgG1 Fc-region derived Fc-region polypeptide with a P329G mutation

<400> SEQUENCE: 16

Asp Lys Thr His Thr Cys Pro Pro Cys Pro Ala Pro Glu Leu Leu Gly
1 5 10 15

Gly Pro Ser Val Phe Leu Phe Pro Pro Lys Pro Lys Asp Thr Leu Met
20 25 30

Ile Ser Arg Thr Pro Glu Val Thr Cys Val Val Val Asp Val Ser His
35 40 45

Glu Asp Pro Glu Val Lys Phe Asn Trp Tyr Val Asp Gly Val Glu Val
50 55 60

His Asn Ala Lys Thr Lys Pro Arg Glu Glu Gln Tyr Asn Ser Thr Tyr
65 70 75 80

Arg Val Val Ser Val Leu Thr Val Leu His Gln Asp Trp Leu Asn Gly
85 90 95

Lys Glu Tyr Lys Cys Lys Val Ser Asn Lys Ala Leu Gly Ala Pro Ile
100 105 110

Glu Lys Thr Ile Ser Lys Ala Lys Gly Gln Pro Arg Glu Pro Gln Val
115 120 125

Tyr Thr Leu Pro Pro Ser Arg Asp Glu Leu Thr Lys Asn Gln Val Ser
130 135 140

Leu Thr Cys Leu Val Lys Gly Phe Tyr Pro Ser Asp Ile Ala Val Glu
145 150 155 160

Trp Glu Ser Asn Gly Gln Pro Glu Asn Asn Tyr Lys Thr Thr Pro Pro
165 170 175

Val Leu Asp Ser Asp Gly Ser Phe Phe Leu Tyr Ser Lys Leu Thr Val
180 185 190

Asp Lys Ser Arg Trp Gln Gln Gly Asn Val Phe Ser Cys Ser Val Met
195 200 205

His Glu Ala Leu His Asn His Tyr Thr Gln Lys Ser Leu Ser Leu Ser
210 215 220

Pro Gly Lys
225

<210> SEQ ID NO 17
<211> LENGTH: 227
<212> TYPE: PRT
<213> ORGANISM: Artificial Sequence
<220> FEATURE:
<223> OTHER INFORMATION: Description of Artificial Sequence: Synthetic human IgG1 Fc-region derived Fc-region polypeptide with L234A, L235A mutations and P329G mutation

<400> SEQUENCE: 17

Asp Lys Thr His Thr Cys Pro Pro Cys Pro Ala Pro Glu Ala Ala Gly
1 5 10 15

Gly Pro Ser Val Phe Leu Phe Pro Pro Lys Pro Lys Asp Thr Leu Met
20 25 30

Ile Ser Arg Thr Pro Glu Val Thr Cys Val Val Val Asp Val Ser His
35 40 45

Glu Asp Pro Glu Val Lys Phe Asn Trp Tyr Val Asp Gly Val Glu Val
50 55 60

His Asn Ala Lys Thr Lys Pro Arg Glu Glu Gln Tyr Asn Ser Thr Tyr

```
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Ser Arg Asp Glu Leu Thr Lys Asn Gln Val Ser
    130                 135                 140

Leu Thr Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225


<210> SEQ ID NO 18
<211> LENGTH: 227
<212> TYPE: PRT
<213> ORGANISM: Artificial Sequence
<220> FEATURE:
<223> OTHER INFORMATION: Description of Artificial Sequence: Synthetic
      human IgG1 Fc-region derived Fc-region polypeptide with a
      P239G mutation and Y349C, T366S, L368A, Y407V mutations

<400> SEQUENCE: 18

Asp Lys Thr His Thr Cys Pro Pro Cys Pro Ala Pro Glu Leu Leu Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
    130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190
```

Asp Lys Ser Arg Trp Gln Gln Gly Asn Val Phe Ser Cys Ser Val Met
195 200 205

His Glu Ala Leu His Asn His Tyr Thr Gln Lys Ser Leu Ser Leu Ser
210 215 220

Pro Gly Lys
225

<210> SEQ ID NO 19
<211> LENGTH: 227
<212> TYPE: PRT
<213> ORGANISM: Artificial Sequence
<220> FEATURE:
<223> OTHER INFORMATION: Description of Artificial Sequence: Synthetic human IgG1 Fc-region derived Fc-region polypeptide with a P329G mutation and S354C, T366W mutation

<400> SEQUENCE: 19

Asp Lys Thr His Thr Cys Pro Pro Cys Pro Ala Pro Glu Leu Leu Gly
1 5 10 15

Gly Pro Ser Val Phe Leu Phe Pro Pro Lys Pro Lys Asp Thr Leu Met
20 25 30

Ile Ser Arg Thr Pro Glu Val Thr Cys Val Val Val Asp Val Ser His
35 40 45

Glu Asp Pro Glu Val Lys Phe Asn Trp Tyr Val Asp Gly Val Glu Val
50 55 60

His Asn Ala Lys Thr Lys Pro Arg Glu Glu Gln Tyr Asn Ser Thr Tyr
65 70 75 80

Arg Val Val Ser Val Leu Thr Val Leu His Gln Asp Trp Leu Asn Gly
85 90 95

Lys Glu Tyr Lys Cys Lys Val Ser Asn Lys Ala Leu Gly Ala Pro Ile
100 105 110

Glu Lys Thr Ile Ser Lys Ala Lys Gly Gln Pro Arg Glu Pro Gln Val
115 120 125

Tyr Thr Leu Pro Pro Cys Arg Asp Glu Leu Thr Lys Asn Gln Val Ser
130 135 140

Leu Trp Cys Leu Val Lys Gly Phe Tyr Pro Ser Asp Ile Ala Val Glu
145 150 155 160

Trp Glu Ser Asn Gly Gln Pro Glu Asn Asn Tyr Lys Thr Thr Pro Pro
165 170 175

Val Leu Asp Ser Asp Gly Ser Phe Phe Leu Tyr Ser Lys Leu Thr Val
180 185 190

Asp Lys Ser Arg Trp Gln Gln Gly Asn Val Phe Ser Cys Ser Val Met
195 200 205

His Glu Ala Leu His Asn His Tyr Thr Gln Lys Ser Leu Ser Leu Ser
210 215 220

Pro Gly Lys
225

<210> SEQ ID NO 20
<211> LENGTH: 227
<212> TYPE: PRT
<213> ORGANISM: Artificial Sequence
<220> FEATURE:
<223> OTHER INFORMATION: Description of Artificial Sequence: Synthetic human IgG1 Fc-region derived Fc-region polypeptide with L234A, L235A, P329G and Y349C, T366S, L368A, Y407V mutations

<400> SEQUENCE: 20

```
Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
    130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225


<210> SEQ ID NO 21
<211> LENGTH: 227
<212> TYPE: PRT
<213> ORGANISM: Artificial Sequence
<220> FEATURE:
<223> OTHER INFORMATION: Description of Artificial Sequence: Synthetic
      human IgG1 Fc-region derived Fc-region polypeptide with
      L234A, L235A, P329G mutations and S354C, T366W mutations

<400> SEQUENCE: 21

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110
```

```
Glu Lys Thr Ile Ser Lys Ala Lys Gly Gln Pro Arg Glu Pro Gln Val
        115                 120                 125

Tyr Thr Leu Pro Pro Cys Arg Asp Glu Leu Thr Lys Asn Gln Val Ser
    130                 135                 140

Leu Trp Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225


<210> SEQ ID NO 22
<211> LENGTH: 229
<212> TYPE: PRT
<213> ORGANISM: Artificial Sequence
<220> FEATURE:
<223> OTHER INFORMATION: Description of Artificial Sequence: Synthetic
      human IgG4 Fc-region derived Fc-region polypeptide with
      S228P and L235E mutations

<400> SEQUENCE: 22

Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
```

225

<210> SEQ ID NO 23
<211> LENGTH: 229
<212> TYPE: PRT
<213> ORGANISM: Artificial Sequence
<220> FEATURE:
<223> OTHER INFORMATION: Description of Artificial Sequence: Synthetic
human IgG4 Fc-region derived Fc-region polypeptide with
S228P, L235E mutations and P329G mutation

<400> SEQUENCE: 23

```
Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Gly Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225
```

<210> SEQ ID NO 24
<211> LENGTH: 229
<212> TYPE: PRT
<213> ORGANISM: Artificial Sequence
<220> FEATURE:
<223> OTHER INFORMATION: Description of Artificial Sequence: Synthetic
human IgG4 Fc-region derived Fc-region polypeptide with
S354C, T366W mutations

<400> SEQUENCE: 24

```
Glu Ser Lys Tyr Gly Pro Pro Cys Pro Ser Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45
```

Ser Gln Glu Asp Pro Glu Val Gln Phe Asn Trp Tyr Val Asp Gly Val
50 55 60

Glu Val His Asn Ala Lys Thr Lys Pro Arg Glu Glu Gln Phe Asn Ser
65 70 75 80

Thr Tyr Arg Val Val Ser Val Leu Thr Val Leu His Gln Asp Trp Leu
85 90 95

Asn Gly Lys Glu Tyr Lys Cys Lys Val Ser Asn Lys Gly Leu Pro Ser
100 105 110

Ser Ile Glu Lys Thr Ile Ser Lys Ala Lys Gly Gln Pro Arg Glu Pro
115 120 125

Gln Val Tyr Thr Leu Pro Pro Cys Gln Glu Glu Met Thr Lys Asn Gln
130 135 140

Val Ser Leu Trp Cys Leu Val Lys Gly Phe Tyr Pro Ser Asp Ile Ala
145 150 155 160

Val Glu Trp Glu Ser Asn Gly Gln Pro Glu Asn Asn Tyr Lys Thr Thr
165 170 175

Pro Pro Val Leu Asp Ser Asp Gly Ser Phe Phe Leu Tyr Ser Arg Leu
180 185 190

Thr Val Asp Lys Ser Arg Trp Gln Glu Gly Asn Val Phe Ser Cys Ser
195 200 205

Val Met His Glu Ala Leu His Asn His Tyr Thr Gln Lys Ser Leu Ser
210 215 220

Leu Ser Leu Gly Lys
225

<210> SEQ ID NO 25
<211> LENGTH: 229
<212> TYPE: PRT
<213> ORGANISM: Artificial Sequence
<220> FEATURE:
<223> OTHER INFORMATION: Description of Artificial Sequence: Synthetic human IgG4 Fc-region derived Fc-region polypeptide with Y349C, T366S, L368A, Y407V mutations

<400> SEQUENCE: 25

Glu Ser Lys Tyr Gly Pro Pro Cys Pro Ser Cys Pro Ala Pro Glu Phe
1 5 10 15

Leu Gly Gly Pro Ser Val Phe Leu Phe Pro Pro Lys Pro Lys Asp Thr
20 25 30

Leu Met Ile Ser Arg Thr Pro Glu Val Thr Cys Val Val Val Asp Val
35 40 45

Ser Gln Glu Asp Pro Glu Val Gln Phe Asn Trp Tyr Val Asp Gly Val
50 55 60

Glu Val His Asn Ala Lys Thr Lys Pro Arg Glu Glu Gln Phe Asn Ser
65 70 75 80

Thr Tyr Arg Val Val Ser Val Leu Thr Val Leu His Gln Asp Trp Leu
85 90 95

Asn Gly Lys Glu Tyr Lys Cys Lys Val Ser Asn Lys Gly Leu Pro Ser
100 105 110

Ser Ile Glu Lys Thr Ile Ser Lys Ala Lys Gly Gln Pro Arg Glu Pro
115 120 125

Gln Val Cys Thr Leu Pro Pro Ser Gln Glu Glu Met Thr Lys Asn Gln
130 135 140

Val Ser Leu Ser Cys Ala Val Lys Gly Phe Tyr Pro Ser Asp Ile Ala
145 150 155 160

```
Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Val Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225


<210> SEQ ID NO 26
<211> LENGTH: 229
<212> TYPE: PRT
<213> ORGANISM: Artificial Sequence
<220> FEATURE:
<223> OTHER INFORMATION: Description of Artificial Sequence: Synthetic
      human IgG4 Fc-region derived Fc-region polypeptide with a
      S228P, L235E and S354C, T366W mutations

<400> SEQUENCE: 26

Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Cys Gln Glu Glu Met Thr Lys Asn Gln
    130                 135                 140

Val Ser Leu Trp Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225


<210> SEQ ID NO 27
<211> LENGTH: 229
<212> TYPE: PRT
<213> ORGANISM: Artificial Sequence
<220> FEATURE:
<223> OTHER INFORMATION: Description of Artificial Sequence: Synthetic
```

human IgG4 Fc-region derived Fc-region polypeptide with a S228P, L235E and Y349C, T366S, L368A, Y407V mutations

<400> SEQUENCE: 27

```
Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Cys Thr Leu Pro Pro Ser Gln Glu Glu Met Thr Lys Asn Gln
    130                 135                 140

Val Ser Leu Ser Cys Ala Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Val Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225
```

<210> SEQ ID NO 28
<211> LENGTH: 229
<212> TYPE: PRT
<213> ORGANISM: Artificial Sequence
<220> FEATURE:
<223> OTHER INFORMATION: Description of Artificial Sequence: Synthetic human IgG4 Fc-region derived Fc-region polypeptide with a P329G mutation

<400> SEQUENCE: 28

```
Glu Ser Lys Tyr Gly Pro Pro Cys Pro Ser Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95
```

```
Asn Gly Lys Glu Tyr Lys Cys Lys Val Ser Asn Lys Gly Leu Gly Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225
```

<210> SEQ ID NO 29
<211> LENGTH: 229
<212> TYPE: PRT
<213> ORGANISM: Artificial Sequence
<220> FEATURE:
<223> OTHER INFORMATION: Description of Artificial Sequence: Synthetic human IgG4 Fc-region derived Fc-region polypeptide with a P239G and Y349C, T366S, L368A, Y407V mutations

<400> SEQUENCE: 29

```
Glu Ser Lys Tyr Gly Pro Pro Cys Pro Ser Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Gly Ser
            100                 105                 110

Ser Ile Glu Lys Thr Ile Ser Lys Ala Lys Gly Gln Pro Arg Glu Pro
        115                 120                 125

Gln Val Cys Thr Leu Pro Pro Ser Gln Glu Glu Met Thr Lys Asn Gln
    130                 135                 140

Val Ser Leu Ser Cys Ala Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Val Ser Arg Leu
            180                 185                 190

Thr Val Asp Lys Ser Arg Trp Gln Glu Gly Asn Val Phe Ser Cys Ser
        195                 200                 205
```

Val Met His Glu Ala Leu His Asn His Tyr Thr Gln Lys Ser Leu Ser
    210                 215                 220

Leu Ser Leu Gly Lys
225

<210> SEQ ID NO 30
<211> LENGTH: 229
<212> TYPE: PRT
<213> ORGANISM: Artificial Sequence
<220> FEATURE:
<223> OTHER INFORMATION: Description of Artificial Sequence: Synthetic human IgG4 Fc-region derived Fc-region polypeptide with a P329G and S354C, T366W mutations

<400> SEQUENCE: 30

Glu Ser Lys Tyr Gly Pro Pro Cys Pro Ser Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Gly Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Cys Gln Glu Glu Met Thr Lys Asn Gln
    130                 135                 140

Val Ser Leu Trp Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225

<210> SEQ ID NO 31
<211> LENGTH: 229
<212> TYPE: PRT
<213> ORGANISM: Artificial Sequence
<220> FEATURE:
<223> OTHER INFORMATION: Description of Artificial Sequence: Synthetic human IgG4 Fc-region derived Fc-region polypeptide with a S228P, L235E, P329G and Y349C, T366S, L368A, Y407V mutations

<400> SEQUENCE: 31

Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr

```
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Gly Ser
            100                 105                 110

Ser Ile Glu Lys Thr Ile Ser Lys Ala Lys Gly Gln Pro Arg Glu Pro
        115                 120                 125

Gln Val Cys Thr Leu Pro Pro Ser Gln Glu Glu Met Thr Lys Asn Gln
    130                 135                 140

Val Ser Leu Ser Cys Ala Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Val Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225


<210> SEQ ID NO 32
<211> LENGTH: 229
<212> TYPE: PRT
<213> ORGANISM: Artificial Sequence
<220> FEATURE:
<223> OTHER INFORMATION: Description of Artificial Sequence: Synthetic
      human IgG4 Fc-region derived Fc-region polypeptide with a
      S228P, L235E, P329G and S354C, T366W mutations

<400> SEQUENCE: 32

Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Gly Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Cys Gln Glu Glu Met Thr Lys Asn Gln
    130                 135                 140
```

Val Ser Leu Trp Cys Leu Val Lys Gly Phe Tyr Pro Ser Asp Ile Ala
145 150 155 160

Val Glu Trp Glu Ser Asn Gly Gln Pro Glu Asn Asn Tyr Lys Thr Thr
165 170 175

Pro Pro Val Leu Asp Ser Asp Gly Ser Phe Phe Leu Tyr Ser Arg Leu
180 185 190

Thr Val Asp Lys Ser Arg Trp Gln Glu Gly Asn Val Phe Ser Cys Ser
195 200 205

Val Met His Glu Ala Leu His Asn His Tyr Thr Gln Lys Ser Leu Ser
210 215 220

Leu Ser Leu Gly Lys
225

<210> SEQ ID NO 33
<211> LENGTH: 274
<212> TYPE: PRT
<213> ORGANISM: Homo sapiens

<400> SEQUENCE: 33

Ala Glu Ser His Leu Ser Leu Leu Tyr His Leu Thr Ala Val Ser Ser
1 5 10 15

Pro Ala Pro Gly Thr Pro Ala Phe Trp Val Ser Gly Trp Leu Gly Pro
20 25 30

Gln Gln Tyr Leu Ser Tyr Asn Ser Leu Arg Gly Glu Ala Glu Pro Cys
35 40 45

Gly Ala Trp Val Trp Glu Asn Gln Val Ser Trp Tyr Trp Glu Lys Glu
50 55 60

Thr Thr Asp Leu Arg Ile Lys Glu Lys Leu Phe Leu Glu Ala Phe Lys
65 70 75 80

Ala Leu Gly Gly Lys Gly Pro Tyr Thr Leu Gln Gly Leu Leu Gly Cys
85 90 95

Glu Leu Gly Pro Asp Asn Thr Ser Val Pro Thr Ala Lys Phe Ala Leu
100 105 110

Asn Gly Glu Glu Phe Met Asn Phe Asp Leu Lys Gln Gly Thr Trp Gly
115 120 125

Gly Asp Trp Pro Glu Ala Leu Ala Ile Ser Gln Arg Trp Gln Gln Gln
130 135 140

Asp Lys Ala Ala Asn Lys Glu Leu Thr Phe Leu Leu Phe Ser Cys Pro
145 150 155 160

His Arg Leu Arg Glu His Leu Glu Arg Gly Arg Gly Asn Leu Glu Trp
165 170 175

Lys Glu Pro Pro Ser Met Arg Leu Lys Ala Arg Pro Ser Ser Pro Gly
180 185 190

Phe Ser Val Leu Thr Cys Ser Ala Phe Ser Phe Tyr Pro Pro Glu Leu
195 200 205

Gln Leu Arg Phe Leu Arg Asn Gly Leu Ala Ala Gly Thr Gly Gln Gly
210 215 220

Asp Phe Gly Pro Asn Ser Asp Gly Ser Phe His Ala Ser Ser Ser Leu
225 230 235 240

Thr Val Lys Ser Gly Asp Glu His His Tyr Cys Cys Ile Val Gln His
245 250 255

Ala Gly Leu Ala Gln Pro Leu Arg Val Glu Leu Glu Ser Pro Ala Lys
260 265 270

Ser Ser

```
<210> SEQ ID NO 34
<211> LENGTH: 21
<212> TYPE: PRT
<213> ORGANISM: Artificial Sequence
<220> FEATURE:
<223> OTHER INFORMATION: Description of Artificial Sequence: Synthetic
      HIS-AVITAG

<400> SEQUENCE: 34

His His His His His His Gly Leu Asn Asp Ile Phe Glu Ala Gln Lys
1               5                   10                  15

Ile Glu Trp His Glu
            20


<210> SEQ ID NO 35
<211> LENGTH: 99
<212> TYPE: PRT
<213> ORGANISM: Homo sapiens

<400> SEQUENCE: 35

Ile Gln Arg Thr Pro Lys Ile Gln Val Tyr Ser Arg His Pro Ala Glu
1               5                   10                  15

Asn Gly Lys Ser Asn Phe Leu Asn Cys Tyr Val Ser Gly Phe His Pro
            20                  25                  30

Ser Asp Ile Glu Val Asp Leu Leu Lys Asn Gly Glu Arg Ile Glu Lys
        35                  40                  45

Val Glu His Ser Asp Leu Ser Phe Ser Lys Asp Trp Ser Phe Tyr Leu
    50                  55                  60

Leu Tyr Tyr Thr Glu Phe Thr Pro Thr Glu Lys Asp Glu Tyr Ala Cys
65                  70                  75                  80

Arg Val Asn His Val Thr Leu Ser Gln Pro Lys Ile Val Lys Trp Asp
                85                  90                  95

Arg Asp Met


<210> SEQ ID NO 36
<211> LENGTH: 450
<212> TYPE: PRT
<213> ORGANISM: Artificial Sequence
<220> FEATURE:
<223> OTHER INFORMATION: Description of Artificial Sequence: Synthetic
      anti-HER2 antibody IgG1 HC

<400> SEQUENCE: 36

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30

Tyr Ile His Trp Val Arg Gln Ala Pro Gly Lys Gly Leu Glu Trp Val
        35                  40                  45

Ala Arg Ile Tyr Pro Thr Asn Gly Tyr Thr Arg Tyr Ala Asp Ser Val
    50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ser Arg Trp Gly Gly Asp Gly Phe Tyr Ala Met Asp Tyr Trp Gly Gln
            100                 105                 110

Gly Thr Leu Val Thr Val Ser Ser Ala Ser Thr Lys Gly Pro Ser Val
```

```
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Asp Glu Leu Thr Lys Asn Gln Val Ser Leu
        355                 360                 365

Thr Cys Leu Val Lys Gly Phe Tyr Pro Ser Asp Ile Ala Val Glu Trp
    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
        435                 440                 445

Gly Lys
    450


<210> SEQ ID NO 37
<211> LENGTH: 214
<212> TYPE: PRT
<213> ORGANISM: Artificial Sequence
<220> FEATURE:
<223> OTHER INFORMATION: Description of Artificial Sequence: Synthetic
      anti-HER2 antibody IgG1 LC

<400> SEQUENCE: 37

Asp Ile Gln Met Thr Gln Ser Pro Ser Ser Leu Ser Ala Ser Val Gly
1               5                   10                  15
```

Asp Arg Val Thr Ile Thr Cys Arg Ala Ser Gln Asp Val Asn Thr Ala
20 25 30

Val Ala Trp Tyr Gln Gln Lys Pro Gly Lys Ala Pro Lys Leu Leu Ile
35 40 45

Tyr Ser Ala Ser Phe Leu Tyr Ser Gly Val Pro Ser Arg Phe Ser Gly
50 55 60

Ser Arg Ser Gly Thr Asp Phe Thr Leu Thr Ile Ser Ser Leu Gln Pro
65 70 75 80

Glu Asp Phe Ala Thr Tyr Tyr Cys Gln Gln His Tyr Thr Thr Pro Pro
85 90 95

Thr Phe Gly Gln Gly Thr Lys Val Glu Ile Lys Arg Thr Val Ala Ala
100 105 110

Pro Ser Val Phe Ile Phe Pro Pro Ser Asp Glu Gln Leu Lys Ser Gly
115 120 125

Thr Ala Ser Val Val Cys Leu Leu Asn Asn Phe Tyr Pro Arg Glu Ala
130 135 140

Lys Val Gln Trp Lys Val Asp Asn Ala Leu Gln Ser Gly Asn Ser Gln
145 150 155 160

Glu Ser Val Thr Glu Gln Asp Ser Lys Asp Ser Thr Tyr Ser Leu Ser
165 170 175

Ser Thr Leu Thr Leu Ser Lys Ala Asp Tyr Glu Lys His Lys Val Tyr
180 185 190

Ala Cys Glu Val Thr His Gln Gly Leu Ser Ser Pro Val Thr Lys Ser
195 200 205

Phe Asn Arg Gly Glu Cys
210

<210> SEQ ID NO 38
<211> LENGTH: 447
<212> TYPE: PRT
<213> ORGANISM: Artificial Sequence
<220> FEATURE:
<223> OTHER INFORMATION: Description of Artificial Sequence: Synthetic
anti-HER2 antibody IgG4 HC

<400> SEQUENCE: 38

Glu Val Gln Leu Val Glu Ser Gly Gly Gly Leu Val Gln Pro Gly Gly
1 5 10 15

Ser Leu Arg Leu Ser Cys Ala Ala Ser Gly Phe Asn Ile Lys Asp Thr
20 25 30

Tyr Ile His Trp Val Arg Gln Ala Pro Gly Lys Gly Leu Glu Trp Val
35 40 45

Ala Arg Ile Tyr Pro Thr Asn Gly Tyr Thr Arg Tyr Ala Asp Ser Val
50 55 60

Lys Gly Arg Phe Thr Ile Ser Ala Asp Thr Ser Lys Asn Thr Ala Tyr
65 70 75 80

Leu Gln Met Asn Ser Leu Arg Ala Glu Asp Thr Ala Val Tyr Tyr Cys
85 90 95

Ser Arg Trp Gly Gly Asp Gly Phe Tyr Ala Met Asp Tyr Trp Gly Gln
100 105 110

Gly Thr Leu Val Thr Val Ser Ser Ala Ser Thr Lys Gly Pro Ser Val
115 120 125

Phe Pro Leu Ala Pro Cys Ser Arg Ser Thr Ser Glu Ser Thr Ala Ala
130 135 140

Leu Gly Cys Leu Val Lys Asp Tyr Phe Pro Glu Pro Val Thr Val Ser
145 150 155 160

```
Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Lys Thr Tyr Thr Cys Asn Val Asp His Lys
        195                 200                 205

Pro Ser Asn Thr Lys Val Asp Lys Arg Val Glu Ser Lys Tyr Gly Pro
    210                 215                 220

Pro Cys Pro Ser Cys Pro Ala Pro Glu Phe Leu Gly Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser Gln Glu Asp Pro Glu
            260                 265                 270

Val Gln Phe Asn Trp Tyr Val Asp Gly Val Glu Val His Asn Ala Lys
        275                 280                 285

Thr Lys Pro Arg Glu Glu Gln Phe Asn Ser Thr Tyr Arg Val Val Ser
    290                 295                 300

Val Leu Thr Val Leu His Gln Asp Trp Leu Asn Gly Lys Glu Tyr Lys
305                 310                 315                 320

Cys Lys Val Ser Asn Lys Gly Leu Pro Ser Ser Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Gln Glu Glu Met Thr Lys Asn Gln Val Ser Leu Thr Cys Leu
        355                 360                 365

Val Lys Gly Phe Tyr Pro Ser Asp Ile Ala Val Glu Trp Glu Ser Asn
    370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Arg Leu Thr Val Asp Lys Ser Arg
                405                 410                 415

Trp Gln Glu Gly Asn Val Phe Ser Cys Ser Val Met His Glu Ala Leu
            420                 425                 430

His Asn His Tyr Thr Gln Lys Ser Leu Ser Leu Ser Leu Gly Lys
        435                 440                 445


<210> SEQ ID NO 39
<211> LENGTH: 214
<212> TYPE: PRT
<213> ORGANISM: Artificial Sequence
<220> FEATURE:
<223> OTHER INFORMATION: Description of Artificial Sequence: Synthetic
      anti-HER2 antibody IgG4 LC

<400> SEQUENCE: 39

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Arg Ser Gly Thr Asp Phe Thr Leu Thr Ile Ser Ser Leu Gln Pro
```

65 70 75 80

Glu Asp Phe Ala Thr Tyr Tyr Cys Gln Gln His Tyr Thr Thr Pro Pro
85 90 95

Thr Phe Gly Gln Gly Thr Lys Val Glu Ile Lys Arg Thr Val Ala Ala
100 105 110

Pro Ser Val Phe Ile Phe Pro Pro Ser Asp Glu Gln Leu Lys Ser Gly
115 120 125

Thr Ala Ser Val Val Cys Leu Leu Asn Asn Phe Tyr Pro Arg Glu Ala
130 135 140

Lys Val Gln Trp Lys Val Asp Asn Ala Leu Gln Ser Gly Asn Ser Gln
145 150 155 160

Glu Ser Val Thr Glu Gln Asp Ser Lys Asp Ser Thr Tyr Ser Leu Ser
165 170 175

Ser Thr Leu Thr Leu Ser Lys Ala Asp Tyr Glu Lys His Lys Val Tyr
180 185 190

Ala Cys Glu Val Thr His Gln Gly Leu Ser Ser Pro Val Thr Lys Ser
195 200 205

Phe Asn Arg Gly Glu Cys
210

<210> SEQ ID NO 40
<211> LENGTH: 115
<212> TYPE: PRT
<213> ORGANISM: Artificial Sequence
<220> FEATURE:
<223> OTHER INFORMATION: Description of Artificial Sequence: Synthetic amino acid sequence of the heavy chain variable region of briakinumab (CJ-695, ABT-874).

<400> SEQUENCE: 40

Gln Val Gln Leu Val Glu Ser Gly Gly Gly Val Val Gln Pro Gly Arg
1 5 10 15

Ser Leu Arg Leu Ser Cys Ala Ala Ser Gly Phe Thr Phe Ser Ser Tyr
20 25 30

Gly Met His Trp Val Arg Gln Ala Pro Gly Lys Gly Leu Glu Trp Val
35 40 45

Ala Phe Ile Arg Tyr Asp Gly Ser Asn Lys Tyr Tyr Ala Asp Ser Val
50 55 60

Lys Gly Arg Phe Thr Ile Ser Arg Asp Asn Ser Lys Asn Thr Leu Tyr
65 70 75 80

Leu Gln Met Asn Ser Leu Arg Ala Glu Asp Thr Ala Val Tyr Tyr Cys
85 90 95

Lys Thr His Gly Ser His Asp Asn Trp Gly Gln Gly Thr Met Val Thr
100 105 110

Val Ser Ser
115

<210> SEQ ID NO 41
<211> LENGTH: 112
<212> TYPE: PRT
<213> ORGANISM: Artificial Sequence
<220> FEATURE:
<223> OTHER INFORMATION: Description of Artificial Sequence: Synthetic amino acid sequence of the light chain variable region of briakinumab (J-695, ABT-874).

<400> SEQUENCE: 41

Gln Ser Val Leu Thr Gln Pro Pro Ser Val Ser Gly Ala Pro Gly Gln
1 5 10 15

```
Arg Val Thr Ile Ser Cys Ser Gly Ser Arg Ser Asn Ile Gly Ser Asn
            20                  25                  30

Thr Val Lys Trp Tyr Gln Gln Leu Pro Gly Thr Ala Pro Lys Leu Leu
        35                  40                  45

Ile Tyr Tyr Asn Asp Gln Arg Pro Ser Gly Val Pro Asp Arg Phe Ser
    50                  55                  60

Gly Ser Lys Ser Gly Thr Ser Ala Ser Leu Ala Ile Thr Gly Leu Gln
65                  70                  75                  80

Ala Glu Asp Glu Ala Asp Tyr Tyr Cys Gln Ser Tyr Asp Arg Tyr Thr
                85                  90                  95

His Pro Ala Leu Leu Phe Gly Thr Gly Thr Lys Val Thr Val Leu Gly
            100                 105                 110


<210> SEQ ID NO 42
<211> LENGTH: 119
<212> TYPE: PRT
<213> ORGANISM: Artificial Sequence
<220> FEATURE:
<223> OTHER INFORMATION: Description of Artificial Sequence: Synthetic
      amino acid sequence of the heavy chain variable region of
      ustekinumab (CTNO-1275).

<400> SEQUENCE: 42

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Thr Tyr
            20                  25                  30

Trp Leu Gly Trp Val Arg Gln Met Pro Gly Lys Gly Leu Asp Trp Ile
        35                  40                  45

Gly Ile Met Ser Pro Val Asp Ser Asp Ile Arg Tyr Ser Pro Ser Phe
    50                  55                  60

Gln Gly Gln Val Thr Met Ser Val Asp Lys Ser Ile Thr Thr Ala Tyr
65                  70                  75                  80

Leu Gln Trp Asn Ser Leu Lys Ala Ser Asp Thr Ala Met Tyr Tyr Cys
                85                  90                  95

Ala Arg Arg Arg Pro Gly Gln Gly Tyr Phe Asp Phe Trp Gly Gln Gly
            100                 105                 110

Thr Leu Val Thr Val Ser Ser
        115


<210> SEQ ID NO 43
<211> LENGTH: 107
<212> TYPE: PRT
<213> ORGANISM: Artificial Sequence
<220> FEATURE:
<223> OTHER INFORMATION: Description of Artificial Sequence: Synthetic
      amino acid sequence of the light chain variable region of
      ustekinumab (CTNO-1275).

<400> SEQUENCE: 43

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Gln Lys Pro Glu Lys Ala Pro Lys Ser Leu Ile
        35                  40                  45

Tyr Ala Ala Ser Ser Leu Gln Ser Gly Val Pro Ser Arg Phe Ser Gly
    50                  55                  60
```

```
Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Asn Ile Tyr Pro Tyr
                85                  90                  95

Thr Phe Gly Gln Gly Thr Lys Leu Glu Ile Lys
            100                 105


<210> SEQ ID NO 44
<211> LENGTH: 123
<212> TYPE: PRT
<213> ORGANISM: Artificial Sequence
<220> FEATURE:
<223> OTHER INFORMATION: Description of Artificial Sequence: Synthetic
      Bevacizumab heavy chain variable domain (Drug Bank DB00112)

<400> SEQUENCE: 44

Glu Val Gln Leu Val Glu Ser Gly Gly Gly Leu Val Gln Pro Gly Gly
1               5                   10                  15

Ser Leu Arg Leu Ser Cys Ala Ala Ser Gly Tyr Thr Phe Thr Asn Tyr
            20                  25                  30

Gly Met Asn Trp Val Arg Gln Ala Pro Gly Lys Gly Leu Glu Trp Val
        35                  40                  45

Gly Trp Ile Asn Thr Tyr Thr Gly Glu Pro Thr Tyr Ala Ala Asp Phe
    50                  55                  60

Lys Arg Arg Phe Thr Phe Ser Leu Asp Thr Ser Lys Ser Thr Ala Tyr
65                  70                  75                  80

Leu Gln Met Asn Ser Leu Arg Ala Glu Asp Thr Ala Val Tyr Tyr Cys
                85                  90                  95

Ala Lys Tyr Pro His Tyr Tyr Gly Ser Ser His Trp Tyr Phe Asp Val
            100                 105                 110

Trp Gly Gln Gly Thr Leu Val Thr Val Ser Ser
        115                 120


<210> SEQ ID NO 45
<211> LENGTH: 104
<212> TYPE: PRT
<213> ORGANISM: Artificial Sequence
<220> FEATURE:
<223> OTHER INFORMATION: Description of Artificial Sequence: Synthetic
      Bevacizumab light chain variable domain (Drug Bank DB00112)

<400> SEQUENCE: 45

Asp Ile Gln Met Thr Gln Ser Pro Ser Ser Leu Ser Ala Ser Val Gly
1               5                   10                  15

Asp Arg Val Thr Ile Thr Cys Ser Ala Ser Gln Asp Ile Ser Asn Tyr
            20                  25                  30

Leu Asn Trp Tyr Gln Gln Lys Pro Gly Lys Ala Pro Lys Val Leu Ile
        35                  40                  45

Tyr Phe Thr Ser Ser Leu His Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ser Thr Val Pro Trp
                85                  90                  95

Thr Phe Gly Gln Gly Thr Lys Val
            100


<210> SEQ ID NO 46
<211> LENGTH: 217
```

```
<212> TYPE: PRT
<213> ORGANISM: Artificial Sequence
<220> FEATURE:
<223> OTHER INFORMATION: Description of Artificial Sequence: Synthetic
      amino acid sequence of the light chain of briakinumab

<400> SEQUENCE: 46

Gln Ser Val Leu Thr Gln Pro Pro Ser Val Ser Gly Ala Pro Gly Gln
1               5                   10                  15

Arg Val Thr Ile Ser Cys Ser Gly Ser Arg Ser Asn Ile Gly Ser Asn
            20                  25                  30

Thr Val Lys Trp Tyr Gln Gln Leu Pro Gly Thr Ala Pro Lys Leu Leu
        35                  40                  45

Ile Tyr Tyr Asn Asp Gln Arg Pro Ser Gly Val Pro Asp Arg Phe Ser
    50                  55                  60

Gly Ser Lys Ser Gly Thr Ser Ala Ser Leu Ala Ile Thr Gly Leu Gln
65                  70                  75                  80

Ala Glu Asp Glu Ala Asp Tyr Tyr Cys Gln Ser Tyr Asp Arg Tyr Thr
                85                  90                  95

His Pro Ala Leu Leu Phe Gly Thr Gly Thr Lys Val Thr Val Leu Gly
            100                 105                 110

Gln Pro Lys Ala Ala Pro Ser Val Thr Leu Phe Pro Pro Ser Ser Glu
        115                 120                 125

Glu Leu Gln Ala Asn Lys Ala Thr Leu Val Cys Leu Ile Ser Asp Phe
    130                 135                 140

Tyr Pro Gly Ala Val Thr Val Ala Trp Lys Ala Asp Ser Ser Pro Val
145                 150                 155                 160

Lys Ala Gly Val Glu Thr Thr Thr Pro Ser Lys Gln Ser Asn Asn Lys
                165                 170                 175

Tyr Ala Ala Ser Ser Tyr Leu Ser Leu Thr Pro Glu Gln Trp Lys Ser
            180                 185                 190

His Arg Ser Tyr Ser Cys Gln Val Thr His Glu Gly Ser Thr Val Glu
        195                 200                 205

Lys Thr Val Ala Pro Thr Glu Cys Ser
    210                 215


<210> SEQ ID NO 47
<211> LENGTH: 445
<212> TYPE: PRT
<213> ORGANISM: Artificial Sequence
<220> FEATURE:
<223> OTHER INFORMATION: Description of Artificial Sequence: Synthetic
      amino acid sequence of the heavy chain of briakinumab

<400> SEQUENCE: 47

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Gly Met His Trp Val Arg Gln Ala Pro Gly Lys Gly Leu Glu Trp Val
        35                  40                  45

Ala Phe Ile Arg Tyr Asp Gly Ser Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95
```

```
Lys Thr His Gly Ser His Asp Asn Trp Gly Gln Gly Thr Met Val Thr
            100                 105                 110

Val Ser Ser Ala Ser Thr Lys Gly Pro Ser Val Phe Pro Leu Ala Pro
        115                 120                 125

Ser Ser Lys Ser Thr Ser Gly Gly Thr Ala Ala Leu Gly Cys Leu Val
    130                 135                 140

Lys Asp Tyr Phe Pro Glu Pro Val Thr Val Ser Trp Asn Ser Gly Ala
145                 150                 155                 160

Leu Thr Ser Gly Val His Thr Phe Pro Ala Val Leu Gln Ser Ser Gly
                165                 170                 175

Leu Tyr Ser Leu Ser Ser Val Val Thr Val Pro Ser Ser Ser Leu Gly
            180                 185                 190

Thr Gln Thr Tyr Ile Cys Asn Val Asn His Lys Pro Ser Asn Thr Lys
        195                 200                 205

Val Asp Lys Lys Val Glu Pro Lys Ser Cys Asp Lys Thr His Thr Cys
    210                 215                 220

Pro Pro Cys Pro Ala Pro Glu Leu Leu Gly Gly Pro Ser Val Phe Leu
225                 230                 235                 240

Phe Pro Pro Lys Pro Lys Asp Thr Leu Met Ile Ser Arg Thr Pro Glu
                245                 250                 255

Val Thr Cys Val Val Val Asp Val Ser His Glu Asp Pro Glu Val Lys
            260                 265                 270

Phe Asn Trp Tyr Val Asp Gly Val Glu Val His Asn Ala Lys Thr Lys
        275                 280                 285

Pro Arg Glu Glu Gln Tyr Asn Ser Thr Tyr Arg Val Val Ser Val Leu
    290                 295                 300

Thr Val Leu His Gln Asp Trp Leu Asn Gly Lys Glu Tyr Lys Cys Lys
305                 310                 315                 320

Val Ser Asn Lys Ala Leu Pro Ala Pro Ile Glu Lys Thr Ile Ser Lys
                325                 330                 335

Ala Lys Gly Gln Pro Arg Glu Pro Gln Val Tyr Thr Leu Pro Pro Ser
            340                 345                 350

Arg Glu Glu Met Thr Lys Asn Gln Val Ser Leu Thr Cys Leu Val Lys
        355                 360                 365

Gly Phe Tyr Pro Ser Asp Ile Ala Val Glu Trp Glu Ser Asn Gly Gln
    370                 375                 380

Pro Glu Asn Asn Tyr Lys Thr Thr Pro Pro Val Leu Asp Ser Asp Gly
385                 390                 395                 400

Ser Phe Phe Leu Tyr Ser Lys Leu Thr Val Asp Lys Ser Arg Trp Gln
                405                 410                 415

Gln Gly Asn Val Phe Ser Cys Ser Val Met His Glu Ala Leu His Asn
            420                 425                 430

His Tyr Thr Gln Lys Ser Leu Ser Leu Ser Arg Gly Lys
        435                 440                 445


<210> SEQ ID NO 48
<211> LENGTH: 214
<212> TYPE: PRT
<213> ORGANISM: Artificial Sequence
<220> FEATURE:
<223> OTHER INFORMATION: Description of Artificial Sequence: Synthetic
      amino acid sequence of the light chain of ustekinumab

<400> SEQUENCE: 48

Asp Ile Gln Met Thr Gln Ser Pro Ser Ser Leu Ser Ala Ser Val Gly
1               5                   10                  15
```

Asp Arg Val Thr Ile Thr Cys Arg Ala Ser Gln Gly Ile Ser Ser Trp
20 25 30

Leu Ala Trp Tyr Gln Gln Lys Pro Glu Lys Ala Pro Lys Ser Leu Ile
35 40 45

Tyr Ala Ala Ser Ser Leu Gln Ser Gly Val Pro Ser Arg Phe Ser Gly
50 55 60

Ser Gly Ser Gly Thr Asp Phe Thr Leu Thr Ile Ser Ser Leu Gln Pro
65 70 75 80

Glu Asp Phe Ala Thr Tyr Tyr Cys Gln Gln Tyr Asn Ile Tyr Pro Tyr
85 90 95

Thr Phe Gly Gln Gly Thr Lys Leu Glu Ile Lys Arg Thr Val Ala Ala
100 105 110

Pro Ser Val Phe Ile Phe Pro Pro Ser Asp Glu Gln Leu Lys Ser Gly
115 120 125

Thr Ala Ser Val Val Cys Leu Leu Asn Asn Phe Tyr Pro Arg Glu Ala
130 135 140

Lys Val Gln Trp Lys Val Asp Asn Ala Leu Gln Ser Gly Asn Ser Gln
145 150 155 160

Glu Ser Val Thr Glu Gln Asp Ser Lys Asp Ser Thr Tyr Ser Leu Ser
165 170 175

Ser Thr Leu Thr Leu Ser Lys Ala Asp Tyr Glu Lys His Lys Val Tyr
180 185 190

Ala Cys Glu Val Thr His Gln Gly Leu Ser Ser Pro Val Thr Lys Ser
195 200 205

Phe Asn Arg Gly Glu Cys
210

<210> SEQ ID NO 49
<211> LENGTH: 449
<212> TYPE: PRT
<213> ORGANISM: Artificial Sequence
<220> FEATURE:
<223> OTHER INFORMATION: Description of Artificial Sequence: Synthetic amino acid sequence of the heavy chain of ustekinumab

<400> SEQUENCE: 49

Glu Val Gln Leu Val Gln Ser Gly Ala Glu Val Lys Lys Pro Gly Glu
1 5 10 15

Ser Leu Lys Ile Ser Cys Lys Gly Ser Gly Tyr Ser Phe Thr Thr Tyr
20 25 30

Trp Leu Gly Trp Val Arg Gln Met Pro Gly Lys Gly Leu Asp Trp Ile
35 40 45

Gly Ile Met Ser Pro Val Asp Ser Asp Ile Arg Tyr Ser Pro Ser Phe
50 55 60

Gln Gly Gln Val Thr Met Ser Val Asp Lys Ser Ile Thr Thr Ala Tyr
65 70 75 80

Leu Gln Trp Asn Ser Leu Lys Ala Ser Asp Thr Ala Met Tyr Tyr Cys
85 90 95

Ala Arg Arg Arg Pro Gly Gln Gly Tyr Phe Asp Phe Trp Gly Gln Gly
100 105 110

Thr Leu Val Thr Val Ser Ser Ser Ser Thr Lys Gly Pro Ser Val Phe
115 120 125

Pro Leu Ala Pro Ser Ser Lys Ser Thr Ser Gly Gly Thr Ala Ala Leu
130 135 140

Gly Cys Leu Val Lys Asp Tyr Phe Pro Glu Pro Val Thr Val Ser Trp

```
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Asp Glu Leu Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445

Lys


<210> SEQ ID NO 50
<211> LENGTH: 110
<212> TYPE: PRT
<213> ORGANISM: Artificial Sequence
<220> FEATURE:
<223> OTHER INFORMATION: Description of Artificial Sequence: Synthetic
      amino acid sequence of the light chain variable region
      of bevacizumab

<400> SEQUENCE: 50

Asp Ile Gln Met Thr Gln Ser Pro Ser Ser Leu Ser Ala Ser Val Gly
1               5                   10                  15

Asp Arg Val Thr Ile Thr Cys Ser Ala Ser Gln Asp Ile Ser Asn Tyr
            20                  25                  30

Leu Asn Trp Tyr Gln Gln Lys Pro Gly Lys Ala Pro Lys Val Leu Ile
        35                  40                  45
```

Tyr Phe Thr Ser Ser Leu His Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ser Thr Val Pro Trp
                85                  90                  95

Thr Phe Gly Gln Gly Thr Lys Val Glu Ile Lys Arg Thr Val
            100                 105                 110

<210> SEQ ID NO 51
<211> LENGTH: 110
<212> TYPE: PRT
<213> ORGANISM: Artificial Sequence
<220> FEATURE:
<223> OTHER INFORMATION: Description of Artificial Sequence: Synthetic amino acid sequence of the light chain variable region of bevacizumab variant

<400> SEQUENCE: 51

Asp Ile Gln Met Thr Gln Ser Pro Ser Ser Leu Ser Ala Ser Val Gly
1               5                   10                  15

Asp Arg Val Thr Ile Thr Cys Ser Ala Ser Gln Lys Ile Ser Asn Tyr
            20                  25                  30

Leu Asn Trp Tyr Gln Gln Lys Pro Gly Lys Ala Pro Lys Val Leu Ile
        35                  40                  45

Tyr Phe Thr Ser Ser Lys His Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ser Lys Val Pro Trp
                85                  90                  95

Thr Phe Gly Gln Gly Thr Lys Val Glu Ile Lys Arg Thr Val
            100                 105                 110

<210> SEQ ID NO 52
<211> LENGTH: 223
<212> TYPE: PRT
<213> ORGANISM: Homo sapiens

<400> SEQUENCE: 52

Val Glu Cys Pro Pro Cys Pro Ala Pro Pro Val Ala Gly Pro Ser Val
1               5                   10                  15

Phe Leu Phe Pro Pro Lys Pro Lys Asp Thr Leu Met Ile Ser Arg Thr
            20                  25                  30

Pro Glu Val Thr Cys Val Val Val Asp Val Ser His Glu Asp Pro Glu
        35                  40                  45

Val Gln Phe Asn Trp Tyr Val Asp Gly Val Glu Val His Asn Ala Lys
    50                  55                  60

Thr Lys Pro Arg Glu Glu Gln Phe Asn Ser Thr Phe Arg Val Val Ser
65                  70                  75                  80

Val Leu Thr Val Val His Gln Asp Trp Leu Asn Gly Lys Glu Tyr Lys
                85                  90                  95

Cys Lys Val Ser Asn Lys Gly Leu Pro Ala Pro Ile Glu Lys Thr Ile
            100                 105                 110

Ser Lys Thr Lys Gly Gln Pro Arg Glu Pro Gln Val Tyr Thr Leu Pro
        115                 120                 125

Pro Ser Arg Glu Glu Met Thr Lys Asn Gln Val Ser Leu Thr Cys Leu
    130                 135                 140

Val Lys Gly Phe Tyr Pro Ser Asp Ile Ser Val Glu Trp Glu Ser Asn
145 150 155 160

Gly Gln Pro Glu Asn Asn Tyr Lys Thr Thr Pro Pro Met Leu Asp Ser
165 170 175

Asp Gly Ser Phe Phe Leu Tyr Ser Lys Leu Thr Val Asp Lys Ser Arg
180 185 190

Trp Gln Gln Gly Asn Val Phe Ser Cys Ser Val Met His Glu Ala Leu
195 200 205

His Asn His Tyr Thr Gln Lys Ser Leu Ser Leu Ser Pro Gly Lys
210 215 220

<210> SEQ ID NO 53
<211> LENGTH: 227
<212> TYPE: PRT
<213> ORGANISM: Homo sapiens

<400> SEQUENCE: 53

Asp Thr Pro Pro Pro Cys Pro Arg Cys Pro Ala Pro Glu Leu Leu Gly
1 5 10 15

Gly Pro Ser Val Phe Leu Phe Pro Pro Lys Pro Lys Asp Thr Leu Met
20 25 30

Ile Ser Arg Thr Pro Glu Val Thr Cys Val Val Val Asp Val Ser His
35 40 45

Glu Asp Pro Glu Val Gln Phe Lys Trp Tyr Val Asp Gly Val Glu Val
50 55 60

His Asn Ala Lys Thr Lys Pro Arg Glu Glu Gln Tyr Asn Ser Thr Phe
65 70 75 80

Arg Val Val Ser Val Leu Thr Val Leu His Gln Asp Trp Leu Asn Gly
85 90 95

Lys Glu Tyr Lys Cys Lys Val Ser Asn Lys Ala Leu Pro Ala Pro Ile
100 105 110

Glu Lys Thr Ile Ser Lys Thr Lys Gly Gln Pro Arg Glu Pro Gln Val
115 120 125

Tyr Thr Leu Pro Pro Ser Arg Glu Glu Met Thr Lys Asn Gln Val Ser
130 135 140

Leu Thr Cys Leu Val Lys Gly Phe Tyr Pro Ser Asp Ile Ala Val Glu
145 150 155 160

Trp Glu Ser Ser Gly Gln Pro Glu Asn Asn Tyr Asn Thr Thr Pro Pro
165 170 175

Met Leu Asp Ser Asp Gly Ser Phe Phe Leu Tyr Ser Lys Leu Thr Val
180 185 190

Asp Lys Ser Arg Trp Gln Gln Gly Asn Ile Phe Ser Cys Ser Val Met
195 200 205

His Glu Ala Leu His Asn Arg Phe Thr Gln Lys Ser Leu Ser Leu Ser
210 215 220

Pro Gly Lys
225

<210> SEQ ID NO 54
<211> LENGTH: 224
<212> TYPE: PRT
<213> ORGANISM: Homo sapiens

<400> SEQUENCE: 54

Pro Pro Cys Pro Ser Cys Pro Ala Pro Glu Phe Leu Gly Gly Pro Ser
1 5 10 15

-continued

```
Val Phe Leu Phe Pro Pro Lys Pro Lys Asp Thr Leu Met Ile Ser Arg
            20                  25                  30

Thr Pro Glu Val Thr Cys Val Val Val Asp Val Ser Gln Glu Asp Pro
        35                  40                  45

Glu Val Gln Phe Asn Trp Tyr Val Asp Gly Val Glu Val His Asn Ala
    50                  55                  60

Lys Thr Lys Pro Arg Glu Glu Gln Phe Asn Ser Thr Tyr Arg Val Val
65                  70                  75                  80

Ser Val Leu Thr Val Leu His Gln Asp Trp Leu Asn Gly Lys Glu Tyr
                85                  90                  95

Lys Cys Lys Val Ser Asn Lys Gly Leu Pro Ser Ser Ile Glu Lys Thr
            100                 105                 110

Ile Ser Lys Ala Lys Gly Gln Pro Arg Glu Pro Gln Val Tyr Thr Leu
        115                 120                 125

Pro Pro Ser Gln Glu Glu Met Thr Lys Asn Gln Val Ser Leu Thr Cys
    130                 135                 140

Leu Val Lys Gly Phe Tyr Pro Ser Asp Ile Ala Val Glu Trp Glu Ser
145                 150                 155                 160

Asn Gly Gln Pro Glu Asn Asn Tyr Lys Thr Thr Pro Pro Val Leu Asp
                165                 170                 175

Ser Asp Gly Ser Phe Phe Leu Tyr Ser Arg Leu Thr Val Asp Lys Ser
            180                 185                 190

Arg Trp Gln Glu Gly Asn Val Phe Ser Cys Ser Val Met His Glu Ala
        195                 200                 205

Leu His Asn His Tyr Thr Gln Lys Ser Leu Ser Leu Ser Leu Gly Lys
    210                 215                 220


<210> SEQ ID NO 55
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 55

His His His His His His
1               5
```